US012586360B1

(12) United States Patent
    Matthews et al.

(10) Patent No.:   US 12,586,360 B1
(45) Date of Patent:        Mar. 24, 2026

(54) METHODS AND SYSTEMS FOR MONITORING AND SURVEILLANCE OF AUTONOMOUS AI IN MEDICAL IMAGING

(71) Applicant: Whiterabbit.ai Inc., Redwood City, CA (US)

(72) Inventors: Thomas Matthews, Burlingame, CA (US); Marguerite Thomlinson, Irvine, CA (US); Siddhartha Chattopadhyay, Tahoe, CA (US); Jason Su, San Jose, CA (US)

(73) Assignee: Whiterabbit.ai Inc., Redwood City, CA (US)

( * ) Notice:     Subject to any disclaimer, the term of this patent is extended or adjusted under 35 U.S.C. 154(b) by 237 days.

(21) Appl. No.: 18/544,758

(22) Filed:     Dec. 19, 2023

Related U.S. Application Data

(60) Provisional application No. 63/433,575, filed on Dec. 19, 2022.

(51) Int. Cl.
    *G06T 7/00*      (2017.01)
    *G06V 10/764*    (2022.01)
    *G06V 10/776*    (2022.01)

(52) U.S. Cl.
    CPC .......... *G06V 10/776* (2022.01); *G06T 7/0012* (2013.01); *G06V 10/764* (2022.01);
    (Continued)

(58) Field of Classification Search
    CPC .............. G06V 10/776; G06V 10/764; G06V 2201/03; G06T 7/0012; G06T 2207/10081;
    (Continued)

(56)                    References Cited

U.S. PATENT DOCUMENTS

2018/0068083 A1 *  3/2018  Cohen ................... G16H 50/20
2019/0189268 A1 *  6/2019  Stoval, III ............. G16H 50/70
                        (Continued)

FOREIGN PATENT DOCUMENTS

WO     WO-2021067843 A1    4/2021
WO     WO-2021142209 A1    7/2021
WO     WO-2022221175 A1   10/2022
WO     WO-2023283443 A1    1/2023

OTHER PUBLICATIONS

Brandt et al., Comparison of clinical and automated breast density measurements: implications for risk prediction and supplemental screening. Radiology. 279(3):710-719 (2016).
                        (Continued)

*Primary Examiner* — Van D Huynh
(74) *Attorney, Agent, or Firm* — WILSON SONSINI GOODRICH & ROSATI

(57)                    ABSTRACT

Disclosed herein is a method for monitoring, surveillance, and/or operation of a machine-learning medical imaging screening classifier, comprising: obtaining the classifier, which is trained to process medical image data of a subject to determine a classification output indicative of a presence or absence of a health state in the subject; obtaining medical image data of clinical subjects of a medical imaging clinical site; applying the classifier to the medical image data to determine classification outputs indicative of a health state in the clinical subjects; determining performance metrics of the classifier, based at least in part on the classification outputs and an actual presence or absence of the health state for the clinical subjects; and operating the classifier in (i) an autonomous operating mode when the classifier is validated based on the performance metrics meeting pre-determined criteria, or (ii) an semi-autonomous or non-autonomous operating mode when the classifier is not validated.

39 Claims, 82 Drawing Sheets

(52) U.S. Cl.

CPC .............. *G06T 2207/10081* (2013.01); *G06T 2207/10088* (2013.01); *G06T 2207/10104* (2013.01); *G06T 2207/10121* (2013.01); *G06T 2207/10132* (2013.01); *G06T 2207/20081* (2013.01); *G06T 2207/20084* (2013.01); *G06T 2207/30068* (2013.01); *G06T 2207/30096* (2013.01); *G06V 2201/03* (2022.01)

(58) Field of Classification Search

CPC ........... G06T 2207/10088; G06T 2207/10104; G06T 2207/10121; G06T 2207/10132; G06T 2207/20081; G06T 2207/20084; G06T 2207/30068; G06T 2207/30096

See application file for complete search history.

(56) References Cited

U.S. PATENT DOCUMENTS

| | | | | |
|---|---|---|---|---|
| 2020/0211694 | A1* | 7/2020 | Nye | G06T 7/11 |
| 2020/0342589 | A1* | 10/2020 | Heindl | G06T 7/143 |
| 2020/0380675 | A1* | 12/2020 | Golden | G06T 7/0012 |
| 2022/0165418 | A1* | 5/2022 | Li | G06V 10/7747 |
| 2023/0284983 | A1* | 9/2023 | Kashiwagi | G16H 20/70 |
| 2023/0343461 | A1* | 10/2023 | Mellem | G16H 50/20 |
| 2024/0289586 | A1* | 8/2024 | Balakrishnan | G06N 3/098 |
| 2024/0346655 | A1* | 10/2024 | Vlasimsky | G06T 3/40 |
| 2025/0316339 | A1* | 10/2025 | Cohen | G16H 50/30 |

OTHER PUBLICATIONS

Chen et al., A Scalable Tree Boosting System. Proceedings of the 22nd ACM SIGKDD International Conference on Knowledge Discovery and Data Mining. New York, NY, USA: ACM. 2016; pp. 785-794.

Cohen et al., Large sample standard errors of kappa and weighted kappa. Psychol Bull. 72(5):323-327 (1969).

Lehman et al., Mammographic breast density assessment using deep learning: Clinical implementation. Radiology. 290(1):52-58 (2019).

Mathews, Thomas P, et al., A Multisite Study of a Breast Density Deep Learning Model for Full-field Digital Mammography and Synthetic Mammography. Radiology Artificial Intelligence 3(1):1-10 (2020).

Shen, Yigiu, et al., Globally-Aware Multiple Instance Classifier for Breast Cancer Screening. Medical Image Analysis, 11861: 18-26 (2020).

Tan, Mingxing, et al., EfficientNet: Rethinking Model Scaling for Convolutional Neural Networks. Proceedings of the 36th International Conference on Machine Learning 1-11 (2019).

Taylor, K, et al., Quantification of the UK 5-point Breast Imaging Classification and Mapping to BI-RADS to Facilitate Comparison with International Literature. The British Journal of Radiology 84 (1007):1005-1010 (2011).

Tian, Zhi, et al., FCOS: A Simple and Strong Anchor-free Object Detector. IEEE Transactions on Pattern Analysis and Machine Intelligence 1:1-12 (2020).

* cited by examiner

MG Tech/Tech Aid

STATE

Post MG

Qualified

Post US

Leave clinic

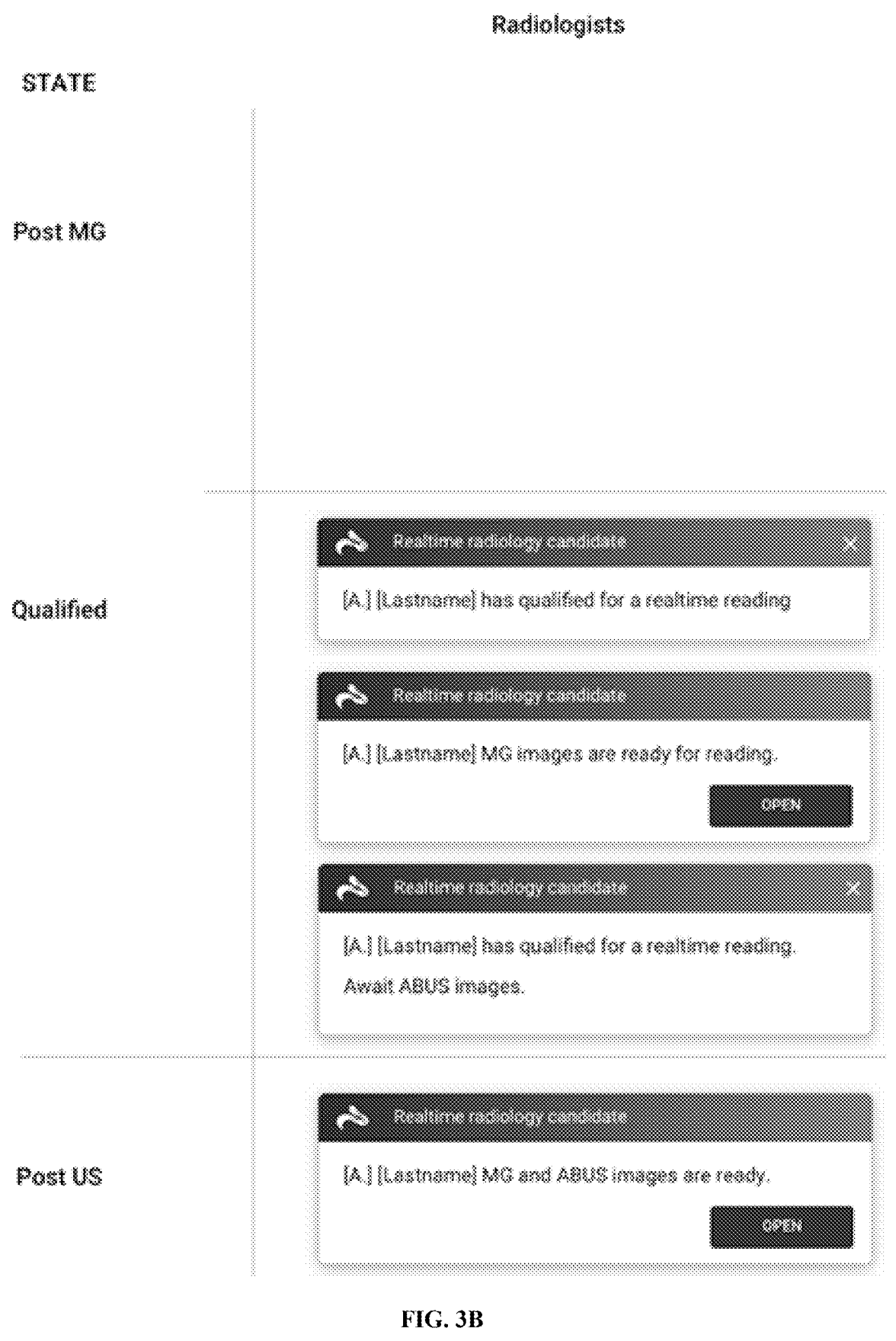

Radiologists

STATE

Post MG

Qualified

Realtime radiology candidate

[A.] [Lastname] has qualified for a realtime reading

Realtime radiology candidate

[A.] [Lastname] MG images are ready for reading.

OPEN

Realtime radiology candidate

[A.] [Lastname] has qualified for a realtime reading.

Await ABUS images.

Post US

Realtime radiology candidate

[A.] [Lastname] MG and ABUS images are ready.

OPEN

FIG. 3B

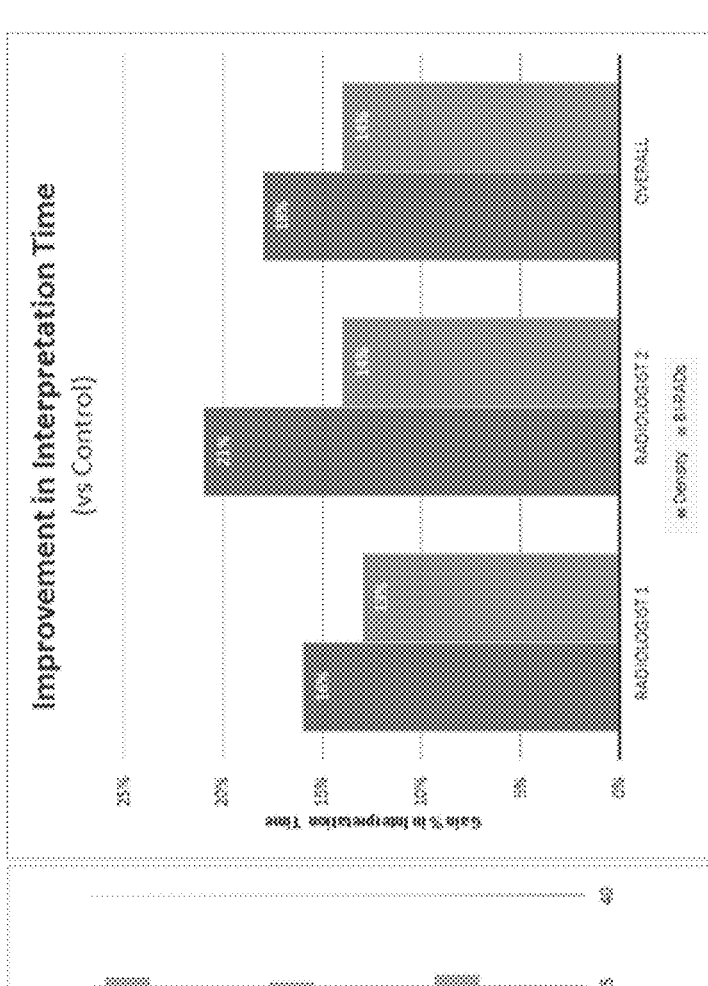
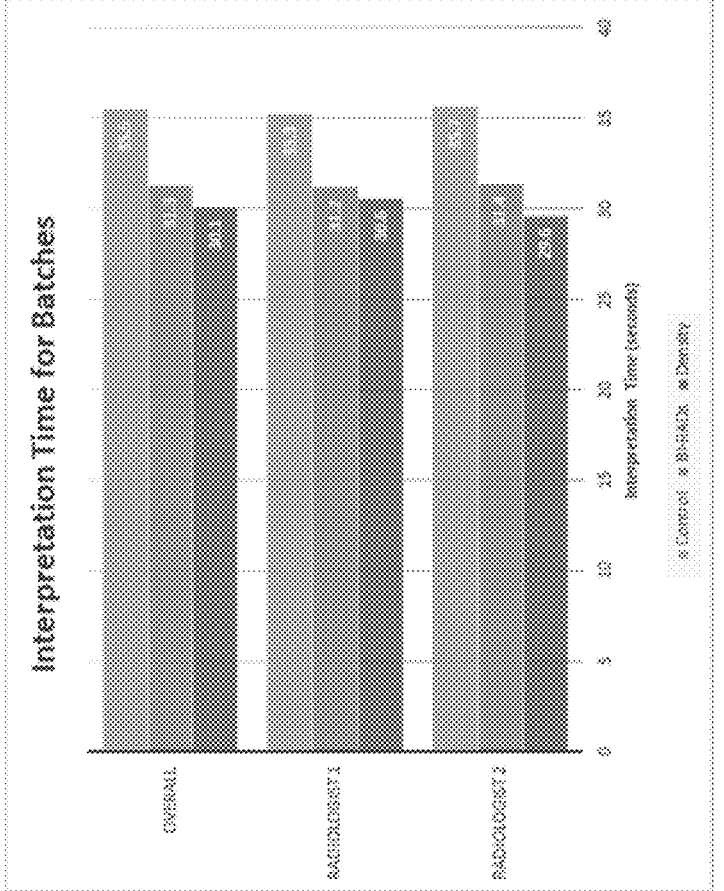
FIG. 7

Real-Time Radiology Workflow

Screening exam

Rule-in

Uncertain

Rule-out

2800

NON-SUSPICIOUS

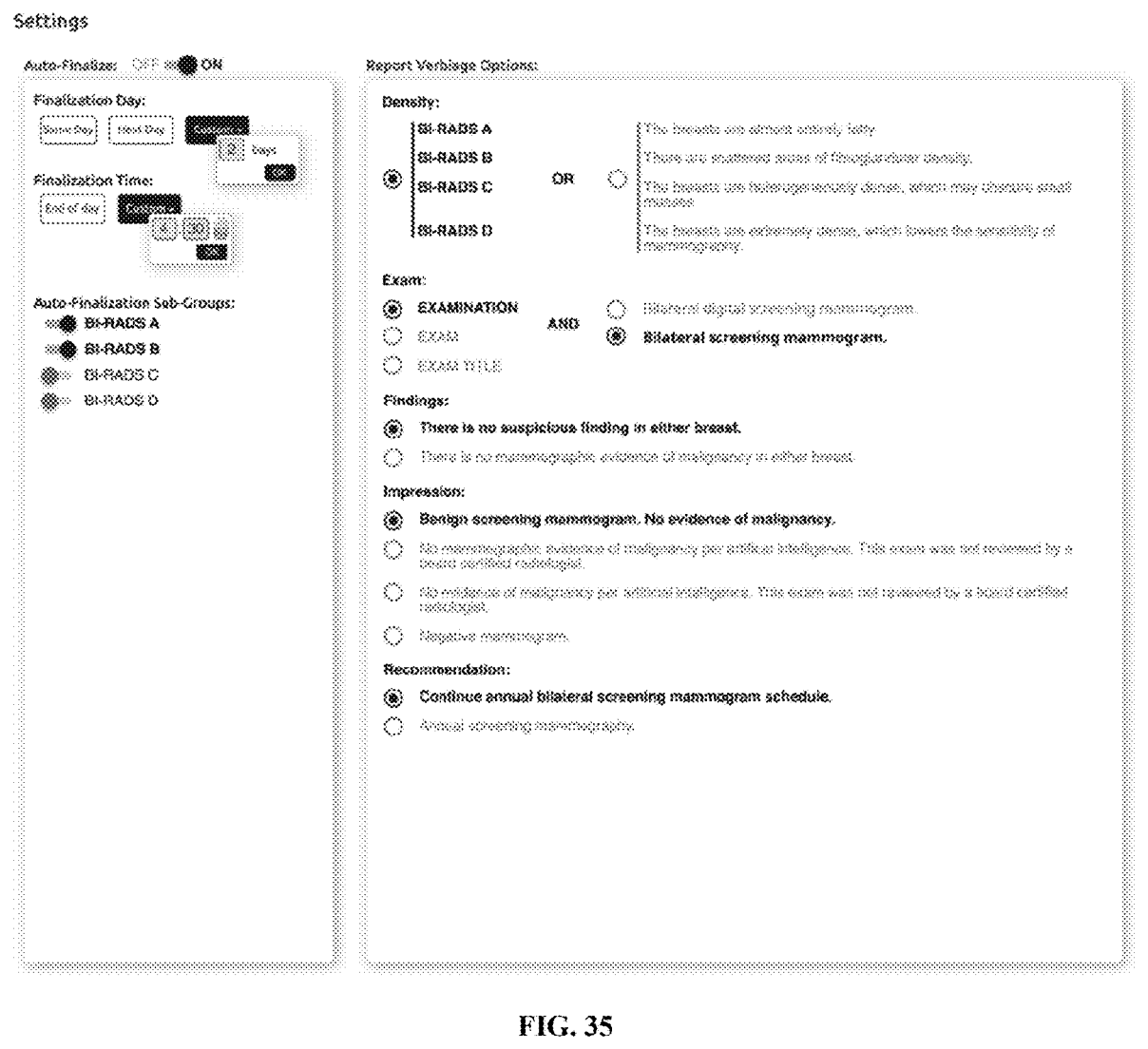

Settings

Auto-Finalize:  OFF  ●ON

Report Verbiage Options:

Finalization Day:

[Same Day] [Next Day]

Density:

|BI-RADS A

|BI-RADS B

● |BI-RADS C        OR    ○

|BI-RADS D

Finalization Time:

[End of day]

Auto-Finalization Sub-Groups:
● BI-RADS A
● BI-RADS B
● BI-RADS C
● BI-RADS D

Exam:

● EXAMINATION        ○
○ EXAM            AND
○ EXAM TITLE        ● Bilateral screening mammogram.

Findings:

● There is no suspicious finding in either breast.
○

Impression:

● Benign screening mammogram. No evidence of malignancy.
○
○
○

Recommendation:

● Continue annual bilateral screening mammogram schedule.
○

FIG. 35

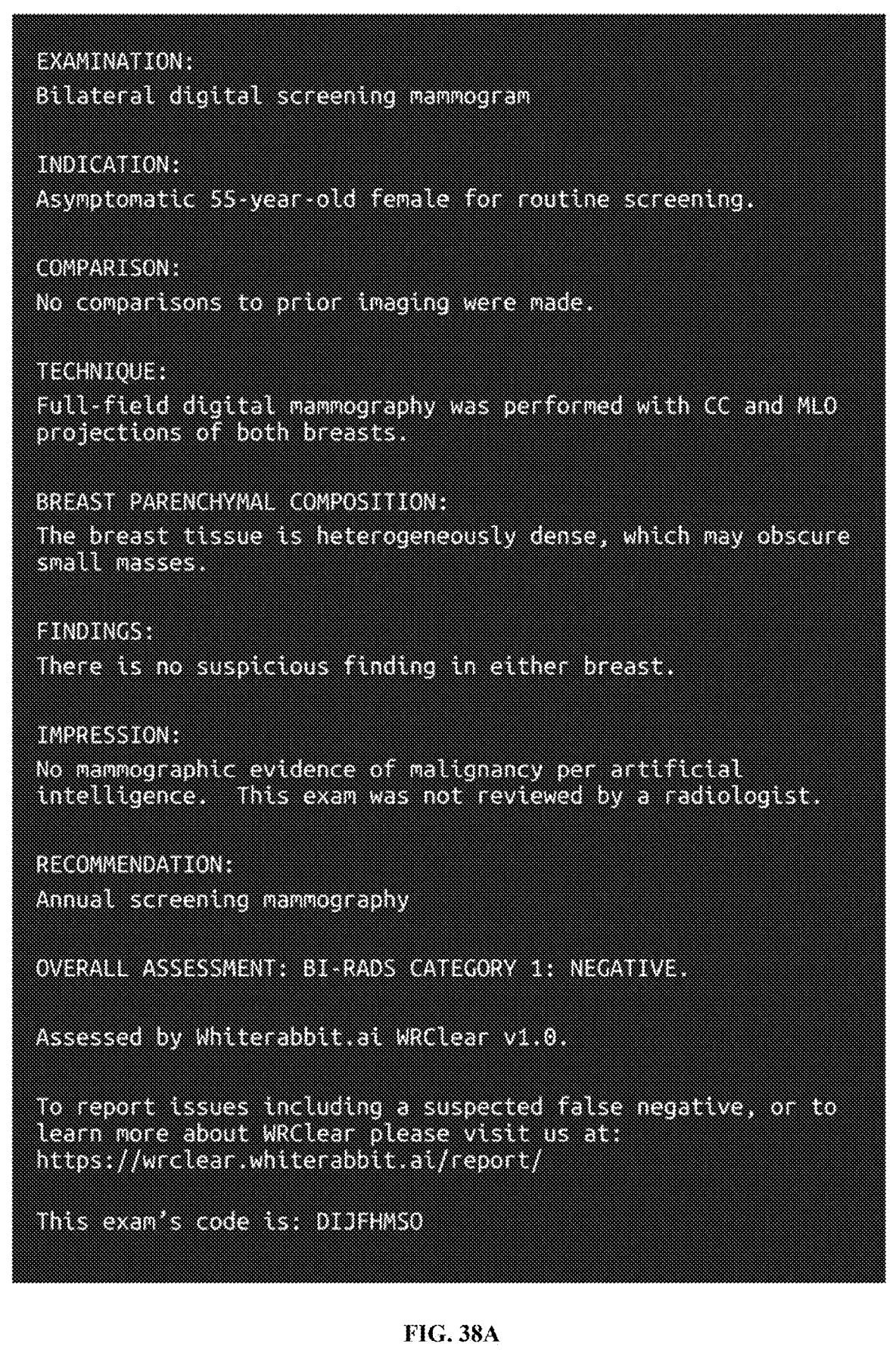

EXAMINATION:
Bilateral digital screening mammogram

INDICATION:
Asymptomatic 55-year-old female for routine screening.

COMPARISON:
No comparisons to prior imaging were made.

TECHNIQUE:
Full-field digital mammography was performed with CC and MLO
projections of both breasts.

BREAST PARENCHYMAL COMPOSITION:
The breast tissue is heterogeneously dense, which may obscure
small masses.

FINDINGS:
There is no suspicious finding in either breast.

IMPRESSION:
No mammographic evidence of malignancy per artificial
intelligence.  This exam was not reviewed by a radiologist.

RECOMMENDATION:
Annual screening mammography

OVERALL ASSESSMENT: BI-RADS CATEGORY 1: NEGATIVE.

Assessed by Whiterabbit.ai WRClear v1.0.

To report issues including a suspected false negative, or to
learn more about WRClear please visit us at:
https://wrclear.whiterabbit.ai/report/

This exam's code is: DIJFHMSO

FIG. 38A

PT returns to same facility

Condensed Diagram

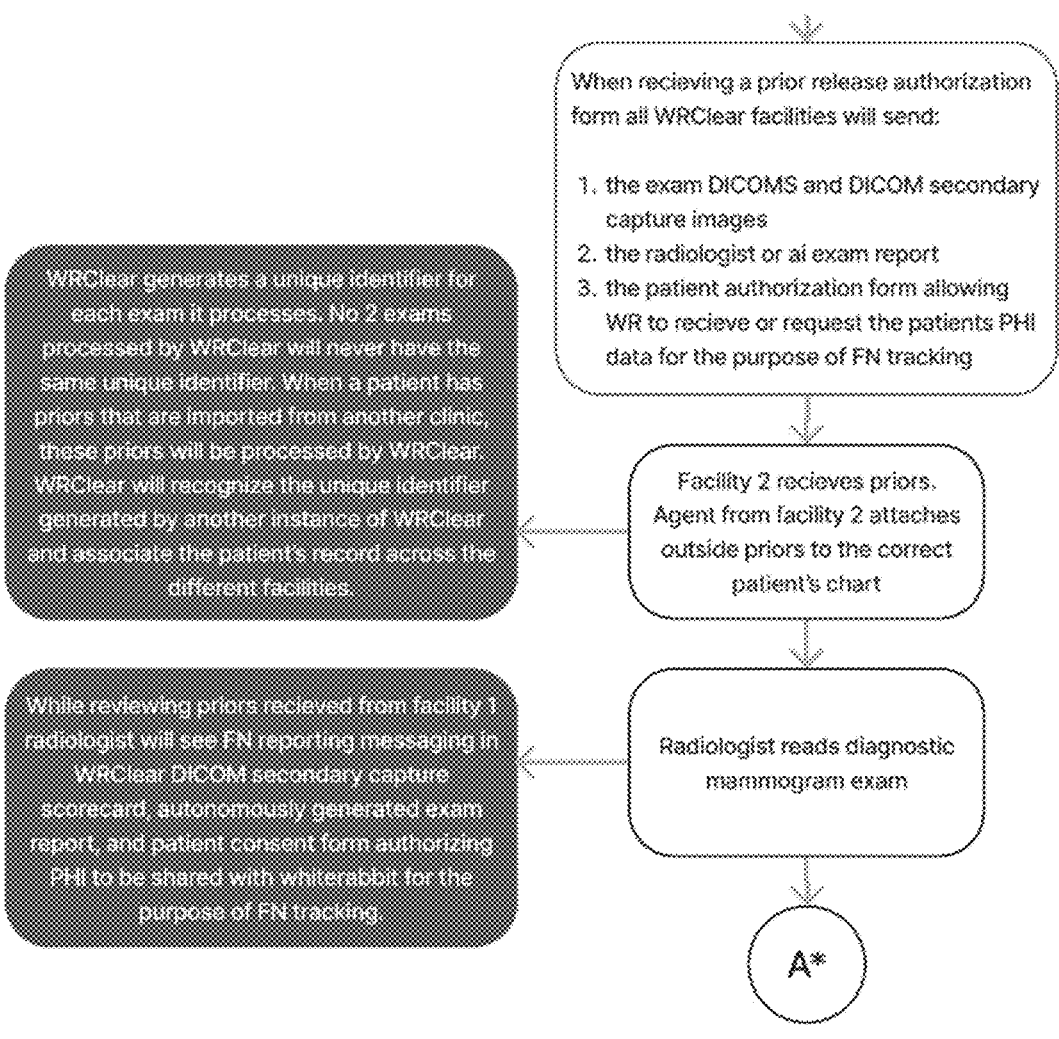

When recieving a prior release authorization form all WRClear facilities will send:

1. the exam DICOMS and DICOM secondary capture images
2. the radiologist or ai exam report
3. the patient authorization form allowing WR to recieve or request the patients PHI data for the purpose of FN tracking WRClear generates a unique identifier for each exam it processes. No 2 exams processed by WRClear will never have the same unique identifier. When a patient has priors that are imported from another clinic, these priors will be processed by WRClear. WRClear will recognize the unique identifier generated by another instance of WRClear and associate the patient's record across the different facilities Facility 2 recieves priors. Agent from facility 2 attaches outside priors to the correct patient's chart While reviewing priors recieved from facility 1 radiologist will see FN reporting messaging in WRClear DICOM secondary capture scorecard, autonomously generated exam report, and patient consent form authorizing PHI to be shared with whiterabbit for the purpose of FN tracking Radiologist reads diagnostic mammogram exam

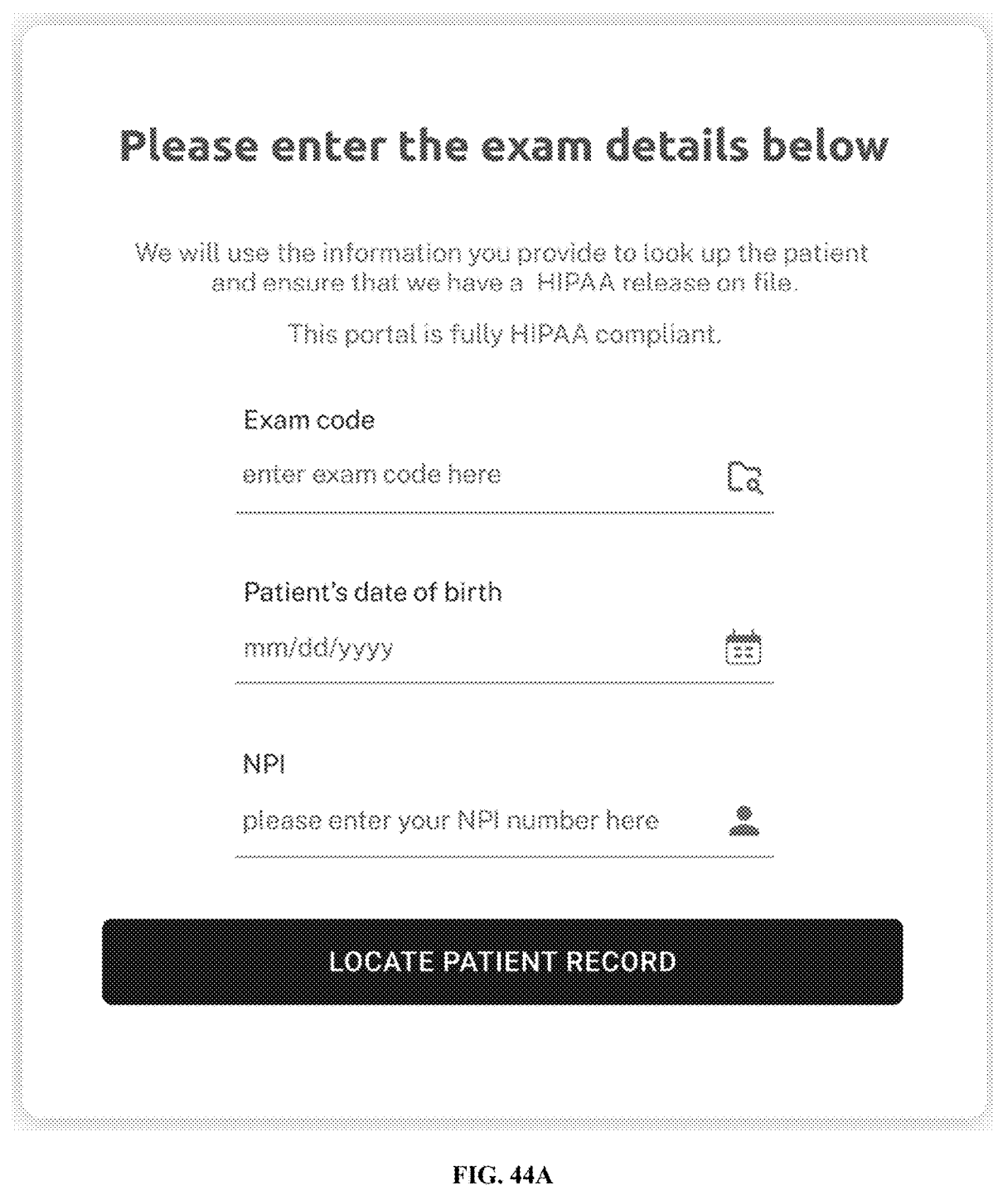

Please enter the exam details below

We will use the information you provide to look up the patient
and ensure that we have a  HIPAA release on file.

This portal is fully HIPAA compliant.

Exam code enter exam code here

Patient's date of birth mm/dd/yyyy

NPI please enter your NPI number here

LOCATE PATIENT RECORD

FIG. 44A

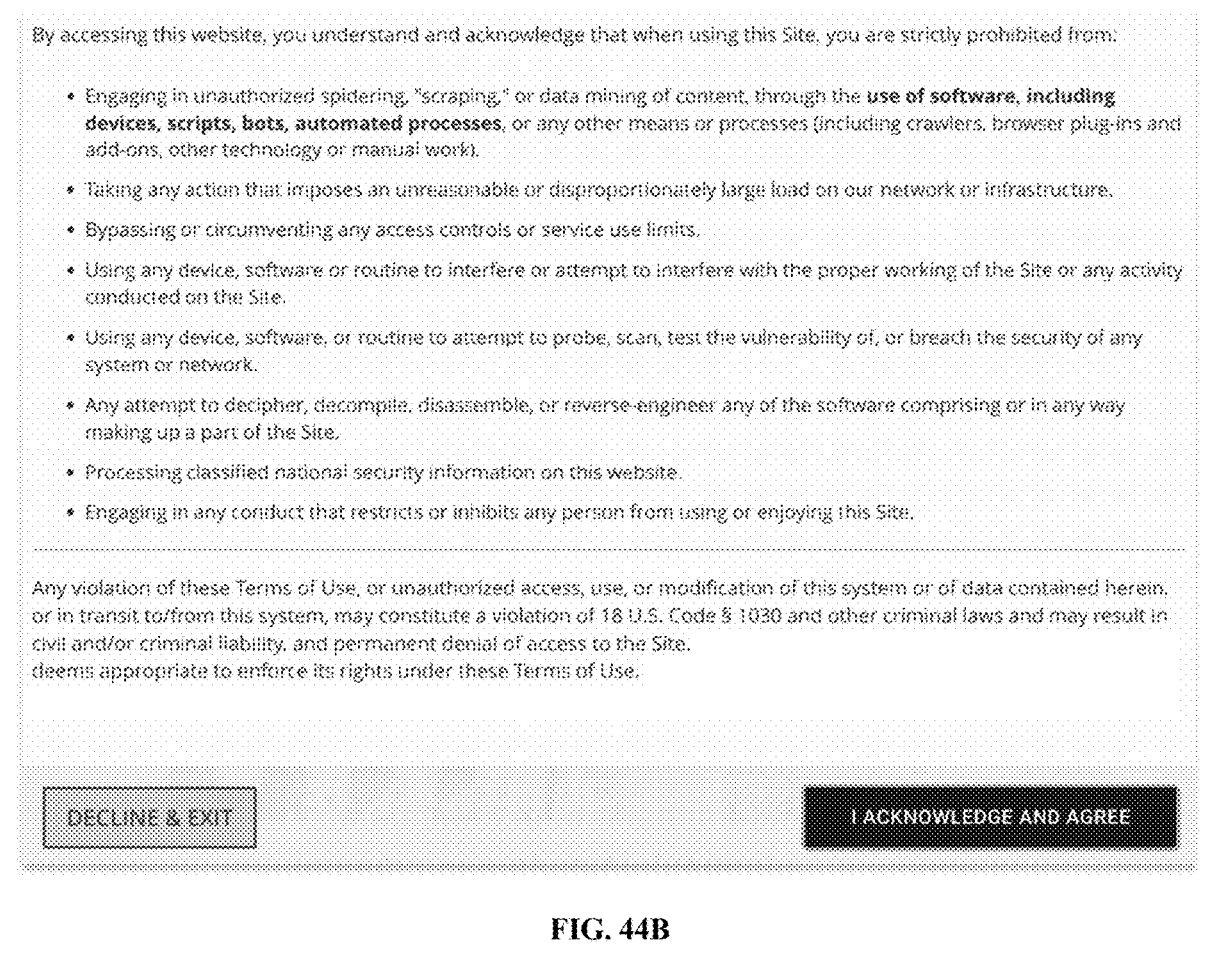

By accessing this website, you understand and acknowledge that when using this Site, you are strictly prohibited from:

- Engaging in unauthorized spidering, "scraping," or data mining of content, through the use of software, including devices, scripts, bots, automated processes, or any other means or processes (including crawlers, browser plug-ins and add-ons, other technology or manual work).

- Taking any action that imposes an unreasonable or disproportionately large load on our network or infrastructure.

- Bypassing or circumventing any access controls or service use limits.

- Using any device, software or routine to interfere or attempt to interfere with the proper working of the Site or any activity conducted on the Site.

- Using any device, software, or routine to attempt to probe, scan, test the vulnerability of, or breach the security of any system or network.

- Any attempt to decipher, decompile, disassemble, or reverse-engineer any of the software comprising or in any way making up a part of the Site.

- Processing classified national security information on this website.

- Engaging in any conduct that restricts or inhibits any person from using or enjoying this Site.

Any violation of these Terms of Use, or unauthorized access, use, or modification of this system or of data contained herein, or in transit to/from this system, may constitute a violation of 18 U.S. Code § 1030 and other criminal laws and may result in civil and/or criminal liability, and permanent denial of access to the Site.
deems appropriate to enforce its rights under these Terms of Use.

DECLINE & EXIT                I ACKNOWLEDGE AND AGREE

FIG. 44B

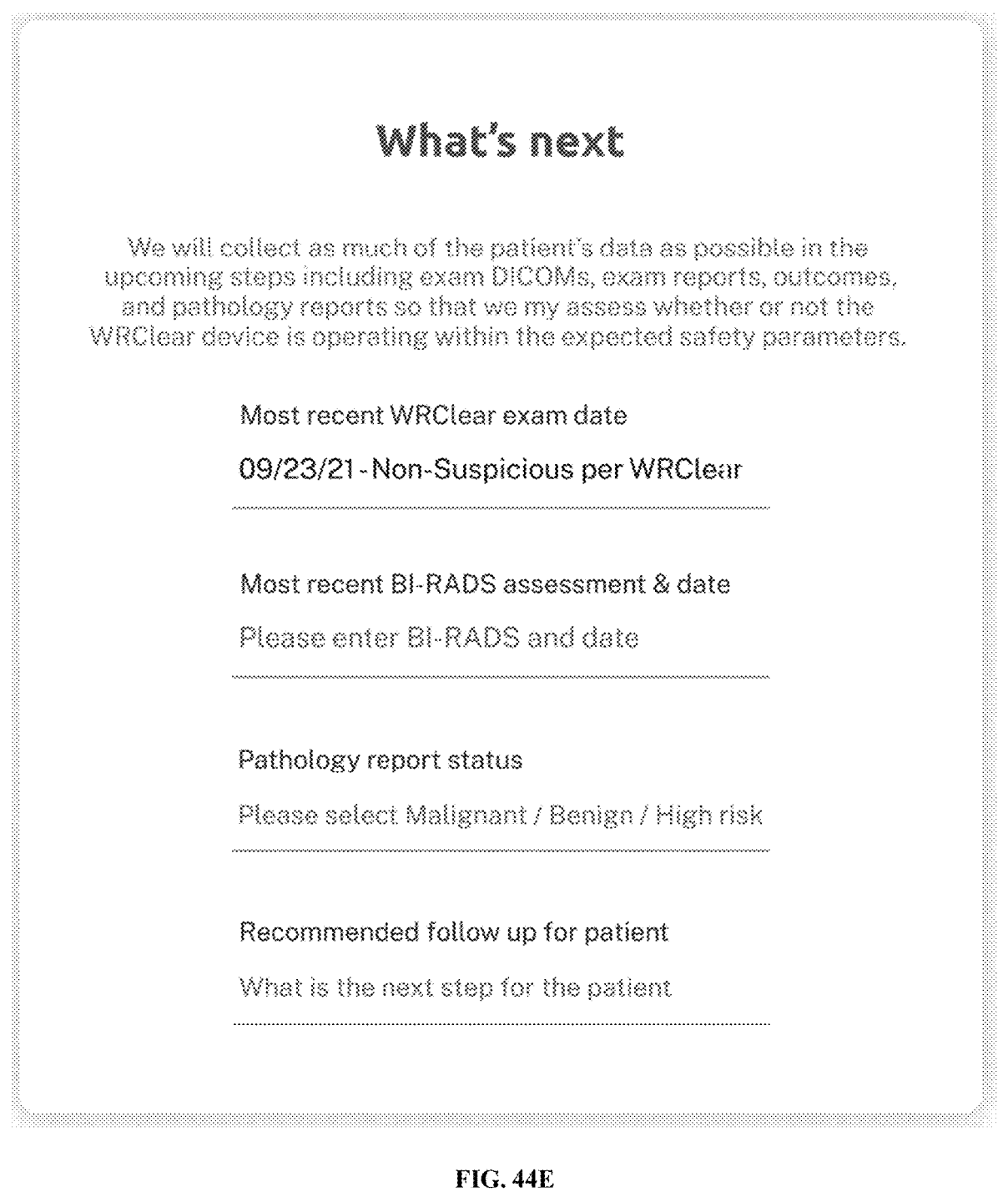

What's next

We will collect as much of the patient's data as possible in the
upcoming steps including exam DICOMs, exam reports, outcomes,
and pathology reports so that we my assess whether or not the
WRClear device is operating within the expected safety parameters.

Most recent WRClear exam date

09/23/21 - Non-Suspicious per WRClear

Most recent BI-RADS assessment & date

Please enter BI-RADS and date

Pathology report status

Please select Malignant / Benign / High risk

Recommended follow up for patient

What is the next step for the patient

FIG. 44E

UPLOAD

NEXT

Operating Mode: Autonomous

4810 Exam

4820 Exam processed by WRClear?

4830 Manual Mammogram Read Performed Performed by P Without Support from WRClear Outputs 4840 Exam is CLEAR (negative)?

4850 Exam is Auto Finalized?

4860 Manual Mammogram Read Performed Performed by P With Support from WRClear Outputs 4870 Exam Autonomously Finalized and Processed by WRClear

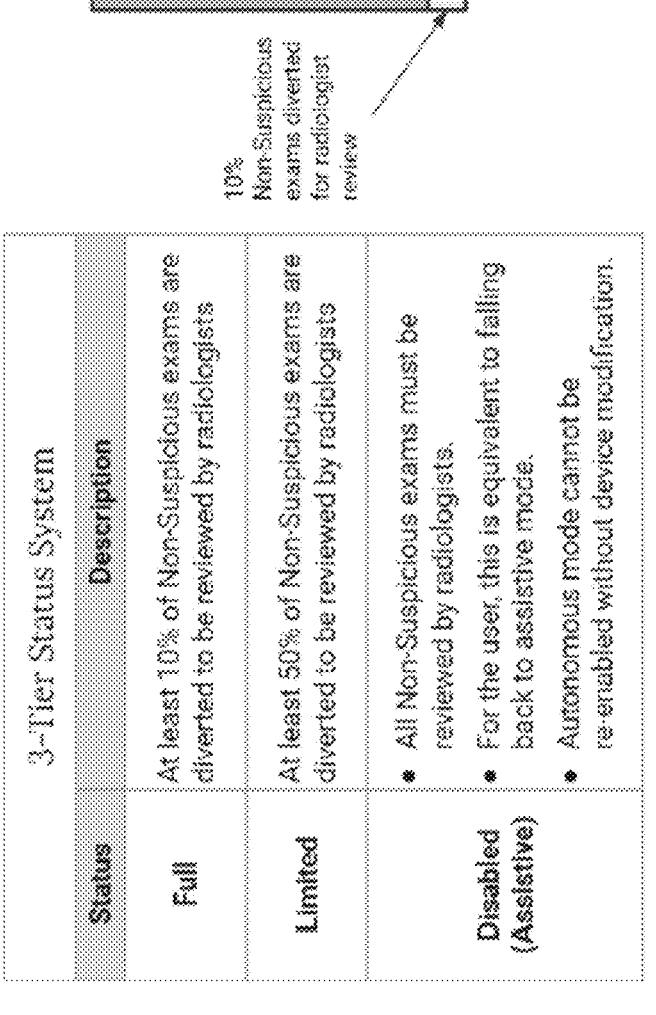

3-Tier Status System

| Status | Description |
|---|---|
| Full | At least 10% of Non-Suspicious exams are diverted to be reviewed by radiologists |
| Limited | At least 50% of Non-Suspicious exams are diverted to be reviewed by radiologists |
| Disabled (Assistive) | • All Non-Suspicious exams must be reviewed by radiologists.<br>• For the user, this is equivalent to falling back to assistive mode.<br>• Autonomous mode cannot be re-enabled without device modification. |

FIG. 52

Case 1: The exam is not finalized

NON-FINALIZED Exam REPROCESSED

Tech

IP reads the exam with or without outputs from WRClear

Interpreting Physician (IP)

Exam finalized

If the exam is not finalized (an autonomous report has not been generated):

1. Tech: Correct the exclusion criteria and REPROCESS the exam within WRClear
2. IP: Read the exam using updated device outputs

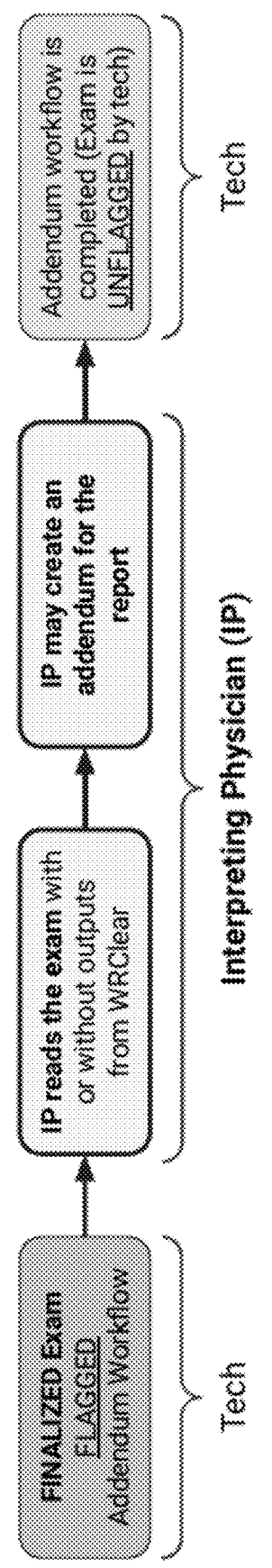

Case 2: The exam is finalized

Tech

FINALIZED Exam FLAGGED Addendum Workflow

IP reads the exam with or without outputs from WRClear

IP may create an addendum for the report

Interpreting Physician (IP)

Addendum workflow is completed (Exam is UNFLAGGED by tech)

Tech

If the exam is finalized (an autonomous report has been generated):

1. Technologist: Correct the exclusion criteria, FLAG the exam within WRClear, and notify the IP using the site's addendum workflow 2. IP: Read and potentially create a report addendum

3. Technologist: UNFLAG the exam.

FIG. 56

METHODS AND SYSTEMS FOR MONITORING AND SURVEILLANCE OF AUTONOMOUS AI IN MEDICAL IMAGING

CROSS-REFERENCE

This application claims the benefit of U.S. Application No. 63/433,575, filed Dec. 19, 2022, which is incorporated by reference herein in its entirety.

BACKGROUND

Breast cancer is the most widespread cancer in women in the U.S., with over 250 thousand new diagnoses in 2017 alone. About 1 in 8 women will be diagnosed with breast cancer at some point during their lives. Despite improvements in treatment, over 40 thousand women die every year in the U.S. from breast cancer. Substantial progress has been made in reducing breast cancer mortality in part due to the widespread adoption of screening mammography. Breast cancer screening can help identify early-stage cancers, which have much better prognoses and lower treatment costs as compared to late-stage cancers. This difference can be substantial: women with localized breast cancer have a 5-year survival rate of nearly 99%, while women with metastatic breast cancer have a 5-year survival rate of 27%.

Despite these demonstrated benefits, adoption rates for screening mammography are hindered, in part, by poor subject experience, such as long delays in obtaining an appointment, unclear pricing, long wait times to receive exam results, and confusing reports. Further, problems arising from a lack of transparency in pricing are exacerbated by large variations in costs among providers. Similarly, delivery times for receiving exam results are inconsistent among providers. In addition, significant variation in radiologist performance results in subjects experiencing very different standards of care depending on location and income.

SUMMARY

The present disclosure provides methods and systems for expedited radiological screening, which may operate at high sensitivity to reduce the number of false positives and remove unnecessary biopsies and surgical procedures, thereby resulting in improvements in reading performance, subject safety, and effectiveness of mammography as a screening tool.

In an aspect, the present disclosure provides a method for monitoring, surveillance, and/or operation of a machine-learning medical imaging screening classifier. The method comprises (a) obtaining the machine-learning medical imaging screening classifier, wherein the machine-learning medical imaging screening classifier is trained to process medical image data of a subject to determine a classification output indicative of a presence or an absence of a health state in the subject; (b) obtaining medical image data of a plurality of clinical subjects of a medical imaging clinical site, the plurality of clinical subjects comprising one or more positive subjects having the health state and one or more negative subjects not having the health state; (c) applying the machine-learning medical imaging screening classifier to the medical image data of the plurality of subjects to determine a plurality of classification outputs indicative of a presence or an absence of a health state in each of the plurality of clinical subjects; (d) determining a set of performance metrics of the machine-learning medical imaging screening classifier, based at least in part on (i) the plurality of classification outputs and (ii) an actual presence or actual absence of the health state for each of the plurality of clinical subjects; (e) determining that the machine-learning medical imaging screening classifier is validated when the set of performance metrics meets pre-determined criteria, or determining that the machine-learning medical imaging screening classifier is not validated when the set of performance metrics does not meet the pre-determined criteria; and (f) operating the machine-learning medical imaging screening classifier in an autonomous operating mode when the machine-learning medical imaging screening classifier is validated, or operating the machine-learning medical imaging screening classifier in an semi-autonomous or non-autonomous operating mode when the machine-learning medical imaging screening classifier is not validated.

In some embodiments, the machine-learning medical imaging screening classifier may comprise a supervised machine-learning algorithm. In some embodiments, the machine-learning medical imaging screening classifier may comprise a deep reinforcement learning algorithm. In some embodiments, the machine-learning medical imaging screening classifier may comprise a large language model.

In some embodiments, the plurality of classification outputs may comprise a non-suspicious classification output that is indicative of an absence of the health state.

In some embodiments, the method may further comprise performing false-negative tracking of medical image data of a subject with a non-suspicious classification output. The false-negative tracking may end when (i) a pathology result is obtained that is indicative of whether the subject has the health state, or (ii) a vigilance time window expires subsequent to the medical imaging assessment.

In some embodiments, the vigilance time window may be about 1 year, about 2 years, about 3 years, about 4 years, about 5 years, about 6 years, about 7 years, about 8 years, about 9 years, about 10 years, or more than about 10 years.

In some embodiments, the health state may comprise a presence or an absence of a disease or disorder. The disease or disorder may comprise cancer. The cancer may be breast cancer.

In some embodiments, the medical imaging may comprise radiological imaging. In some embodiments, the medical image data may be generated using an imaging modality selected from the group consisting of mammography, X-ray, fluoroscopy, ultrasound, magnetic resonance imaging (MRI), computed tomography (CT), positron emission tomography (PET), and a combination thereof. The imaging modality may be mammography.

In some embodiments, the set of performance metrics may comprise a clinical sensitivity, a clinical specificity, a true positive rate (TPR), a false positive rate (FPR), a positive predictive value (PPV), a negative predictive value (NPV), an area-under-the-curve (AUC), a positive rate, or a negative rate.

In some embodiments, the pre-determined criteria may comprise a sensitivity criterion that the clinical sensitivity is at least about 10%, at least about 20%, at least about 30%, at least about 40%, at least about 50%, at least about 60%, at least about 70%, at least about 80%, at least about 85%, at least about 90%, at least about 95%, at least about 96%, at least about 97%, at least about 98%, or at least about 99%.

In some embodiments, the pre-determined criteria may comprise a specificity criterion that the clinical specificity is at least about 10%, at least about 20%, at least about 30%, at least about 40%, at least about 50%, at least about 60%, at least about 70%, at least about 80%, at least about 85%, at least about 90%, at least about 95%, at least about 96%, at least about 97%, at least about 98%, or at least about 99%.

In some embodiments, the pre-determined criteria may comprise a PPV criterion that the PPV is at least about 10%, at least about 20%, at least about 30%, at least about 40%, at least about 50%, at least about 60%, at least about 70%, at least about 80%, at least about 85%, at least about 90%, at least about 95%, at least about 96%, at least about 97%, at least about 98%, or at least about 99%.

In some embodiments, the pre-determined criteria may comprise an NPV criterion that the NPV is at least about 10%, at least about 20%, at least about 30%, at least about 40%, at least about 50%, at least about 60%, at least about 70%, at least about 80%, at least about 85%, at least about 90%, at least about 95%, at least about 96%, at least about 97%, at least about 98%, or at least about 99%.

In some embodiments, the pre-determined criteria may comprise an FPR criterion that the FPR is at least about 10%, at least about 20%, at least about 30%, at least about 40%, at least about 50%, at least about 60%, at least about 70%, at least about 80%, at least about 85%, at least about 90%, at least about 95%, at least about 96%, at least about 97%, at least about 98%, or at least about 99%.

In some embodiments, the pre-determined criteria may comprise an AUC criterion that the AUC is at least about 0.50, at least about 0.55, at least about 0.60, at least about 0.65, at least about 0.70, at least about 0.75, at least about 0.80, at least about 0.85, at least about 0.90, at least about 0.95, at least about 0.96, at least about 0.97, at least about 0.98, or at least about 0.99.

In some embodiments, the pre-determined criteria may comprise a positive rate criterion that the positive rate is at least about 10%, at least about 20%, at least about 30%, at least about 40%, at least about 50%, at least about 60%, at least about 70%, at least about 80%, or at least about 90%.

In some embodiments, the pre-determined criteria may comprise a negative rate criterion that the negative rate is at least about 10%, at least about 20%, at least about 30%, at least about 40%, at least about 50%, at least about 60%, at least about 70%, at least about 80%, or at least about 90%.

In some embodiments, operating the machine-learning medical imaging screening classifier in the autonomous operating mode may further comprise applying the machine-learning medical imaging screening classifier to medical image data of a test subject, to automatically determine, without performing radiologist review, a classification output indicative of an absence of a health state in the test subject.

In some embodiments, operating the machine-learning medical imaging screening classifier in the autonomous operating mode may further comprise generating, by the machine-learning medical imaging screening classifier, a report indicative of the classification output of the test subject.

In some embodiments, operating the machine-learning medical imaging screening classifier in the autonomous operating mode may further comprise applying the machine-learning medical imaging screening classifier to medical image data of a plurality of test subjects, to automatically determine, without performing radiologist review, a plurality of classification outputs indicative of an absence of a health state for at least about 50%, at least about 40%, at least about 30%, or at least about 20% of the plurality of test subjects.

In some embodiments, the method may further comprise diverting at least a subset of the medical image data of the plurality of test subjects for physician review for performance monitoring of the machine-learning medical imaging screening classifier. The subset may be diverted randomly. The subset may be diverted based on a risk criterion. The risk criterion may comprise whether the predicted probability of the health state is close to the decision boundary of the machine-learning medical imaging screening classifier.

In some embodiments, the subset is at least about 5%, at least about 7%, at least about 10%, at least about 12%, at least about 15%, at least about 18%, or at least about 20% of the medical image data of the plurality of test subjects.

In some embodiments, operating the machine-learning medical imaging screening classifier in the autonomous operating mode may further comprise applying the machine-learning medical imaging screening classifier to medical image data of a test subject, to automatically generate a tissue assessment of a body part of the test subject (e.g., tissue density).

In some embodiments, the determining in (e) may be periodic. The periodic determination may be by week, by month, by quarter, or by year.

In some embodiments, operating the machine-learning medical imaging screening classifier in the semi-autonomous operating mode may further comprise applying the machine-learning medical imaging screening classifier to medical image data of a plurality of test subjects, to automatically determine, without performing radiologist review, a plurality of classification outputs indicative of an absence of a health state for about 20% to about 80% of the plurality of test subjects.

In some embodiments, operating the machine-learning medical imaging screening classifier in the semi-autonomous operating mode may further comprise applying the machine-learning medical imaging screening classifier to medical image data of a plurality of test subjects, to automatically determine, without performing radiologist review, a plurality of classification outputs indicative of an absence or presence of a health state for about 20% to 80% of the plurality of test subjects.

In some embodiments, operating the machine-learning medical imaging screening classifier in the augmentative operating mode may further comprise generating, by the machine-learning medical imaging screening classifier, a report indicative of the classification output of the test subject that requires final sign off by a physician.

In some embodiments, operating the machine-learning medical image screening classifier in the assistive operating mode may further comprise applying the machine-learning medical imaging screening classifier to test subjects to aid a physician in case review or to triage the priority of subjects.

In some embodiments, the method may further comprise re-training the machine-learning medical imaging screening classifier, based at least in part on (i) the plurality of classification outputs determined in (c) and (ii) the actual presence or actual absence of the health state for each of the plurality of subjects.

In some embodiments, the method may further comprise re-training the machine-learning medical imaging screening classifier, based at least in part on the set of performance metrics determined in (d).

In some embodiments, the method may further comprise (g) performing a continuous surveillance program to re-validate the machine-learning medical imaging screening classifier, thereby assessing the machine-learning medical imaging screening classifier based at least in part on the pre-determined criteria.

In some embodiments, the method may further comprise (h) altering an operating mode and/or a level of surveillance of the machine-learning medical imaging screening classifier, based at least in part on the assessing in (g).

In some embodiments, the method may further comprise validating the performance metrics of the machine-learning medical imaging screening classifier based at least in part on additional clinical information of the subject.

In some embodiments, the machine-learning medical imaging screening classifier may be configured to automate a determination of a positive diagnosis of a disease or disorder in the subject, without further physician review.

In some embodiments, the machine-learning medical imaging screening classifier may be configured to automate a determination of a negative diagnosis of a disease or disorder in the subject, without further physician review.

In some embodiments, the method may further comprise providing, by the machine-learning medical imaging screening classifier, assistive features for aiding physician review for low-confidence cases that cannot be automatically assessed.

In some embodiments, the set of performance metrics may comprise an objective evaluation of the machine-learning medical imaging screening classifier, performed by applying the machine-learning medical imaging screening classifier to retrospective medical imaging data.

In some embodiments, the set of performance metrics may comprise a subjective evaluation of the machine-learning medical imaging screening classifier, performed by operating the machine-learning medical imaging screening classifier in an assistive or augmentative operating mode.

In some embodiments, operating the machine-learning medical imaging screening classifier for subjective evaluation in the assistive or adjunctive operating mode comprises performing physician review of the outputs of the machine-learning medical imaging screening classifier for at least a portion of subject examinations during a period of time. The period of time may be at least about 1 month, at least about 2 months, at least about 3 months, at least about 4 months, at least about 5 months, at least about 6 months, at least about 7 months, at least about 8 months, at least about 9 months, at least about 10 months, at least about 11 months, or at least about 12 months.

In some embodiments, the set of performance metrics may comprise a combination of objective criteria and subjective criteria.

In some embodiments, the validating may further comprise qualifying the machine-learning medical imaging screening classifier for use at a facility level, a regional level, or a company level.

In some embodiments, the method may further comprise operating the machine-learning medical imaging screening classifier in different levels of autonomy such as a fully autonomous operating mode, a semi-autonomous operating mode, an augmentative operating mode, an assistive operating mode, a disabled operating mode, or any combination thereof.

In some embodiments, operating the machine-learning medical imaging screening classifier in the fully autonomous operating mode may comprise generating, by the machine-learning medical imaging screening classifier, an autonomous assessment on all subject examinations within an intended population.

In some embodiments, operating the machine-learning medical imaging screening classifier in the semi-autonomous operating mode may comprise generating, by the machine-learning medical imaging screening classifier, an autonomous assessment on a limited subset of subject examinations within an intended population.

In some embodiments, the subset of the subject examinations within the intended population that the semi-autonomous operating mode limits the machine-learning medical imaging screening classifier to may be randomly selected or selected based on risk and/or demographic factors.

In some embodiments, operating the machine-learning medical imaging screening classifier in the augmentative operating mode may comprise (i) generating, by the machine-learning medical imaging screening classifier, an initial assessment for a subject examination within an intended population, and (ii) performing physician review and verification of the initial assessment.

In some embodiments, operating the machine-learning medical imaging screening classifier in the assistive operating mode may comprise performing physician review of subject examinations while utilizing the outputs of the machine-learning medical imaging screening classifier to aid in the review.

In some embodiments, the surveillance may comprise performing passive monitoring of the machine-learning medical imaging screening classifier by assessing subsequent outcome records of subjects after autonomous assessment by the machine-learning medical imaging screening classifier.

In some embodiments, the surveillance may comprise active evaluation of the machine-learning medical imaging screening classifier by human or physician intervention before finalizing assessment by the machine-learning medical imaging screening classifier.

In some embodiments, the surveillance may comprise a combination of passive monitoring and active evaluation, thereby gaining benefits of larger sample sizes obtained by passive monitoring and timely feedback obtained by active evaluation.

In some embodiments, the machine-learning medical imaging screening classifier may be re-validated continuously by software for each assessed case.

In some embodiments, the machine-learning medical imaging screening classifier may be re-validated periodically by software and a manual evaluation process, such as every three months, every six months, or annually.

In some embodiments, the pre-determined criteria may comprise a set of acceptance criteria that the machine-learning medical imaging screening classifier must meet in order to operate in full autonomous mode.

In some embodiments, the pre-determined criteria may comprise a set of restoration criteria that the machine-learning medical imaging screening classifier must meet in order to return to an operating mode with a higher level of autonomy subsequent to a previous failed validation.

In some embodiments, the pre-determined criteria may comprise benchmarks for sensitivity, specificity, NPV, PPV, AUC, positive rate, or negative rate.

In some embodiments, the surveillance may comprise active evaluation by diverting a subset of exams away from automation for physician assessment.

In some embodiments, the diverted exams may be presented for physician assessment in a blinded manner from classification outputs generated by the machine-learning classifier.

In some embodiments, the pre-determined criteria may require no more than a pre-determined allowable number of false negative or false positive errors by the machine-learning medical imaging screening classifier to occur within a given time period during the course of active evaluation.

In some embodiments, the given time period may be at least about 1 month, at least about 2 months, at least about 3 months, at least about 4 months, at least about 5 months, at least about 6 months, at least about 7 months, at least about 8 months, at least about 9 months, at least about 10 months, at least about 11 months, or at least about 12 months.

In some embodiments, the pre-determined criteria may be set based at least in part on a size of the medical imaging clinical site.

In some embodiments, the pre-determined allowable number of false negative or false positive errors may be greater for medical imaging clinical sites having a larger volume of subject examinations.

In some embodiments, the surveillance may comprise performing a false negative tracking process to detect potential false negative errors by the machine-learning medical imaging screening classifier.

In some embodiments, the false negative tracking process may comprise automatically populating, by a computer processor, machine-readable identifiers in the classification outputs.

In some embodiments, the method may further comprise, subsequent to merging together a subject's records from a multiple clinical sites, (i) automatically determining, by a computer processor, that different machine-readable identifiers corresponding to each of the multiple clinical sites correspond to the same subject, and (ii) merging together the records into a single clinical record for the same subject.

In some embodiments, the surveillance may comprise performing a false negative action plan to determine whether a potential false negative is a true false negative.

In some embodiments, performing the false negative action plan may comprise performing physician review of a clinical record of the subject the patient data to determine whether the health state was detectable at the time machine-learning medical imaging screening classifier generated an autonomous assessment.

In some embodiments, the operating mode of the machine-learning medical imaging screening classifier may be reduced in level of autonomy, from full autonomous mode, to semi-autonomous mode, to augmentative mode, to assistive mode, or any subset thereof, responsive to failure of the machine-learning medical imaging screening classifier to be re-validated based on pre-determined acceptance criteria.

In some embodiments, the operating mode of the machine-learning medical imaging screening classifier may be increased in level of autonomy, responsive to the machine-learning medical imaging screening classifier being restored to meeting pre-determined restoration criteria.

In some embodiments, the machine-learning medical imaging screening classifier may be restored after troubleshooting or updating.

In some embodiments, the restoration criteria may comprise performing active evaluation by physicians.

In some embodiments, a level of surveillance may be raised when the machine-learning medical imaging screening classifier fails to be re-validated based on pre-determined acceptance criteria.

In some embodiments, raising the level of surveillance may comprise employing more active evaluation methods or increasing efforts behind the evaluation methods.

In some embodiments, raising the level of surveillance may comprise increasing a number or a percentage of exams diverted for physician review.

In some embodiments, the machine-learning medical imaging screening classifier may be disabled, when a limited number of attempts to resolve performance issues have been unsuccessfully performed.

In some embodiments, a level of autonomy and/or operation mode of the machine-learning medical imaging screening classifier may be automatically changed in response to the re-validation.

In some embodiments, a level of autonomy and/or operation mode of the machine-learning medical imaging screening classifier may be manually changed as part of a manual evaluation process.

In another aspect, the present disclosure provides a non-transitory computer-readable medium comprising machine-executable code that, upon execution by one or more computer processors, implements a method for operating a machine-learning medical imaging screening classifier. The method comprises (a) obtaining the machine-learning medical imaging screening classifier, wherein the machine-learning medical imaging screening classifier is trained to process medical image data of a subject to determine a classification output indicative of a presence or an absence of a health state in the subject; (b) obtaining medical image data of a plurality of clinical subjects of a medical imaging clinical site, the plurality of clinical subjects comprising one or more positive subjects having the health state and one or more negative subjects not having the health state; (c) applying the machine-learning medical imaging screening classifier to the medical image data of the plurality of subjects to determine a plurality of classification outputs indicative of a presence of an absence of a health state in each of the plurality of clinical subjects; (d) determining a set of performance metrics of the machine-learning medical imaging screening classifier, based at least in part on (i) the plurality of classification outputs and (ii) an actual presence or actual absence of the health state for each of the plurality of subjects; (e) determining that the machine-learning medical imaging screening classifier is validated when the set of performance metrics meets pre-determined criteria, or determining that the machine-learning medical imaging screening classifier is not validated when the set of performance metrics does not meet the pre-determined criteria; and (f) operating the machine-learning medical imaging screening classifier in an autonomous operating mode when the machine-learning medical imaging screening classifier is validated, or operating the machine-learning medical imaging screening classifier in an semi-autonomous or non-autonomous operating mode when the machine-learning medical imaging screening classifier is not validated.

In another aspect, the present disclosure provides a computer system for operating a machine-learning radiological screening classifier, comprising: one or more computer processors individually or collectively programmed to: (a) obtain the machine-learning medical imaging screening classifier, wherein the machine-learning medical imaging screening classifier is trained to process medical image data of a subject to determine a classification output indicative of a presence or an absence of a health state in the subject; (b) obtain medical image data of a plurality of clinical subjects of a medical imaging clinical site, the plurality of clinical subjects comprising one or more positive subjects having the health state and one or more negative subjects not having the health state; (c) apply the machine-learning medical imaging screening classifier to the medical image data of the plurality of subjects to determine a plurality of classification outputs indicative of a presence of an absence of a health state in each of the plurality of clinical subjects; (d) determine a set of performance metrics of the machine-learning medical imaging screening classifier, based at least in part on (i) the plurality of classification outputs and (ii) an actual presence or actual absence of the health state for each of the plurality of clinical subjects; (e) determine that the machine-learning medical imaging screening classifier is validated when the set of performance metrics meets pre-determined criteria, or determining that the machine-learning medical imaging screening classifier is not validated when the set of performance metrics does not meet the pre-determined criteria; and (f) operate the machine-learning medical imaging screening classifier in an autonomous operating mode when the machine-learning medical imaging screening classifier is validated, or operating the machine-learning medical imaging screening classifier in an semi-autonomous or non-autonomous operating mode when the machine-learning medical imaging screening classifier is not validated.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIGS. 3A-3D show an example of a user interface for a real-time radiology system including views from the perspective of a mammography technologist or technologist's assistant (FIG. 3A), a radiologist (FIG. 3B), a billing representative (FIG. 3C), and an ultrasound technologist or technologist's assistant (FIG. 3D).

FIG. 7 shows an example plot comparing the interpretation time for batches (including control, BI-RADs, and density) (left) and the percentage improvement in interpretation time versus controls (right), across a first set of radiologist, a second set of radiologists, and the overall total set of radiologists.

with adaptation by matrix calibration for 500 training samples. The numbers of test samples (exams) within each bin are shown in parentheses.

Figure 17A:
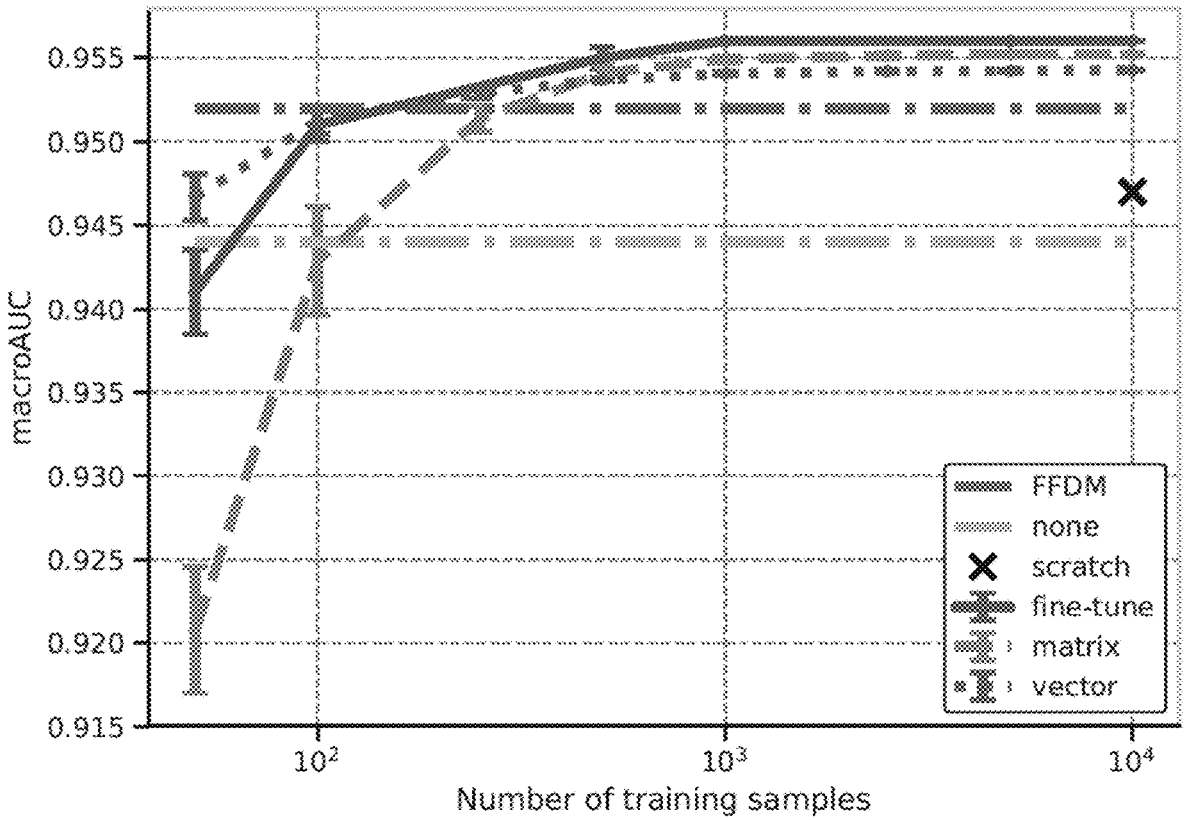
Figure 17B:
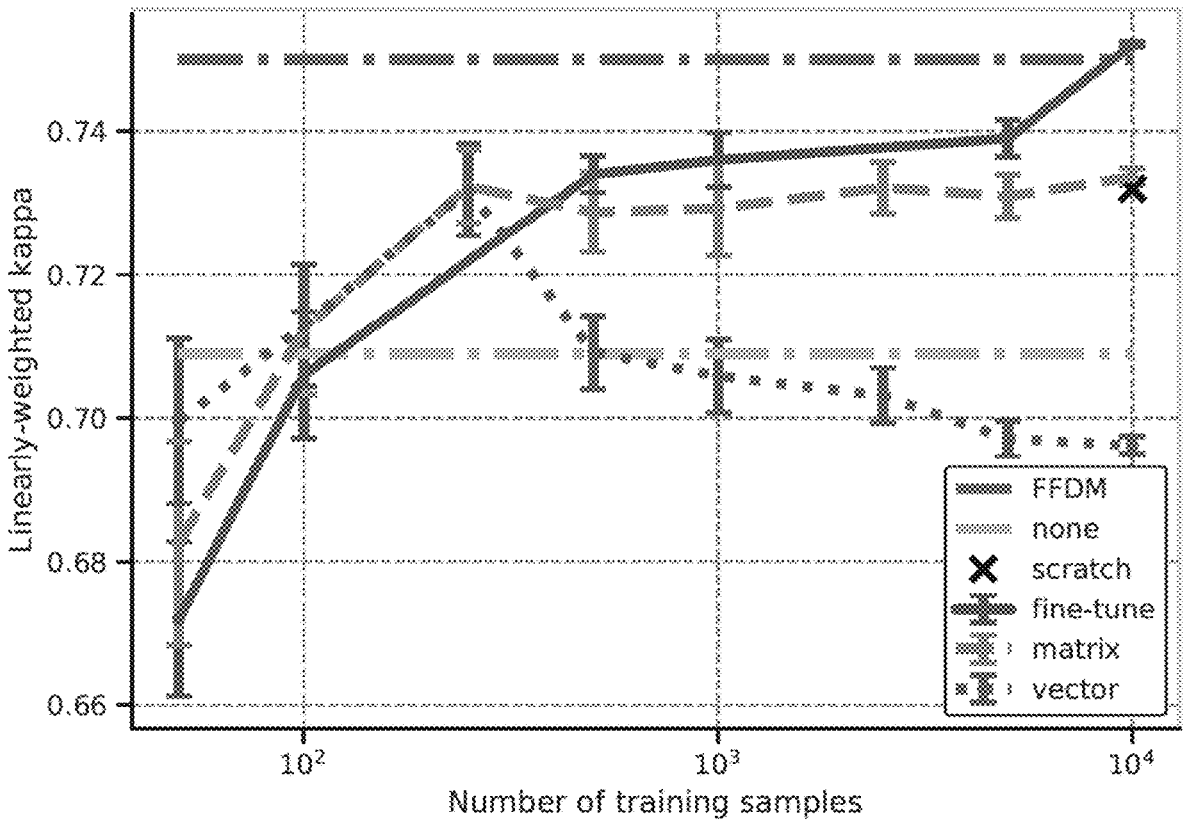
Figure 17C:
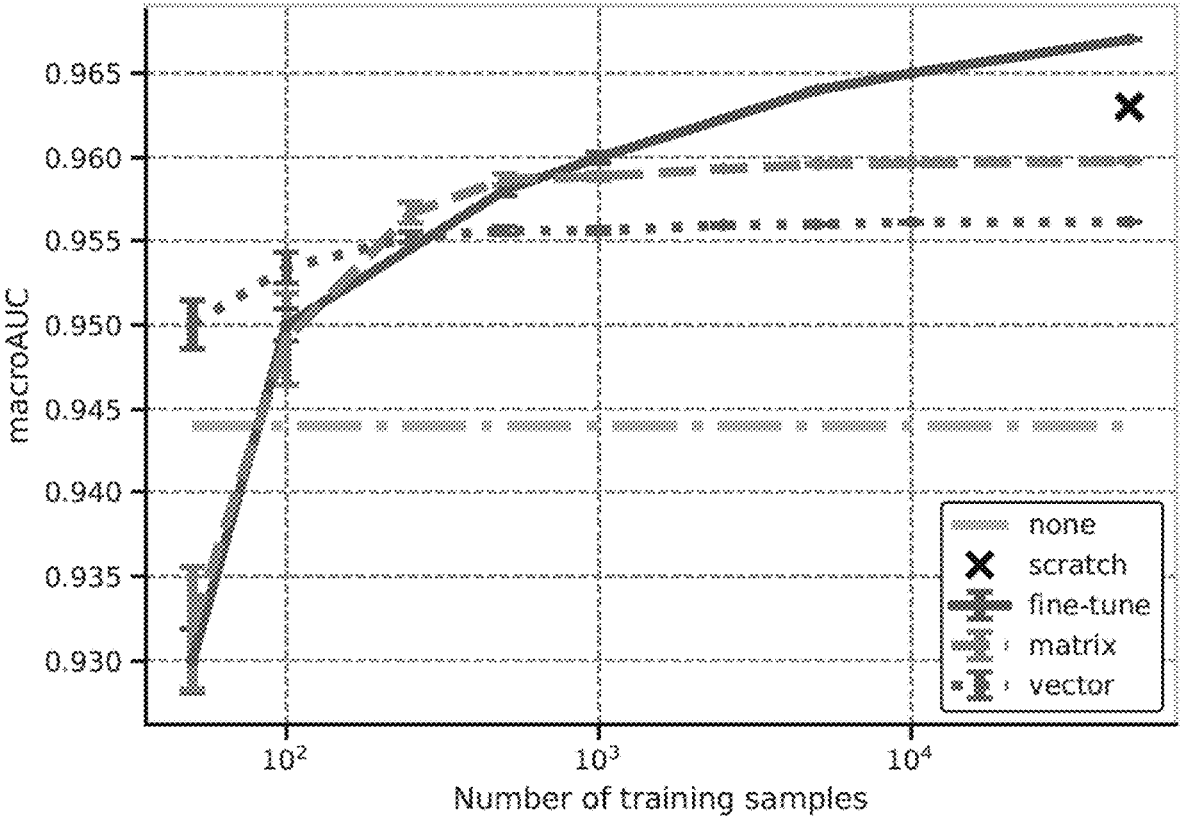
Figure 17D:
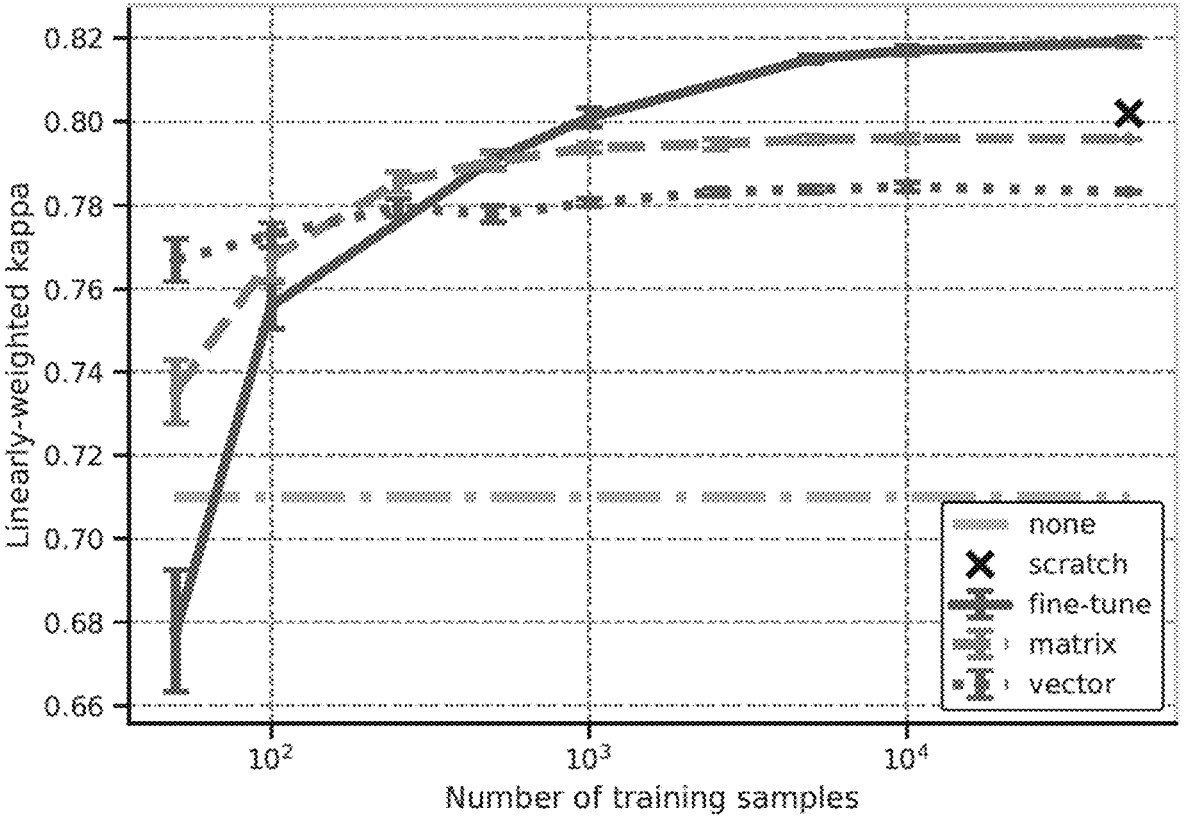

FIGS. 17A-17D show the impact of the amount of training data on the performance of the adaptation methods, as measured by macroAUC and linearly weighted Cohen's kappa, for the Site 1 dataset (FIGS. 17A-17B, respectively) and the Site 2 SM dataset (FIGS. 17C-17D, respectively).

Figure 18:
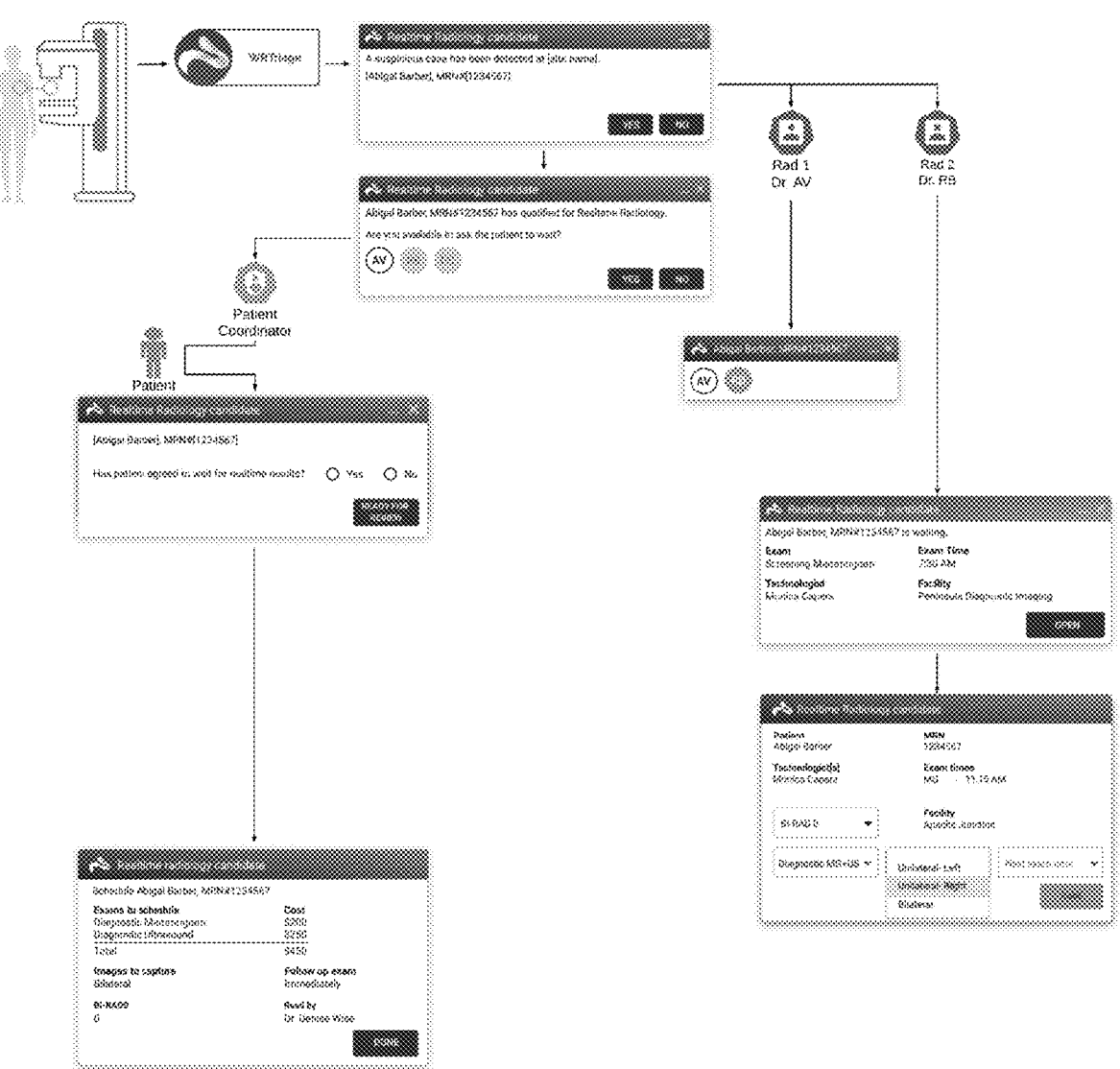

FIG. 18 shows an example of a schematic of a real-time radiology assessment workflow.

Figure 19:
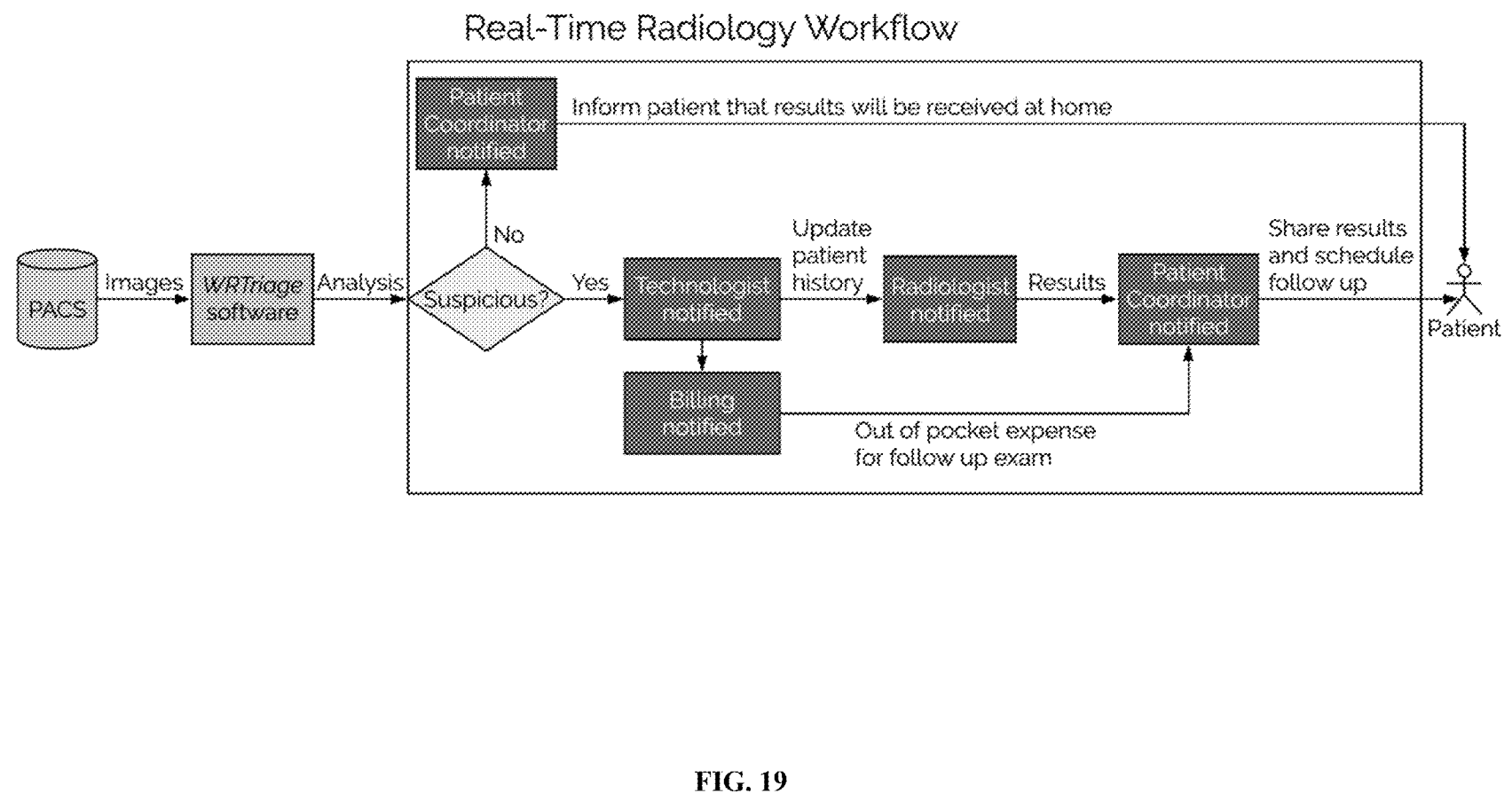

FIG. 19 shows an example of a schematic of a real-time radiology assessment workflow.

Figure 20:
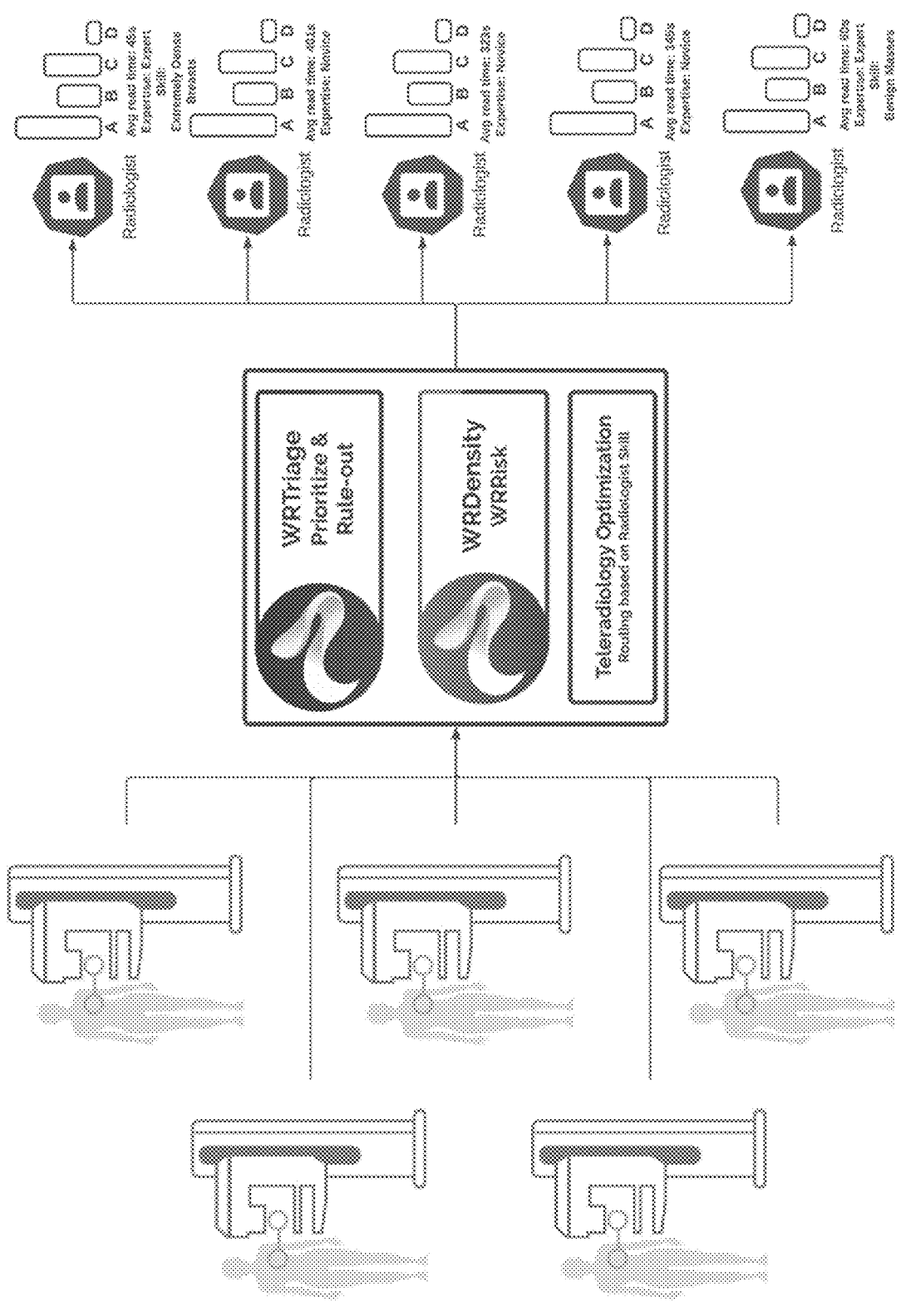

FIG. 20 shows an example of a schematic of an AI-assisted radiology assessment workflow in a teleradiology setting.

Figure 21:
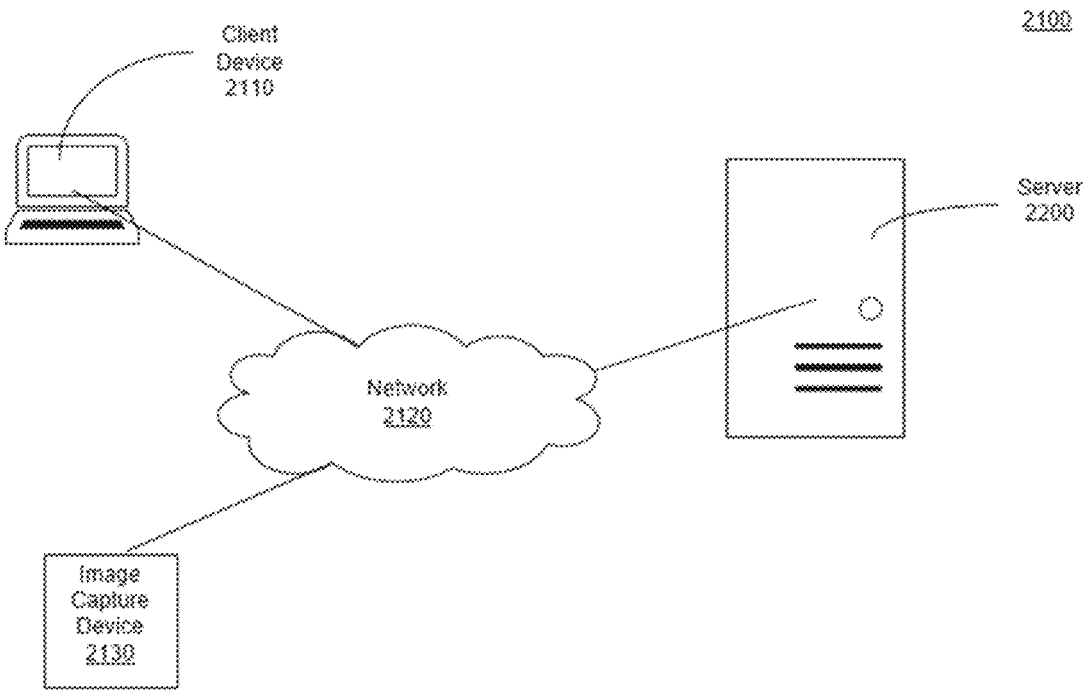

FIG. 21 schematically illustrates an example of a system for providing an expedited radiological screening workflow.

Figure 22:
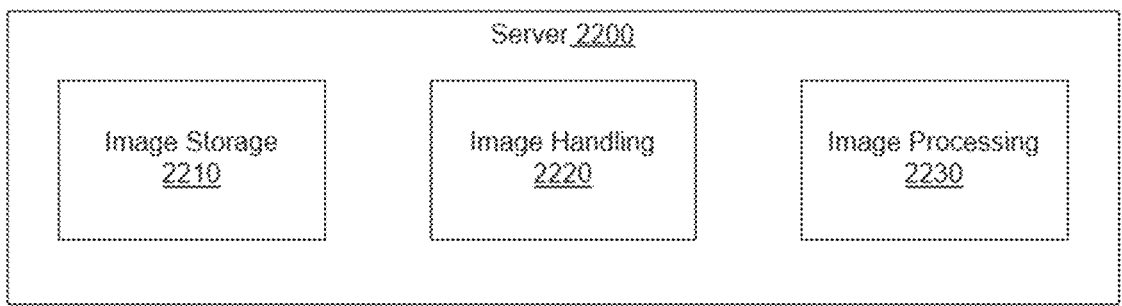

FIG. 22 schematically illustrates an example of a server.

Figure 23:
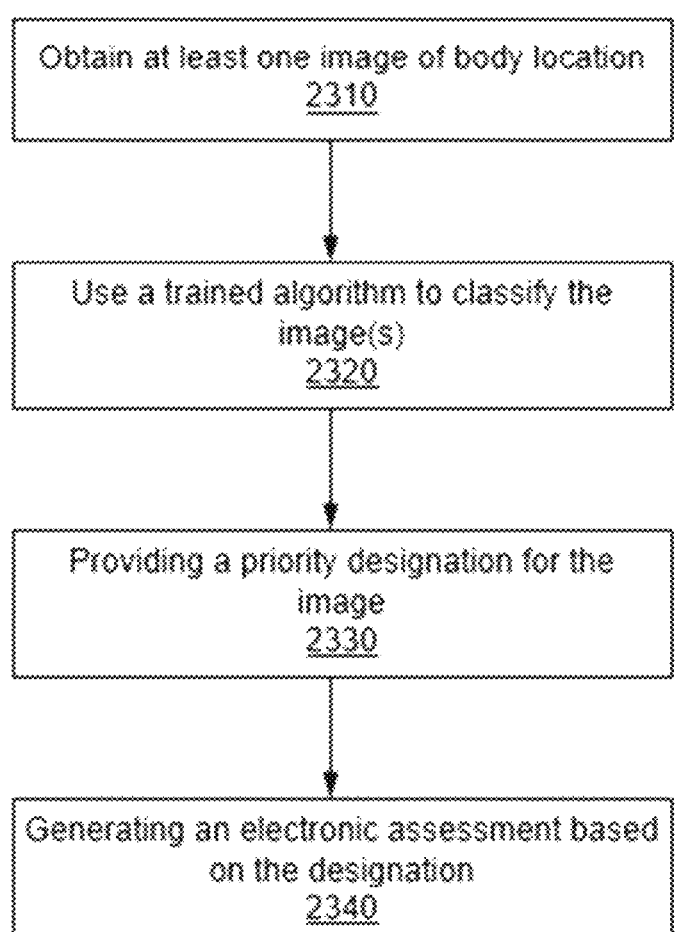

FIG. 23 shows an example of a process for generating an electronic assessment describing whether a mammogram is high-priority or low-priority for analysis by a radiologist or other professional.

Figure 24:
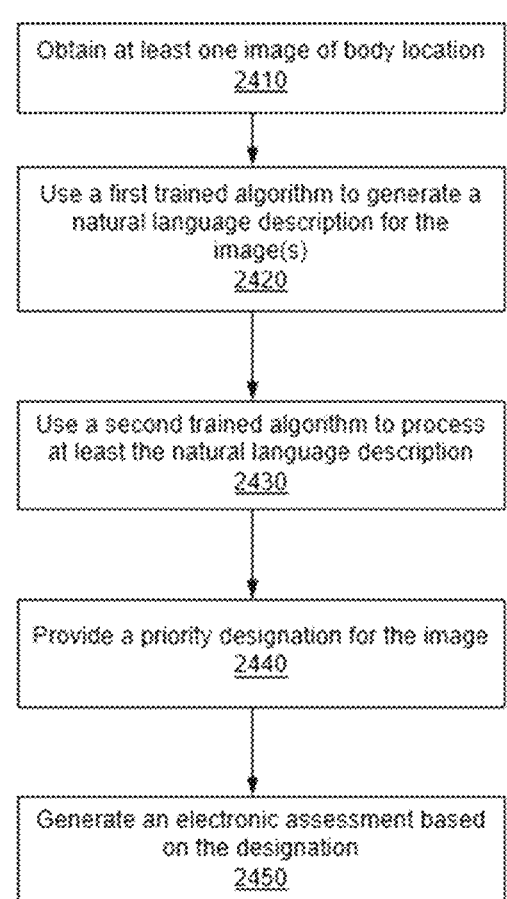

FIG. 24 illustrates an example of an alternative process for generating the electronic assessment, using a natural language description of mammogram images.

Figure 25:
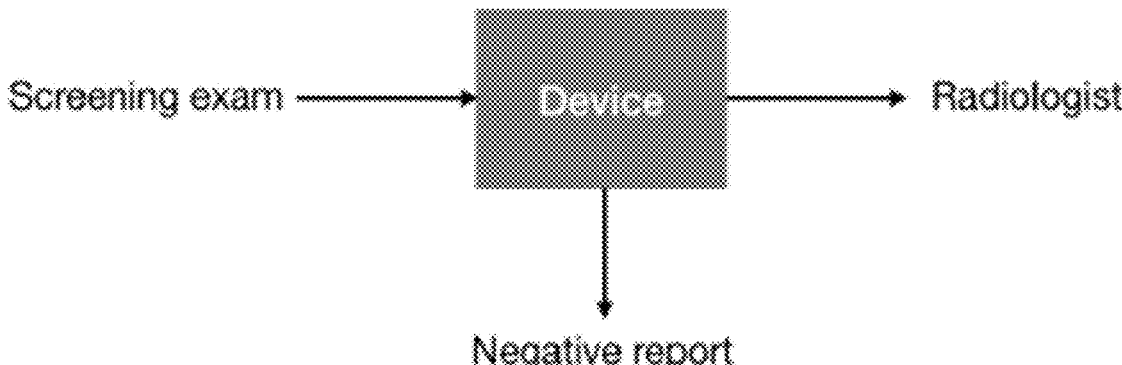

FIG. 25 illustrates an example of a block diagram for the expedited screening system.

Figure 26:
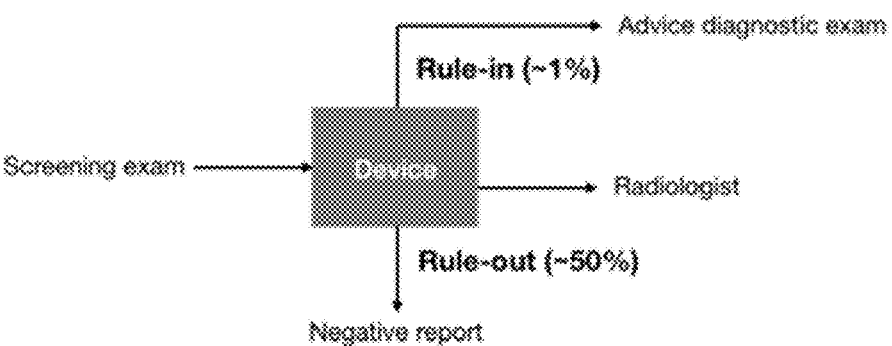

FIG. 26 illustrates an example of a block diagram for the expedited screening system.

Figure 27:
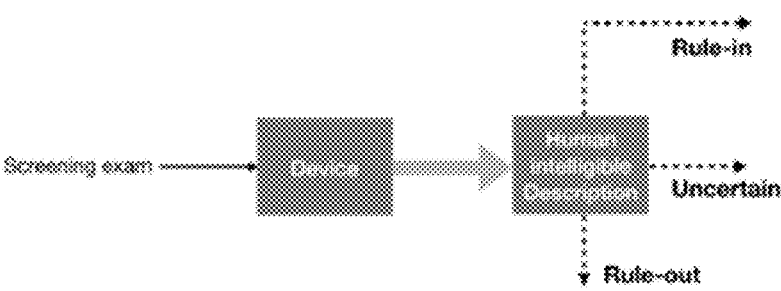

FIG. 27 illustrates an example of a block diagram for the expedited screening system.

Figure 28:
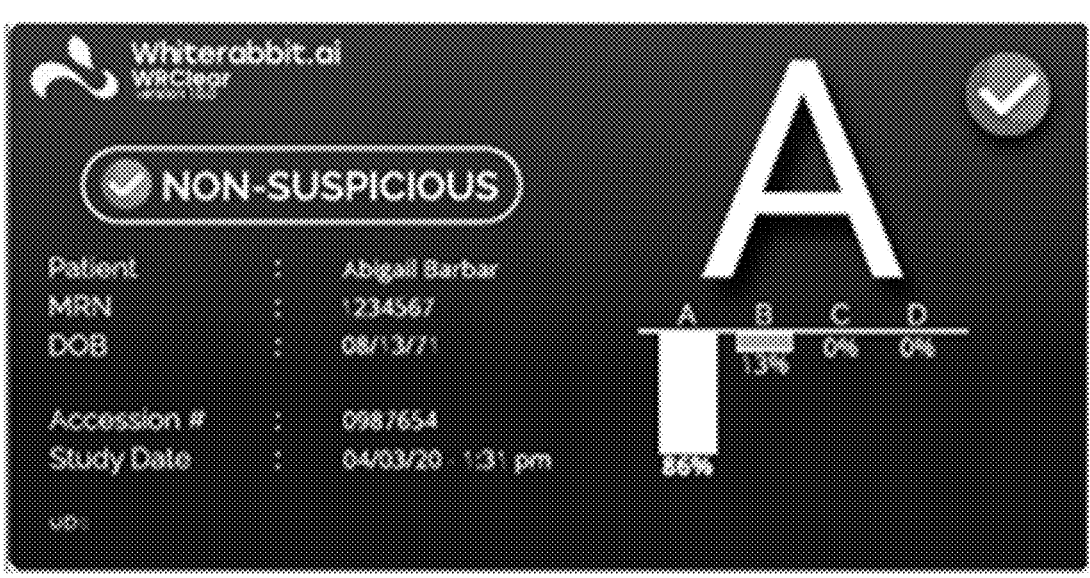

FIG. 28 illustrates an example of a preliminary report showing an assessment result for a subject.

Figure 29:
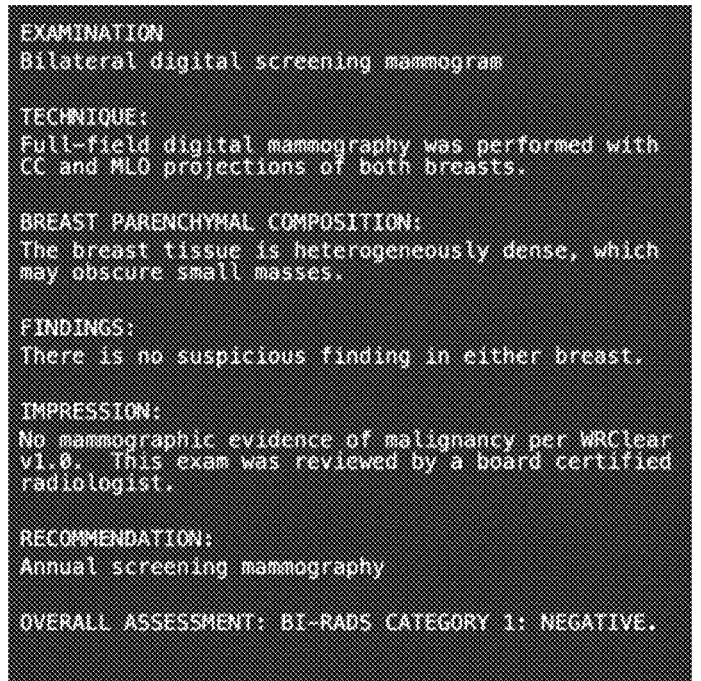

FIG. 29 illustrates an example of a comprehensive report of an assessment result for a subject.

Figure 30:
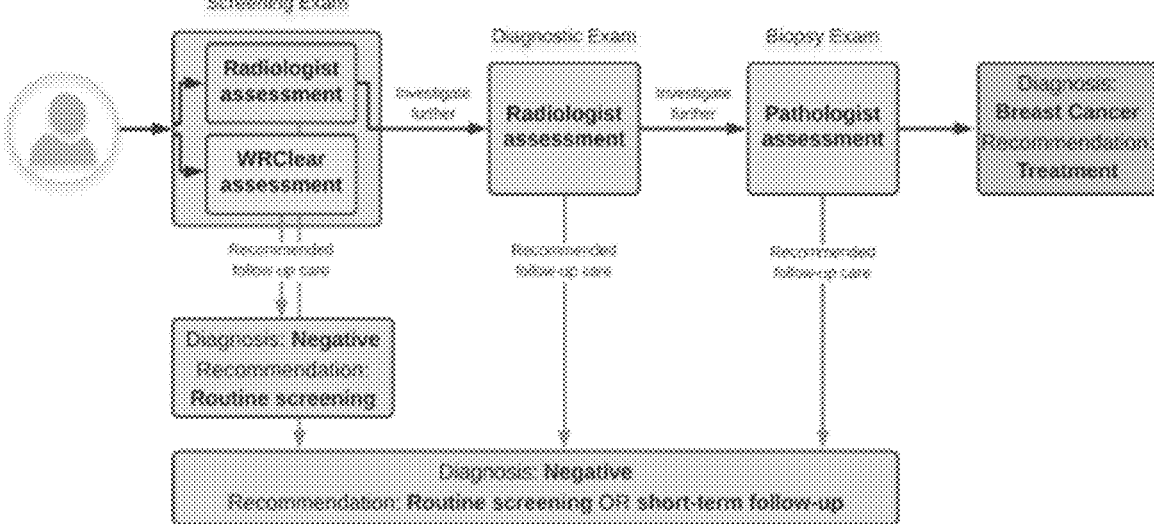

FIG. 30 illustrates a flow diagram for an example full screening process of a subject with a medical condition, based at least in part on obtained medical images from the subject.

Figure 31:
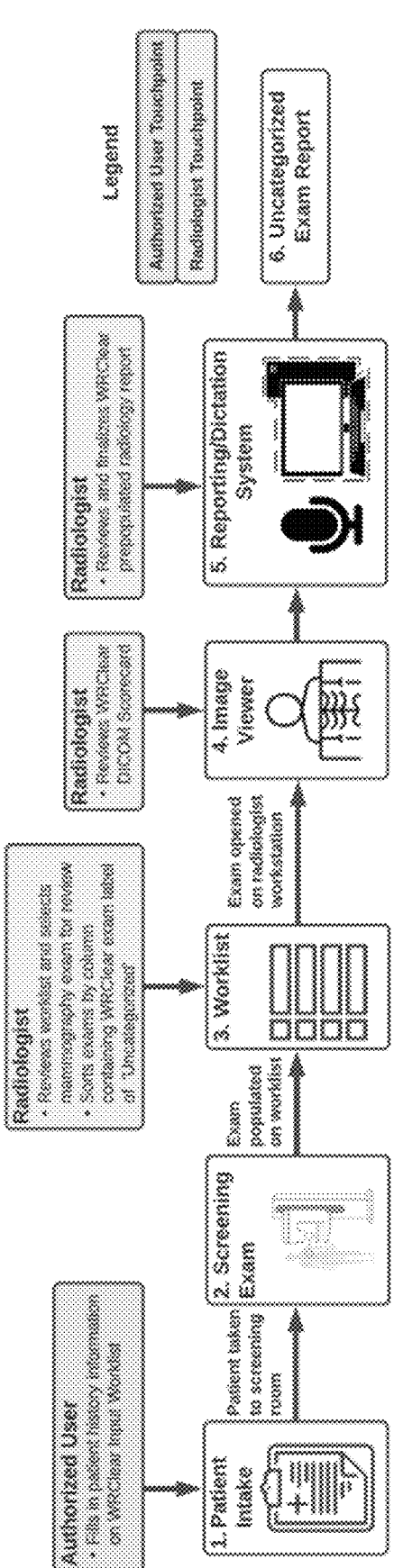

FIG. 31 shows a workflow diagram for the authorized user and radiologist for an Uncategorized exam or a Non-Suspicious exam where auto-finalization is not enabled.

Figure 32:
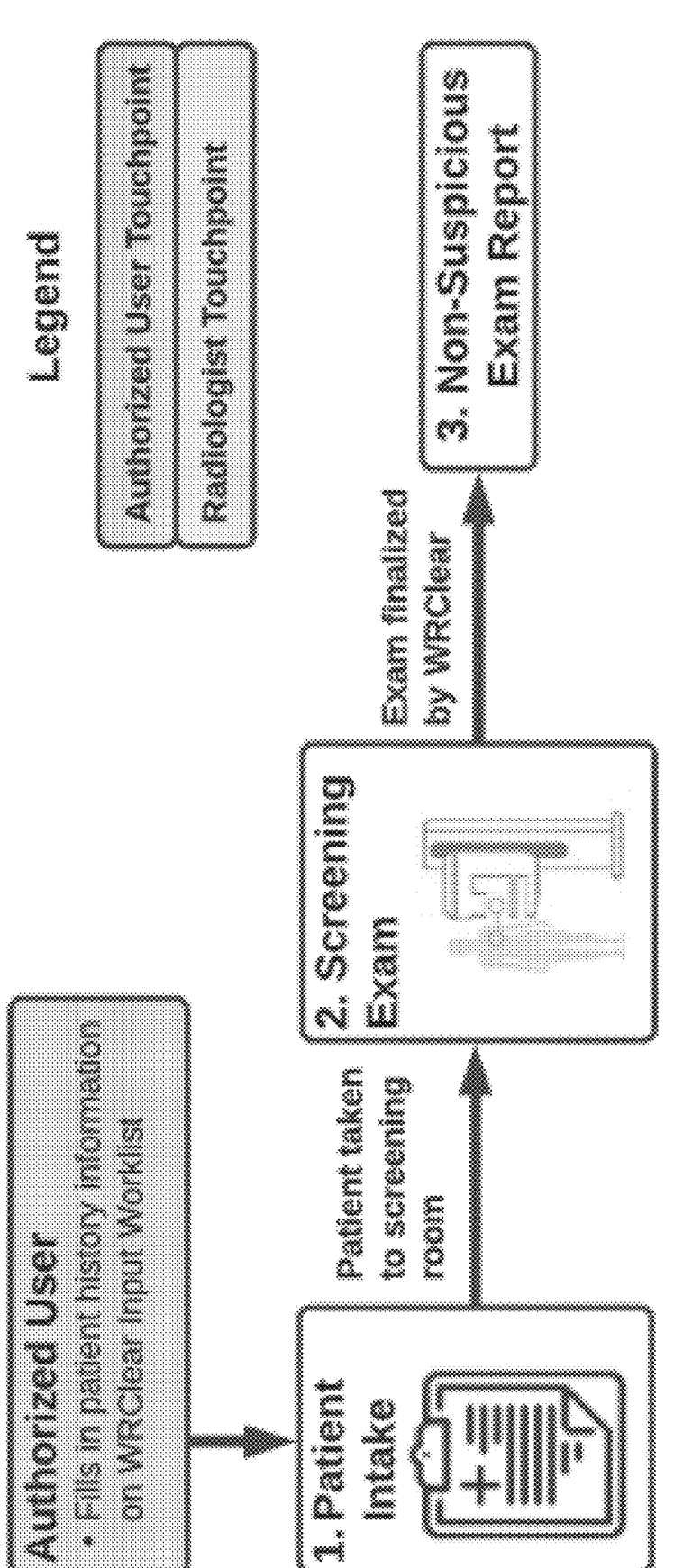

FIG. 32 shows a workflow diagram for the authorized user and radiologist for a Non-Suspicious exam that is automatically finalized by the AI-assisted radiological workflow.

Figure 33:
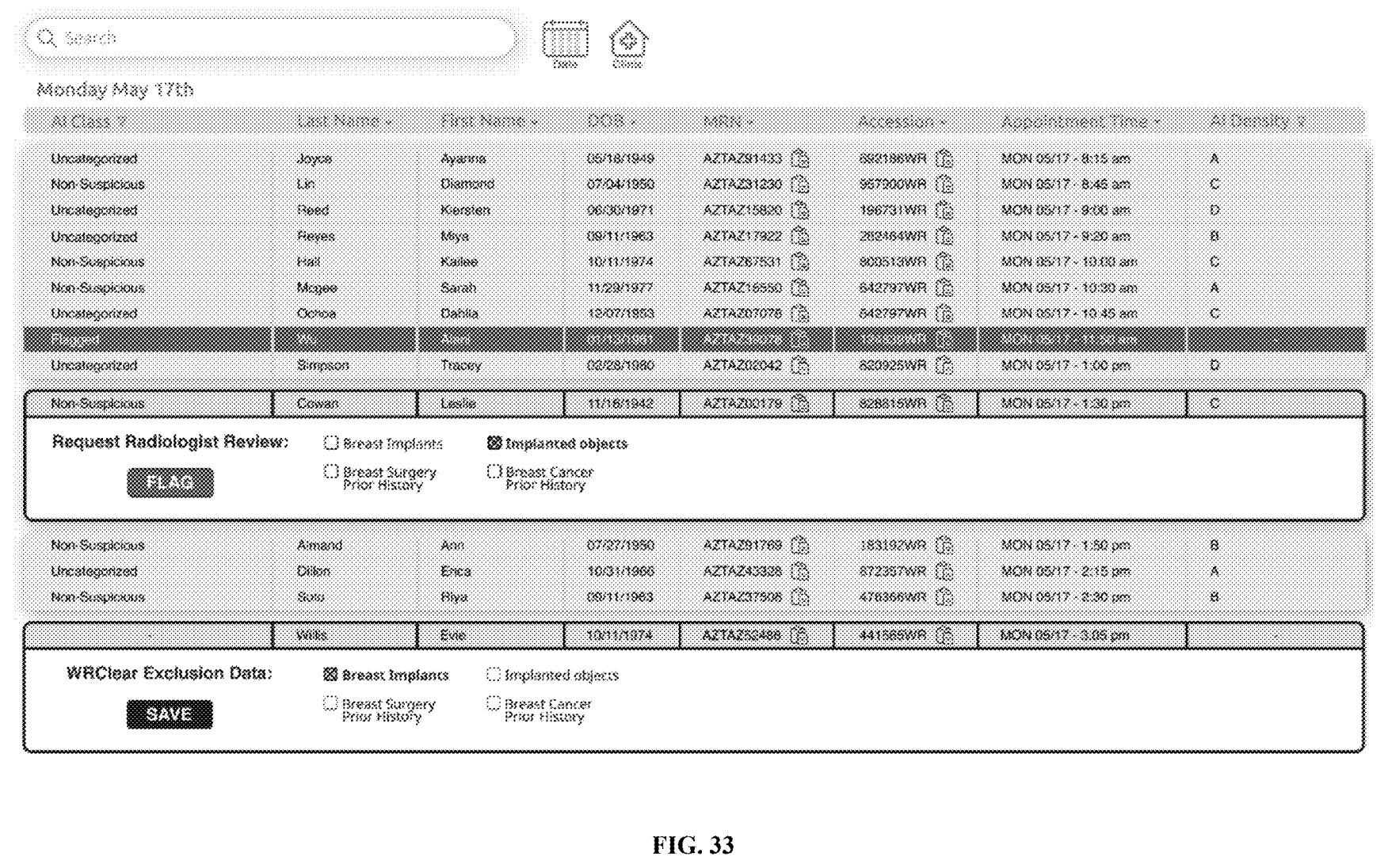

FIG. 33 shows a user view of an input worklist of the AI-assisted radiological workflow.

Figure 34A:
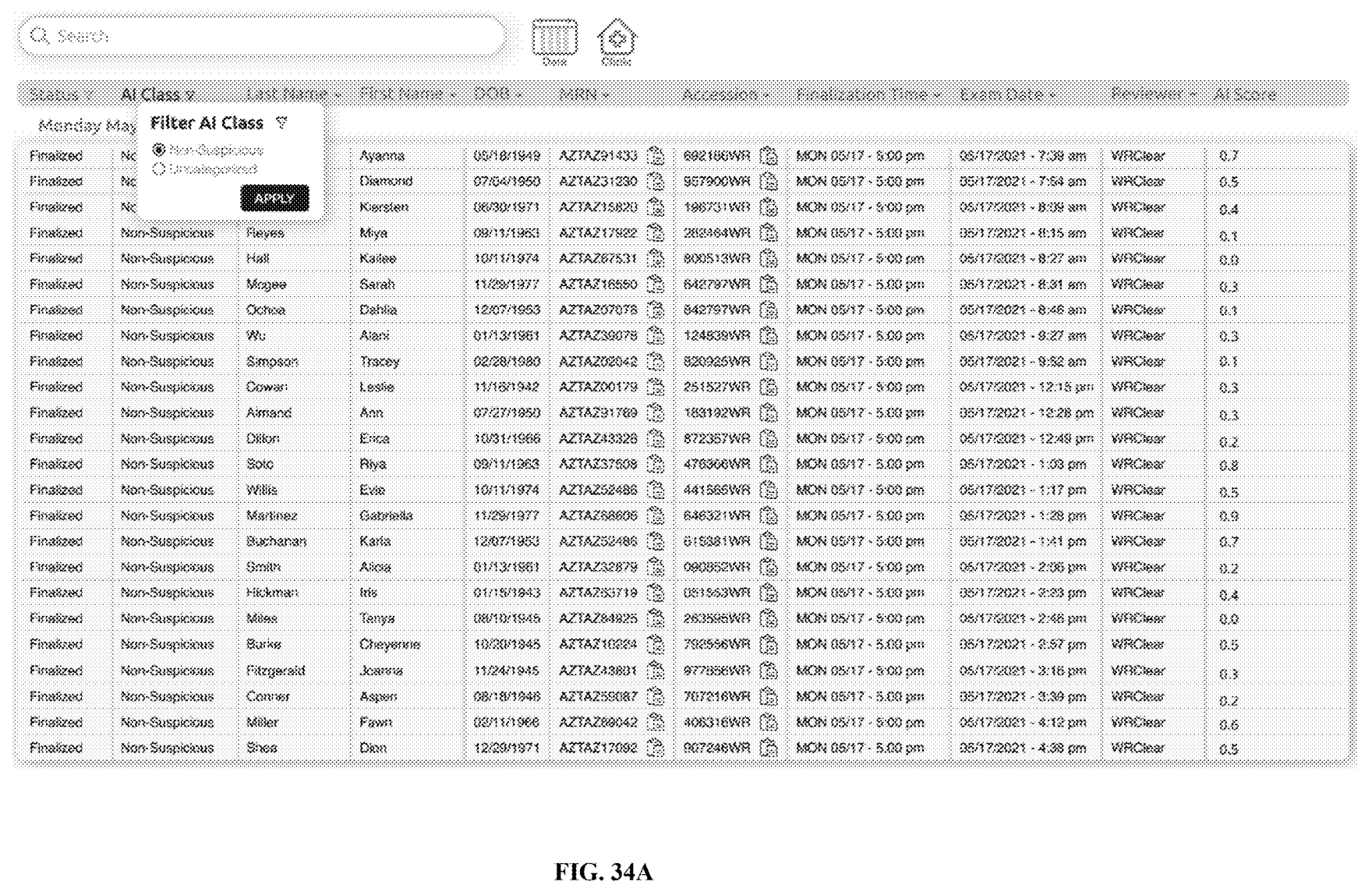

FIG. 34A shows a user view of a radiologist exam list of the AI-assisted radiological workflow, where only Non-Suspicious exams are being seen due to an applied filter.

Figure 34B:
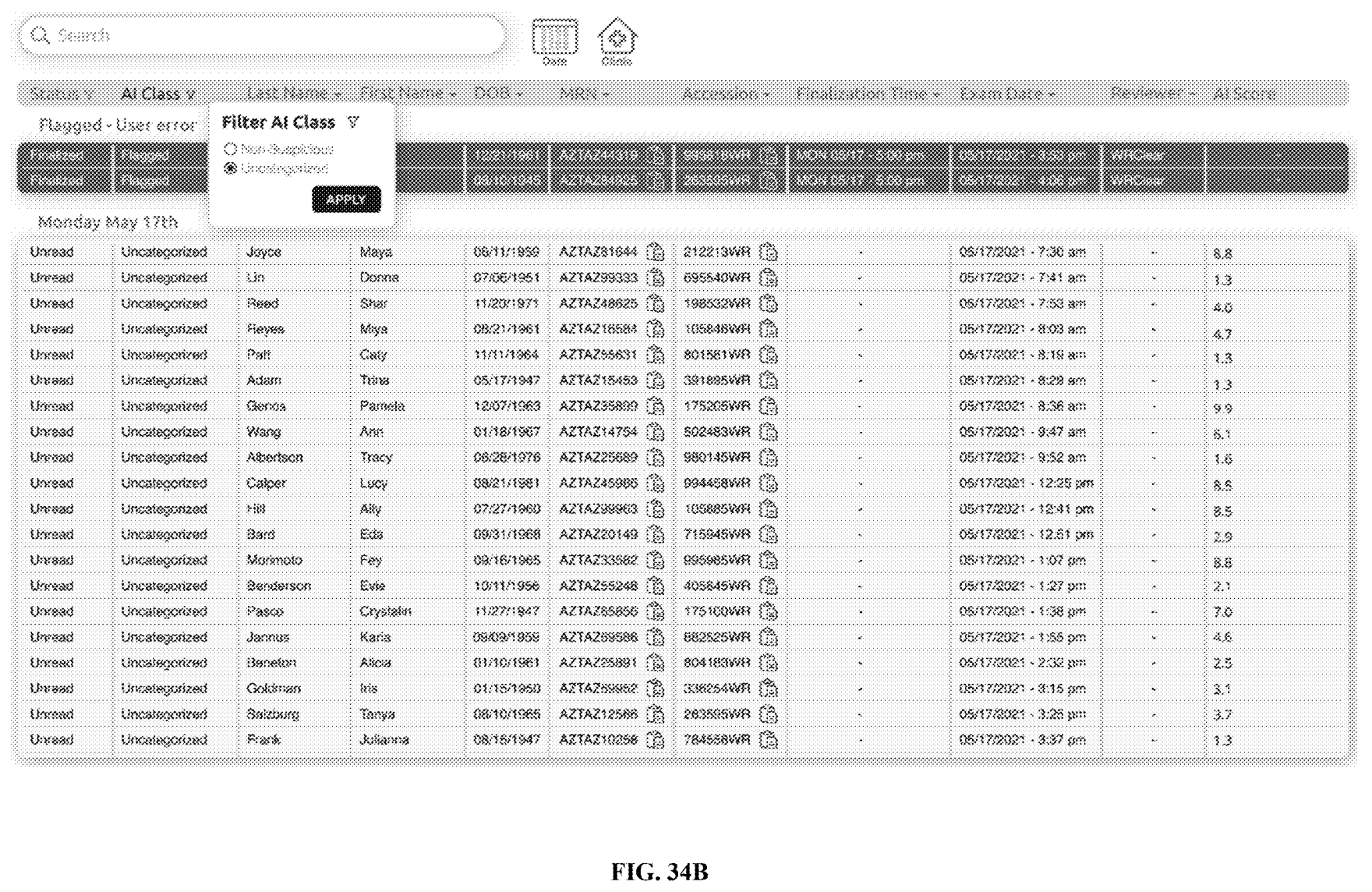

FIG. 34B shows a user view of a radiologist exam list of the AI-assisted radiological workflow, with flagged cases where a filter to include Uncategorized exams has been applied.

FIG. 35 shows a user view of a radiologist configuration panel for the AI-assisted radiological workflow, which occurs on a page within the Radiologist Exam List.

Figure 36:
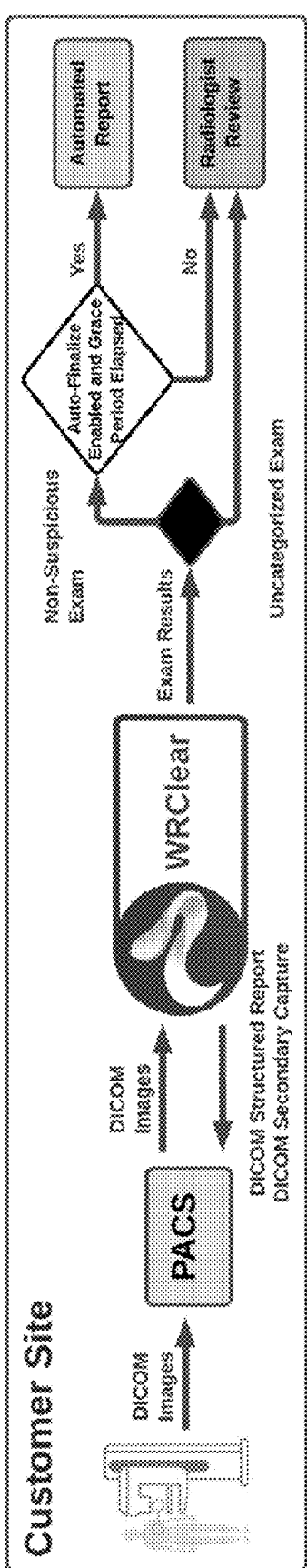

FIG. 36 shows a diagram illustrating the workflow for report generation and review with the AI-assisted radiological workflow, including when an exam is automated or manually reviewed by the radiologist for different exam classifications.

Figure 37A:
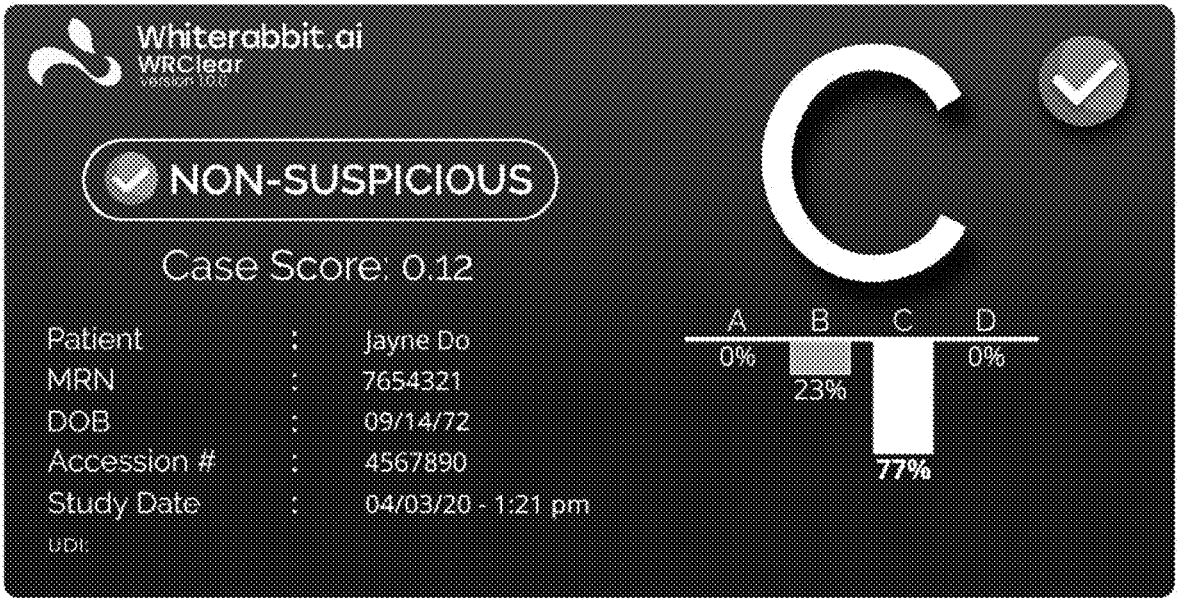

FIG. 37A shows an example of an output generated by the AI-assisted radiological workflow for a Non-Suspicious case, which indicates the label for the exam, the Case Score, the predicted breast density, and the unique exam ID.

Figure 37B:
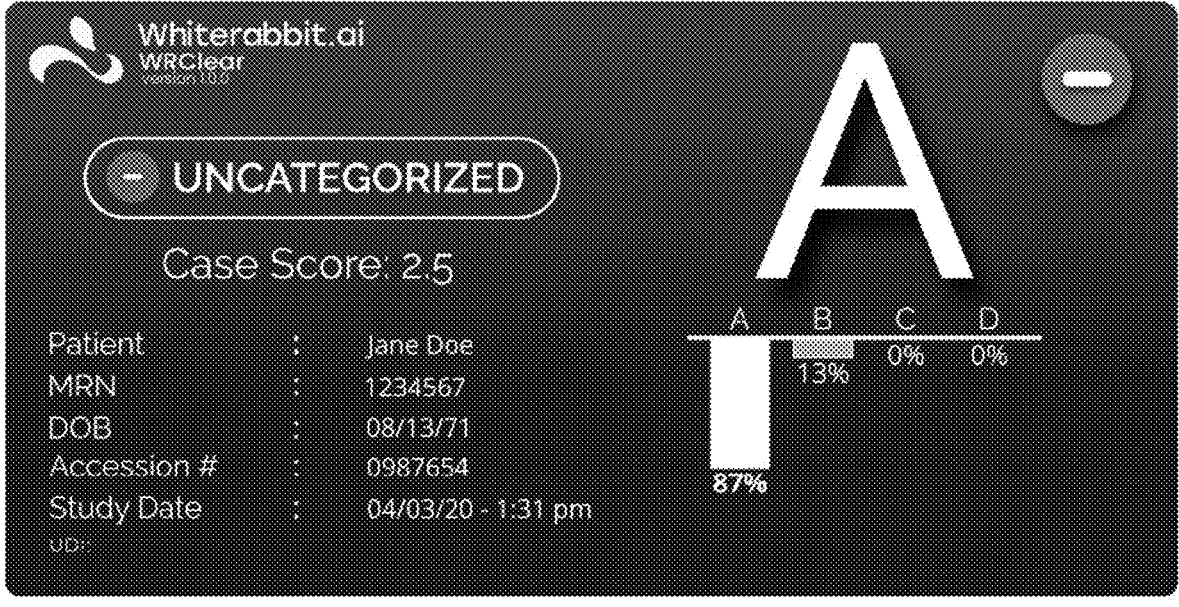

FIG. 37B shows an example of an output scorecard generated by the AI-assisted radiological workflow for an Uncategorized exam, where the exam passed all the inclusion/exclusion criteria, which indicates the label for the exam, the Case Score, as well as the predicted breast density.

FIG. 38A shows an example radiology report for an automated case, in which a Non-Suspicious exam is generated and finalized by the AI-assisted radiological workflow.

Figure 38B:
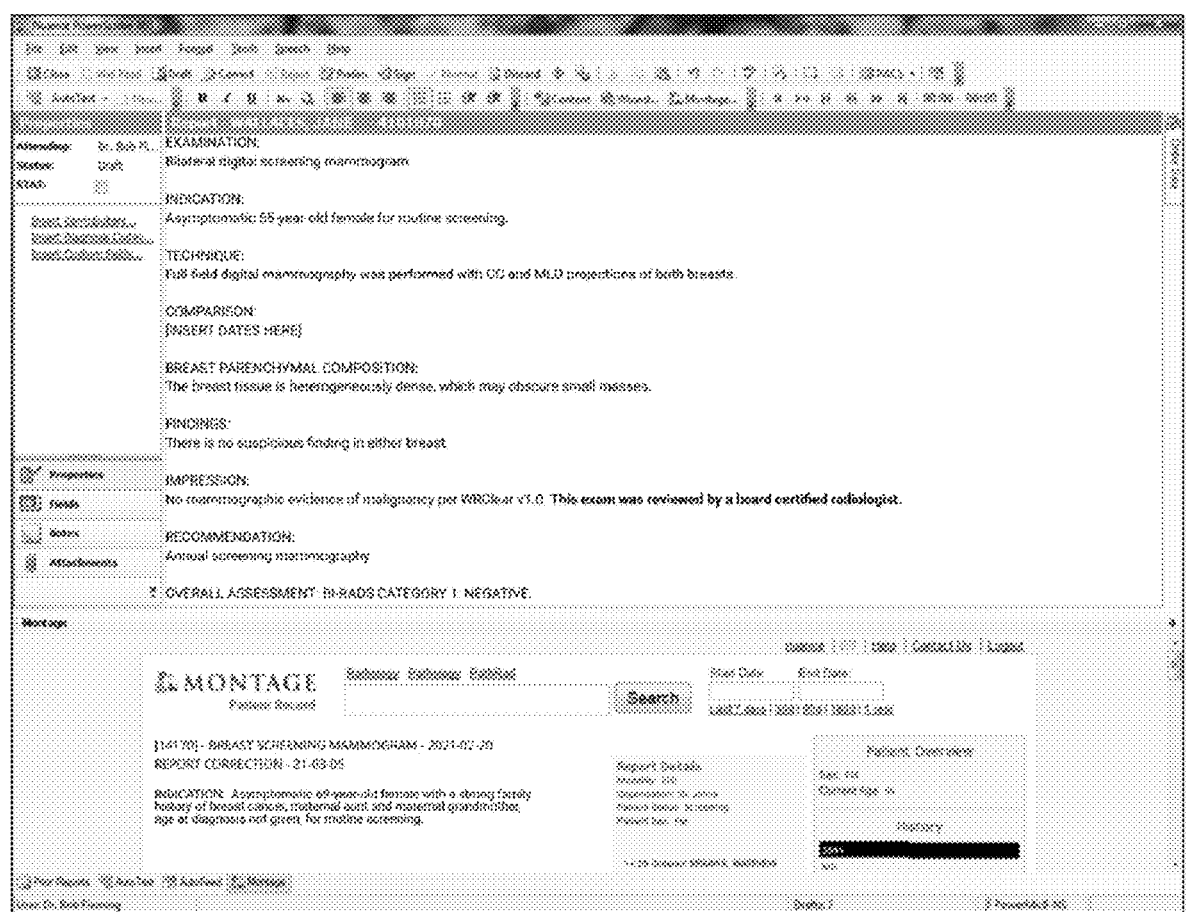

FIG. 38B shows an example radiology report for an assistive-use case, in which a Non-Suspicious exam was pre-generated by the AI-assisted radiological workflow and reviewed by a radiologist in Nuance PowerScribe 360 radiology voice recognition software.

Figure 39:
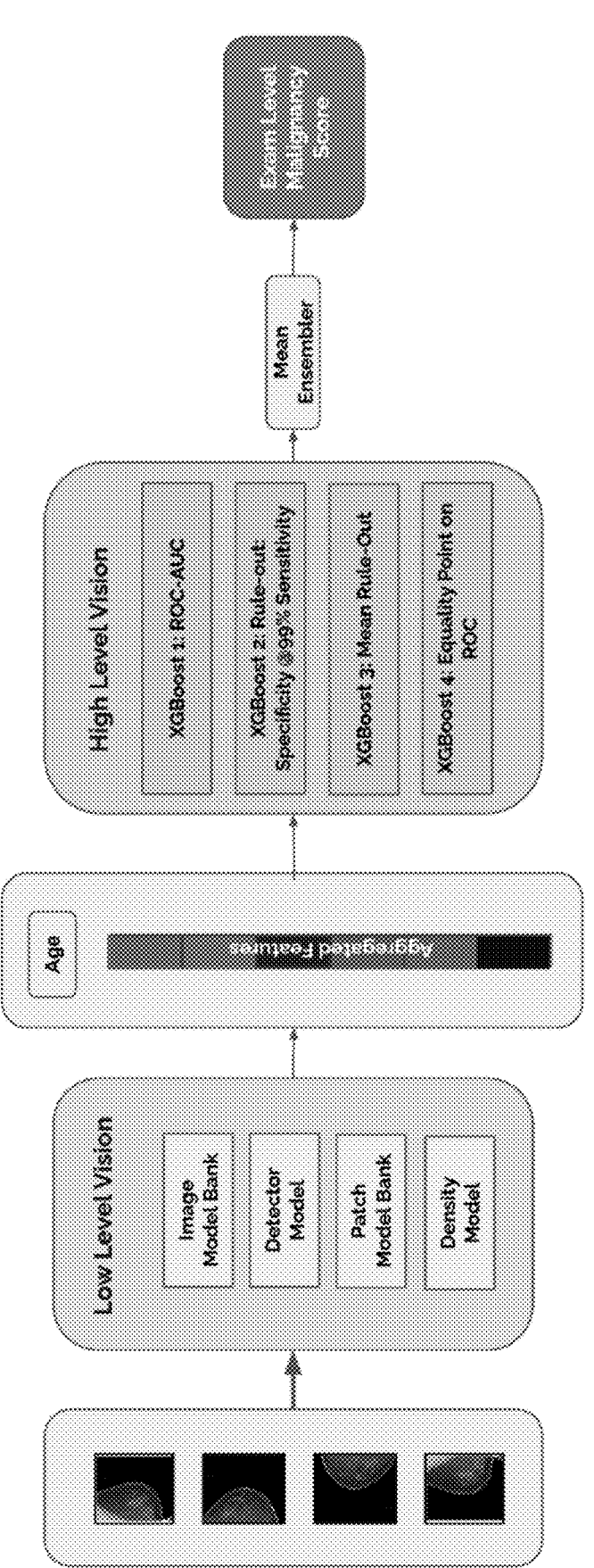

FIG. 39 shows an example of a cancer detection model architecture.

Figure 40:
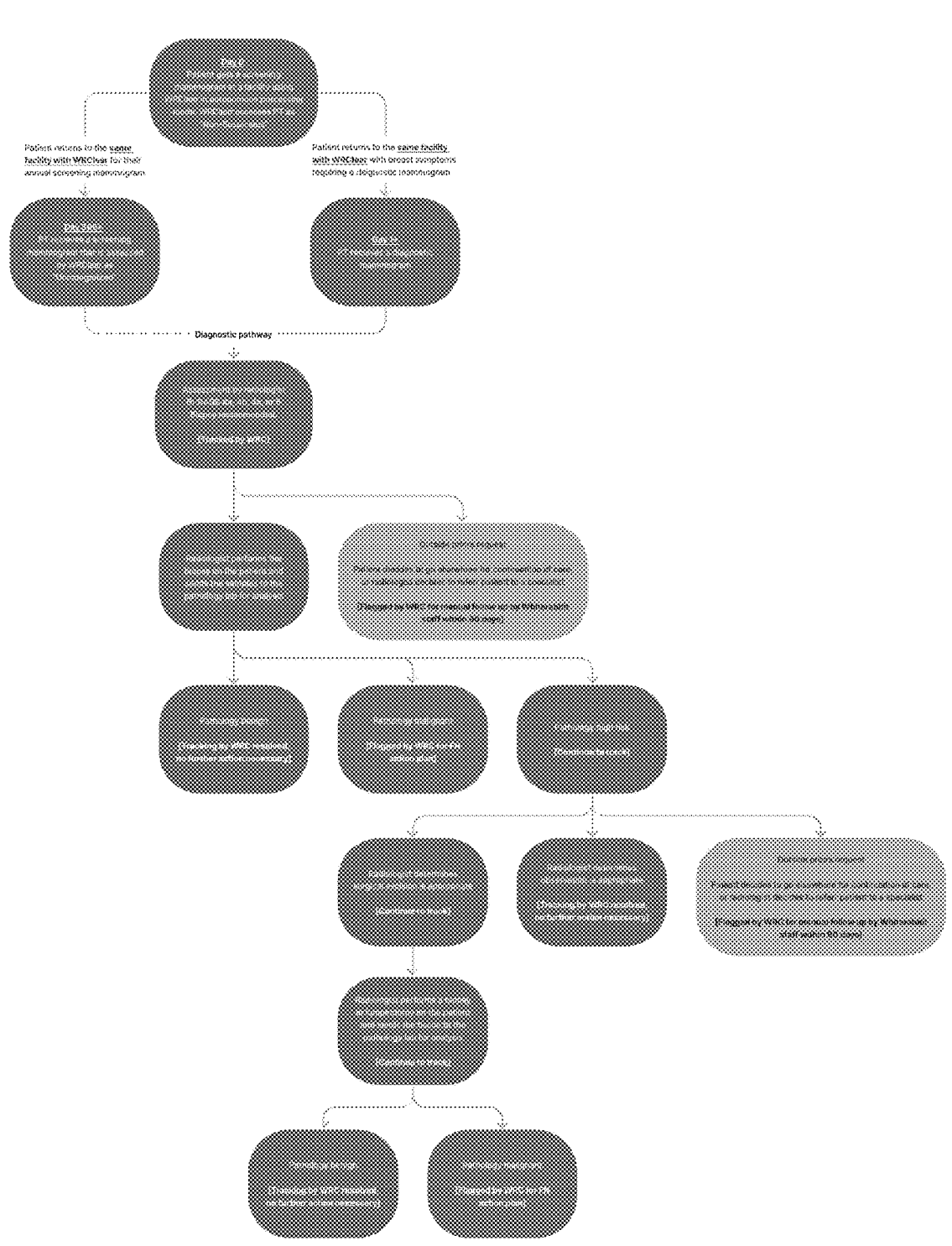

FIG. 40 shows an example of a flowchart of FN tracking mechanism when the location of the mammograph is at the original location where the patient received Non-Suspicious exam result.

Figure 41:
Figure 41:

FIG. 41 shows an example of a flowchart of FN tracking mechanism when the location of the mammograph is at an alternate facility that is also using the AI-assisted radiological workflow after a patient received an original screening exam at the original facility.

Figure 42:
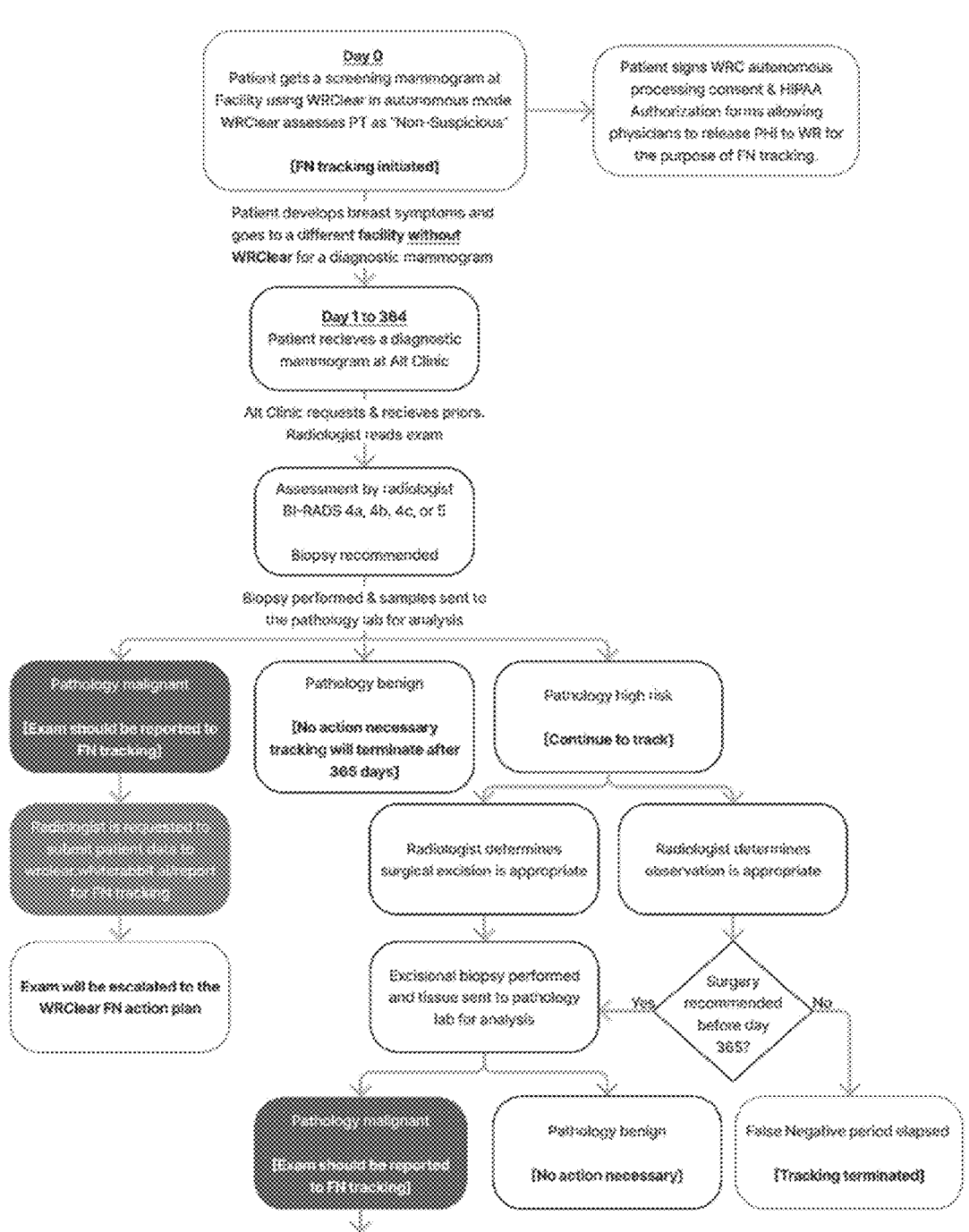
Figure 42:
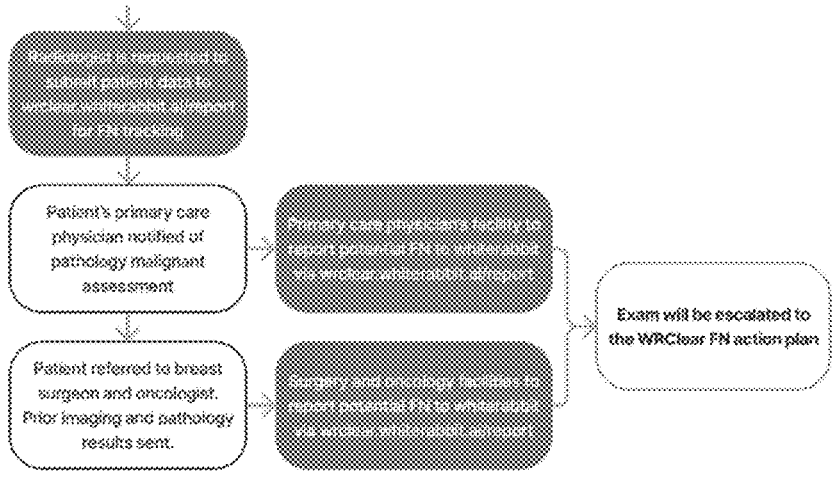

FIG. 42 shows an example of a flowchart of FN tracking mechanism when the location of the mammograph is at an alternate clinic after a patient received an original exam at an original facility.

Figure 43A:
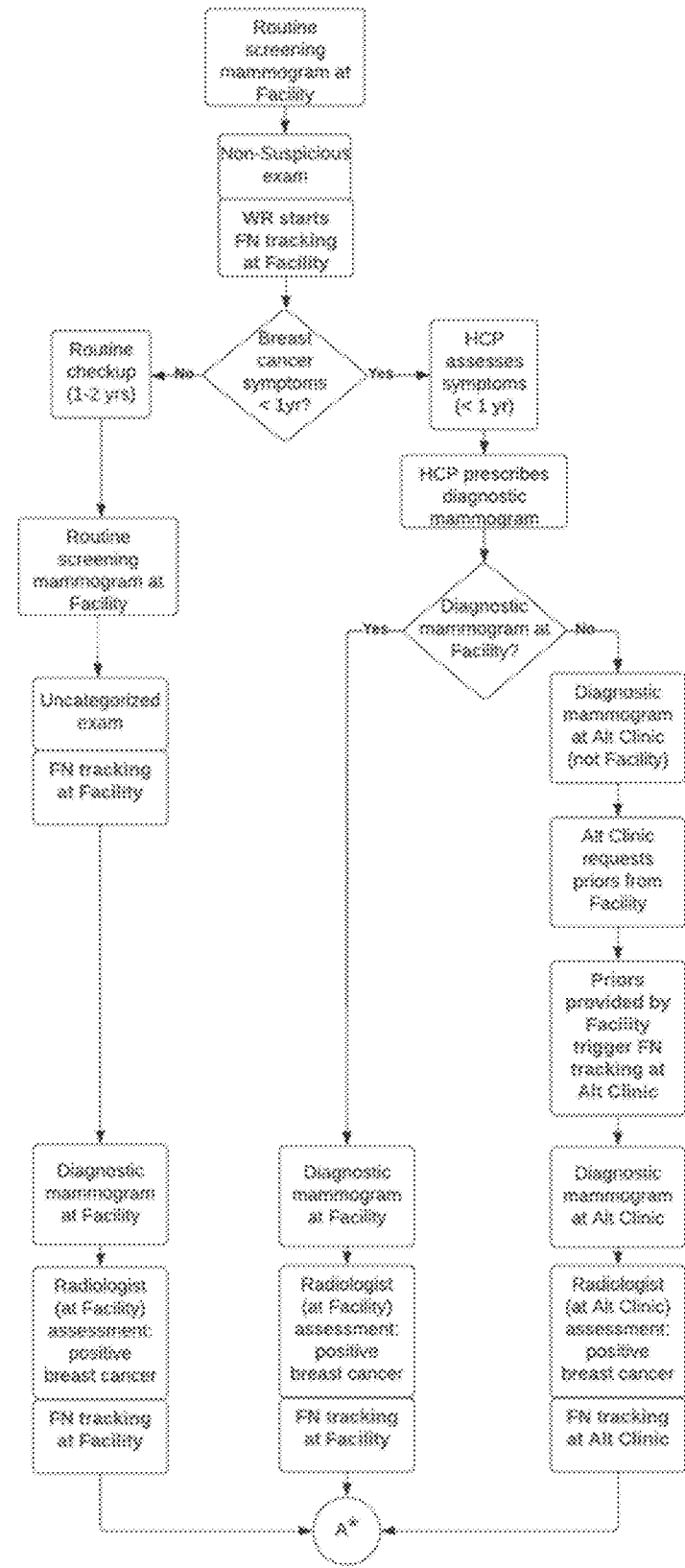

FIG. 43A provides an example flowchart of the clinical workflow.

Figure 43B:
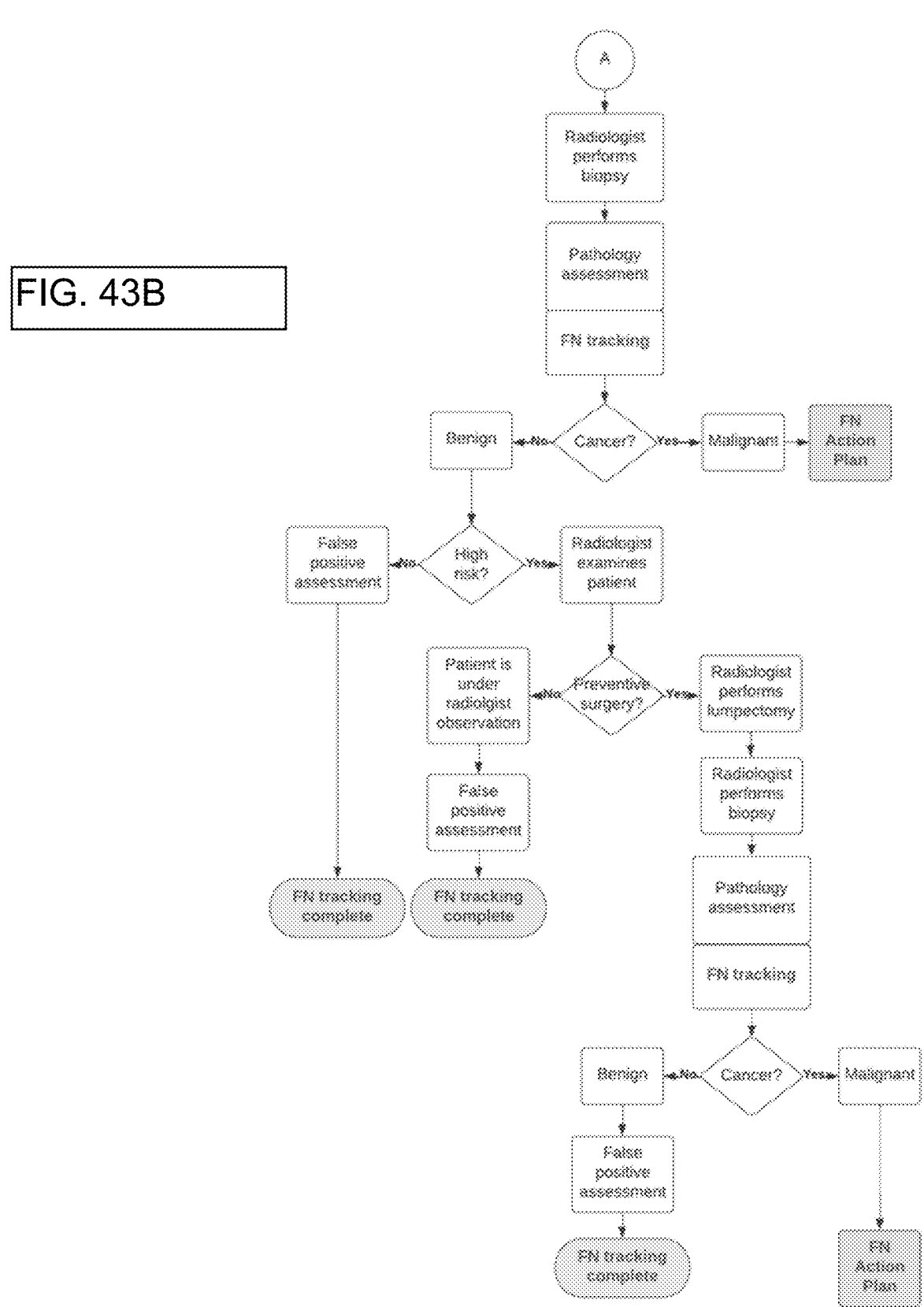

FIG. 43B provides an example flowchart of the corresponding FN tracking process.

Figure 44C:
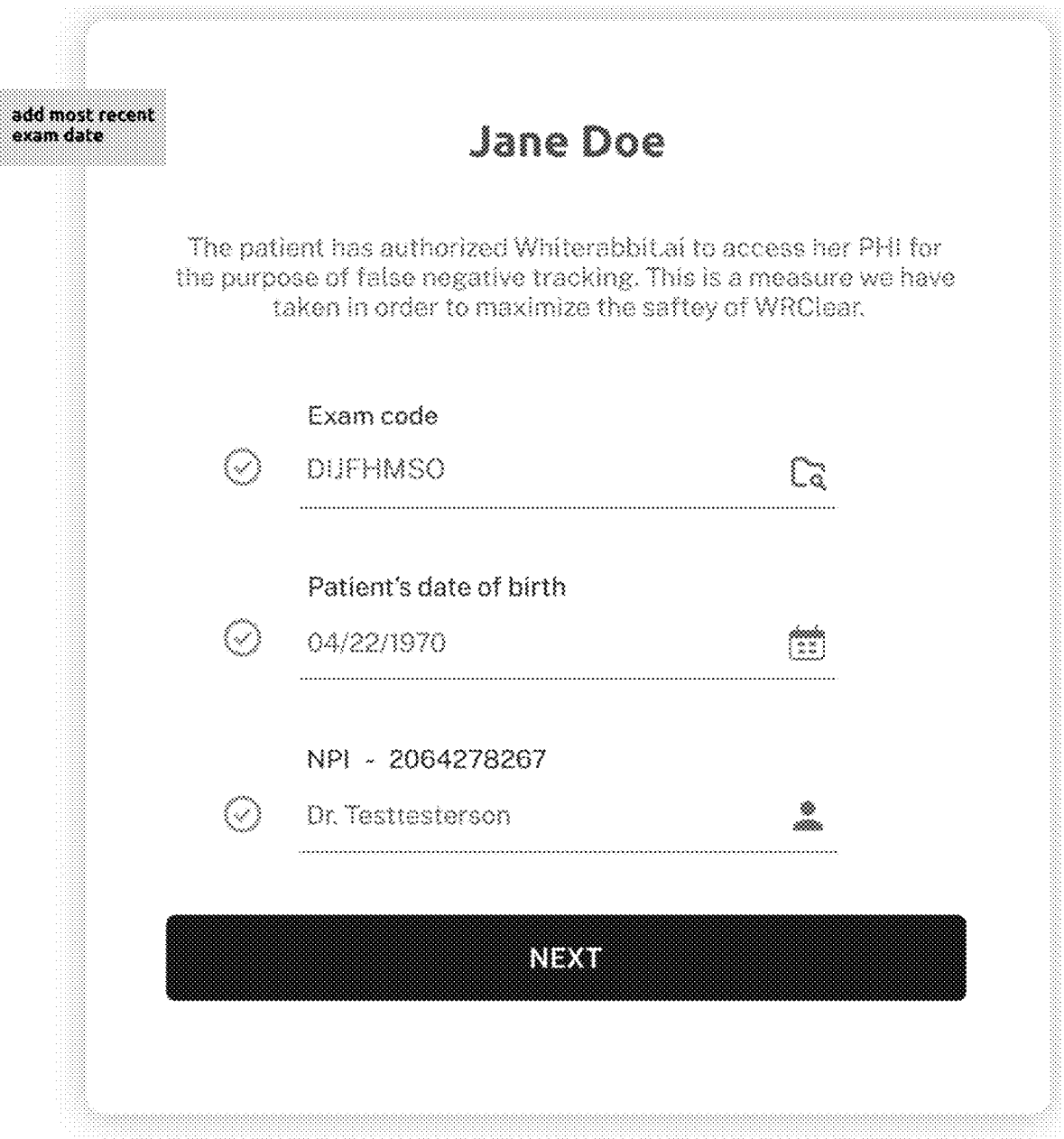
Figure 44D:
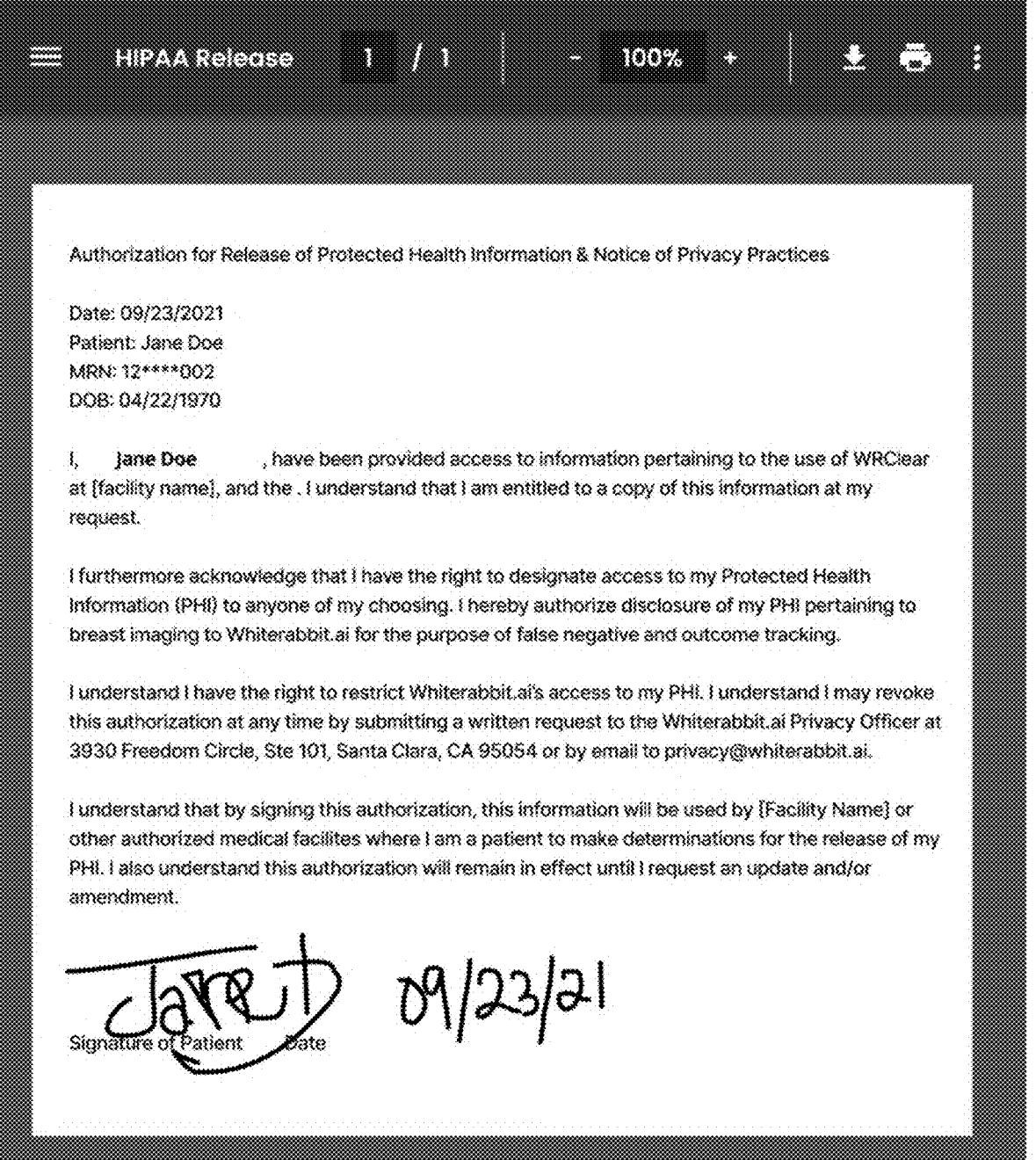
Figure 44F:

FIGS. 44A-44F provide example views of a website for radiologists to submit FN tracking information, including webpages that allow locating a patient record (FIG. 44A), acknowledging and agreeing to terms of use (FIG. 44B), displaying authorization for release of protected health information and notice of privacy practices (FIGS. 44C-44D), collecting patient exam information (FIGS. 44E-44F).

Figure 45:
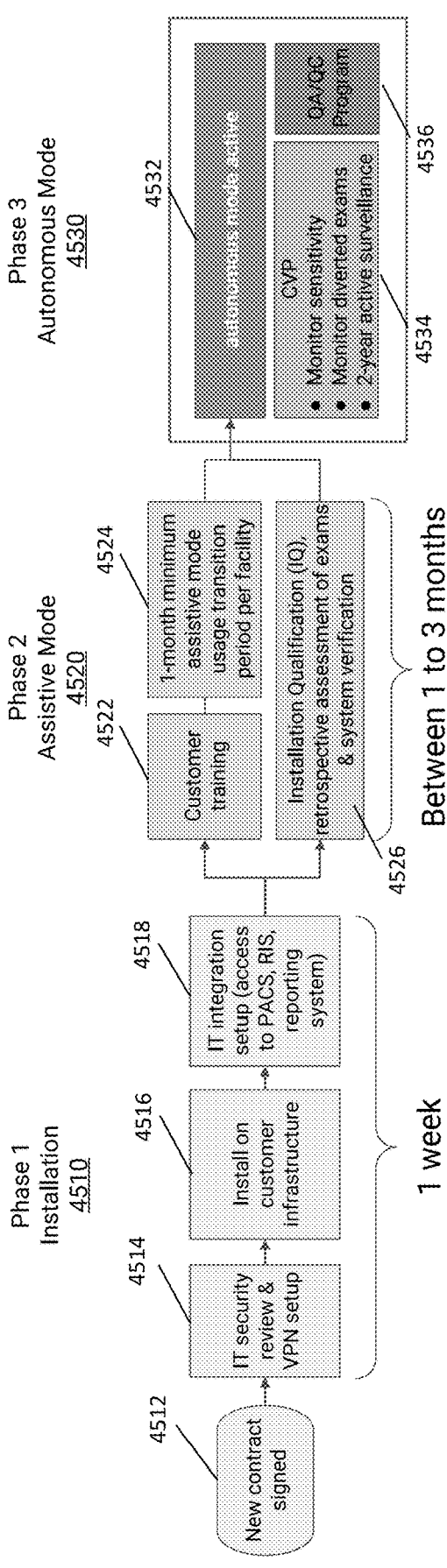

FIG. 45 shows an example workflow of installing and operating a machine-learning medical imaging screening classifier.

Figure 46:
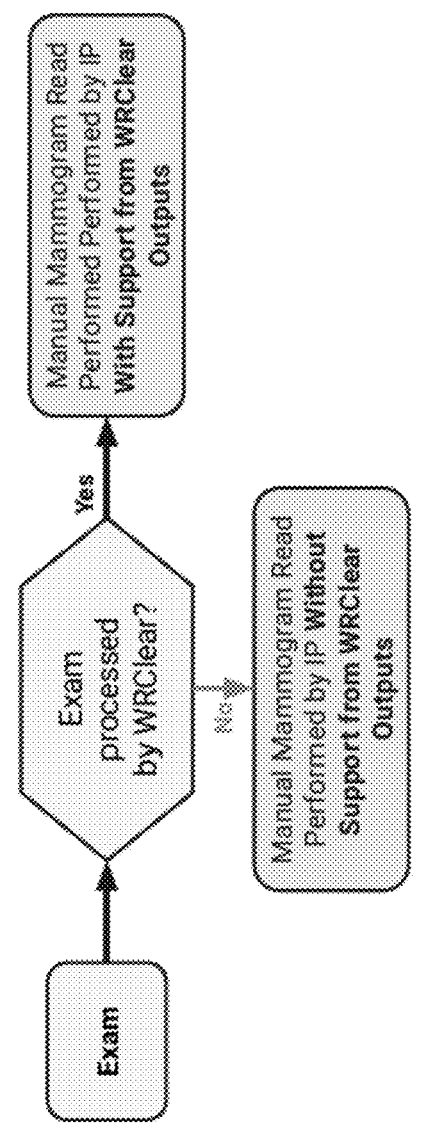

FIG. 46 shows an example workflow of a machine-learning medical imaging screening classifier at training mode.

Figure 47:
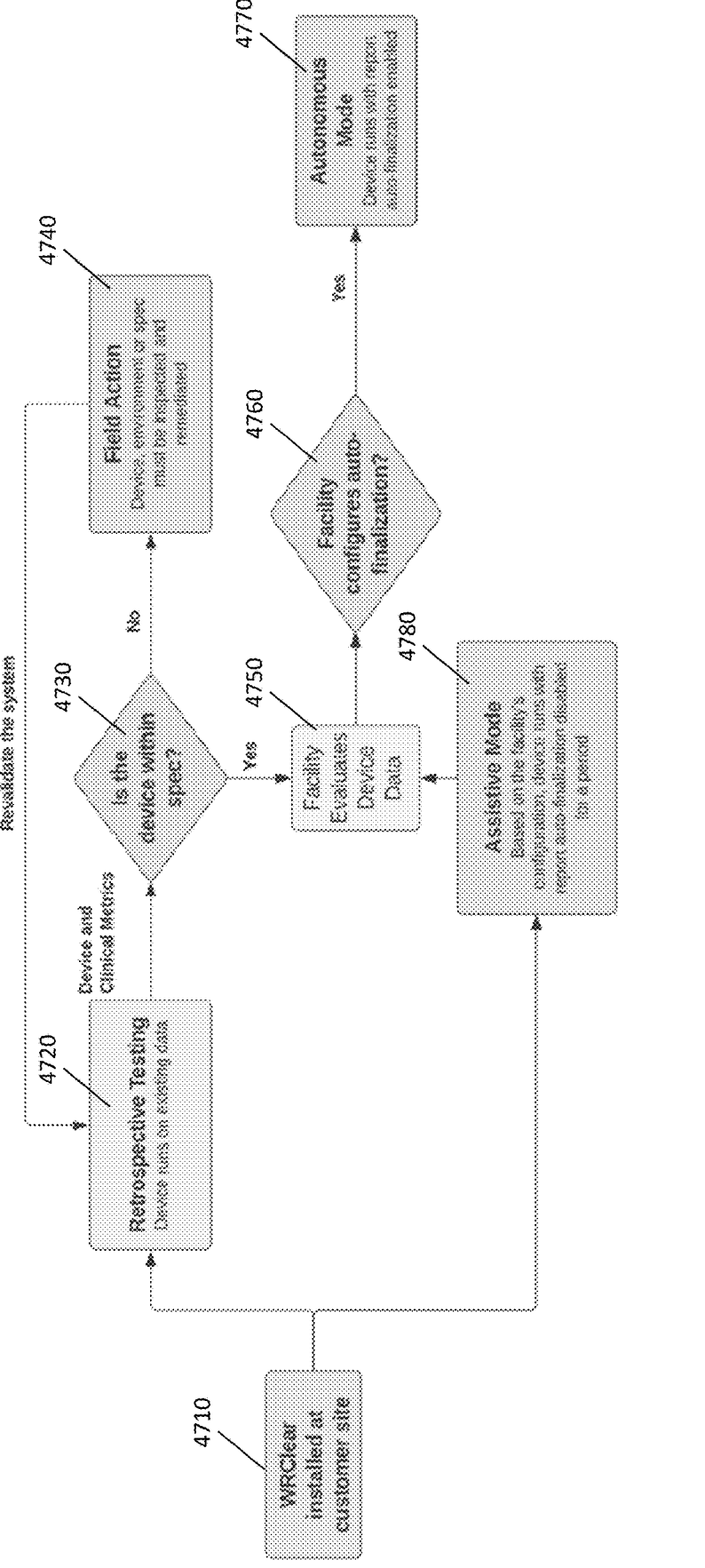

FIG. 47 shows an example workflow of installation qualification of a machine-learning medical imaging screening classifier.

Figure 48:
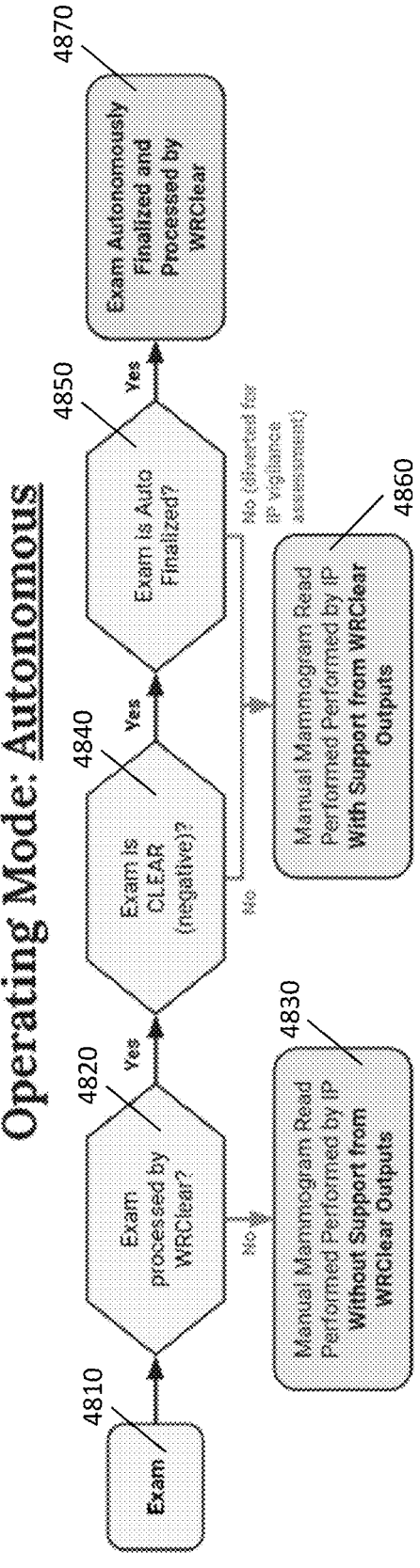

FIG. 48 shows an example workflow of a machine-learning medical imaging screening classifier at autonomous mode.

Figure 49A:
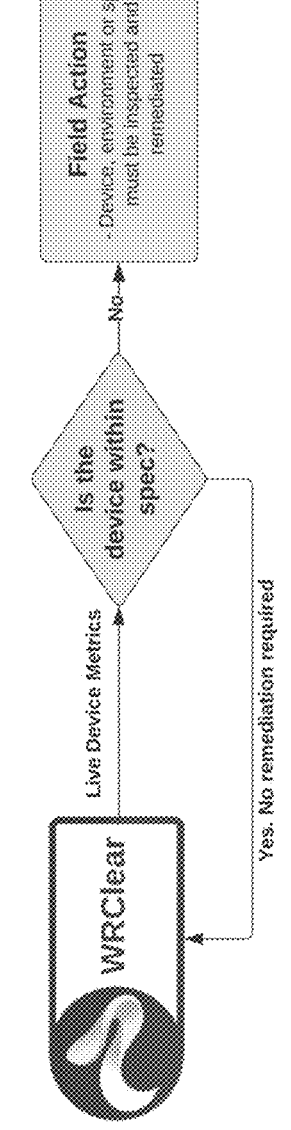

FIG. 49A shows an example workflow of operational qualification of a machine-learning medical imaging screening classifier.

Figure 49B:
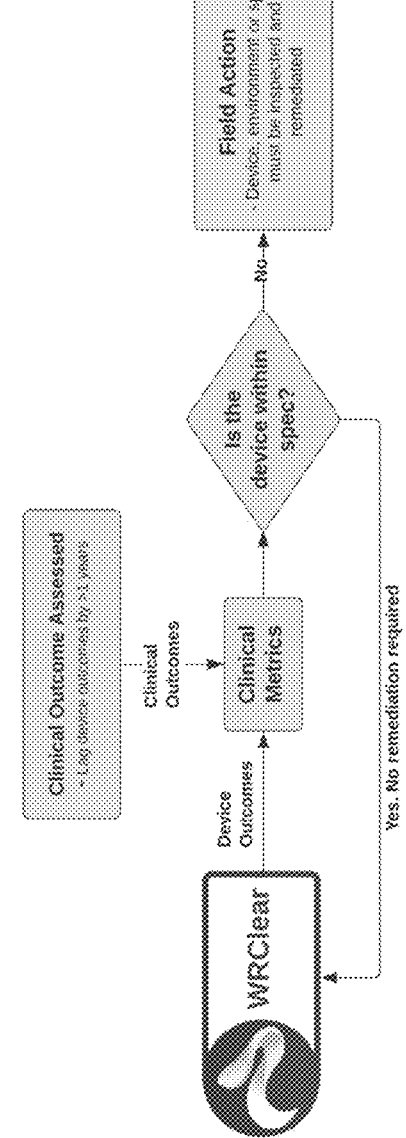

FIG. 49B shows an example workflow of performance qualification of a machine-learning medical imaging screening classifier.

Figure 50:
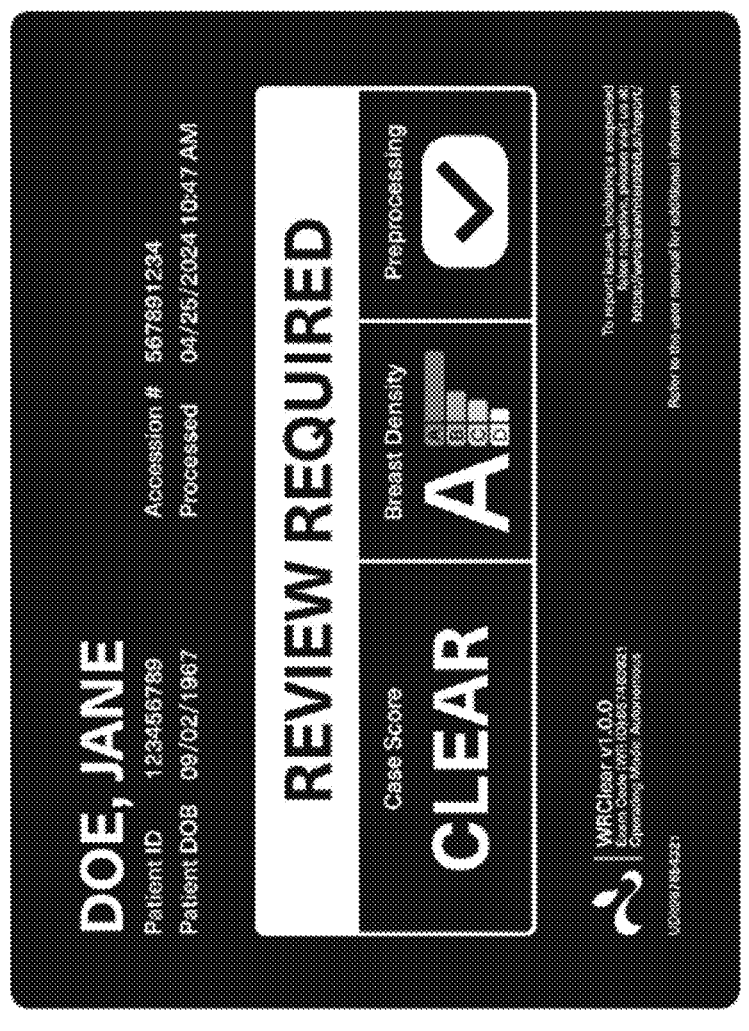

FIG. 50 shows an example of a diverted examination record.

Figure 51:
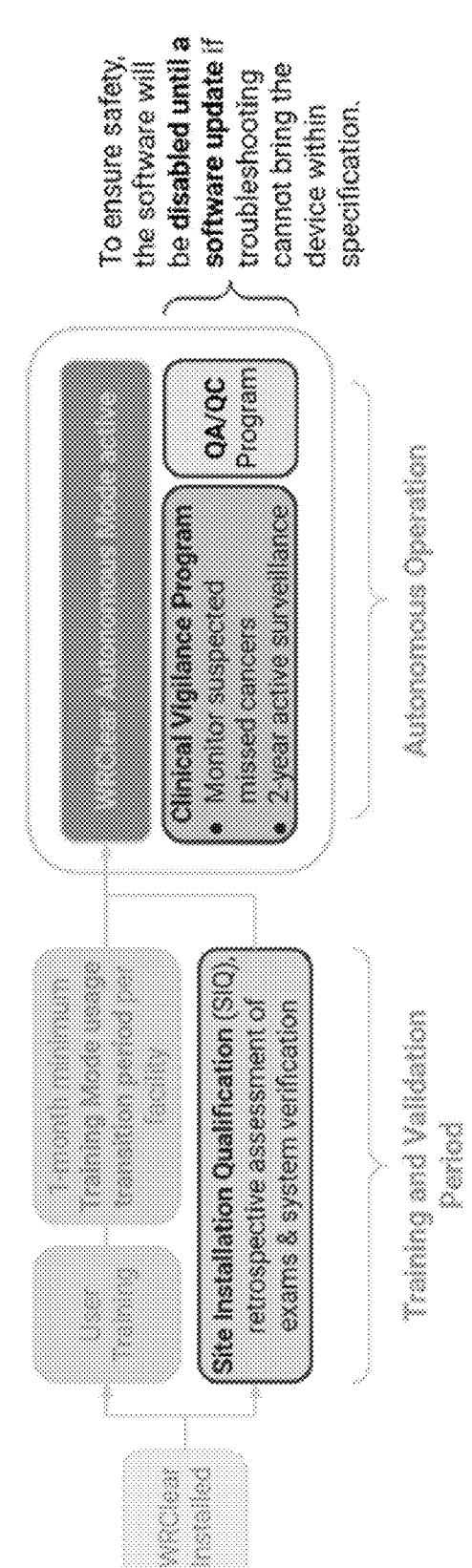

FIG. 51 shows an example workflow of a machine-learning medical imaging screening classifier when quality assurance (QA) or quality control identifies an issue of the classifier.

FIG. 52 shows 3-tier autonomous status of a machine-learning medical imaging screening classifier.

Figure 53:
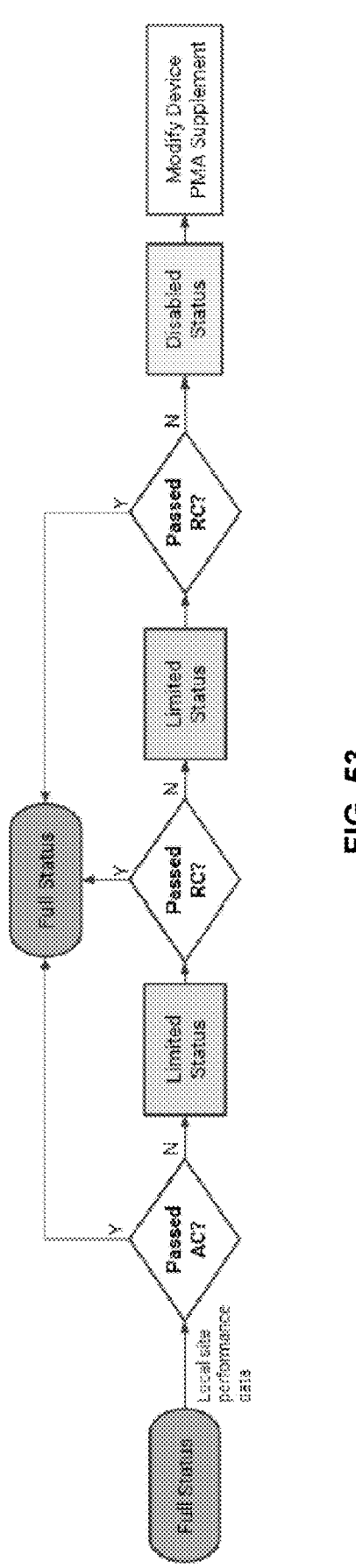

FIG. 53 shows an example workflow of determining an autonomous status of a machine-learning medical imaging screening classifier.

Figure 54:
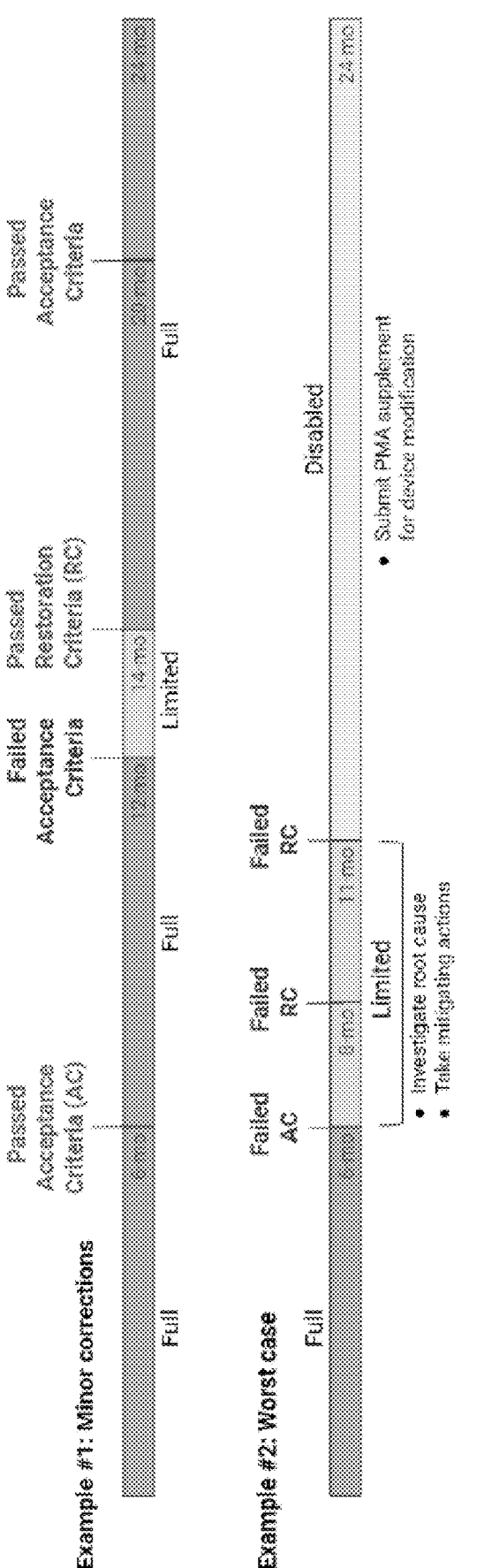

FIG. 54 shows examples of workflows of determining an autonomous status of a machine-learning medical imaging screening classifier.

Figure 55:
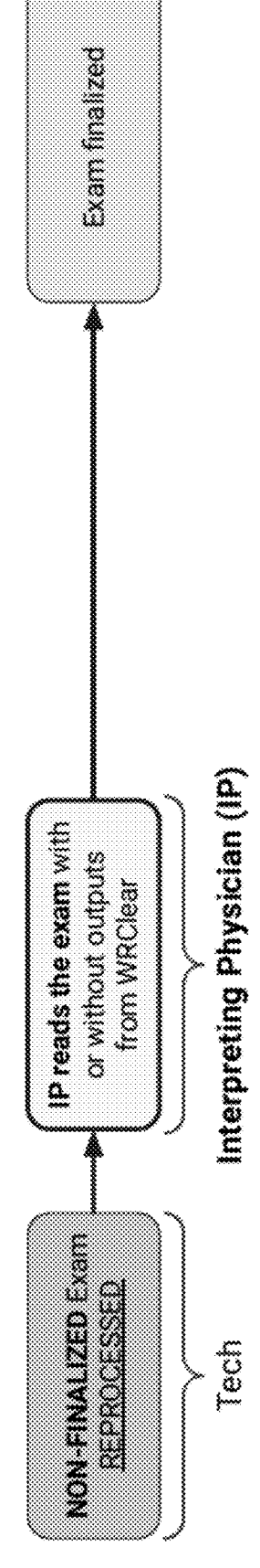

FIG. 55 shows a use case of a patient's medical image examined by a machine-learning medical imaging screening classifier where the examination is not finalized.

FIG. 56 shows a use case of a patient's medical image examined by a machine-learning medical imaging screening classifier where the examination is finalized.

Figure 57:
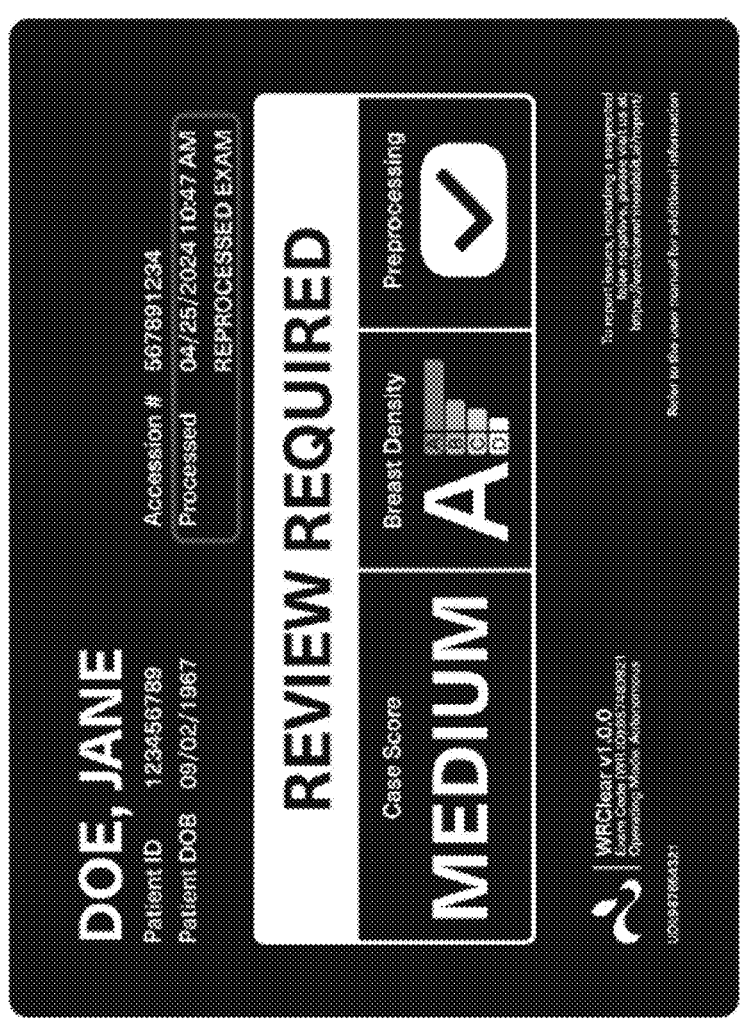

FIG. 57 shows an example of a reprocessed examination record.

Figure 58:
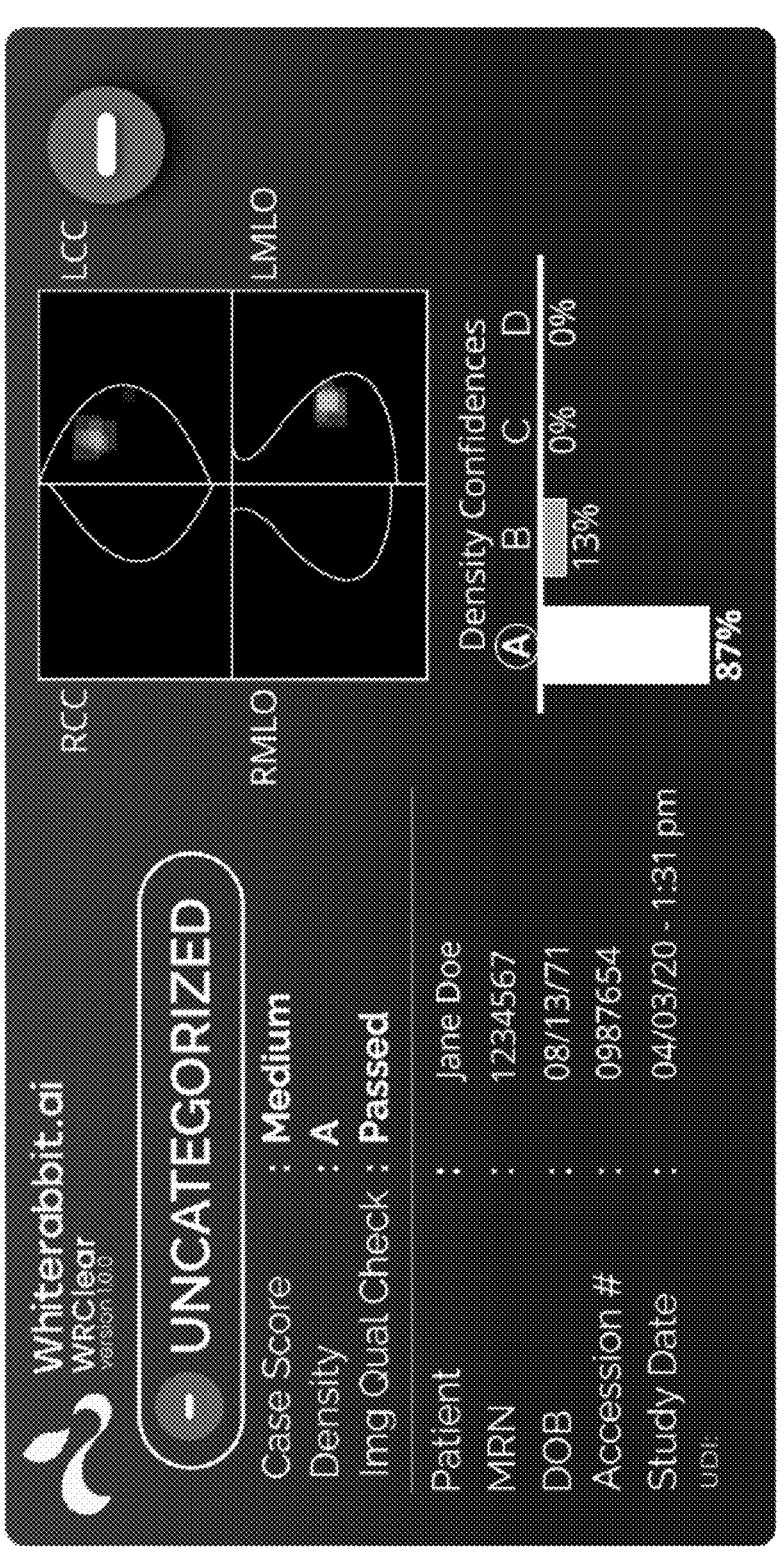

FIG. 58 shows an example of Digital Imaging and Communications in Medicine (DICOM) image scorecard generated for a patient's medical image labeled as Uncategorized by a machine-learning medical imaging screening classifier.

Figure 59B:
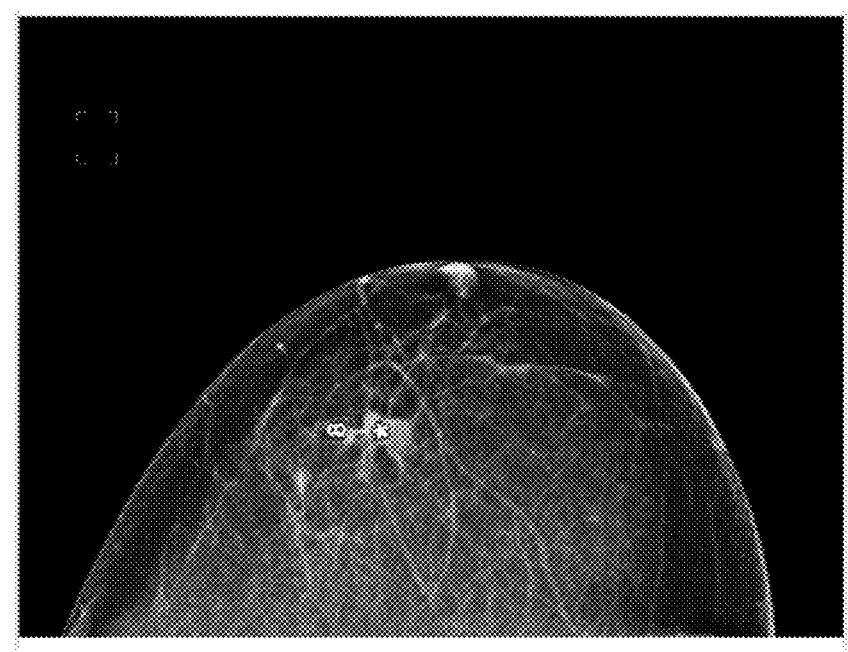
Figure 59A:

FIGS. 59A-59B show examples of 2D mammography images with assistive CAD marker functionality on L MLO and L CC views for an uncategorized exam with a case score of 9 and 8, respectively.

Figure 60B:
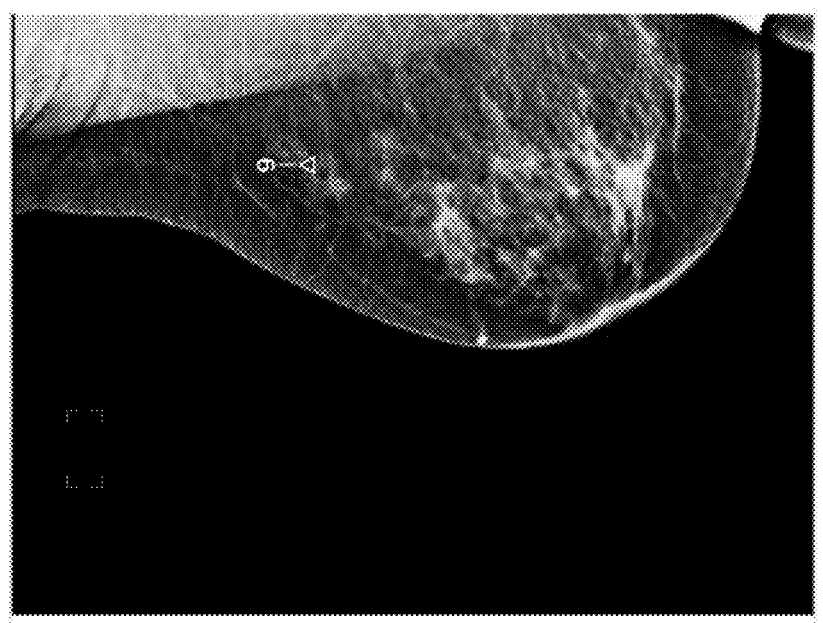
Figure 60A:
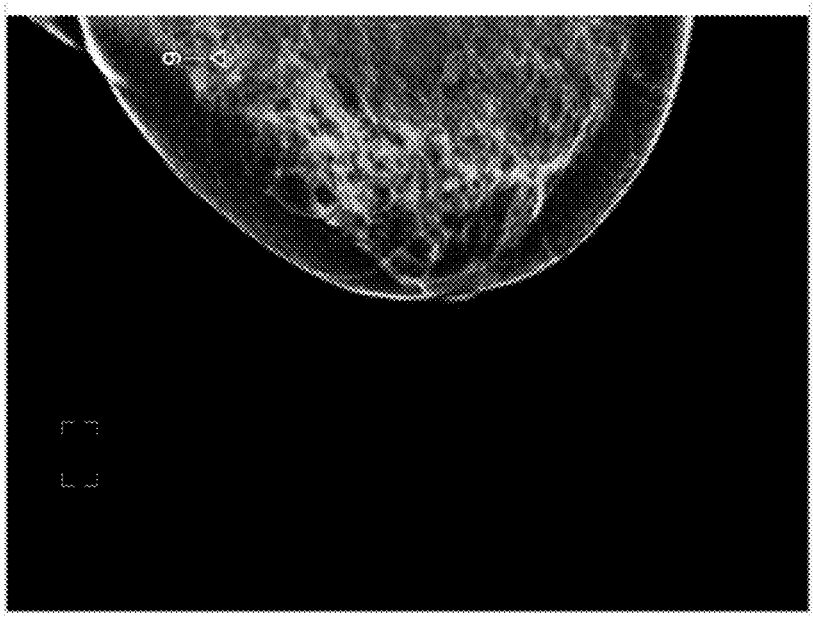

FIGS. 60A-60B show example of 2D mammography images with assistive CAD marker functionality on R CC and R MLO views for an Uncategorized exam with identified microcalcifications marked by a (Δ) symbol.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As used in the specification and claims, the singular form "a", "an", and "the" include plural references unless the context clearly dictates otherwise. For example, the term "a nucleic acid" includes a plurality of nucleic acids, including mixtures thereof.

As used herein, the term "subject," generally refers to an entity or a medium that has testable or detectable genetic information. A subject can be a person, individual, or patient. A subject can be a vertebrate, such as, for example, a mammal. Non-limiting examples of mammals include humans, simians, farm animals, sport animals, rodents, and pets. The subject can be a person that has a cancer or is suspected of having a cancer. The subject may be displaying a symptom(s) indicative of a health or physiological state or condition of the subject, such as a cancer (e.g., breast cancer) of the subject. As an alternative, the subject can be asymptomatic with respect to such health or physiological state or condition.

Breast cancer is the most widespread cancer in women in the U.S., with over 250 thousand new diagnoses in 2017 alone. About 1 in 8 women will be diagnosed with breast cancer at some point during their lives. Despite improvements in treatment, over 40 thousand women die every year in the U.S. from breast cancer. Substantial progress has made in reducing breast cancer mortality in part due to the widespread adoption of screening mammography. Breast cancer screening can help identify early-stage cancers, which have much better prognoses and lower treatment costs as compared to late-stage cancers. This difference can be substantial: women with localized breast cancer have a 5-year survival rate of nearly 99%, while women with metastatic breast cancer have a 5-year survival rate of 27%.

Despite these demonstrated benefits, adoption rates for screening mammography are hindered, in part, by poor subject experience, such as long delays in obtaining an appointment, unclear pricing, long wait times to receive exam results, and confusing reports. Further, problems arising from a lack of transparency in pricing are exacerbated by large variations in costs among providers. Similarly, delivery times for receiving exam results are inconsistent among providers. In addition, significant variation in radiologist performance results in subjects experiencing very different standards of care depending on location and income.

The present disclosure provides methods and systems for performing real-time radiology of subjects by stratifying medical image data using artificial intelligence into distinct radiological workflows for further screening and/or diagnostic assessment. Such subjects may include subjects with a cancer and subjects without cancer. The screening may be for a cancer such as, for example, breast cancer.

Figure 1:
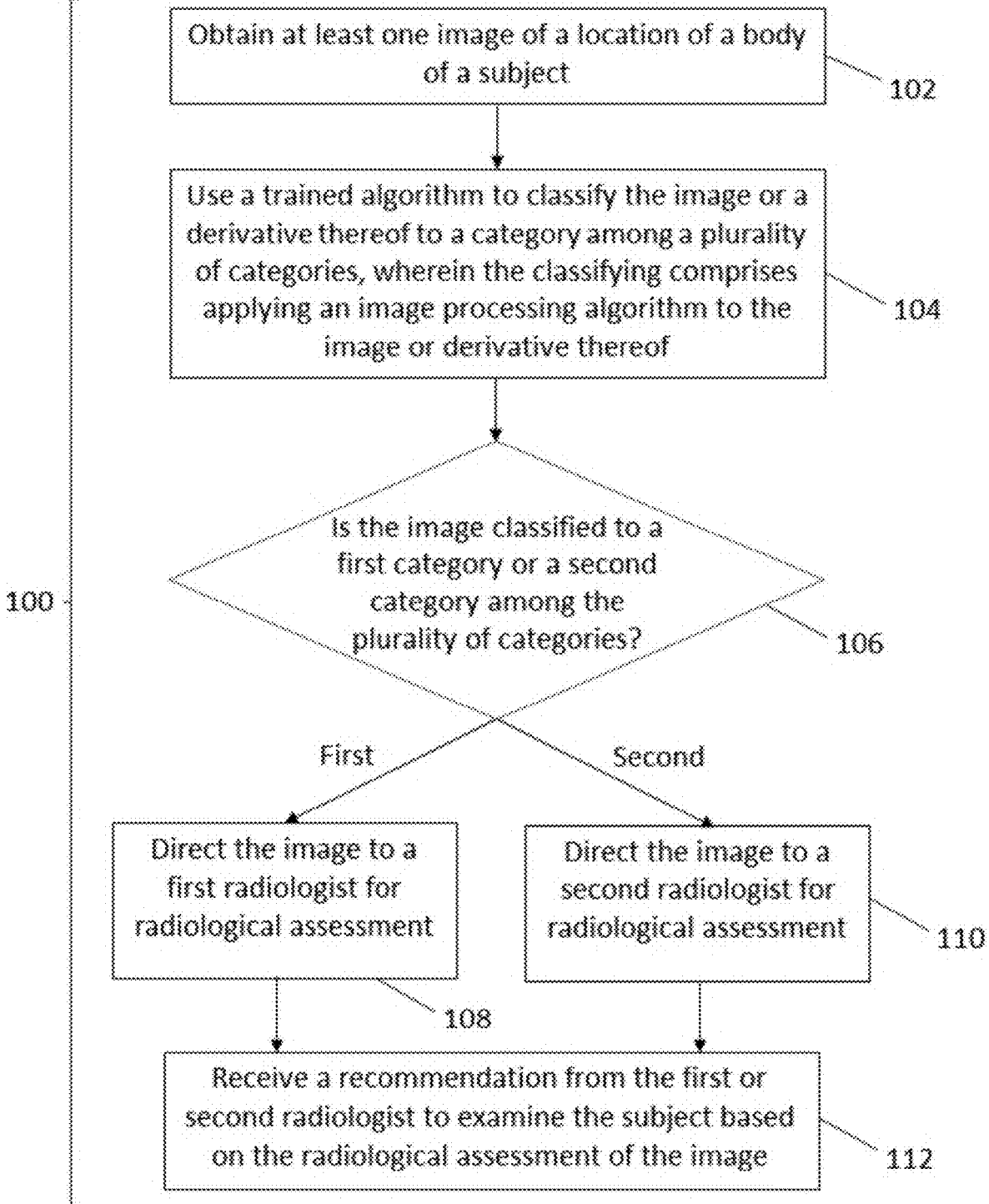
FIG. 1 illustrates an example workflow of a method for directing cases for radiological review (e.g., by a radiologist or radiologic technologist).

FIG. 1 illustrates an example workflow of a method for directing cases for radiological review (e.g., by a radiologist, radiologic technician, or radiologic technologist). In an aspect, the present disclosure provides a method 100 for processing at least one image of a location of a body of a subject. The method 100 may comprise obtaining the image of the location of a body of the subject (as in operation 102). Next, the method 100 may comprise using a trained algorithm to classify the image or a derivative thereof to a category among a plurality of categories (as in operation 104). For example, the classifying may comprise applying an image processing algorithm to the image or derivative thereof. Next, the method 100 may comprise determining whether the image was classified to a first category or a second category among the plurality of categories (as in operation 106). If the image was classified to the first category, then the method 100 may comprise directing the image to a first radiologist for radiological assessment (as in operation 108). If the image was classified to the second category, then the method 100 may comprise directing the image to a second radiologist for radiological assessment (as in operation 110). Next, the method 100 may comprise receiving a recommendation (e.g., from the first or second radiologist, or from another radiologist or physician) to examine the subject based at least in part on the radiological assessment of the image (as in operation 112).

Figure 2:
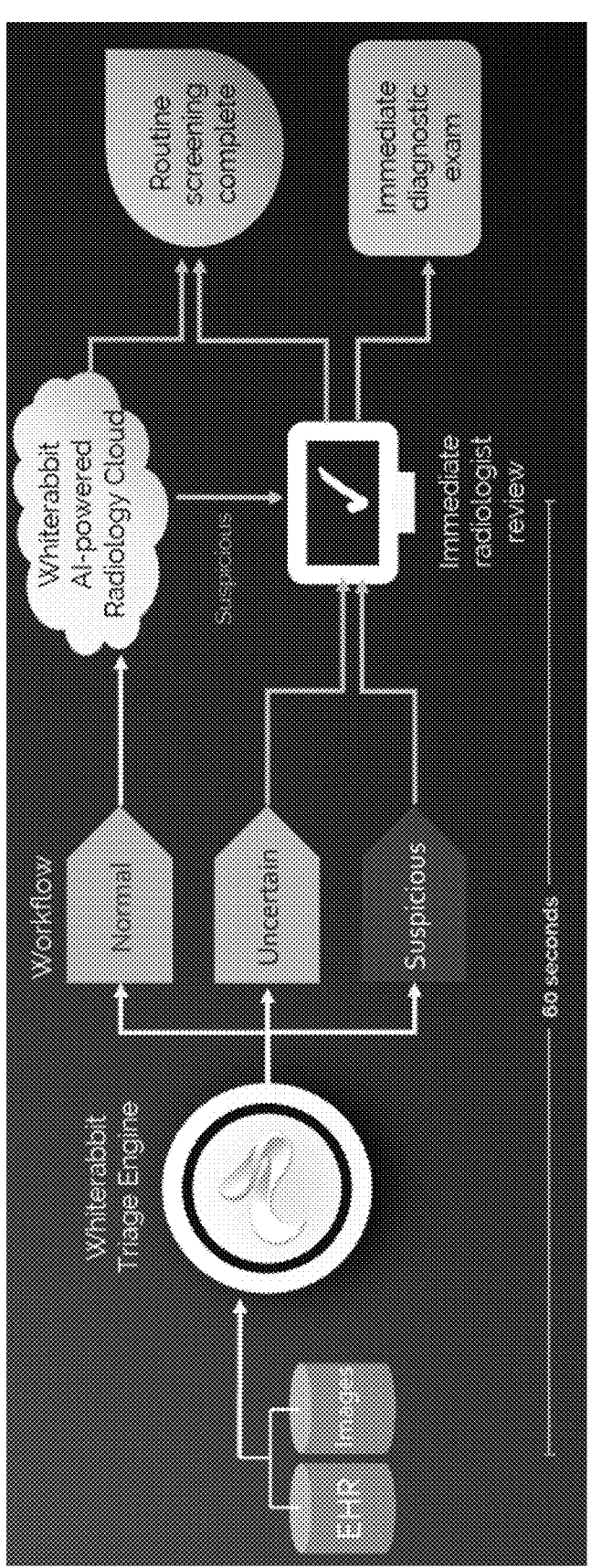
FIG. 2 illustrates an example of a method of using a triage engine configured to stratify a subject who is undergoing mammographic screening by classifying the mammographic data of the subject into one of three different workflows: normal, uncertain, and suspicious.

FIG. 2 illustrates an example of a method of using a triage engine configured to stratify a subject who is undergoing mammographic screening by classifying the mammographic data of the subject into one of three different workflows: normal, uncertain, and suspicious. First, a dataset comprising an electronic health record (EHR) and medical images of a subject are provided. Next, an AI-based triage engine processes the EHR and medical images to analyze and classify the dataset as likely normal, possibly suspicious, or likely suspicious. Next, the subject's dataset is processed by one of three workflows based at least in part on the classification of the dataset as normal, uncertain, or suspicious: a normal workflow, an uncertain workflow, and a suspicious workflow, respectively. Each of the three workflows may comprise radiologist review or further AI-based analysis (e.g., by a trained algorithm). The normal workflow may comprise an AI-based (optionally a cloud-based) confirmation that the subject's dataset is normal, upon which the routine screening is complete. For example, a group of radiologists may review the normal workflow cases at high volume and efficiency. Alternatively, the normal workflow may comprise an AI-based (optionally a cloud-based) determination that the subject's dataset is suspicious, upon which an immediate radiologist review of the subject's dataset is ordered. For example, a second group of radiologists may review the suspicious workflow cases at lower volume and lower efficiency (e.g., expert radiologists conducting more detailed radiological assessments). Similarly, the uncertain and suspicious workflow may also comprise an immediate radiologist review of the subject's dataset. In some embodiments, different sets of radiologists are used to review the different workflows, as described elsewhere herein. In some embodiments, the same sets of radiologists are used to review the different workflows (e.g., at different time points depending on a prioritization of the cases for radiological assessment).

Figure 3A:
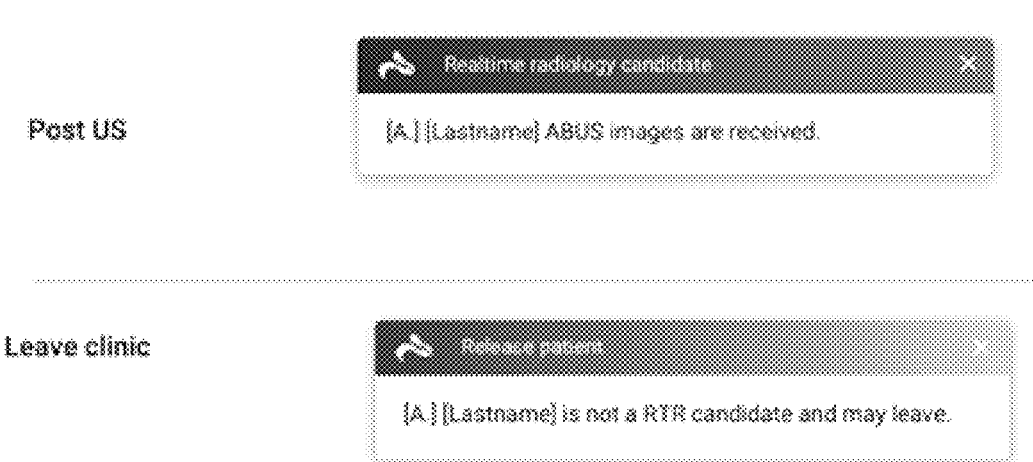
Figure 3C:
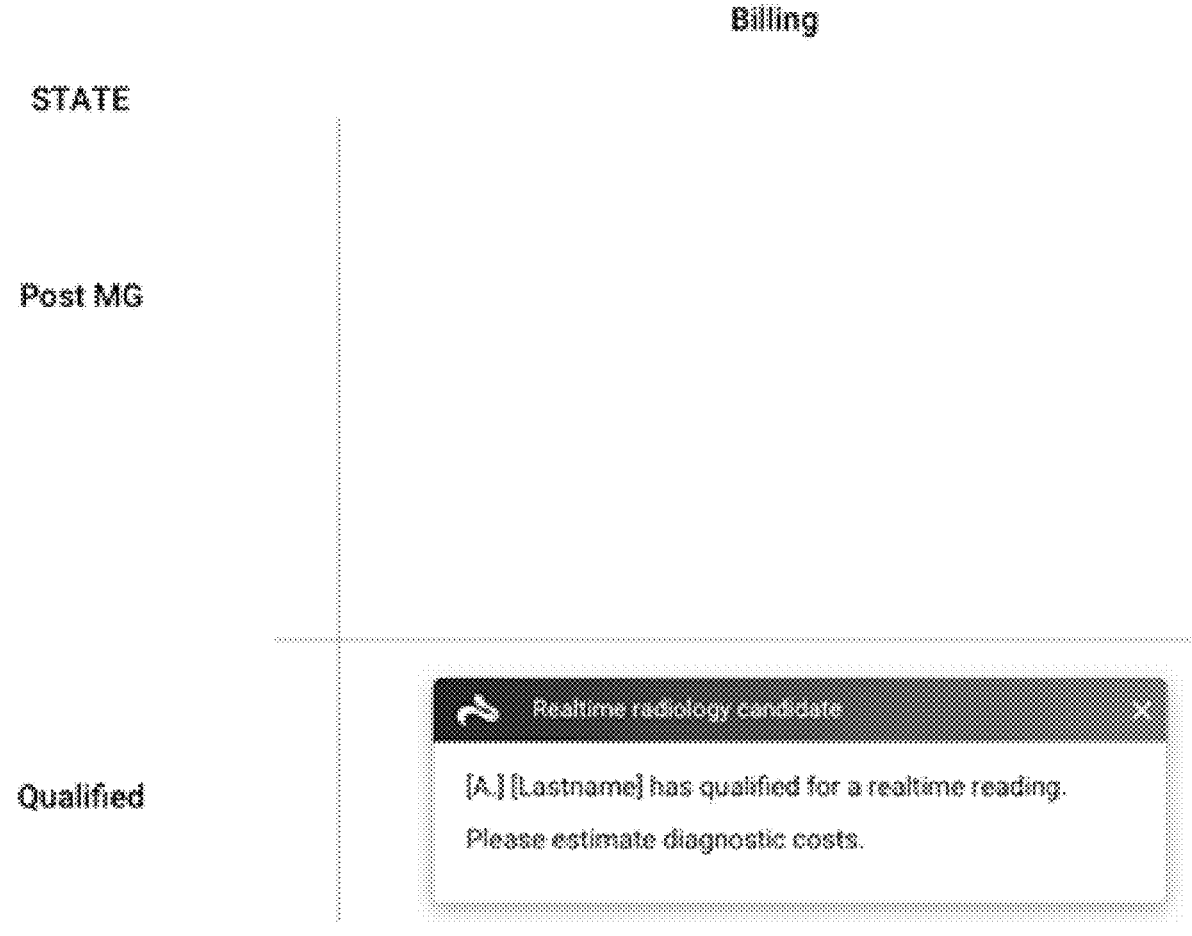
Figure 3D:
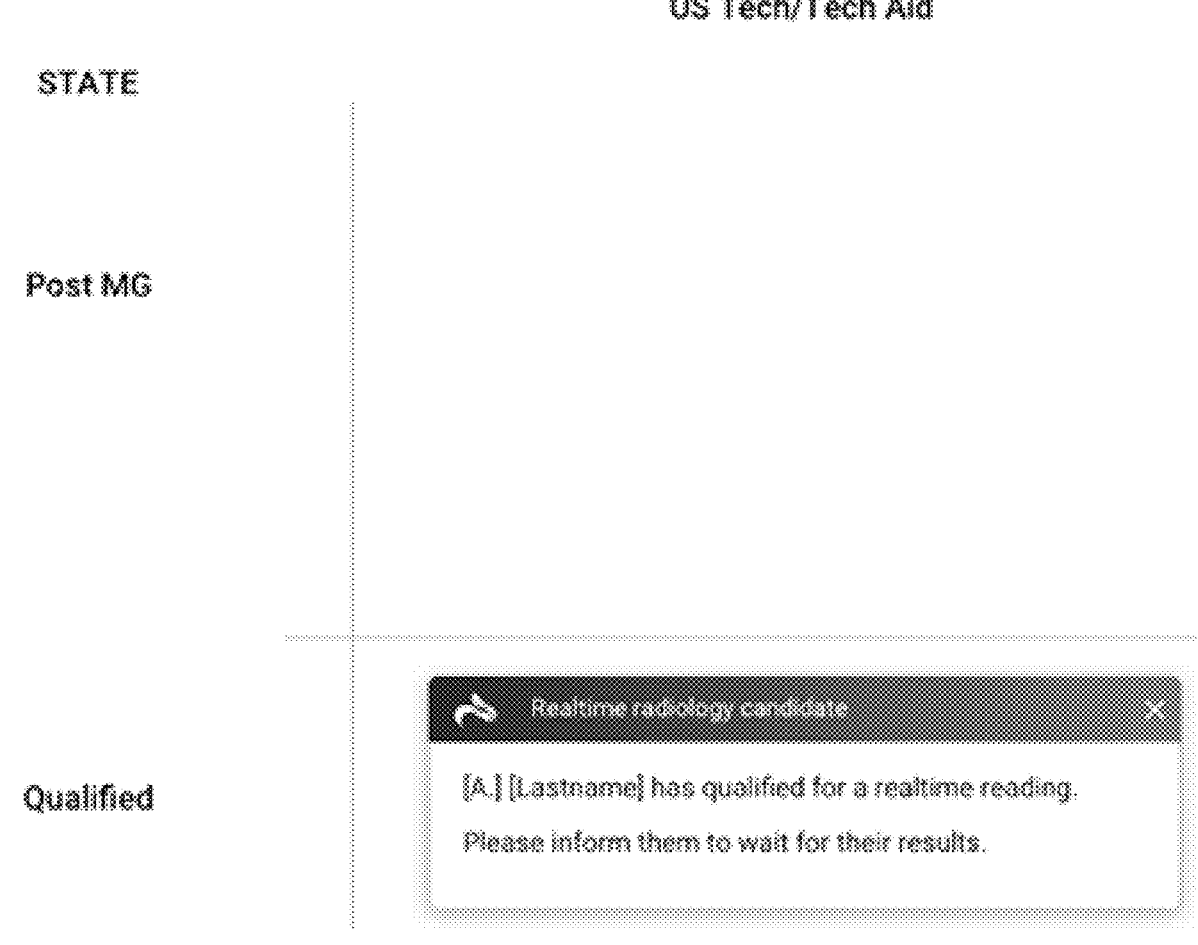

FIGS. 3A-3D show an example of a user interface for a real-time radiology system, including views from the perspective of a mammography technologist or technologist's assistant (FIG. 3A), a radiologist (FIG. 3B), a billing representative (FIG. 3C), and an ultrasound technician or technician's assistant (FIG. 3D). The view may include a heatmap showing which regions were identified as suspicious by the AI algorithm. The mammography technologist or technologist's assistant may ask the subject some questions and evaluate the responses to the questions to assess whether the subject is qualified for a real-time radiology assessment. The radiologist may read or interpret the medical images (e.g., mammography images) of the subject in accordance with the real-time radiology methods and systems of the present disclosure. The billing representative may estimate the diagnostic costs based at least in part on the subject's qualification for a real-time radiology assessment. The mammography/ultrasound technologist or technologist's assistant may inform the subject to wait for their results of the real-time radiology assessment. The user interface may provide a notification (e.g., generated by an AI-based algorithm) to the technologist or technologist's assistant that an acquired image is of poor quality, so that the technologist or technologist's assistant can make a correction to the acquired image or repeat the image acquisition.
Obtaining Medical Images The medical images may be obtained or derived from a human subject (e.g., a patient). The medical images may be stored in a database, such as a computer server (e.g., cloud-based server), a local server, a local computer, or a mobile device (such as smartphone or tablet)). The medical images may be obtained from a subject with cancer, from a subject that is suspected of having cancer, or from a subject that does not have or is not suspected of having cancer.

The medical images may be taken before and/or after treatment of a subject with cancer. Medical images may be obtained from a subject during a treatment or a treatment regime. Multiple sets of medical images may be obtained from a subject to monitor the effects of the treatment over time. The medical images may be taken from a subject known or suspected of having a cancer (e.g., breast cancer) for which a definitive positive or negative diagnosis is not available via clinical tests. The medical images may be taken from a subject suspected of having cancer. The medical images may be taken from a subject experiencing unexplained symptoms, such as fatigue, nausea, weight loss, aches and pains, weakness, or bleeding. The medical images may be taken from a subject having explained symptoms. The medical images may be taken from a subject at risk of developing cancer due to factors such as familial history, age, hypertension or pre-hypertension, diabetes or pre-diabetes, overweight or obesity, environmental exposure, lifestyle risk factors (e.g., smoking, alcohol consumption, or drug use), or presence of other risk factors.

The medical images may be acquired using one or more imaging modalities, such as a mammography scan, a computed tomography (CT) scan, a magnetic resonance imaging (MRI) scan, an ultrasound scan, a digital X-ray scan, a positron emission tomography (PET) scan, a PET-CT scan, a nuclear medicine scan, a thermography scan, an ophthalmy scan, an optical coherence tomography scan, an electrocardiography scan, an endoscopy scan, a diaphanography scan, a bone densitometry scan, an optical scan, or any combination thereof. The medical images may be pre-processed using image processing techniques or deep learning to enhance image characteristics (e.g., contrast, brightness, sharpness), remove noise or artifacts, filter frequency ranges, compress the images to a small file size, or sample or crop the images. The medical images may be raw or reconstructed (e.g., to create a 3-D volume from a plurality of 2-D images). The images may be processed to compute maps that are correlated to tissue properties or functional behavior as in functional MRI (fMRI) or resting state fMRI. The images may be overlaid with heatmaps or additional information showing information like fluid flow. The images may be created from a composite of images from several scans of the same subject or from several subjects.
Trained Algorithms After obtaining datasets comprising a plurality of medical images of a location of a body of one or more subjects, a trained algorithm may be used to process the datasets to classify the image as normal, ambiguous, or suspicious. For example, the trained algorithm may be used to determine regions of interest (ROIs) in the plurality of medical images of a subject, and to process the ROIs to classify the image as normal, ambiguous, or suspicious. The trained algorithm may be configured to classify the image as normal, ambiguous, or suspicious with an accuracy of at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, at least about 99%, or more than 99% for at least about 25, at least about 50, at least about 100, at least about 150, at least about 200, at least about 250, at least about 300, at least about 350, at least about 400, at least about 450, at least about 500, or more than about 500 independent samples.

The trained algorithm may comprise a supervised machine learning algorithm. The trained algorithm may comprise a classification and regression tree (CART) algorithm. The supervised machine learning algorithm may comprise, for example, a Random Forest, a support vector machine (SVM), a neural network (e.g., a deep neural network (DNN)), or a deep learning algorithm. The trained algorithm may comprise an unsupervised machine learning algorithm.

The trained algorithm may be configured to accept a plurality of input variables and to produce one or more output values based at least in part on the plurality of input variables. The plurality of input variables may comprise features extracted from one or more datasets comprising medical images of a location of a body of a subject. For example, an input variable may comprise a number of potentially cancerous or suspicious regions of interest (ROIs) in the dataset of medical images. The potentially cancerous or suspicious regions of interest (ROIs) may be identified or extracted from the dataset of medical images using a variety of image processing approaches, such as image segmentation. An input variable may also comprise several images from slices in a 3D volume or multiple exams over a course of time. The plurality of input variables may also include clinical health data of a subject.

In some embodiments, the clinical health data comprises one or more quantitative measures of the subject, such as age, weight, height, body mass index (BMI), blood pressure, heart rate, glucose levels. As another example, the clinical health data can comprise one or more categorical measures, such as race, ethnicity, history of medication or other clinical treatment, history of tobacco use, history of alcohol consumption, daily activity or fitness level, genetic test results, blood test results, imaging results, and screening results.

The trained algorithm may comprise one or more modules configured to perform image processing on one or more images (e.g., radiological images), thereby producing a detection or segmentation of the one or more images. The trained algorithm may comprise a classifier, such that each of the one or more output values comprises one of a fixed number of possible values (e.g., a linear classifier, a logistic regression classifier, etc.) indicating a classification of the datasets comprising medical images by the classifier. The trained algorithm may comprise a binary classifier, such that each of the one or more output values comprises one of two values (e.g., $\{0, 1\}$, {positive, negative}, {high-risk, low-risk}, or {suspicious, normal}) indicating a classification of the datasets comprising medical images by the classifier. The trained algorithm may be another type of classifier, such that each of the one or more output values comprises one of more than two values (e.g., $\{0, 1, 2\}$, {positive, negative, or indeterminate}, {high-risk, intermediate-risk, or low-risk}, or {suspicious, normal, or indeterminate}) indicating a classification of the datasets comprising medical images by the classifier. The output values may comprise descriptive labels, numerical values, or a combination thereof. Some of the output values may comprise descriptive labels. Such descriptive labels may provide an identification, indication, likelihood, or risk of a disease or disorder state of the subject, and may comprise, for example, positive, negative, high-risk, intermediate-risk, low-risk, suspicious, normal, or indeterminate. Such descriptive labels may provide an identification of a follow-up diagnostic procedure or treatment for the subject, and may comprise, for example, a therapeutic intervention, a duration of the therapeutic intervention, and/or a dosage of the therapeutic intervention suitable to treat a cancer or other condition. Such descriptive labels may provide an identification of secondary clinical tests that may be appropriate to perform on the subject, and may comprise, for example, an imaging test, a blood test, a computed tomography (CT) scan, a magnetic resonance imaging (MRI) scan, an ultrasound scan, a digital X-ray, a positron emission tomography (PET) scan, a PET-CT scan, or any combination thereof. As another example, such descriptive labels may provide a prognosis of the cancer of the subject. As another example, such descriptive labels may provide a relative assessment of the cancer (e.g., an estimated stage or tumor burden) of the subject. Some descriptive labels may be mapped to numerical values, for example, by mapping "positive" to 1 and "negative" to 0.

Some of the output values may comprise numerical values, such as binary, integer, or continuous values. Such binary output values may comprise, for example, $\{0, 1\}$, {positive, negative}, or {high-risk, low-risk}. Such integer output values may comprise, for example, $\{0, 1, 2\}$. Such continuous output values may comprise, for example, a probability value of at least 0 and no more than 1. Such continuous output values may comprise, for example, the center coordinates of an ROI. Such continuous output values may indicate a prognosis of the cancer of the subject. Some numerical values may be mapped to descriptive labels, for example, by mapping 1 to "positive" and 0 to "negative." An array or map of numerical values may be produced, such as a probability of cancer map.

Some of the output values may be assigned based at least in part on one or more cutoff values. For example, a binary classification of datasets comprising medical images may assign an output value of "positive" or 1 if the dataset comprising medical images indicates that the subject has at least a 50% probability of having a cancer (e.g., breast cancer). For example, a binary classification of datasets comprising medical images may assign an output value of "negative" or 0 if the dataset comprising medical images indicates that the subject has less than a 50% probability of having a cancer. In this case, a single cutoff value of 50% is used to classify datasets comprising medical images into one of the two possible binary output values. Examples of single cutoff values may include about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 91%, about 92%, about 93%, about 94%, about 95%, about 96%, about 97%, about 98%, and about 99%.

As another example, a classification of datasets comprising medical images may assign an output value of "positive" or 1 if the dataset comprising medical images indicates that the subject has a probability of having a cancer of at least about 50%, at least about 55%, at least about 60%, at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, or more. The classification of samples may assign an output value of "positive" or 1 if the dataset comprising medical images indicates that the subject has a probability of having a cancer of more than about 50%, more than about 55%, more than about 60%, more than about 65%, more than about 70%, more than about 75%, more than about 80%, more than about 85%, more than about 90%, more than about 91%, more than about 92%, more than about 93%, more than about 94%, more than about 95%, more than about 96%, more than about 97%, more than about 98%, or more than about 99%.

The classification of datasets comprising medical images may assign an output value of "negative" or 0 if the dataset comprising medical images indicates that the subject has a probability of having a cancer of less than about 50%, less than about 45%, less than about 40%, less than about 35%, less than about 30%, less than about 25%, less than about 20%, less than about 15%, less than about 10%, less than about 9%, less than about 8%, less than about 7%, less than about 6%, less than about 5%, less than about 4%, less than about 3%, less than about 2%, or less than about 1%. The classification of dataset comprising medical images may assign an output value of "negative" or 0 if the dataset comprising medical images indicates that the subject has a probability of having a cancer of no more than about 50%, no more than about 45%, no more than about 40%, no more than about 35%, no more than about 30%, no more than about 25%, no more than about 20%, no more than about 15%, no more than about 10%, no more than about 9%, no more than about 8%, no more than about 7%, no more than about 6%, no more than about 5%, no more than about 4%, no more than about 3%, no more than about 2%, or no more than about 1%.

The classification of datasets comprising medical images may assign an output value of "indeterminate" or 2 if the dataset comprising medical images is not classified as "positive", "negative", 1, or 0. In this case, a set of two cutoff values is used to classify datasets comprising medical images into one of the three possible output values. Examples of sets of cutoff values may include {1%, 99%}, {2%, 98%}, {5%, 95%}, {10%, 90%}, {15%, 85%}, {20%, 80%}, {25%, 75%}, {30%, 70%}, {35%, 65%}, {40%, 60%}, and {45%, 55%}. Similarly, sets of n cutoff values may be used to classify datasets comprising medical images into one of n+1 possible output values, where n is any positive integer.

The trained algorithm may be trained with a plurality of independent training samples. Each of the independent training samples may comprise a dataset comprising medical images from a subject, associated datasets obtained by analyzing the medical images (e.g., labels or annotations), and one or more known output values corresponding to the dataset comprising medical images (e.g., the difficulty of reading the images, the time it took read the images, a clinical diagnosis, prognosis, absence, or treatment efficacy of a cancer of the subject). Independent training samples may comprise dataset comprising medical images, and associated datasets and outputs obtained or derived from a plurality of different subjects. Independent training samples may comprise dataset comprising medical images and associated datasets and outputs obtained at a plurality of different time points from the same subject (e.g., on a regular basis such as weekly, monthly, or annually). Independent training samples may be associated with presence of the cancer or disease (e.g., training samples comprising dataset comprising medical images, and associated datasets and outputs obtained or derived from a plurality of subjects known to have the cancer or disease). Independent training samples may be associated with absence of the cancer or disease (e.g., training samples comprising dataset comprising medical images, and associated datasets and outputs obtained or derived from a plurality of subjects who are known to not have a previous diagnosis of the cancer or who have received a negative test result for the cancer or disease).

The trained algorithm may be trained with at least about 50, at least about 100, at least about 250, at least about 500, at least about 1 thousand, at least about 5 thousand, at least about 10 thousand, at least about 15 thousand, at least about 20 thousand, at least about 25 thousand, at least about 30 thousand, at least about 35 thousand, at least about 40 thousand, at least about 45 thousand, at least about 50 thousand, at least about 100 thousand, at least about 150 thousand, at least about 200 thousand, at least about 250 thousand, at least about 300 thousand, at least about 350 thousand, at least about 400 thousand, at least about 450 thousand, or at least about 500 thousand independent training samples. The independent training samples may comprise dataset comprising medical images associated with presence of the disease (e.g., cancer) and/or dataset comprising medical images associated with absence of the disease (e.g., cancer). The trained algorithm may be trained with no more than about 500 thousand, no more than about 450 thousand, no more than about 400 thousand, no more than about 350 thousand, no more than about 300 thousand, no more than about 250 thousand, no more than about 200 thousand, no more than about 150 thousand, no more than about 100 thousand, no more than about 50 thousand, no more than about 25 thousand, no more than about 10 thousand, no more than about 5 thousand, no more than about 1 thousand, no more than about 500, no more than about 250, no more than about 100, or no more than about 50 independent training samples associated with presence of the disease (e.g., cancer). In some embodiments, the dataset comprising medical images is independent of samples used to train the trained algorithm.

The trained algorithm may be trained with a first number of independent training samples associated with presence of the disease (e.g., cancer) and a second number of independent training samples associated with absence of the disease (e.g., cancer). The first number of independent training samples associated with presence of the disease (e.g., cancer) may be no more than the second number of independent training samples associated with absence of the disease (e.g., cancer). The first number of independent training samples associated with presence of the disease (e.g., cancer) may be equal to the second number of independent training samples associated with absence of the disease (e.g., cancer). The first number of independent training samples associated with presence of the disease (e.g., cancer) may be greater than the second number of independent training samples associated with absence of the disease (e.g., cancer).

The trained algorithm may be configured to classify the medical images at an accuracy of at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, or more; for at least about 50, at least about 100, at least about 250, at least about 500, at least about 1 thousand, at least about 5 thousand, at least about 10 thousand, at least about 15 thousand, at least about 20 thousand, at least about 25 thousand, at least about 30 thousand, at least about 35 thousand, at least about 40 thousand, at least about 45 thousand, at least about 50 thousand, at least about 100 thousand, at least about 150 thousand, at least about 200 thousand, at least about 250 thousand, at least about 300 thousand, at least about 350 thousand, at least about 400 thousand, at least about 450 thousand, or at least about 500 thousand independent test samples. The accuracy of classifying the medical images by the trained algorithm may be calculated as the percentage of independent test samples (e.g., images from subjects known to have the cancer or subjects with negative clinical test results for the cancer) that are correctly identified or classified as being normal or suspicious.

The trained algorithm may be configured to classify the medical images with a positive predictive value (PPV) of at least about 5%, at least about 10%, at least about 15%, at least about 20%, at least about 25%, at least about 30%, at least about 35%, at least about 40%, at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, or more. The PPV of classifying the medical images using the trained algorithm may be calculated as the percentage of medical images identified or classified as being suspicious that correspond to subjects that truly have an abnormal condition (e.g., cancer).

The trained algorithm may be configured to classify the medical images with a negative predictive value (NPV) of at least about 5%, at least about 10%, at least about 15%, at least about 20%, at least about 25%, at least about 30%, at least about 35%, at least about 40%, at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, or more. The NPV of classifying the medical images using the trained algorithm may be calculated as the percentage of medical images identified or classified as being normal that correspond to subjects that truly do not have an abnormal condition (e.g., cancer).

The trained algorithm may be configured to classify the medical images with a clinical sensitivity at least about 5%, at least about 10%, at least about 15%, at least about 20%, at least about 25%, at least about 30%, at least about 35%, at least about 40%, at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, at least about 99.1%, at least about 99.2%, at least about 99.3%, at least about 99.4%, at least about 99.5%, at least about 99.6%, at least about 99.7%, at least about 99.8%, at least about 99.9%, at least about 99.99%, at least about 99.999%, or more. The clinical sensitivity of classifying the medical images using the trained algorithm may be calculated as the percentage of medical images obtained from subjects known to have a condition (e.g., cancer) that are correctly identified or classified as being suspicious for the condition.

The trained algorithm may be configured to classify the medical images with a clinical specificity of at least about 5%, at least about 10%, at least about 15%, at least about 20%, at least about 25%, at least about 30%, at least about 35%, at least about 40%, at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, at least about 99.1%, at least about 99.2%, at least about 99.3%, at least about 99.4%, at least about 99.5%, at least about 99.6%, at least about 99.7%, at least about 99.8%, at least about 99.9%, at least about 99.99%, at least about 99.999%, or more. The clinical specificity of classifying the medical images using the trained algorithm may be calculated as the percentage of medical images obtained from subjects without a condition (e.g., subjects with negative clinical test results for cancer) that are correctly identified or classified as being normal for the condition.

The trained algorithm may be configured to classify the medical images with an Area-Under-Curve (AUC) of at least about 0.50, at least about 0.55, at least about 0.60, at least about 0.65, at least about 0.70, at least about 0.75, at least about 0.80, at least about 0.81, at least about 0.82, at least about 0.83, at least about 0.84, at least about 0.85, at least about 0.86, at least about 0.87, at least about 0.88, at least about 0.89, at least about 0.90, at least about 0.91, at least about 0.92, at least about 0.93, at least about 0.94, at least about 0.95, at least about 0.96, at least about 0.97, at least about 0.98, at least about 0.99, or more. The AUC may be calculated as an integral of the Receiver Operating Characteristic (ROC) curve (e.g., the area under the ROC curve) associated with the trained algorithm in classifying datasets comprising medical images as being normal or suspicious.

The trained algorithm may be adjusted or tuned to improve one or more of the performance, accuracy, PPV, NPV, clinical sensitivity, clinical specificity, or AUC of identifying the cancer. The trained algorithm may be adjusted or tuned by adjusting parameters of the trained algorithm (e.g., a set of cutoff values used to classify a dataset comprising medical images as described elsewhere herein, or parameters or weights of a neural network). The trained algorithm may be adjusted or tuned continuously during the training process or after the training process has completed.

After the trained algorithm is initially trained, a subset of the inputs may be identified as most influential or most important to be included for making high-quality classifications. For example, a subset of the plurality of features of the dataset comprising medical images may be identified as most influential or most important to be included for making high-quality classifications or identifications of cancer. The plurality of features of the dataset comprising medical images or a subset thereof may be ranked based at least in part on classification metrics indicative of each individual feature's influence or importance toward making high-quality classifications or identifications of cancer. Such metrics may be used to reduce, in some cases significantly, the number of input variables (e.g., predictor variables) that may be used to train the trained algorithm to a desired performance level (e.g., based at least in part on a desired minimum accuracy, PPV, NPV, clinical sensitivity, clinical specificity, AUC, or a combination thereof). For example, if training the trained algorithm with a plurality comprising several dozen or hundreds of input variables in the trained algorithm results in an accuracy of classification of more than 99%, then training the trained algorithm instead with only a selected subset of no more than about 5, no more than about 10, no more than about 15, no more than about 20, no more than about 25, no more than about 30, no more than about 35, no more than about 40, no more than about 45, no more than about 50, or no more than about 100 such most influential or most important input variables among the plurality can yield decreased but still acceptable accuracy of classification (e.g., at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99%). The subset may be selected by rank-ordering the entire plurality of input variables and selecting a predetermined number (e.g., no more than about 5, no more than about 10, no more than about 15, no more than about 20, no more than about 25, no more than about 30, no more than about 35, no more than about 40, no more than about 45, no more than about 50, or no more than about 100) of input variables with the best classification metrics.

Identifying or Monitoring a Cancer

After using a trained algorithm to process the dataset comprising a plurality of medical images of a location of a body of a subject to classify the image as normal, ambiguous, or suspicious, a cancer may be identified or monitored in the subject. The identification may be made based at least in part on the classification of the image as normal, ambiguous, or suspicious; a plurality of features extracted from the dataset comprising medical images; and/or clinical health data of the subject. The identification may be made by a radiologist, a plurality of radiologists, or a trained algorithm.

The cancer may be identified in the subject at an accuracy of at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, or more. The accuracy of identifying the cancer may be calculated as the percentage of independent test subjects (e.g., subjects known to have the cancer or subjects with negative clinical test results for the cancer) that are correctly identified or classified as having or not having the cancer.

The cancer may be identified in the subject with a positive predictive value (PPV) of at least about 5%, at least about 10%, at least about 15%, at least about 20%, at least about 25%, at least about 30%, at least about 35%, at least about 40%, at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, or more. The PPV of identifying the cancer may be calculated as the percentage of independent test subjects identified or classified as having cancer that correspond to subjects that truly have cancer.

The cancer may be identified in the subject with a negative predictive value (NPV) of at least about 5%, at least about 10%, at least about 15%, at least about 20%, at least about 25%, at least about 30%, at least about 35%, at least about 40%, at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, or more. The NPV of identifying the cancer using the trained algorithm may be calculated as the percentage of independent test subjects identified or classified as not having cancer that correspond to subjects that truly do not have cancer.

The cancer may be identified in the subject with a clinical sensitivity of at least about 5%, at least about 10%, at least about 15%, at least about 20%, at least about 25%, at least about 30%, at least about 35%, at least about 40%, at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, at least about 99.1%, at least about 99.2%, at least about 99.3%, at least about 99.4%, at least about 99.5%, at least about 99.6%, at least about 99.7%, at least about 99.8%, at least about 99.9%, at least about 99.99%, at least about 99.999%, or more. The clinical sensitivity of identifying the cancer may be calculated as the percentage of independent test subjects associated with presence of the cancer (e.g., subjects known to have the cancer) that are correctly identified or classified as having cancer.

The cancer may be identified in the subject with a clinical specificity of at least about 5%, at least about 10%, at least about 15%, at least about 20%, at least about 25%, at least about 30%, at least about 35%, at least about 40%, at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, at least about 99.1%, at least about 99.2%, at least about 99.3%, at least about 99.4%, at least about 99.5%, at least about 99.6%, at least about 99.7%, at least about 99.8%, at least about 99.9%, at least about 99.99%, at least about 99.999%, or more. The clinical specificity of identifying the cancer may be calculated as the percentage of independent test subjects associated with absence of the cancer (e.g., subjects with negative clinical test results for the cancer) that are correctly identified or classified as not having cancer.

In some embodiments, the subject may be identified as being at risk of a cancer. After identifying the subject as being at risk of a cancer, a clinical intervention for the subject may be selected based at least in part on the cancer for which the subject is identified as being at risk. In some embodiments, the clinical intervention is selected from a plurality of clinical interventions (e.g., clinically indicated for different types of cancer).

In some embodiments, the trained algorithm may determine that the subject is at risk of a cancer of at least about 5%, at least about 10%, at least about 15%, at least about 20%, at least about 25%, at least about 30%, at least about 35%, at least about 40%, at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, or more.

The trained algorithm may determine that the subject is at risk of a cancer at an accuracy of at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, at least about 99.1%, at least about 99.2%, at least about 99.3%, at least about 99.4%, at least about 99.5%, at least about 99.6%, at least about 99.7%, at least about 99.8%, at least about 99.9%, at least about 99.99%, at least about 99.999%, or more.

Upon identifying the subject as having the cancer, the subject may be optionally provided with a therapeutic intervention (e.g., prescribing an appropriate course of treatment to treat the cancer of the subject). The therapeutic intervention may comprise a prescription of an effective dose of a drug, a further testing or evaluation of the cancer, a further monitoring of the cancer, or a combination thereof. If the subject is currently being treated for the cancer with a course of treatment, the therapeutic intervention may comprise a subsequent different course of treatment (e.g., to increase treatment efficacy due to non-efficacy of the current course of treatment).

The therapeutic intervention may comprise recommending the subject for a secondary clinical test to confirm a diagnosis of the cancer. This secondary clinical test may comprise an imaging test, a blood test, a computed tomography (CT) scan, a magnetic resonance imaging (MRI) scan, an ultrasound scan, a chest X-ray, a positron emission tomography (PET) scan, a PET-CT scan, or any combination thereof.

The classification of the image as normal, ambiguous, or suspicious; a plurality of features extracted from the dataset comprising medical images; and/or clinical health data of the subject may be assessed over a duration of time to monitor a subject (e.g., subject who has cancer or who is being treated for cancer). In some cases, the classification of the medical images of the subject may change during the course of treatment. For example, the features of the dataset of a subject with decreasing risk of the cancer due to an effective treatment may shift toward the profile or distribution of a healthy subject (e.g., a subject without cancer). Conversely, for example, the features of the dataset of a subject with increasing risk of the cancer due to an ineffective treatment may shift toward the profile or distribution of a subject with higher risk of the cancer or a more advanced cancer.

The cancer of the subject may be monitored by monitoring a course of treatment for treating the cancer of the subject. The monitoring may comprise assessing the cancer of the subject at two or more time points. The assessing may be based at least on the classification of the image as normal, ambiguous, or suspicious; a plurality of features extracted from the dataset comprising medical images; and/or clinical health data of the subject determined at each of the two or more time points.

In some embodiments, a difference in the classification of the image as normal, ambiguous, or suspicious; a plurality of features extracted from the dataset comprising medical images; and/or clinical health data of the subject determined between the two or more time points may be indicative of one or more clinical indications, such as (i) a diagnosis of the cancer of the subject, (ii) a prognosis of the cancer of the subject, (iii) an increased risk of the cancer of the subject, (iv) a decreased risk of the cancer of the subject, (v) an efficacy of the course of treatment for treating the cancer of the subject, and (vi) a non-efficacy of the course of treatment for treating the cancer of the subject.

In some embodiments, a difference in the classification of the image as normal, ambiguous, or suspicious; a plurality of features extracted from the dataset comprising medical images; and/or clinical health data of the subject determined between the two or more time points may be indicative of a diagnosis of the cancer of the subject. For example, if the cancer was not detected in the subject at an earlier time point but was detected in the subject at a later time point, then the difference is indicative of a diagnosis of the cancer of the subject. A clinical action or decision may be made based at least in part on this indication of diagnosis of the cancer of the subject, such as, for example, prescribing a new therapeutic intervention for the subject. The clinical action or decision may comprise recommending the subject for a secondary clinical test to confirm the diagnosis of the cancer. This secondary clinical test may comprise an imaging test, a blood test, a computed tomography (CT) scan, a magnetic resonance imaging (MRI) scan, an ultrasound scan, a chest X-ray, a positron emission tomography (PET) scan, a PET-CT scan, or any combination thereof.

In some embodiments, a difference in the classification of the image as normal, ambiguous, or suspicious; a plurality of features extracted from the dataset comprising medical images; and/or clinical health data of the subject determined between the two or more time points may be indicative of a prognosis of the cancer of the subject.

In some embodiments, a difference in the classification of the image as normal, ambiguous, or suspicious; a plurality of features extracted from the dataset comprising medical images; and/or clinical health data of the subject determined between the two or more time points may be indicative of the subject having an increased risk of the cancer. For example, if the cancer was detected in the subject both at an earlier time point and at a later time point, and if the difference is a positive difference (e.g., an increase from the earlier time point to the later time point), then the difference may be indicative of the subject having an increased risk of the cancer. A clinical action or decision may be made based at least in part on this indication of the increased risk of the cancer, e.g., prescribing a new therapeutic intervention or switching therapeutic interventions (e.g., ending a current treatment and prescribing a new treatment) for the subject. The clinical action or decision may comprise recommending the subject for a secondary clinical test to confirm the increased risk of the cancer. This secondary clinical test may comprise an imaging test, a blood test, a computed tomography (CT) scan, a magnetic resonance imaging (MRI) scan, an ultrasound scan, a chest X-ray, a positron emission tomography (PET) scan, a PET-CT scan, or any combination thereof.

In some embodiments, a difference in the classification of the image as normal, ambiguous, or suspicious; a plurality of features extracted from the dataset comprising medical images; and/or clinical health data of the subject determined between the two or more time points may be indicative of the subject having a decreased risk of the cancer. For example, if the cancer was detected in the subject both at an earlier time point and at a later time point, and if the difference is a negative difference (e.g., a decrease from the earlier time point to the later time point), then the difference may be indicative of the subject having a decreased risk of the cancer. A clinical action or decision may be made based at least in part on this indication of the decreased risk of the cancer (e.g., continuing or ending a current therapeutic intervention) for the subject. The clinical action or decision may comprise recommending the subject for a secondary clinical test to confirm the decreased risk of the cancer. This secondary clinical test may comprise an imaging test, a blood test, a computed tomography (CT) scan, a magnetic resonance imaging (MRI) scan, an ultrasound scan, a chest X-ray, a positron emission tomography (PET) scan, a PET-CT scan, or any combination thereof.

In some embodiments, a difference in the classification of the image as normal, ambiguous, or suspicious; a plurality of features extracted from the dataset comprising medical images; and/or clinical health data of the subject determined between the two or more time points may be indicative of an efficacy of the course of treatment for treating the cancer of the subject. For example, if the cancer was detected in the subject at an earlier time point but was not detected in the subject at a later time point, then the difference may be indicative of an efficacy of the course of treatment for treating the cancer of the subject. A clinical action or decision may be made based at least in part on this indication of the efficacy of the course of treatment for treating the cancer of the subject, e.g., continuing or ending a current therapeutic intervention for the subject. The clinical action or decision may comprise recommending the subject for a secondary clinical test to confirm the efficacy of the course of treatment for treating the cancer. This secondary clinical test may comprise an imaging test, a blood test, a computed tomography (CT) scan, a magnetic resonance imaging (MRI) scan, an ultrasound scan, a chest X-ray, a positron emission tomography (PET) scan, a PET-CT scan, or any combination thereof.

In some embodiments, a difference in the classification of the image as normal, ambiguous, or suspicious; a plurality of features extracted from the dataset comprising medical images; and/or clinical health data of the subject determined between the two or more time points may be indicative of a non-efficacy of the course of treatment for treating the cancer of the subject. For example, if the cancer was detected in the subject both at an earlier time point and at a later time point, and if the difference is a positive or zero difference (e.g., increased or remained at a constant level from the earlier time point to the later time point), and if an efficacious treatment was indicated at an earlier time point, then the difference may be indicative of a non-efficacy of the course of treatment for treating the cancer of the subject. A clinical action or decision may be made based at least in part on this indication of the non-efficacy of the course of treatment for treating the cancer of the subject, e.g., ending a current therapeutic intervention and/or switching to (e.g., prescribing) a different new therapeutic intervention for the subject. The clinical action or decision may comprise recommending the subject for a secondary clinical test to confirm the non-efficacy of the course of treatment for treating the cancer. This secondary clinical test may comprise an imaging test, a blood test, a computed tomography (CT) scan, a magnetic resonance imaging (MRI) scan, an ultrasound scan, a chest X-ray, a positron emission tomography (PET) scan, a PET-CT scan, or any combination thereof.

Outputting a Report of the Disease

After the cancer is identified or an increased risk of the disease or cancer is monitored in the subject, a report may be electronically outputted that is indicative of (e.g., identifies or provides an indication of) the disease or cancer of the subject. The subject may not display a disease or cancer (e.g., is asymptomatic of the disease or cancer such as a complication). The report may be presented on a graphical user interface (GUI) of an electronic device of a user. The user may be the subject, a caretaker, a physician, a nurse, or another health care worker.

The report may include one or more clinical indications such as (i) a diagnosis of the cancer of the subject, (ii) a prognosis of the disease or cancer of the subject, (iii) an increased risk of the disease or cancer of the subject, (iv) a decreased risk of the disease or cancer of the subject, (v) an efficacy of the course of treatment for treating the disease or cancer of the subject, (vi) a non-efficacy of the course of treatment for treating the disease or cancer of the subject, (vii) a location and/or a level of suspicion of the disease or cancer, and (viii) an efficacy measure of a proposed course of diagnosis of the disease or cancer. The report may include one or more clinical actions or decisions made based at least in part on these one or more clinical indications. Such clinical actions or decisions may be directed to therapeutic interventions, or further clinical assessment or testing of the disease or cancer of the subject.

For example, a clinical indication of a diagnosis of the disease or cancer of the subject may be accompanied with a clinical action of prescribing a new therapeutic intervention for the subject. As another example, a clinical indication of an increased risk of the disease or cancer of the subject may be accompanied with a clinical action of prescribing a new therapeutic intervention or switching therapeutic interventions (e.g., ending a current treatment and prescribing a new treatment) for the subject. As another example, a clinical indication of a decreased risk of the disease or cancer of the subject may be accompanied with a clinical action of continuing or ending a current therapeutic intervention for the subject. As another example, a clinical indication of an efficacy of the course of treatment for treating the disease or cancer of the subject may be accompanied with a clinical action of continuing or ending a current therapeutic intervention for the subject. As another example, a clinical indication of a non-efficacy of the course of treatment for treating the disease or cancer of the subject may be accompanied with a clinical action of ending a current therapeutic intervention and/or switching to (e.g., prescribing) a different new therapeutic intervention for the subject. As another example, a clinical indication of a location of disease or cancer may be accompanied with a clinical action of prescribing a new diagnostic test, especially any particular parameters of that test that may be targeted for the indication.

Computer Systems

Figure 4:
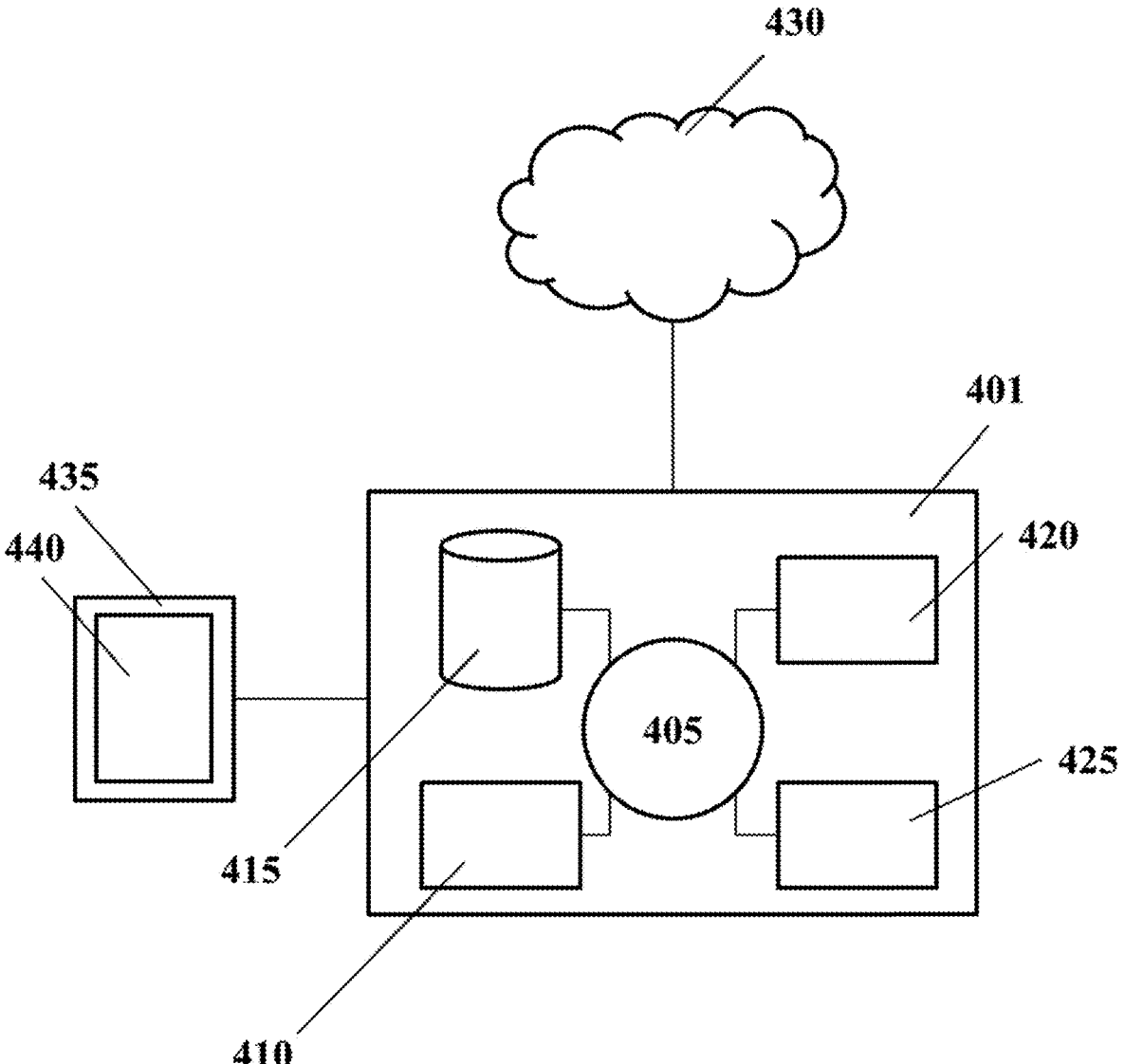
FIG. 4 illustrates a computer system that is programmed or otherwise configured to implement methods provided herein.

The present disclosure provides computer systems that are programmed to implement methods of the disclosure. FIG. 4 shows a computer system 401 that is programmed or otherwise configured to, for example, train and test a trained algorithm; use the trained algorithm to process medical images to classify the image as normal, ambiguous, or suspicious; identify or monitor a cancer of the subject; and electronically output a report that indicative of the cancer of the subject.

The computer system 401 can regulate various aspects of analysis, calculation, and generation of the present disclosure, such as, for example, training and testing a trained algorithm; using the trained algorithm to process medical images to classify the image as normal, ambiguous, or suspicious; identifying or monitoring a cancer of the subject; and electronically outputting a report that indicative of the cancer of the subject. The computer system 401 can be an electronic device of a user or a computer system that is remotely located with respect to the electronic device. The electronic device can be a mobile electronic device.

The computer system 401 includes a central processing unit (CPU, also "processor" and "computer processor" herein) 405, which can be a single core or multi core processor, or a plurality of processors for parallel processing. The computer system 401 also includes memory or memory location 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 can be a data storage unit (or data repository) for storing data. The computer system 401 can be operatively coupled to a computer network ("network") 430 with the aid of the communication interface 420. The network 430 can be the Internet, an internet and/or extranet, or an intranet and/or extranet that is in communication with the Internet.

The network 430 in some cases is a telecommunication and/or data network. The network 430 can include one or more computer servers, which can enable distributed computing, such as cloud computing. For example, one or more computer servers may enable cloud computing over the network 430 ("the cloud") to perform various aspects of analysis, calculation, and generation of the present disclosure, such as, for example, training and testing a trained algorithm; using the trained algorithm to process medical images to classify the image as normal, ambiguous, or suspicious; identifying or monitoring a cancer of the subject; and electronically outputting a report that indicative of the cancer of the subject. Such cloud computing may be provided by cloud computing platforms such as, for example, Amazon Web Services (AWS), Microsoft Azure, Google Cloud Platform, and IBM cloud. The network 430, in some cases with the aid of the computer system 401, can implement a peer-to-peer network, which may enable devices coupled to the computer system 401 to behave as a client or a server.

The CPU 405 may comprise one or more computer processors and/or one or more graphics processing units (GPUs). The CPU 405 can execute a sequence of machine-readable instructions, which can be embodied in a program or software. The instructions may be stored in a memory location, such as the memory 410. The instructions can be directed to the CPU 405, which can subsequently program or otherwise configure the CPU 405 to implement methods of the present disclosure. Examples of operations performed by the CPU 405 can include fetch, decode, execute, and writeback.

The CPU 405 can be part of a circuit, such as an integrated circuit. One or more other components of the system 401 can be included in the circuit. In some cases, the circuit is an application specific integrated circuit (ASIC).

The storage unit 415 can store files, such as drivers, libraries and saved programs. The storage unit 415 can store user data, e.g., user preferences and user programs. The computer system 401 in some cases can include one or more additional data storage units that are external to the computer system 401, such as located on a remote server that is in communication with the computer system 401 through an intranet or the Internet.

The computer system 401 can communicate with one or more remote computer systems through the network 430. For instance, the computer system 401 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 401 via the network 430.

Methods as described herein can be implemented by way of machine (e.g., computer processor) executable code stored on an electronic storage location of the computer system 401, such as, for example, on the memory 410 or electronic storage unit 415. The machine executable or machine readable code can be provided in the form of software. During use, the code can be executed by the processor 405. In some cases, the code can be retrieved from the storage unit 415 and stored on the memory 410 for ready access by the processor 405. In some situations, the electronic storage unit 415 can be precluded, and machine-executable instructions are stored on memory 410.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 401 can include or be in communication with an electronic display 435 that comprises a user interface (UI) 440 for providing, for example, a visual display indicative of training and testing of a trained algorithm; a visual display of image data indicative of a classification as normal, ambiguous, or suspicious; an identification of a subject as having a cancer; or an electronic report (e.g., diagnostic or radiological report) indicative of the cancer of the subject. Examples of UIs include, without limitation, a graphical user interface (GUI) and web-based user interface.

Methods and systems of the present disclosure can be implemented by way of one or more algorithms. An algorithm can be implemented by way of software upon execution by the central processing unit 405. The algorithm can, for example, train and test a trained algorithm; use the trained algorithm to process medical images to classify the image as normal, ambiguous, or suspicious; identify or monitor a cancer of the subject; and electronically output a report that indicative of the cancer of the subject.

EXAMPLES

Example 1—Improving Subject Care with Real-Time Radiology

Using systems and methods of the present disclosure, a real-time radiology screening and diagnostic workflow was performed on a plurality of subjects. As an example, on the first day of the real-time radiology clinic, a subject received immediate results for a normal case, which resulted in the subject feeling relieved and reassured.

As another example, on the next day of the real-time radiology clinic, another subject received a suspicious finding during a screening, and had a diagnostic follow-up performed for the suspicious finding within three hours. The subject was told by the radiologist that her findings were benign and that she is not suspected of having cancer. The subject was very relieved and happy to avoid the anxiety of waiting for a final diagnostic result. On average, such a process may take anywhere from 2 to 8 weeks in the U.S. Even in particular clinics with expedited workflows, the process may take 1 to 2 weeks without the assistance of real-time radiology.

Figure 5:
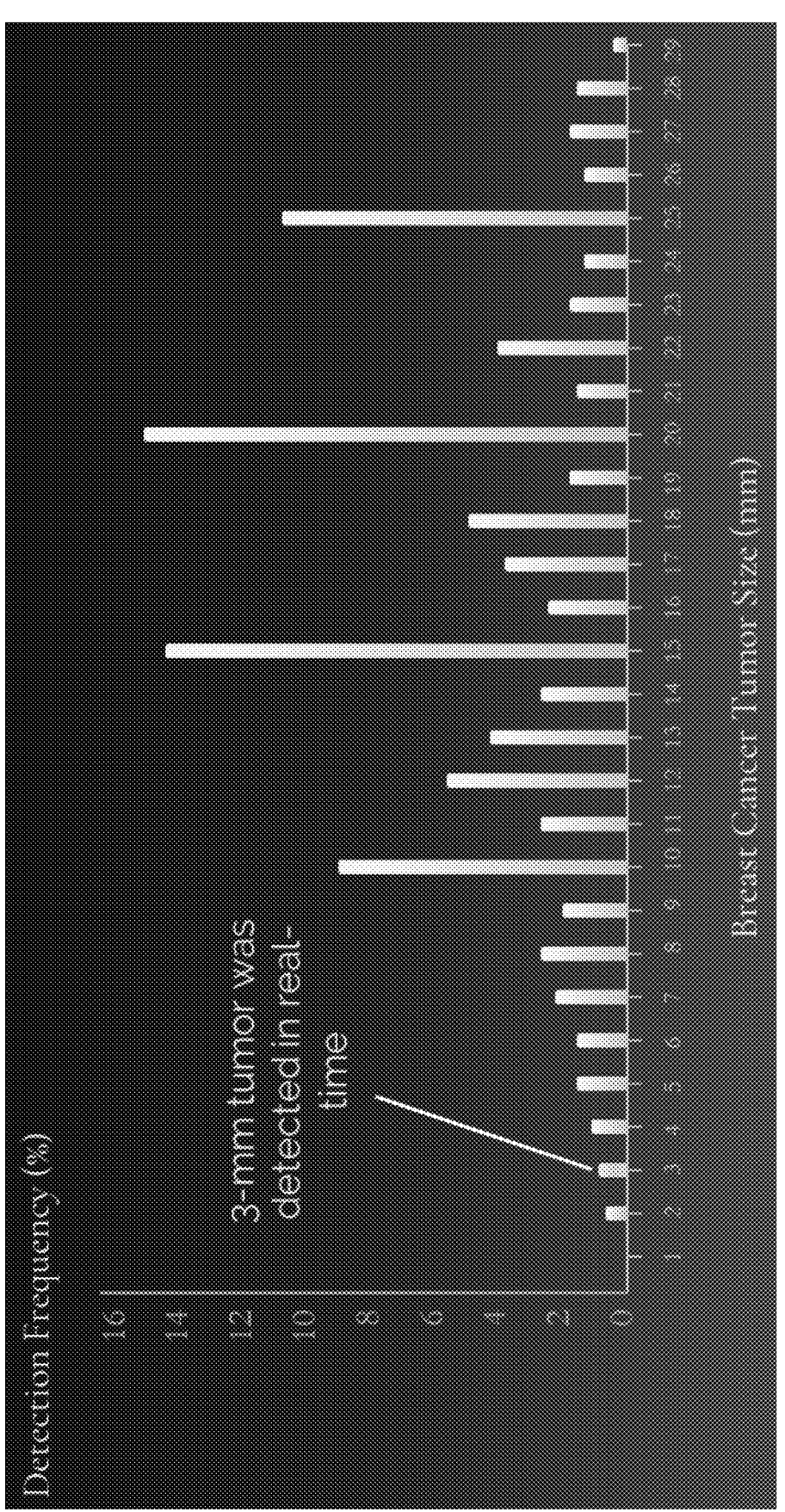
FIG. 5 shows an example plot of detection frequency of breast cancer tumors of various sizes (ranging from 2 mm to 29 mm) that are detected using a real-time radiology system.

As another example, on another day of the real-time radiology clinic, the AI-based real-time radiology system detected a 3-mm breast cancer tumor, which was confirmed 5 days later by biopsy to be a cancer. FIG. 5 shows an example plot of detection frequency of breast cancer tumors of various sizes (ranging from 2 mm to 29 mm) that are detected by radiologists. The real-time radiology system may provide life-saving clinical impact, by reducing the time to treatment. The cancer may continue to grow until this subject receives her next screening or diagnostic procedure, at which time removal and treatment may have been more life threatening, painful, expensive, and have a lower success rate.

As another example, of the real-time radiology clinic, a subject received a diagnostic follow-up procedure for a suspicious finding within 1 hour. A biopsy was needed, but was completed the next business day because the subject was on aspirin. The biopsy confirmed the cancer that was detected by the real-time radiology. The radiology work-up period was reduced from 8 business days to 1 day, and the time to diagnosis was reduced from 1 month to 1 week.

The clinical impact of the real-time radiology system can be measured by screening mammography metrics, such as PPV1 and callback rate. The PPV1 generally refers to the percentage of examinations with an abnormal initial interpretation by a radiologist that result in a tissue diagnosis of cancer within 1 year. The callback rate generally refers to the percentage of examinations with an abnormal initial interpretation (e.g., "recall rate"). During a 6-week span, a real-time radiology clinic processed 796 subject cases using AI-based analysis, of which 94 cases were flagged to be read by radiologists in real time. A total of 4 cases were diagnosed as cancer, of which 3 cases were confirmed as cancer (e.g., by biopsy).

Figure 6:
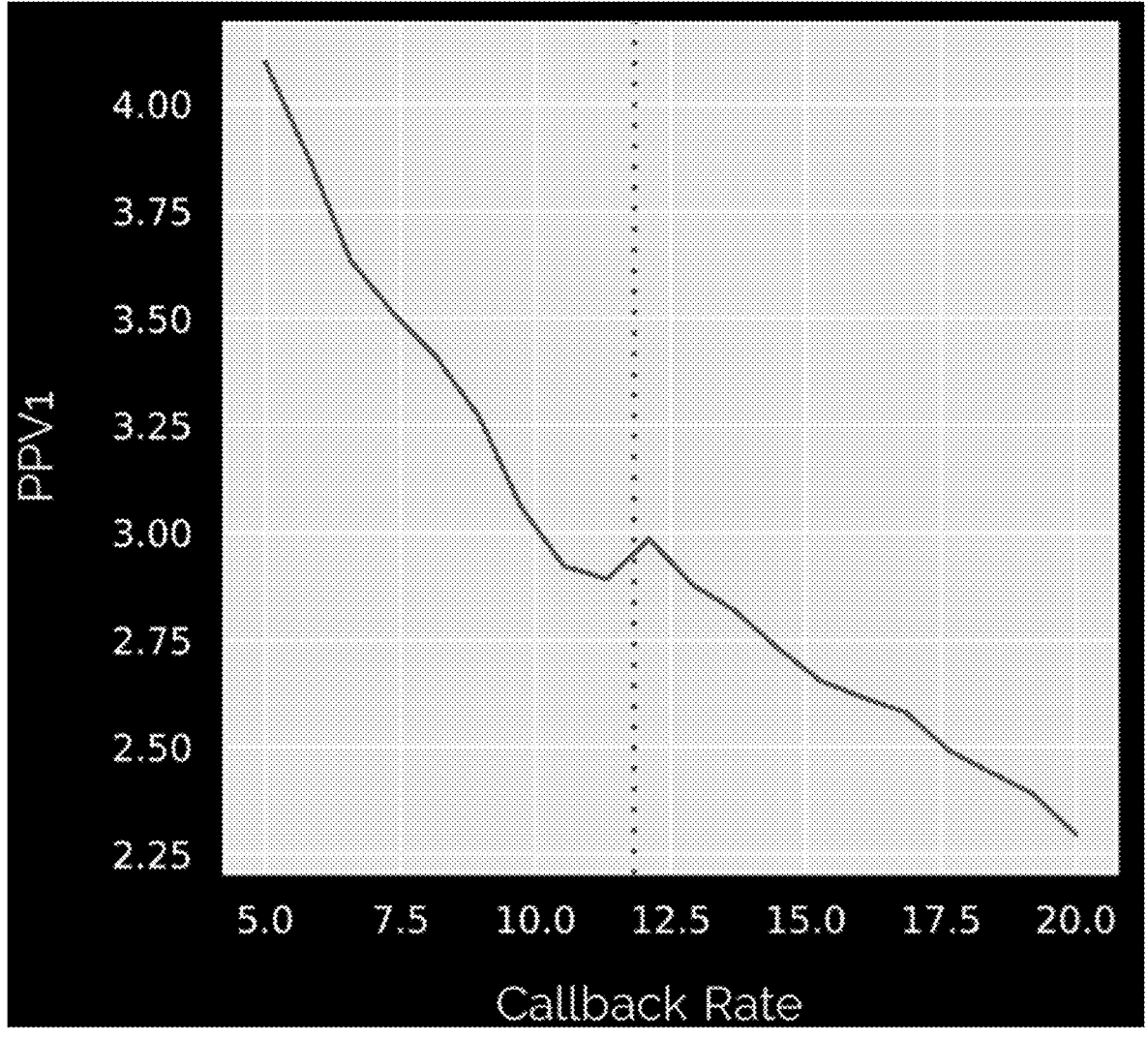
FIG. 6 shows an example plot of positive predictive values from screening mammography (PPV1) versus call-back rate.

FIG. 6 shows an example plot of positive predictive values from screening mammography (PPV1) versus callback rate. The prospective study resulted in a callback rate of 11.8% with a PPV1 of 3.2%. In comparison, a median radiologist has a callback rate of 11.6% with a PPV1 of 4.4%.

FIG. 7 shows an example plot comparing the interpretation time for reading images in AI-sorted batches (including Bi-RADS Assessment, and density) (left) and the percentage improvement in interpretation time versus controls who read randomly shuffled batches (right), across a first set of radiologist, a second set of radiologists, and the overall total set of radiologists. This figure shows that AI-powered workflows can improve radiologist productivity to a statistically significant extent (ranging from about 13% to 21%).

Example 2—Classification of Suspicious Findings in Screening Mammography with Deep Neural Networks Deep learning may be applied to a variety of computer vision and image processing applications. For example, deep learning may be used to automatically learn image features relevant to a given task and may be used for various tasks from classification to detection to segmentation. Computational models based at least in part on deep neural networks (DNNs) may be developed and used in radiology applications, such as screening mammography, to identify suspicious, potentially abnormal, or high-risk lesions and increase radiologist productivity. In some cases, deep learning models are able to match or even surpass human-level performance. In addition, deep learning may be used to help raise the performance of general radiologists to be closer to that of breast imaging specialists. For example, general radiologists generally have poorer cancer detection rates and much higher recall rates compared to fellowship-trained breast radiologists.

Deep learning can be used to perform interpretation of screening mammography, including distinguishing between malignant and benign findings. A DNN model is trained for this task to identify missed cancers or reduce the false positive callbacks, particularly for non-expert readers.

The DNN model was trained using the publicly accessible Digital Database for Screening Mammography (DDSM) dataset (eng.usf.edu/cvprg/Mammography/Database.html). DDSM includes 2,620 studies with over 10,000 digitized scanned film mammography images. The images were evenly split between normal mammograms and those with suspicious findings. The normal mammograms were confirmed through a four-year follow-up of the subject. The suspicious findings were further split between biopsy-proven benign findings (51%) and biopsy-proven malignant findings (49%). All cases with obviously benign findings that are not followed up by biopsy as part of routine clinical care were excluded from the dataset. As a result, distinguishing between benign and malignant findings may be more difficult for this dataset than in a clinical mammography screening scenario.

The DDSM dataset was divided into subsets including a training dataset, a validation dataset, and a testing dataset. Using the training dataset, a DNN was trained to distinguish malignant findings from benign findings or a normal region of the breast. The datasets included annotations pointing out the locations of tumors in the images, which may be critical in guiding the deep learning process.

Figure 8:
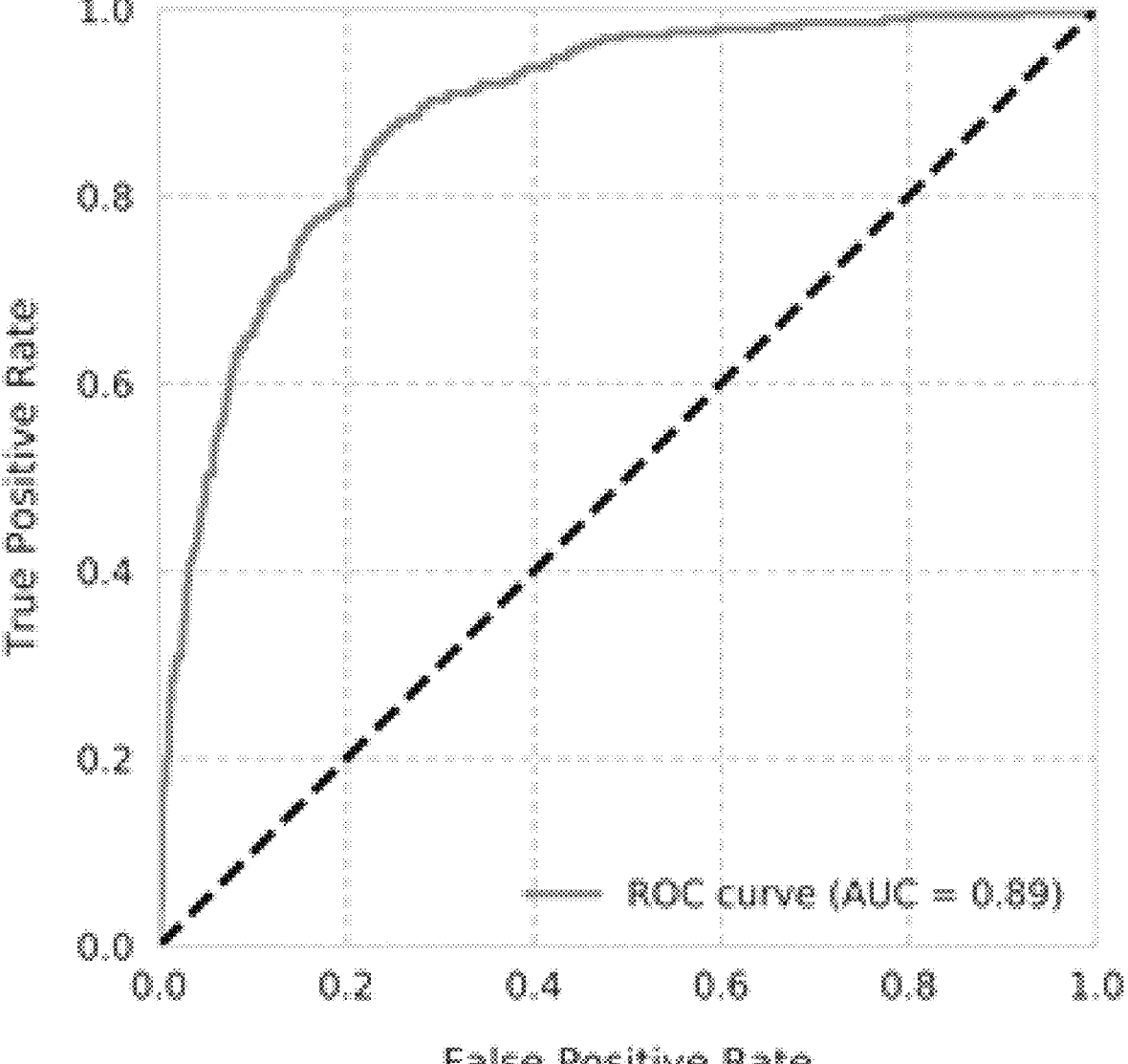
FIG. 8 shows a receiver operating characteristic (ROC) curve indicating the performance of the DNN on a binary classification task as evaluated on a testing dataset.

The performance of the DNN on this binary classification task was evaluated on the testing dataset through the use of a receiver operating characteristic (ROC) curve (as shown in FIG. 8). The DNN model was used to distinguish between malignant and benign findings with high accuracy, as indicated by the area under the ROC curve (AUC) of 0.89. In comparison, expert radiologists may be able to achieve a sensitivity of 84.4% and a specificity of 90.8% for the task of cancer detection for screening mammography. The DNN model was used to distinguish between malignant and benign findings with a sensitivity of 79.2% and a specificity of 80.0% with the more challenging cases found in the DDSM dataset. The performance gap relative to expert radiologists is in part due to the relatively small size of the dataset, and may be mitigated by incorporating larger training datasets. Further, the DNN model may still be configured to outperform general radiologists in accuracy, sensitivity, specificity, AUC, positive predictive value, negative predictive value, or a combination thereof.

A highly accurate DNN model was developed by training on a limited public benchmark dataset. While the dataset is perhaps more difficult than in the clinical setting, the DNN model was able to distinguish between malignant and benign findings with nearly human-level performance.

A similar DNN model may be trained using the clinical mammography dataset of the Joanne Knight Breast Health Center in St. Louis, in partnership with Washington University in St. Louis. This dataset includes a large medical records database comprising more than 100 thousand subjects, including 4 thousand biopsy-confirmed cancer subjects, and over 400 thousand imaging sessions comprising 1.5 million images. The dataset may be manually or automatically labeled (e.g., by building annotations) to optimize the deep learning process. Since the performance of DNNs improves significantly with the size of the training dataset, this uniquely massive and rich dataset may lead to a DNN model having dramatic increases in sensitivity and specificity as compared to the DNN model trained on the DDSM data. Such highly accurate DNN models offer opportunities for transformative improvements in breast cancer screening, enabling all women to receive access to specialist-level care.

Example 3—Artificial Intelligence (AI)-Powered Radiology Clinics for Early Cancer Detection Breast cancer is the most widespread cancer in women in the U.S., with over 250 thousand new diagnoses in 2017 alone. About 1 in 8 women will be diagnosed with breast cancer at some point during their lives. Despite improvements in treatment, over 40 thousand women die every year in the U.S. from breast cancer. Substantial progress has made in reducing breast cancer mortality (39% lower since 1989) in part due to the widespread adoption of screening mammography. Breast cancer screening can help identify early-stage cancers, which have much better prognoses and lower treatment costs as compared to late-stage cancers. This difference can be substantial: women with localized breast cancer have a 5-year survival rate of nearly 99%, while women with metastatic breast cancer have a 5-year survival rate of 27%.

Despite these demonstrated benefits, only about half of women currently obtain mammograms at the rate recommended by the American College of Radiology. This low mammography utilization may result in a significant burden to subjects and to healthcare systems in the form of worse outcomes and higher costs. Adoption rates for screening mammography are hindered, in part, by poor subject experience, such as long delays in obtaining an appointment, unclear pricing, long wait times to receive exam results, and confusing reports. Further, problems arising from a lack of transparency in pricing are exacerbated by large variations in costs among providers. Similarly, delivery times for receiving exam results are inconsistent among providers.

In addition, significant variation in radiologist performance results in subjects experiencing very different standards of care depending on location and income. For example, cancer detection rates are more than twice as high for radiologists in the 90th percentile compared with radiologists in the 10th percentile. False positive rates (e.g., the rate at which healthy subjects are mistakenly recalled for follow-up exams) have even larger differences between these two groups. Aggregated across all screening exams done in the U.S., about 96% of subjects who are called back are false positives. Given the huge societal and personal burden of cancer, combined with the often poor subject experience, inconsistent screening performance, and large cost variations, AI-based or AI-assisted screening approaches can be developed to significantly improve this clinical accuracy of mammography screening.

Innovations in artificial intelligence and software can be leveraged toward achieving significant improvements to health outcomes, including early, accurate detection of cancer. These improvements may affect one or more steps within the subject journey—from cost transparency, appointment scheduling, subject care, radiology workflow, diagnostic accuracy, results delivery, to follow-up. An AI-powered network of imaging centers may be developed to deliver high-quality service, timeliness, accuracy, and cost effectiveness. At such clinics, women may schedule a mammogram instantly, and receive a diagnosis of cancer within a single visit before they leave. The AI-powered clinics may enable the transformation of a traditional two-visit screening-diagnostic paradigm into a single visit, by using "real-time radiology" methods and systems of the present disclosure. Artificial intelligence may be used to customize the clinical workflow for each subject using a triage engine and to tailor how screening exams are read to significantly enhance radiologist accuracy (e.g., by reducing radiologist fatigue), thereby improving the accuracy of cancer detection. Additional improvements to the screening/diagnosis process can be achieved using AI-based or AI-assisted approaches, such as subject scheduling, improving screening guideline adherence through customer outreach, and the timeliness of report delivery with subject-facing applications. A self-improving system may use AI to build better clinics that generate the data to improve the AI-based system.

A key component of creating the AI-powered radiology network is driving growth through subject acquisition. While other components of the system may streamline processes of a radiology workflow and provide subjects with an improved and streamlined experience, subject recruitment and enrollment is important to collect sufficient data to train the AI-powered systems for high performance.

Further, AI-powered clinics may reduce obstacles to screening mammography by improving the subject experience before the subjects arrive at a clinic. This may include addressing two key barriers that limit adoption: (1) concerns about the cost of the exam and (2) lack of awareness about conveniently located clinics. When price and availability are completely opaque, as with conventional clinics, significant variations in price and service may exist, thereby creating a barrier to subjects' scheduling of appointments.

An AI-based user application may be developed to streamline the scheduling process and offer transparency for subjects. The application may be configured to provide users with a map of clinics that accept their insurance as well as available times for appointments. For those with health insurance, screening mammograms, both 2D and 3D, are at no out-of-pocket cost. This, along with any potential costs that may be incurred, may be clearly indicated to the subject at the time of scheduling. Guarantees about the timeliness of exam results may also be presented to the subject, which addresses a potential source of anxiety for subjects that may make them less likely to schedule an appointment.

The application may be configured to confirm the subject's insurance and request the work order from the primary care provider (PCP), if necessary, during the scheduling process. The application may be configured to receive user input of pre-exam forms in order to more efficiently process subjects during their visit to the clinic. If the subject has any remaining forms remaining to complete prior to the exam, she may be provided with a device at the time of check-in to the clinic, to complete the remaining forms. The application may be configured to facilitate electronic entry of these forms to reduce or eliminate the time-consuming and error-prone task of manually transcribing paper forms, as done under the current standard of care. By facilitating the user entry of paperwork prior to the exam date, the application enables the subject to have a more streamlined experience, and less time and resources are devoted to administrative tasks on-site.

The subject's previously acquired mammograms may also be obtained prior to the exam. For images acquired at partnering clinics, this process may happen transparently to the subject. By obtaining the prior images before the visit, a potential bottleneck to immediate review of newly acquired images may be eliminated.

After scheduling an appointment, the application may be configured to provide the subject with reminders about the upcoming exam in order to increase attendance. The application may also be configured to provide the subject with information about the exam procedures ahead of time, in order to minimize anxiety and to reduce time spent explaining the procedure within the exam room. Further, to develop relationships with primary care physicians (PCPs), referring physicians may be able to confirm that their subjects have scheduled a mammography appointment. This will allow doctors to assess compliance and to encourage subjects who do not sign up for an appointment in a timely manner following their recommendations.

Real-Time Radiology System

The conventional breast cancer screening paradigm may include significant delays that introduce anxiety of subjects. This may reduce the number of women who elect to obtain this preventative care and put them at risk for discovering cancer later when it is more difficult to treat and more deadly. A subject may visit a clinic for a screening mammogram, spend about half an hour at the clinic, then leave. She may then wait up to 30 days for a phone call or letter to receive the news that there is a suspicious abnormality on the screening mammogram and that she should schedule a follow-up diagnostic appointment. Next, the subject may wait another week for that appointment, during which she may receive additional imaging to determine if a biopsy is required.

The current paradigm is motivated by the volume of subjects that are screened at larger practices (e.g., more than 100 subjects per day). These imaging centers may have at least a 1-2 day backlog of screening exams that needs to be read before the radiologists can process the screening mammograms that were performed on a given day. If any of those cases were to require a diagnostic work-up, that exam often cannot be done right away because of the high variance in the length of diagnostic exams (e.g., ranging from 20 to 120 minutes. Scheduling does not take this into account, leading to prolonged wait times for subjects and inefficient workflows for technologists.

Subjects who received immediate real-time reading of their screening mammograms may experience significantly less anxiety than those who had not after 3 weeks. In contrast, women who received false positives at screening (normal cases flagged as suspicious) but received an immediate reading experienced nearly the same level of anxiety as women with normal mammograms. Most of these women did not perceive themselves as having an abnormal screen. Those that do, however, tend to seek more medical attention for breast-related concerns and other medical issues. Further, if women know they may leave the mammography clinic with the results of their mammograms, they may be more satisfied with the screening process and may be more likely to follow future screening recommendations. Such increased subject satisfaction may improve member retention among health plans. Additionally, immediate reading of suspicious cases may decrease the time to breast cancer diagnosis, thereby improving subject care and outcomes.

In some cases, clinics are able to offer real-time service by restricting volume. Such clinics may schedule only a few subjects at any given time so that, in case the need arises, the subjects can immediately follow up the screening procedure with a diagnostic exam. This approach may be expensive, time-consuming, and not amenable to be performed at scale, meaning that most women may still need to wait weeks for potentially life-changing results. Roughly 4 million women may encounter such an unpleasant screening process every year.

Using methods and systems of the present disclosure, an AI-based triage system may be developed for screening mammography.

As screening exam images are received from the clinical imaging system, they may be processed by the AI-powered Triage Engine, which then stratifies the subject's case into one of a plurality of workflows. For example, the plurality of workflows may include two categories (e.g., normal and suspicious). As another example, the plurality of workflows may include three categories (e.g., normal, uncertain, and suspicious). Each of these categories may then be handled by a different set of dedicated radiologists, who are specialized to perform the workflow's particular set of responsibilities.

Figure 9:
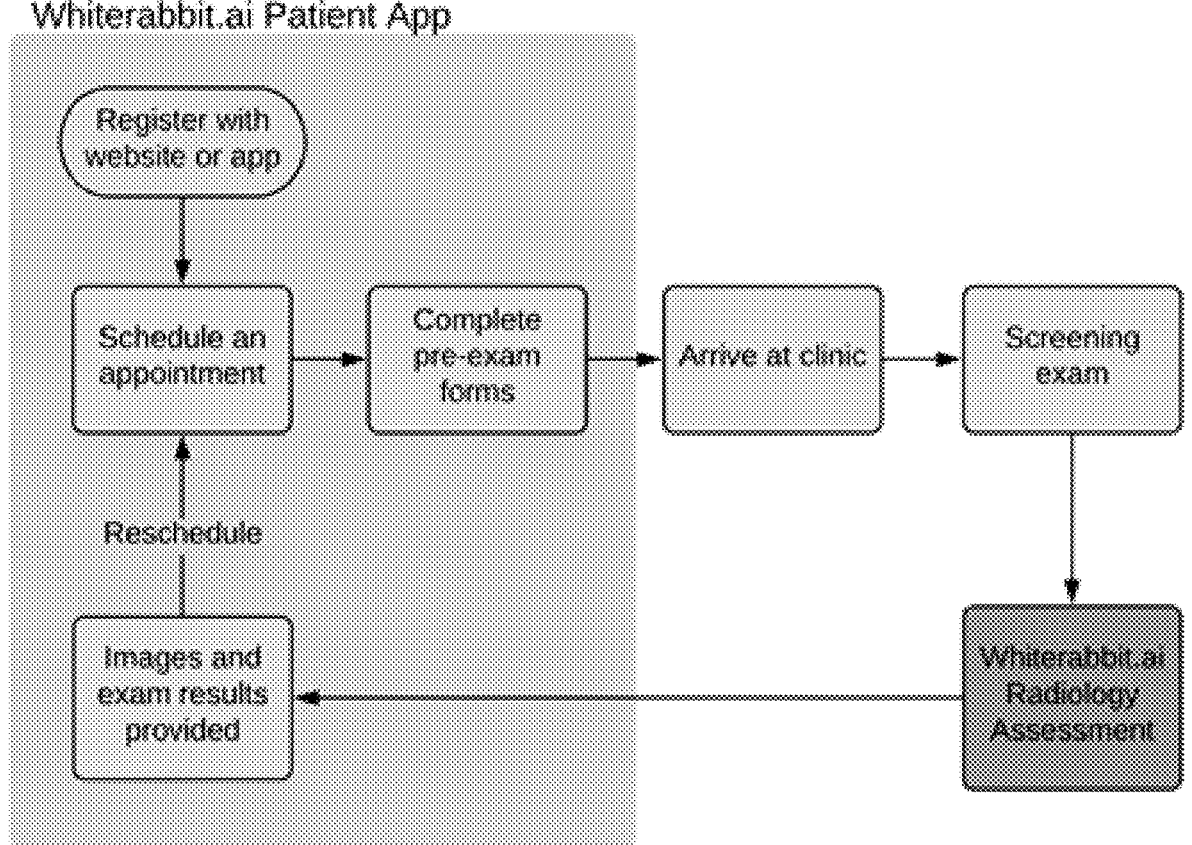
FIG. 9 shows an example of a schematic of subject flow through clinics with the AI-enabled real-time radiology system and subject mobile application (app).

FIG. 9 shows an example of a schematic of subject flow through clinics with the AI-enabled real-time radiology system and subject mobile application (app). The subject begins by registering with a website or subject app. Next, the subject uses the subject app to schedule an appointment for radiology screening. Next, the subject uses the subject app to complete pre-examination forms. Next, the subject arrives at the clinic and receives the screening examination. Next, the AI-based radiology assessment is performed on the medical images obtained from the subject's screening examination. Next, the subject's images and examination results are provided to the subject through the subject app. Next, the subject reschedules an appointment, if needed or recommended, using the subject app. The screening examination process may then proceed as before.

Figure 10:
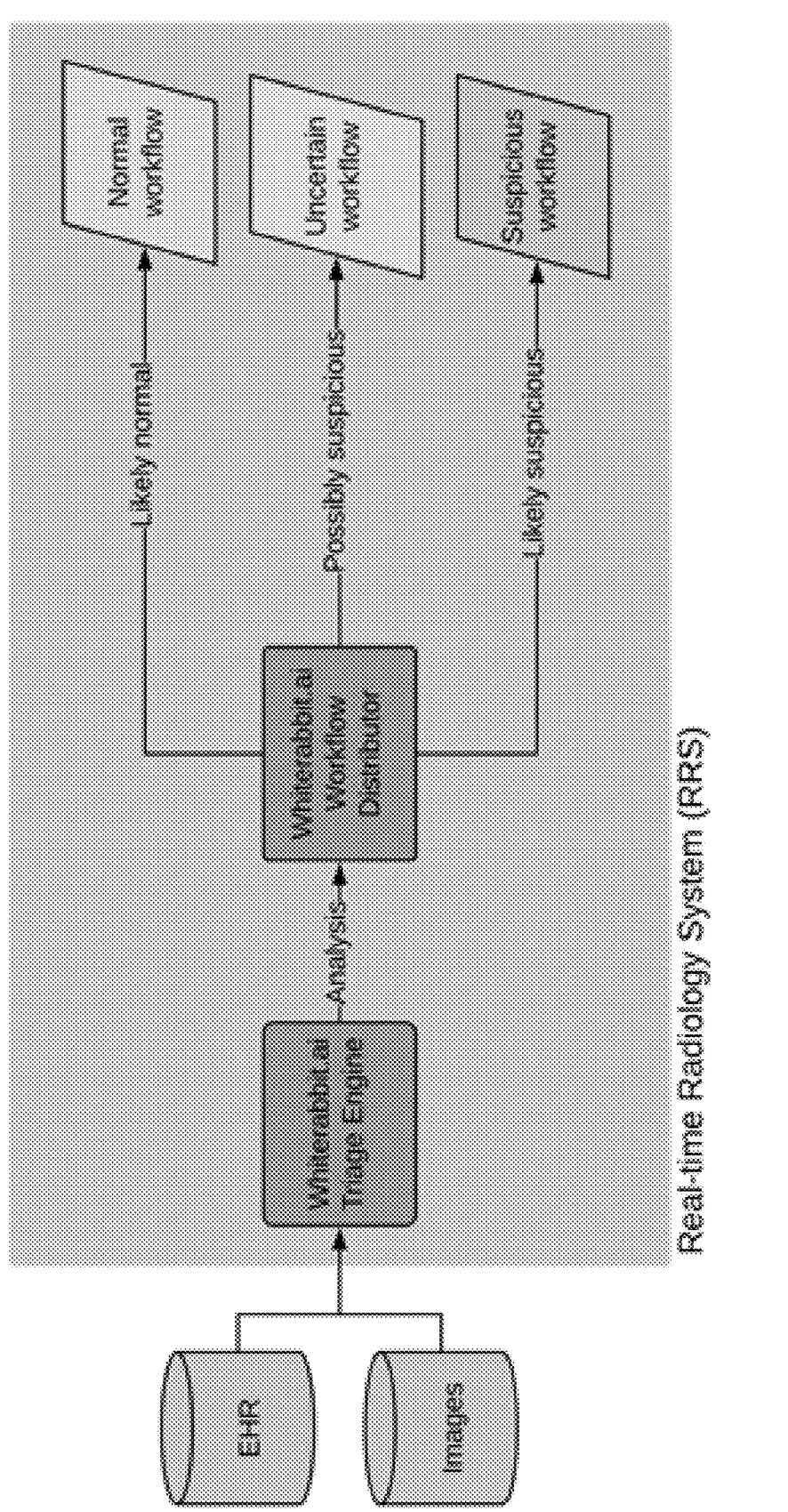
FIG. 10 shows an example of a schematic of an AI-assisted radiology assessment workflow.

FIG. 10 shows an example of a schematic of an AI-assisted radiology assessment workflow. First, a dataset comprising an electronic health record (EHR) and medical images of a subject are provided. Next, an AI-based triage engine processes the EHR and medical images to analyze and classify the dataset as likely normal, possibly suspicious, or likely suspicious. Next, a workflow distributor module distributes the subject's dataset to one of three workflows based at least in part on the classification of the dataset as likely normal, possibly suspicious, or likely suspicious: a normal workflow, an uncertain workflow, and a suspicious workflow, respectively. Each of the three workflows may comprise radiologist review or further AI-based analysis (e.g., by a trained algorithm).

The majority of mammography screening exams may be classified into the normal category. By having a first set of radiologists focusing only on this workflow, the concept of "batch reading" and the value and productivity gains associated with it can be applied and extended. Since the cases handled by this first set of radiologists may be nearly all normal cases, there may be fewer context-switches and penalties caused by handling highly variable cases. With the AI-based system, reports may be automatically pre-populated, allowing radiologists to spend significantly more time interpreting images rather than writing reports. In the rare case where the radiologist disagrees with the AI assessment of a normal case and instead considers the case suspicious, such cases may be handled as usual and the subject may be scheduled for a diagnostic exam. These normal cases may be further sub-divided into even more homogeneous batches to achieve a productivity improvement by grouping cases that an AI-based system has determined to be similar. For example, batching all AI-determined dense breasts together or batching cases that are visually similar based at least in part on AI-derived features.

A smaller fraction of mammography screening exams may be classified into the uncertain workflow. Such sessions may involve findings that the AI system does not classify as normal but that also do not meet the threshold for being outright suspicious. These may be the highly complex cases that require significantly more time per session for radiologist assessment as compared than those cases in the normal or suspicious workflow. For these reasons, it may be beneficial to have a separate second set of radiologists focus on performing this smaller volume of work, which has less homogeneity and potentially significantly more interpretation and reporting requirements. These radiologists may be more specialized in reading this difficult cases through more years of experience or training. This specialization may be made even more specific based at least in part on categories or features that the AI determines. For example, a group of radiologists may perform better than others at correctly assessing AI-determined tumor masses. Therefore, exams identified as such by the algorithm may be routed to this better suited group of specialists. In some cases, the second set of radiologists is the same as the first set of radiologists, but the radiological assessments of the different sets of cases are performed at different times based at least in part on a prioritization of the cases. In some cases, the second set of radiologists is a subset of the first set of radiologists.

The smallest but most important portion of the mammography screening exams may be classified into the suspicious workflow. A third set of radiologists may be assigned to this role to effectively read these cases as their "on-call" obligations. Most of the radiologist's time may be spent performing scheduled diagnostic exams. However, in the downtime between exams, they may be alerted to any suspicious cases such that they may verify the diagnosis as soon as possible. These cases may be critical to handle efficiently so that the subjects can begin their follow-up diagnostic exam as soon as possible. In some cases, the third set of radiologists is the same as the first or second set of radiologists, but the radiological assessments of the different sets of cases are performed at different times based at least in part on a prioritization of the cases. In some cases, the third set of radiologists is a subset of the first or second set of radiologists.

In some cases, the workflow may comprise applying an AI-based algorithm to analyze a medical image to determine a difficulty of performing radiological assessment of the medical image, and then prioritizing or assigning the medical image to a set of radiologists (e.g., among a plurality of different sets of radiologists) for radiological assessment based at least in part on the determined degree of difficulty. For example, cases with low difficulty (e.g., more "routine" cases) may be assigned to a set of radiologists having relatively lower degree of skill or experience, while cases with higher difficulty (e.g., more suspicious or non-routine cases) may be assigned to a different set of radiologists having relatively higher degree of skill or experience (specialized radiologists). For example, cases with low difficulty (e.g., more "routine" cases) may be assigned to a first set of radiologists having relatively lower level of schedule availability, while cases with higher difficulty (e.g., more suspicious or non-routine cases) may be assigned to a different set of radiologists having relatively higher level of schedule availability.

In some cases, the degree of difficulty may be measured by an estimated length of time required to fully assess the image (e.g., about 1 minute, about 2 minutes, about 3 minutes, about 4 minutes, about 5 minutes, about 6 minutes, about 7 minutes, about 8 minutes, about 9 minutes about 10 minutes, about 15 minutes, about 20 minutes, about 25 minutes, about 30 minutes, about 40 minutes, about 50 minutes, about 60 minutes, or more than about 60 minutes. In some cases, the degree of difficulty may be measured by an estimated degree of concordance or agreement of radiological assessment of the medical image across a plurality of independent radiological assessments (e.g., performed by different radiologists or by the same radiologist on different days). For example, the estimated degree of concordance or agreement of radiological assessment may be about 50%, about 55%, about 60%, about 65%, about 70%, about 75%, about 80%, about 85%, about 90%, about 95%, about 96%, about 97%, about 98%, about 99%, or more than about 99%. In some cases, the degree of difficulty may be measured by a desired level of education, experience, or expertise of the radiologist (e.g., less than about 1 year, about 1 year, between 1 and 2 years, about 2 years, between 2 and 3 years, about 3 years, between 3 and 4 years, about 4 years, between 4 and 5 years, about 5 years, between 5 and 6 years, about 6 years, between 6 and 7 years, about 7 years, between 7 and 8 years, about 8 years, between 8 and 9 years, about 9 years, between 9 and 10 years, about 10 years, or more than about 10 years). In some cases, the degree of difficulty may be measured by an estimated sensitivity, specificity, positive predictive value (PPV), negative predictive value (NPV), or accuracy of the radiological assessment (e.g., about 50%, about 55%, about 60%, about 65%, about 70%, about 75%, about 80%, about 85%, about 90%, about 95%, about 96%, about 97%, about 98%, about 99%, or more than about 99%).

In some cases, the workflow may comprise applying an AI-based algorithm to analyze a medical image to determine a categorization of the medical image, and then prioritizing or assigning the medical image to a set of radiologists (e.g., among a plurality of different sets of radiologists) for radiological assessment based at least in part on the determined categorization of the medical image. For example, a set of cases having similar characteristics may be categorized together and assigned to the same radiologist or set of radiologists, thereby achieving a reduction in context switching and an increase in efficiency and accuracy. Similar characteristics may be based at least in part on, for example, location of a body where an ROI occurs, a density of tissue, a BIRADS score, etc. In some cases, workflow may comprise applying an AI-based algorithm to analyze a medical image to determine a lesion type of the medical image, and then prioritizing or assigning the medical image to a set of radiologists (e.g., among a plurality of different sets of radiologists) for radiological assessment based at least in part on the determined lesion type of the medical image.

In some cases, the workflow may comprise allowing radiologists to assign cases to themselves via a market-based system, whereby each case is assessed by an AI-based algorithm to determine an appropriate price or cost of the radiological assessment. Such a price or cost may be a determined relative value unit to be compensated to each radiologist upon completion of the radiological assessment. For example, each radiological assessment of a case may be priced based at least in part on determined characteristics (e.g., difficulty, length of examination time). In such a workflow, cases may not be assigned to radiologists, thereby avoiding the issue of radiologists who choose relatively routine or easy to obtain a high rate of reimbursement per case.

In some cases, the workflow may comprise assigning cases to a radiologist based at least in part on an assessed performance of the radiologist (e.g., prior sensitivity, specificity, positive predictive value (PPV), negative predictive value (NPV), accuracy, or efficiency of the radiologist in performing radiological assessments). Such performance may be determined or refined based at least in part on assigning control cases (e.g., positive or negative control cases) to the radiologist in a blinded manner to ensure quality control. For example, radiologists with better performance may be assigned a higher volume of cases or cases with higher value or compensation. By defining these distinct roles for a given radiologist (e.g., for any given day), each workflow can be individually optimized for task-specific needs. The AI-driven triage engine may allow real-time radiology to be delivered to subjects at scale. The system may also enable dynamic allocation of cases based at least in part on expertise. For example, fellowship-trained breast imagers may be of the most value in the uncertain workflow, where their superior experience may be leveraged. Moreover, we can perform cross-clinic interpretation of screens across a network of clinics can be performed to ensure effective utilization of radiologists' time regardless of any individual clinic's staffing or subject base.

Report delivery may be performed as follows. The Mammography Quality Standards Act (MQSA) mandates that all subjects receive a written lay person's summary of their mammography report directly. This report may be sent within 30 days of the mammogram. Verbal results are often used to expedite care and alleviate anxiety, but they may be supported by written reports. Reports can be mailed, sent electronically, or handed to the subject. Clinics may use paper mail to deliver reports to their subjects. The AI-based clinic may deliver mammography reports electronically via the subject application. The source images may also be made available electronically, so that the subject may easily obtain and transfer the information to other clinics. Subjects in the real-time radiology workflow may receive a screening and diagnostic report immediately before leaving the clinic.

Timely reporting of screening results may be critical to subject satisfaction. Waiting more than two weeks for results and not being able to get in touch with someone to answer questions have been cited as key contributing reasons for subject dissatisfaction (which may in return decrease future screening rates). This system may ensure that a subject does not accidentally receive the wrong report, and that subjects do not have uncertainty about when may receive their results come.

The AI-based system may be continually trained as follows. As the clinical practice is operated, new data is continually collected and used to further train and refine the AI system, thereby further improving the quality of care and enabling new improvements to the subject experience. Each subject exam provides the system with an annotated, and possibly biopsy-proven, example to add to the dataset. In particular, the workflow of the real-time radiology system facilitates prioritizing the capture of high-value cases. The identification of false positives and false negatives (truly suspicious cases not flagged) may be crucial for enhancing the system's performance by providing challenging examples with high instructive value. Even cases that are classified correctly (e.g., with respect to the radiologist's review as the ground truth) may provide useful feedback. Incorporating these cases in the training data set may provide the system with a valuable source of information for uncertainty calibration, which ensures that the confidence values produced by the AI-based system are accurate. This may drastically increase the overall robustness and, in turn, trust in the system. By improving the end-to-end subject workflow and maintaining a radiologist in the loop, the AI-based clinical system may automatically discover the important pieces of information outlined above. The resulting system may be always improving and always providing high-quality subject care and radiological assistance.

The AI-powered mammography screening clinics can provide subjects with high-quality service and accuracy throughout the screening process. Subjects may be able to walk into a clinic, receive a screening for cancer, receive any needed follow-up work, and leave with their diagnosis in hand, thereby completing the entire screening and diagnosis process during the course of a single visit with immediate results. The subject application may be configured to provide price transparency, hassle-free scheduling, error-free form filling, and instantaneous delivery of reports and images, thereby improving the ease, stress, and efficiency of the subject screening process.

The radiologists may be able to provide more accurate and more productive results by employing a specialized set of normal, uncertain, and suspicious (or alternative categorization based at least in part on an AI assessment of the images) workflows orchestrated by the AI triage engine. Clinicians may become more capable as the AI system learns and augments their abilities. AI-based or AI-assisted mammography may be delivered to a large population scale with low cost and high efficiency, thereby enhancing the cancer screening process and subject outcomes.

Example 4—Real-Time Radiology in Breast Cancer Screening Mammography when Coupled with Artificial Intelligence Technologies A software system is developed that is configured to prioritize suspicious screening mammograms for immediate review by radiologists, thereby reducing the time to diagnostic follow-up. The software system is developed with a goal of significantly reducing subject anxiety as well as the overall time to treatment, by shortening the review times for suspicious mammography cases. Reductions in the wait time, which may often be up to about 2-4 weeks between the first and second evaluations, may be expected to extend the life expectancy of those subjects who are actually positive for breast cancer. An additional potential benefit is that the software may reduce the likelihood of missing some cancers.

In some studies, women who are false positives at screening (normal cases flagged as suspicious, BIRADS 0) but receive immediate follow-up may experience nearly the same level of anxiety as women with normal diagnoses. Many of these women may not even perceive themselves as having an abnormal screening result. Therefore, immediate follow-up care may mitigate potential anxiety caused by a false-positive screening result.

On the other hand, women who receive false-positives screening results and are called back for a follow-up diagnostic exam days or weeks later, may seek more medical attention for breast-related concerns and other medical issues. Therefore, women who are able to receive definitive mammography results during the same clinical visit as the mammography scan may be more likely to be satisfied with the screening experience and to have high compliance rates with future screening recommendations.

However, many breast imaging centers may be unable to deliver immediate follow-up exams. This can be due to several challenges including scheduling constraints, timeliness of receiving prior evaluations from other institutions, and productivity loss due to reading each exam immediately after it is acquired. Perhaps most critically, reading several breast screening cases in a batch significantly improves the evaluation accuracy of the reader. This motivates waiting until a large enough batch of cases has been collected before reading an exam, making it impossible to provide immediate results and follow-up examination to a subject if indicated.

Figure 11:
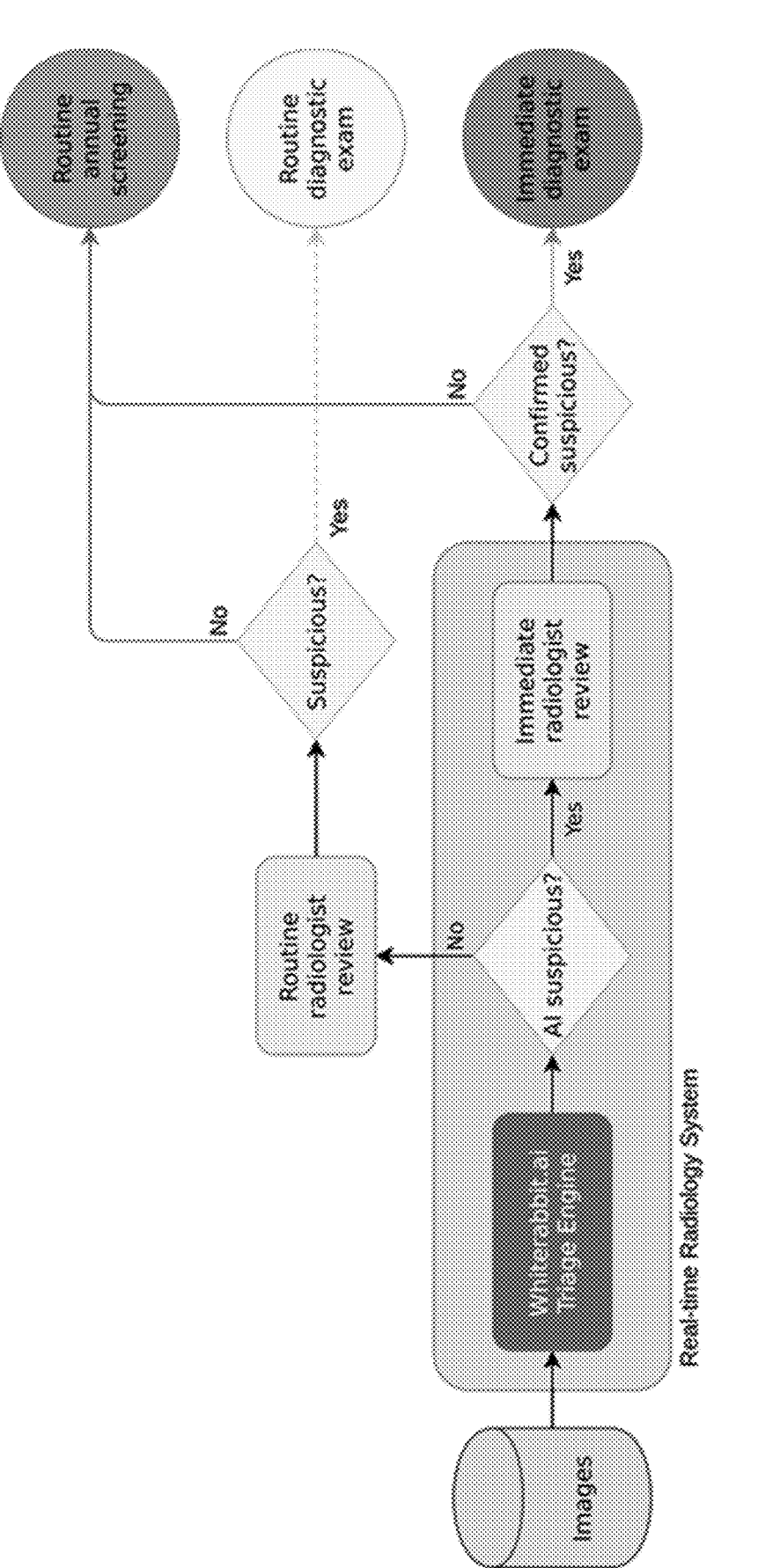
FIG. 11 shows an example of a triage software system developed using machine learning for screening mammography to enable more timely report delivery and follow-up for suspicious cases (e.g., as performed in a batch reading setting).

Machine learning-based methods are employed to evaluate suspicious findings in mammography and tomosynthesis images. A triage software system is developed using machine learning for screening mammography to enable more timely report delivery and follow-up for suspicious cases (e.g., as performed in a batch reading setting) (as shown in FIG. 11). The medical images are fed into a real-time radiology system for processing. An AI-based triage engine of the real-time radiology system processes the medical images to classify the images as suspicious or not suspicious (e.g., normal or routine). If an image is classified as suspicious by the AI-based triage engine, then the image is sent for immediate radiologist review (e.g., during the same visit or same day as the initial screening appointment). The immediate radiologist review may result in a confirmation of a suspicious case (which results in an immediate diagnostic exam being ordered) or a reversal of the suspicious case (which results in the next scheduled routine annual screening being performed). If an image is classified as not suspicious (e.g., normal or routine) by the AI-based triage engine, then the image is sent for routine radiologist review. The routine radiologist review may result in an assessment of the case being suspicious (which results in a routine diagnostic exam being ordered) or a confirmation of the case as not being suspicious (which results in the next scheduled routine annual screening being performed).

This software enables high-volume breast screening clinics to deliver same-day or same-visit diagnostic follow-up imaging to subjects with abnormal-appearing mammography results. Leveraging such rapid diagnostic follow-up imaging can pave the way for breast imaging clinics to deliver the highest accuracy with the highest level of service and to significantly reduce subject anxiety.

Using these machine learning-based approaches, the time-to-treatment of true tumors is reduced so that the subject has an increased probability of a longer lifespan as compared to those subjects who are not evaluated by AI and who do not receive the follow-up diagnostic evaluation on the same day.

The machine learning-based approach to evaluate suspicious findings in mammography and tomosynthesis images confers several advantages and objectives as follows. First, the time from initial screening exam to the delivery of diagnostic imaging results is reduced (potentially significantly) for breast cancer screening, and the likelihood of an accurate diagnosis is improved. For example, such diagnoses may be produced with greater sensitivity, specificity, positive predictive value, negative predictive value, area under the receiver operator characteristic (AUROC), or a combination thereof. Second, the approaches that combine radiologists with artificial intelligence may effectively improve the speed and/or quality of the initial evaluation. Third, more advanced diagnostic exams (e.g., additional X-ray based imaging, ultrasound imaging, another type of medical imaging, or a combination thereof) may be completed within a short period (e.g., within 60 minutes) of when the subject receives his or her screening results. Fourth, such methods may advantageously result in improvement in subject satisfaction that is attributable to the more timely delivery of results and follow-up imaging.

Methods

A clinical workflow is optimized to deliver a higher level of service to subjects. As more subjects and data are collected into training datasets, the machine learning algorithm continuously improves in the accuracy (or sensitivity, specificity, positive predictive value, negative predictive value, AUROC, or a combination thereof) of its computer aided diagnosis.

Computer algorithms and software are developed to automatically classify breast screening images into probably abnormal and normal categories with a high degree of accuracy. Such software can enable high-volume breast screening clinics to deliver same-day or same-visit diagnostic follow-up imaging to subjects with abnormal-appearing initial screening results. This will also require evaluating changes to clinical operations, in particular how screening cases are read and how the second diagnostic evaluation can be performed, within 60 minutes of the initial test.

A rapid screening approach is implemented for all subjects at a breast screening clinic. About 10% of the subjects who are screened have suspicious results and are subsequently recommended for a diagnostic exam to be performed on the same day or during the same visit. The rapid turn-around time of the screening result and follow-up diagnostic exam are enabled by careful coordination between radiologists, clinical staff, and subjects in the clinical environment. As more information is collected, the machine learning that is trained with increasingly larger training datasets yields a higher level of accuracy in detecting suspicious mammography scans.

As the acquisitions of screening exams are completed, the images are sent to a router, received by the software, and rapidly classified (e.g., within about one minute). If the screening is marked by the machine learning algorithm as probably normal, then the subject ends her visit and exits the clinic as usual. However, if the screening is flagged by the machine learning algorithm as probably abnormal, then the subject will be asked to wait for up to about 10 minutes while the case is immediately reviewed by the radiologist (as shown in FIG. 11).

Assuming that a given clinic screens about 30 subjects per day and a 10% rate of possible positives, about 3 subjects per day may be found positive by the machine learning algorithm and may be designated as eligible for real-time diagnostic follow-up after review by the radiologist (e.g., usually additional tomosynthesis imaging and possibly an ultrasound exam).

Several metrics are used to demonstrate the effectiveness of the real-time radiology methods and systems. First, the change in the time it takes between a subject's initial screening exam and the delivery of diagnostic imaging results under the routine workflow and the proposed real-time workflow may be measured, in order to capture both changes in the latency of when a screening a case is reviewed, as well as logistics like mailing letters and appointment scheduling.

Second, the real-time radiology model is evaluated continuously (e.g., on a monthly basis) based at least in part on the latest data collected. For example, the parameters of the computer vision algorithm are tuned and altered to improve its accuracy for the upcoming subsequent time period of screenings (e.g., one month). The effectiveness of the changes to the computer program are evaluated on a blinded test dataset of hundreds of representative exams and from the interim results from the subsequent time period of screenings.

Third, subject satisfaction surveys are reviewed periodically to help determine how operational processes may be improved to better enable follow-up diagnostic examination within a short period of time (e.g., about 60 minutes).

The following data may be collected for each subject who undergoes a mammographic screening/diagnostic assessment via the real-time radiology workflow: subject demographics (e.g., age, race, height, weight, socioeconomic background, smoking status, etc.), subject imaging data (e.g., acquired by mammography), subject outcomes (e.g., BIRADS for screening and diagnostic exams and biopsy pathology results, where applicable), subject visit event time stamps, subject callback rate for batch-read and real-time cases, and radiologist interpretation time for screening and diagnostic cases.

Using methods and systems of the present disclosure, real-time radiology may be performed with potential benefits including: detecting a tumor that may not have otherwise have been recognized (or may only be recognized until the tumor has progressed), a reduced time to treatment, an improved longevity of the subject due to recognition and treatment compared to traditional evaluation process, and reduced subject anxiety since the waiting time between testing has been eliminated.

Example 5—a Multi-Site Study of a Breast Density Deep Learning Model for Full-Field Digital Mammography and Digital Breast Tomosynthesis Exams Deep learning (DL) models hold promise for mammographic breast density estimation, but performance can be hindered by limited training data or image differences that can occur across clinics. Digital breast tomosynthesis (DBT) exams are increasingly becoming the standard for breast cancer screening and breast density assessment, but much more data is available for full-field digital mammography (FFDM) exams. A breast density DL model was developed in a multi-site setting for synthetic 2D mammography (SM) images derived from 3D DBT exams using FFDM images and limited SM data. A DL model was trained to predict Breast Imaging Reporting and Data System (BI-RADS) breast density using FFDM images acquired from 2008 to 2017 (Site 1: 57492 subjects, 750752 images) for a retrospective study. The FFDM model was evaluated on SM datasets from two institutions (Site 1: 3842 subjects, 14472 images; Site 2: 7557 subjects, 63973 images). Adaptation methods were investigated to improve performance on the SM datasets and the effect of dataset size on each adaptation method was considered. Statistical significance was assessed through use of confidence intervals, and estimated by bootstrapping. Even without adaptation, the model demonstrated close agreement with the original reporting radiologists for all three datasets (Site 1 FFDM: linearly-weighted $\kappa w=0.75$, 95% confidence interval (CI): [0.74, 0.76]; Site 1 SM: $\kappa w=0.71$, CI: [0.64, 0.78]; Site 2 SM: $\kappa w=0.72$, CI: [0.70, 0.75]). With adaptation, performance improved for Site 2 (Site 1: $\kappa w=0.72$, CI: [0.66, 0.79], Site 2: $\kappa w=0.79$, CI: [0.76, 0.81]) by use of only 500 SM images. These results establish that the BI-RADS breast density DL model demonstrated a high-level of performance on FFDM and SM images from two institutions by the use of methods requiring no or few SM images.

A multisite study was performed to develop a breast density deep learning model for full-field digital mammography and synthetic mammography, as described by, for example, Matthews et al., "A Multisite Study of a Breast Density Deep Learning Model for Full-Field Digital Mammography and Synthetic Mammography," Radiology: Artificial Intelligence, doi.org/10.1148/ryai.2020200015, which is incorporated by reference herein in its entirety.

Breast density is an important risk factor for breast cancer, and areas of higher density can mask findings within mammograms leading to lower sensitivity. In some states, clinics are required to inform women of their density. Radiologists may assess breast density using the Breast Imaging Reporting and Data System (BI-RADS) lexicon, which divides breast density into four categories: almost entirely fatty, scattered areas of fibroglandular density, heterogeneously dense, and extremely dense (as shown in FIGS. 12A-12D). Unfortunately, radiologists exhibit intra- and inter-reader variability in the assessment of BI-RADS breast density, which can result in differences in clinical care and estimated risk.

Figure 12A:
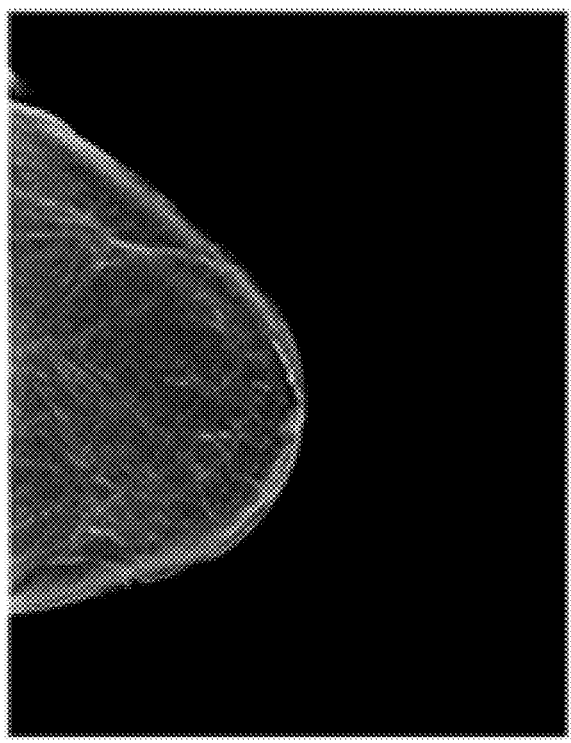
FIGS. 12A-12D show examples of synthetic 2D mammography (SM) images derived from digital breast tomosynthesis (DBT) exams for each of the four Breast Imaging Reporting and Data System (BI-RADS) breast density categories: (A) almost entirely fatty (FIG. 12A), (B) scattered areas of fibroglandular density (FIG. 12B), (C) heterogeneously dense (FIG. 12C), and (D) extremely dense (FIG. 12D).
Figure 12B:
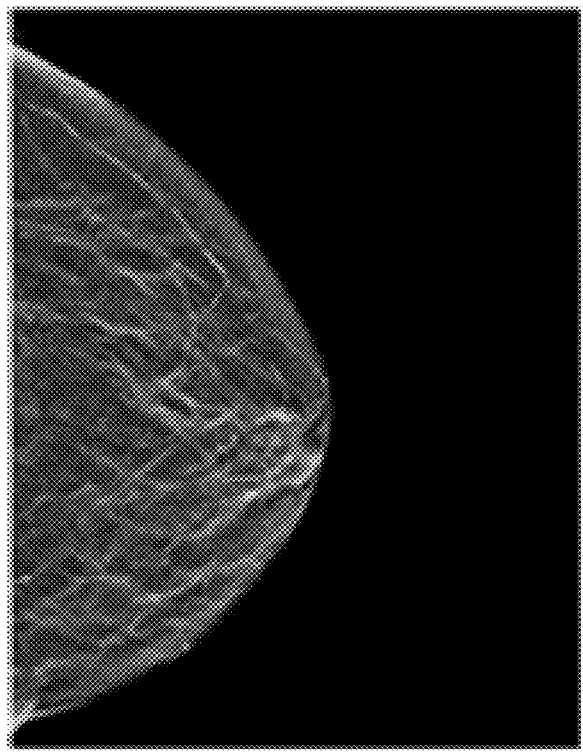
Figure 12C:
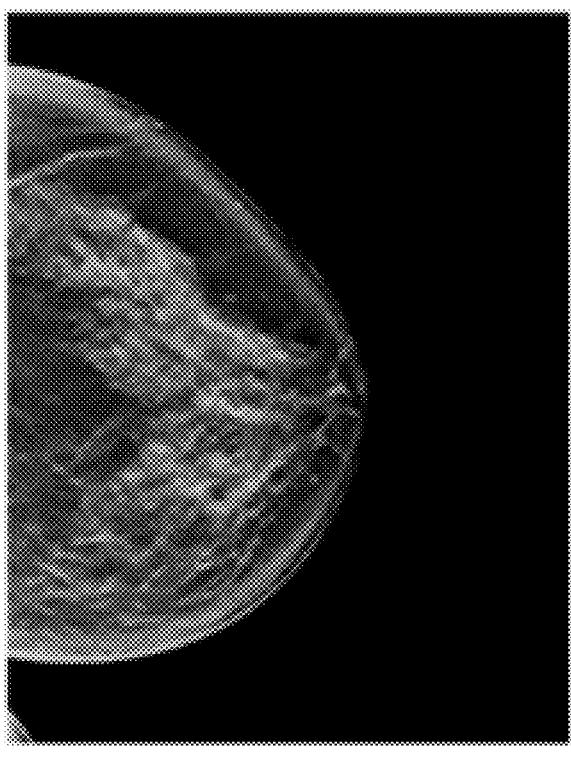
Figure 12D:
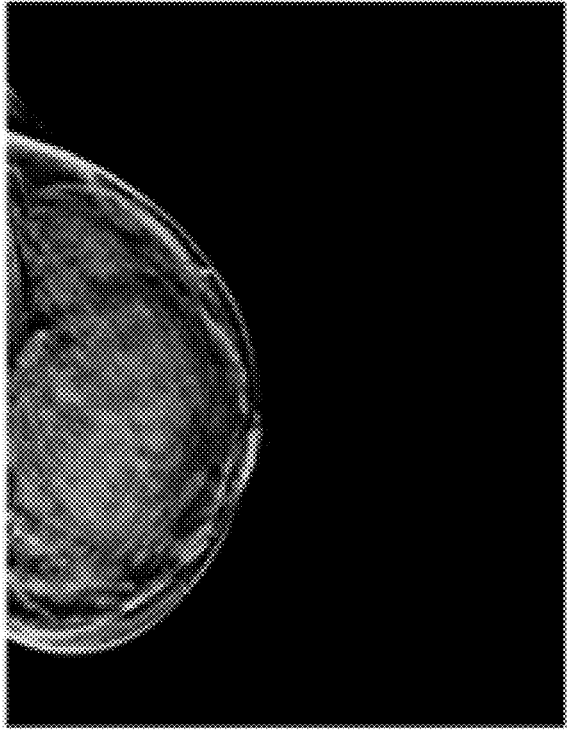
Figure 13A:
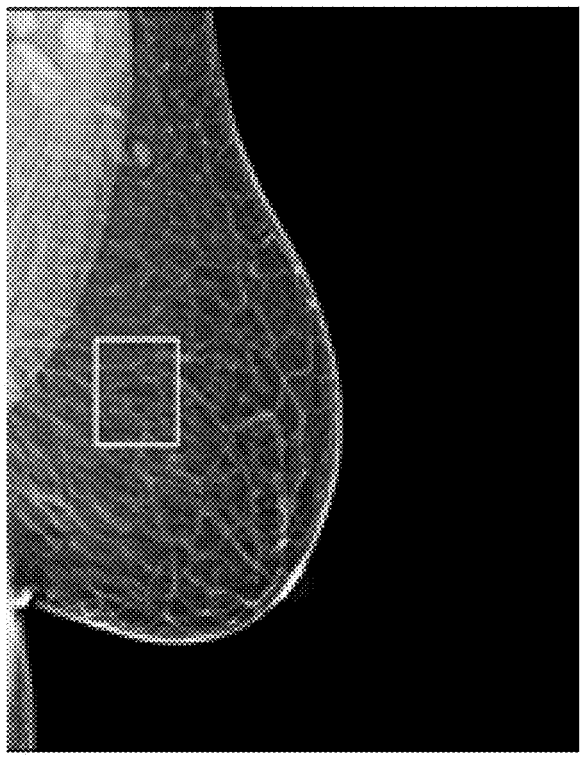
FIGS. 13A-13D show a comparison between a full-field digital mammography (FFDM) image (FIG. 13A) and a synthetic 2D mammography (SM) image (FIG. 13B) of the same breast under the same compression. A zoomed-in region, whose original location is denoted by the white box, is shown for both the FFDM image (FIG. 13C) and the SM image (FIG. 13D) to highlight the differences in texture and contrast that can occur between the two image types.
Figure 13B:
Figure 13C:
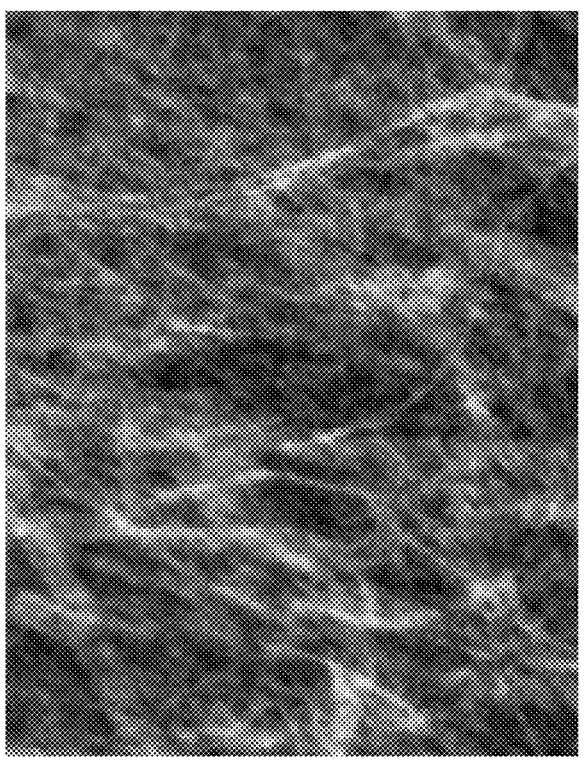
Figure 13D:
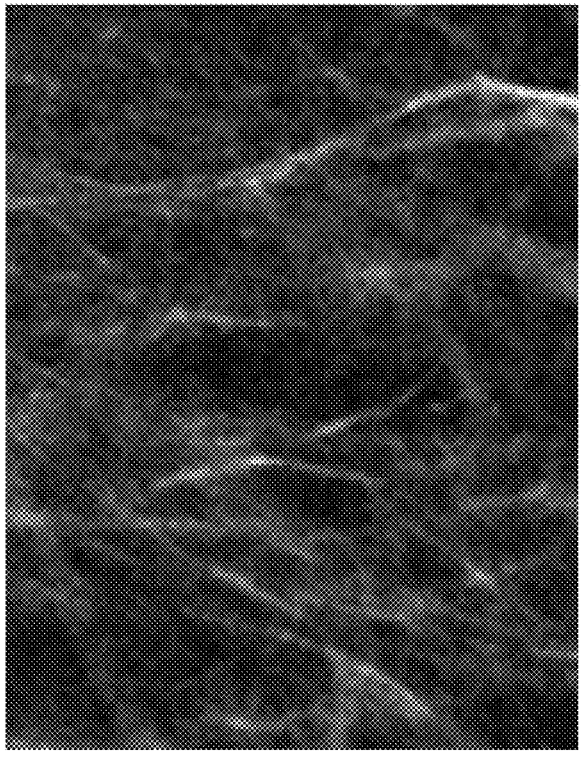

FIGS. 12A-12D show examples of synthetic 2D mammography (SM) images derived from digital breast tomosynthesis (DBT) exams for each of the four Breast Imaging Reporting and Data System (BI-RADS) breast density categories: (A) almost entirely fatty (FIG. 12A), (B) scattered areas of fibroglandular density (FIG. 12B), (C) heterogeneously dense (FIG. 12C), and (D) extremely dense (FIG. 12D). Images are normalized so that the grayscale intensity windows found in their Digital Imaging and Communications in Medicine (DICOM) headers range from 0.0 to 1.0.

Deep learning (DL) may be employed to assess BI-RADS breast density for both film and full-field digital mammography (FFDM) images, with some models demonstrating closer agreement with consensus estimates than individual radiologists. To realize the promise of using these DL models in clinical practice, two key challenges may be met. First, as breast cancer screening is increasingly moving to digital breast tomosynthesis (DBT) due to improved reader performance, DL models may need to be compatible with DBT exams. FIGS. 13A-13D show the differences in image characteristics between 2D images for FFDM and DBT exams. However, the relatively recent adoption of DBT at many institutions means that the datasets available for training DL models are often fairly limited for DBT exams compared with FFDM exams. Second, DL models may need to offer consistent performance across sites, where differences in imaging technology, subject demographics, or assessment practices can impact model performance. To be practical, this may need to be achieved while requiring little additional data from each site.

FIGS. 13A-13D show a comparison between a full-field digital mammography (FFDM) image (FIG. 13A) and a synthetic 2D mammography (SM) image (FIG. 13B) of the same breast of a subject under the same compression; and a zoomed-in region, whose original location is denoted by the white box, both the FFDM image (FIG. 13C) and the SM image (FIG. 13D) to highlight the differences in texture and contrast that can occur between the two image types. Images are normalized so that the grayscale intensity windows found in their Digital Imaging and Communications in Medicine (DICOM) headers range from 0.0 to 1.0.

A BI-RADS breast density DL model was developed that offers close agreement with the original reporting radiologists for both FFDM and DBT exams at two institutions. A DL model was first trained to predict BI-RADS breast density using a large-scale FFDM dataset from one institution. Then, the model was evaluated on a test set of FFDM exams as well as synthetic 2D mammography (SM) images generated as part of DBT exams (C-View, Hologic, Inc., Marlborough, MA), acquired from the same institution and from a separate institution. Adaptation techniques, requiring few SM images, were explored to improve performance on the two SM datasets.

Materials and Methods

The retrospective study was approved by an institutional review board for each of the two sites where data were collected (Site 1: internal institutional review board, Site 2: Western Institutional Review Board). Informed consent was waived and all data were handled according to the Health Insurance Portability and Accountability Act.

Datasets were collected from two sites: Site 1, an academic medical center located in the mid-western region of the United States, and Site 2, an out-subject radiology clinic located in northern California. For Site 1, 191,493 mammography exams were selected (FFDM: n=187,627; SM: n=3,866). The exams were read by one of 11 radiologists with breast imaging experience. For Site 2, 16283 exams were selected. The exams were read by one of 12 radiologists with breast imaging experience ranging from 9 to 41 years. The BI-RADS breast density assessments of the radiologists were obtained from each site's mammography reporting software (Site 1: Magview version 7.1, Magview, Burtonsville, Maryland; Site 2: MRS version 7.2.0; MRS Systems Inc. Seattle, Washington). To facilitate development of our DL models, subjects were randomly selected for training (FFDM: 50700, 88%; Site 1 SM: 3169, 82%; Site 2 SM: 6056, 80%), validation (FFDM: 1832, 3%; Site 1 SM: 403, 10%; Site 2 SM: 757, 10%), or testing (FFDM: 4960, 9%; Site 1 SM: 270, 7%; Site 2 SM: 744, 10%) purposes. All exams with a BI-RADS breast density assessment were included. For the test sets, exams were required to have all four standard screening mammography images (the mediolateral oblique and craniocaudal views of the left and right breasts). The distribution of the BI-RADS breast density assessments for each set are shown in Table 1 (Site 1) and Table 2 (Site 2).

TABLE 1

Description of the Site 1 full-field digital mammography (FFDM) and synthetic 2D mammography (SM) training (train), validation (val), and test (test) datasets. The total number of subjects, exams, and images are given for each dataset. The number of images for the four Breast Imaging Reporting and Data System (BI-RADS) breast density categories are also provided.

| | FFDM Train | FFDM Val | FFDM Test | SM Train | SM Val | SM Test |
|---|---|---|---|---|---|---|
| Patients | 50700 | 1832 | 4960 | 3169 | 403 | 270 |
| Exams | 168208 | 6157 | 13262 | 3189 | 407 | 270 |
| Images | 672704 | 25000 | 53048 | 11873 | 1519 | 1080 |
| BI-RADS A | 80459 (12.0%) | 3465 (13.9%) | 4948 (9.39%) | 1160 (9.8%) | 154 (10.1%) | 96 (8.9%) |
| BI-RADS B | 348878 (51.9%) | 12925 (51.7%) | 27608 (52.0%) | 6121 (51.6%) | 771 (50.8%) | 536 (49.6%) |
| BI-RADS C | 214465 (31.9%) | 7587 (30.3%) | 18360 (34.6%) | 3901 (32.9%) | 510 (33.6%) | 388 (35.9%) |
| BI-RADS D | 28902 (4.3%) | 1023 (4.1%) | 2132 (4.0%) | 691 (5.8%) | 84 (5.5%) | 60 (5.6%) |

TABLE 2

Description of the Site 2 synthetic 2D mammography (SM) training (train), validation (val), and test (test) datasets. The total number of subjects, exams, and images are given for each dataset. The number of images for the four Breast Imaging Reporting and Data System (BI-RADS) breast density categories are also provided.

|  | Train | Val | Test |
|---|---|---|---|
| Patients | 6056 | 757 | 744 |
| Exams | 13061 | 1674 | 1548 |
| Images | 51241 | 6540 | 6192 |
| BI-RADS A | 7866 (15.4%) | 865 (13.2%) | 948 (15.3%) |
| BI-RADS B | 20731 (40.5%) | 2719 (41.6%) | 2612 (42.2%) |
| BI-RADS C | 15706 (30.7%) | 2139 (32.7%) | 1868 (30.2%) |
| BI-RADS D | 6938 (13.5%) | 817 (12.5%) | 764 (12.3%) |

The two sites serve different subject populations. The subject cohort from Site 1 is 59% Caucasian (34192/58397), 23% African American (13201/58397), 3% Asian (1630/58397), and 1% Hispanic (757/58397) while Site 2 is 58% Caucasian (4350/7557), 1% African American (110/7557), 21% Asian (1594/7557), and 7% Hispanic (522/7557).

Deep Learning Model

The DL model and training procedure were implemented using the pytorch DL framework (pytorch.org, version 1.0), which comprises a deep neural network model. The base model architecture comprised a pre-activation Resnet-34, where the batch normalization layers were replaced with group normalization layers. The model was configured to process as input a single image, corresponding to one of the views from a mammography exam, and produce estimated probabilities that the image is of a breast belonging to each of the BI-RADS breast density categories.

The deep learning (DL) model was trained using the full-field digital mammography (FFDM) dataset (as shown in Table 1) by use of the Adam optimizer with a learning rate of $10^{-4}$ and a weight decay of $10^{-3}$. Weight decay not was applied to the parameters belonging to the normalization layers. The input was resized to 416×320 pixels, and the pixel intensity values were normalized so that the grayscale window denoted in the Digital Imaging and Communications in Medicine (DICOM) header ranged from 0.0 to 1.0. Training was performed using mixed precision and gradient checkpointing with batch sizes of 256 distributed across two NVIDIA GTX 1080 Ti graphics processing units (Santa Clara, CA). Each batch was sampled such that the probability of selecting a BI-RADS B or BI-RADS C sample was four times that of selecting a BI-RADS A or BI-RADS D sample, which roughly corresponds to the distribution of densities observed in the U.S. Horizontal and vertical flipping were employed for data augmentation. In order to obtain more frequent information on the training progress, epochs were capped at 100 thousand samples compared with a total training set size of over 672 thousand samples. The model was trained for 100 such epochs. Results are reported for the epoch that had the lowest cross entropy loss on the validation set, which occurred after 93 epochs.

The parameters for the vector and matrix calibration methods were chosen by minimizing a cross-entropy loss function by use of the BFGS optimization method (scipy.org, version 1.1.0). The parameters were initialized such that the linear layer corresponded to the identity transformation. Training was stopped when the L2 norm of the gradient was less than $10^{-6}$ or when the number of iterations exceeded 500. Retraining the last fully-connected layer for the fine-tuning method was performed by use of the Adam optimizer with a learning rate of $10^{-4}$ and weight decay of $10^{-5}$. The batch size was set to 64. The fully-connected layer was trained from random initialization for 100 epochs, and results were reported for the epoch with the lowest validation cross entropy loss. Training from scratch on the synthetic 2D mammography (SM) datasets was performed following the same procedure as for the base model. For fine-tuning and training from scratch, the size of an epoch was set to the number of training samples.

Domain Adaptation

Domain adaptation was performed to take a model trained on a dataset from one domain (source domain) and transfer its knowledge to a dataset in another domain (target domain), which may be much smaller in size. Features learned by DL models in the early layers can be general, e.g., domain and task agnostic. Depending on the similarity of domains and tasks, even deeper features learned from one domain can be reused for another domain or task. Models that can be directly applied to the new domain without modification are the to generalize.

Approaches were developed for adapting the DL model trained on FFDM images (source domain) to SM images (target domain) that reuse all the features learned from the FFDM domain. First, to perform calibration of neural networks, a small linear layer was added following the final fully-connected layer. Two forms for the linear layer were considered: (1) where the matrix is diagonal, which is denoted as vector calibration, and (2) where the matrix is allowed to freely vary, which is denoted as matrix calibration. Second, the final fully-connected layer of the Resnet-34 model was retrained on samples from the target domain, which is denoted as fine-tuning.

In order to investigate the impact of the target domain dataset size, the adaptation techniques were repeated for different SM training sets across a range of sizes. The adaptation process was repeated 10 times for each dataset size with different random samples of the training data. For each sample, the training images were randomly selected, without replacement, from the full training set. As a reference, a Resnet-34 model was trained from scratch, e.g., from random initialization, for the largest number of training samples for each SM dataset.

Statistical Analysis

To obtain an exam-level assessment, each image within an exam was processed by the DL model and the resulting probabilities were averaged. Several performance metrics were computed from these average probabilities for the 4-class BI-RADS breast density task and the binary dense (BI-RADS C+D) vs. non-dense (BI-RADS A+B) task: (1) accuracy, estimated based at least in part on concordance with the original reporting radiologists, (2) the area under the receiver operating characteristic curve (AUC), and (3) Cohen's kappa (scikit-learn.org, version 0.20.0). Confidence intervals were computed by use of non-Studentized pivotal bootstrapping of the test sets for 8000 random samples. For the 4-class problem, the macroAUC (the average of the four AUC values from the one vs. others tasks) and Cohen's kappa with linear weighting were reported. For the binary density tasks, the predicted dense and non-dense probabilities were computed by summing the predicted probabilities for the corresponding BI-RADS density categories.

Results

Performance of the deep learning model on FFDM exams was evaluated as follows. The trained model was first evaluated on a large held-out test set of FFDM exams from Site 1 (4960 subjects, 53048 images, mean age: 56.9, age range: 23-97). In this case, the images were from the same institution and of the same image type as employed to train the model. The BI-RADS breast density distribution predicted by the DL model (A: 8.5%, B: 52.2%, C: 36.1%, D: 3.2%) was similar to that of the original reporting radiologists (A: 9.3%, B: 52.0%, C: 34.6%, D: 4.0%). The DL model exhibited close agreement with the radiologists for the 4-class BI-RADS breast density task across a variety of performance measures (as shown in Table 3), including accuracy (82.2%, 95% confidence interval (CI): [81.6%, 82.9%]) and linearly-weighted Cohen's kappa ($\kappa w$=0.75, CI: [0.74, 0.76]). A high-level of agreement was also observed for the binary breast density task (accuracy=91.1%, CI: [90.6%, 91.6%], AUC=0.971, CI: [0.968, 0.973], $\kappa$=0.81, CI: [0.80, 0.82]). As demonstrated by the confusion matrices shown in FIGS. 14A-14D, the DL model was rarely off by more than one breast density category (e.g., by calling an extremely dense breast as a scattered outcome; 0.03%, 4/13262). This was learned implicitly by the DL model without any explicit penalties for these types of larger errors.

Figure 14A:
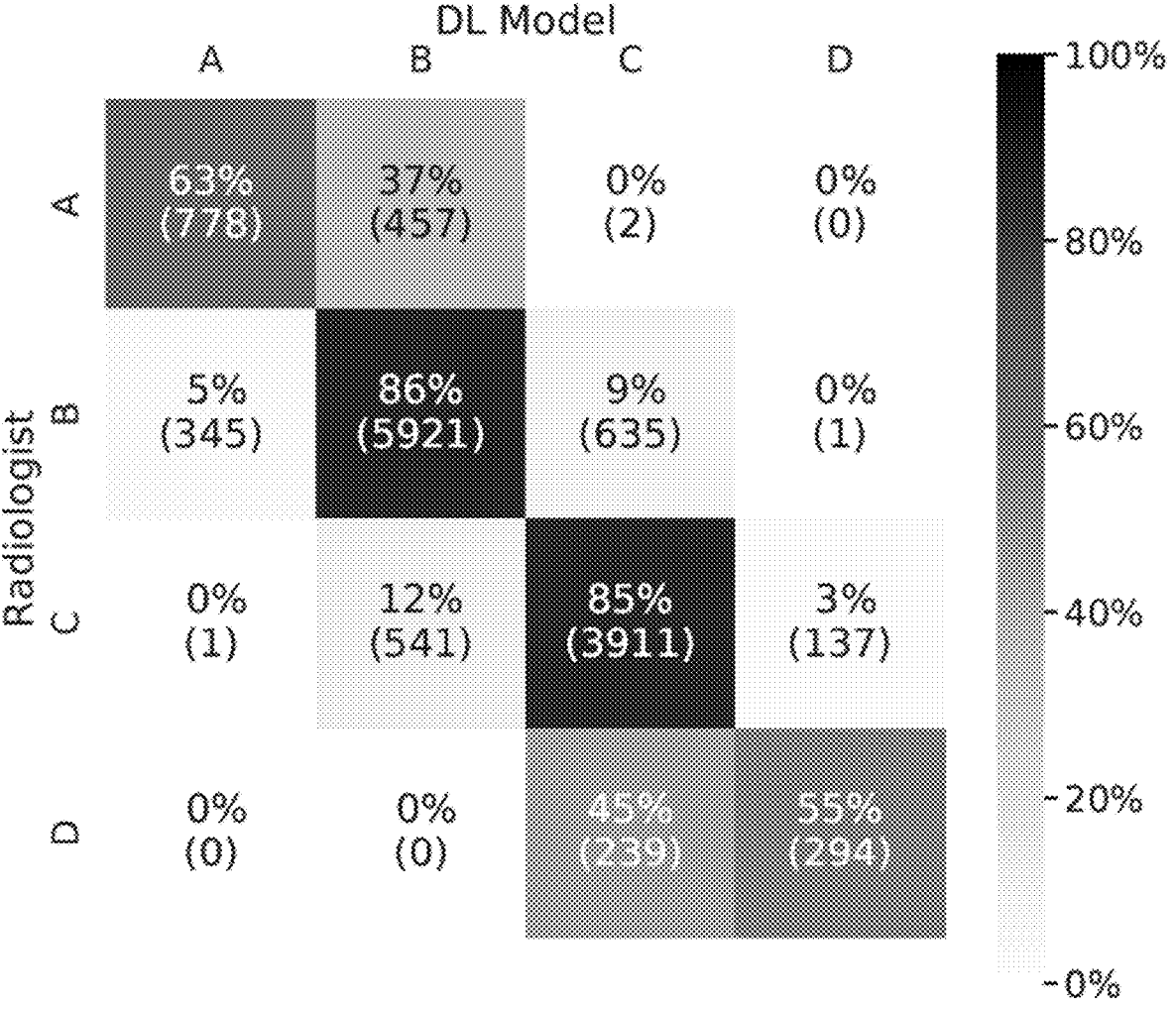
FIGS. 14A-14B show confusion matrices for the Breast Imaging Reporting and Data System (BI-RADS) breast density task (FIG. 14A) and the binary density task (dense, BI-RADS C+D vs. non-dense, BI-RADS A+B) (FIG. 14B) evaluated on the full-field digital mammography (FFDM) test set. The numbers of test samples (exams) within each bin are shown in parentheses.
Figure 14B:
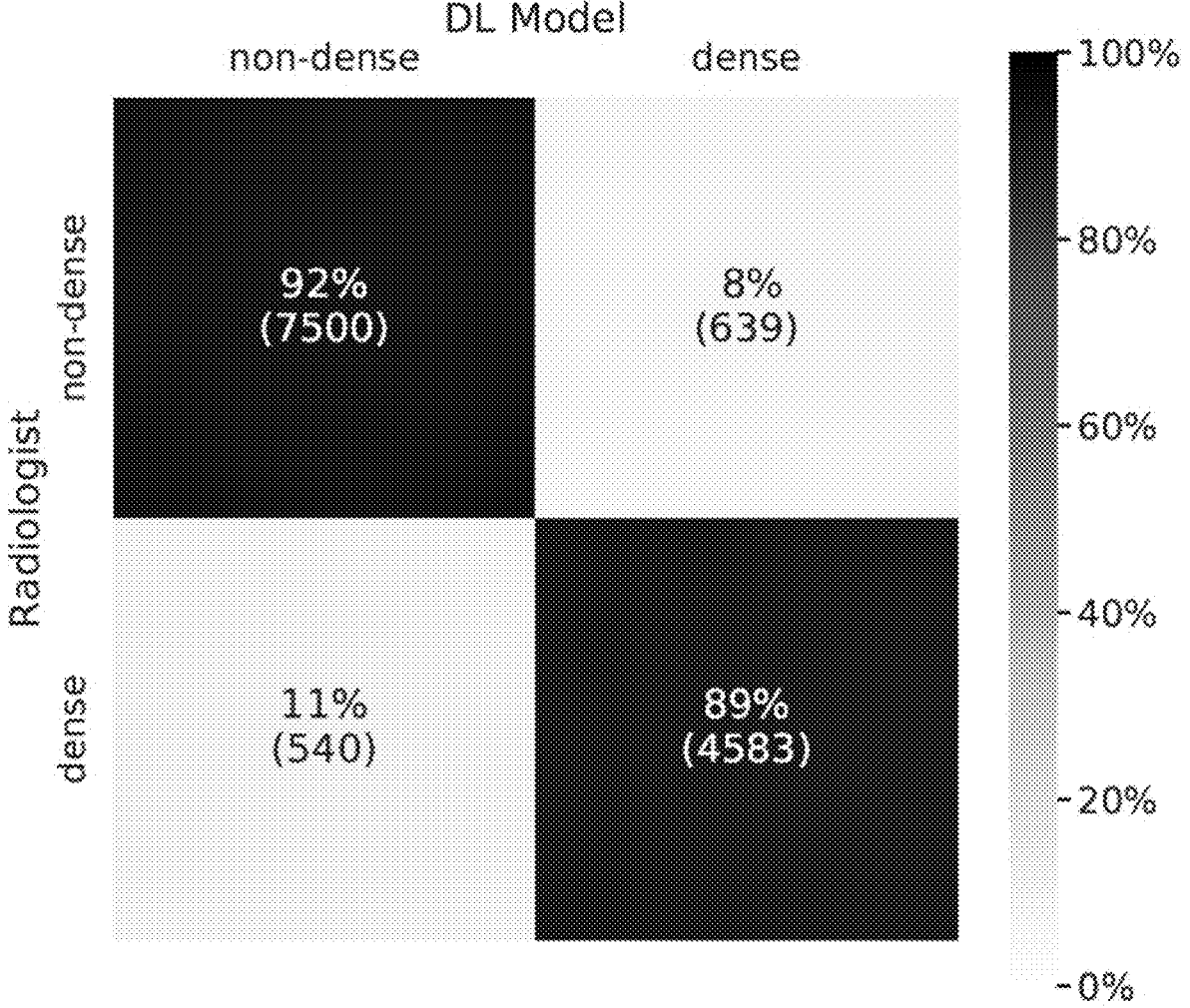
Figure 15A:
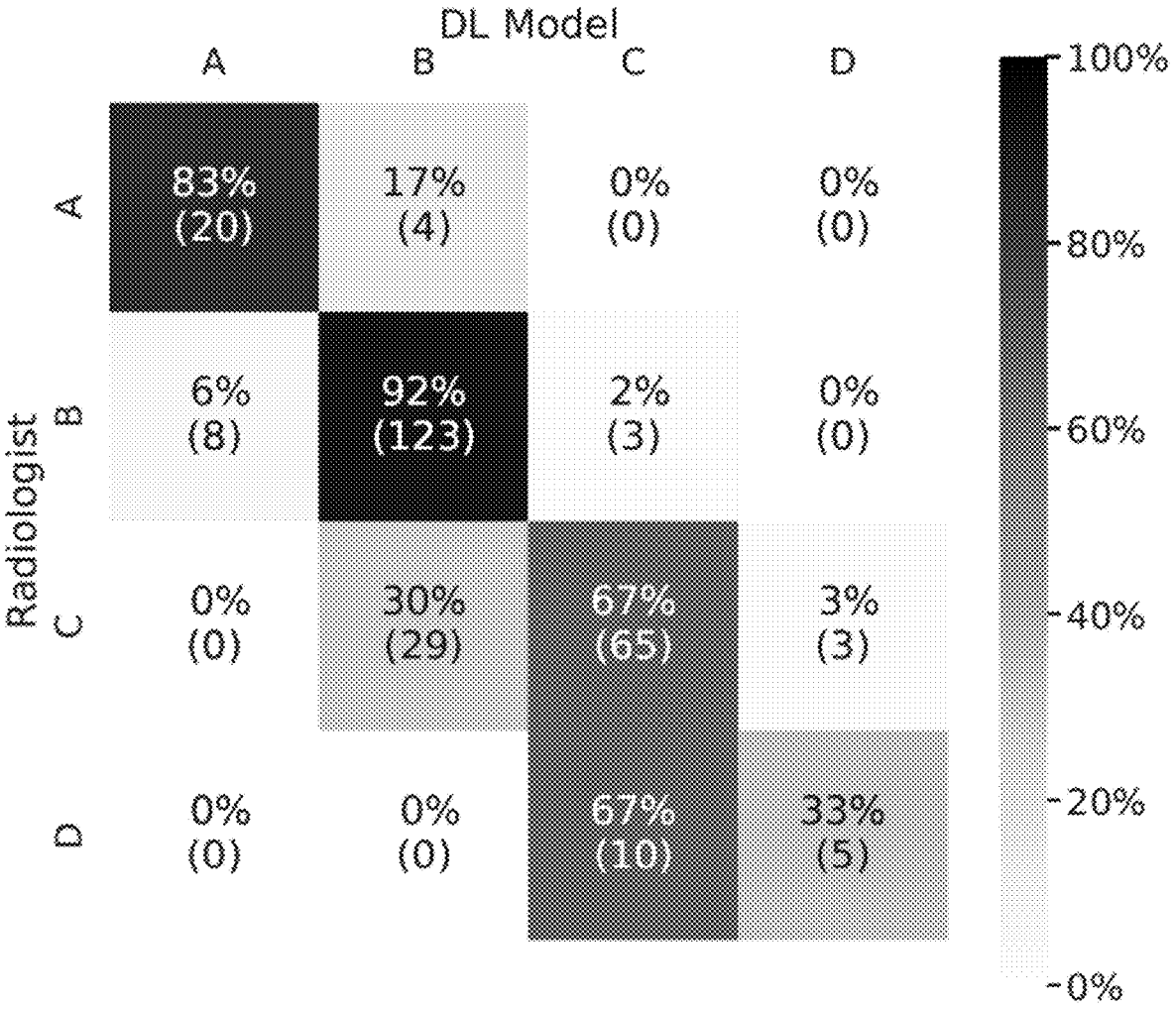
FIGS. 15A-15D show confusion matrices, evaluated on the Site 1 SM test set, for the Breast Imaging Reporting and Data System (BI-RADS) breast density task without adaptation (FIG. 15A), the binary density task (dense, BI-RADS C+D vs. non-dense, BI-RADS A+B) (FIG. 15B) without adaptation, the BI-RADS breast density task with adaptation by matrix calibration for 500 training samples (FIG. 15C), and the binary density task (dense vs. non-dense) (FIG. 15B) with adaptation by matrix calibration for 500 training samples. The numbers of test samples (exams) within each bin are shown in parentheses.
Figure 15B:
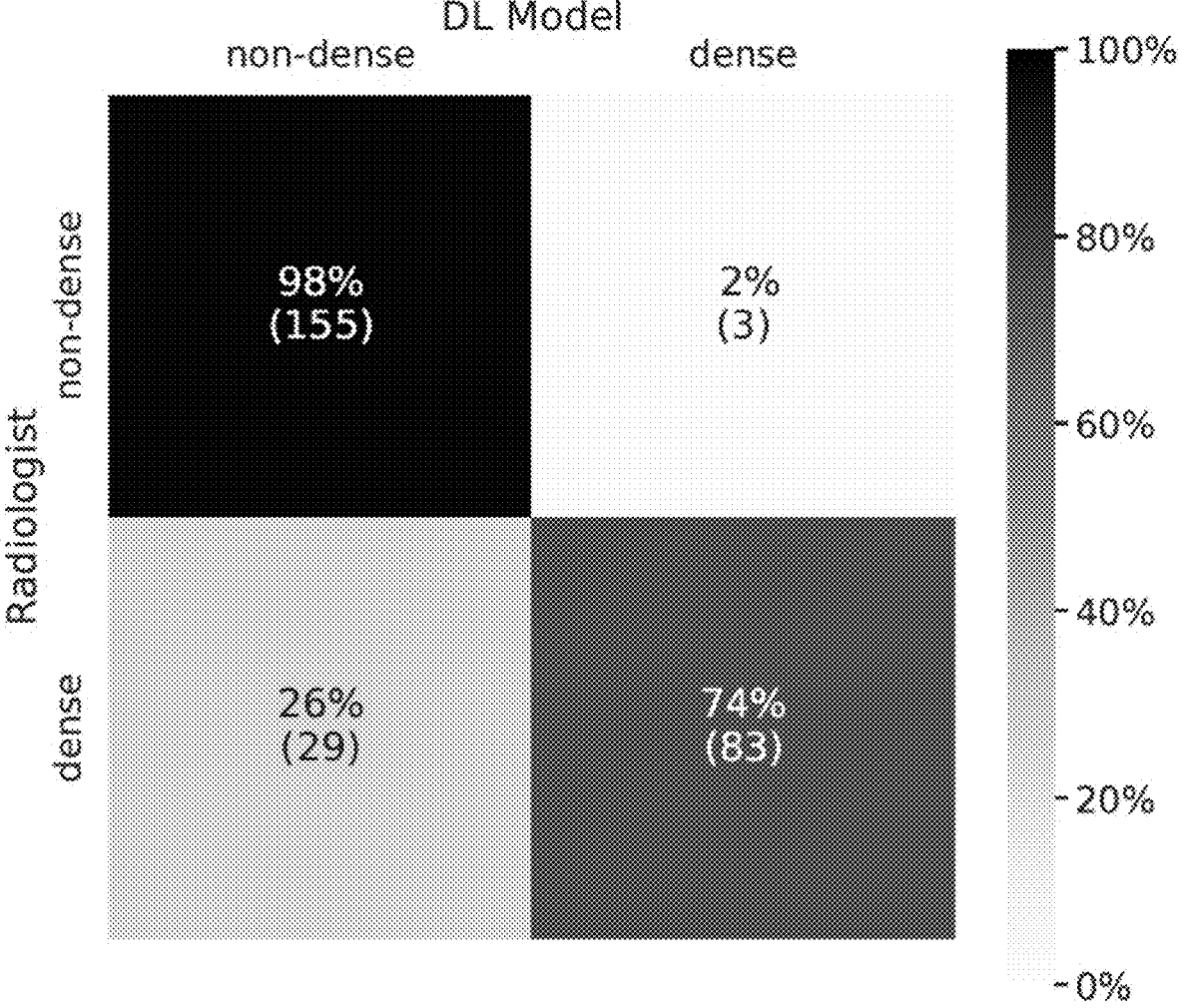
Figure 15C:
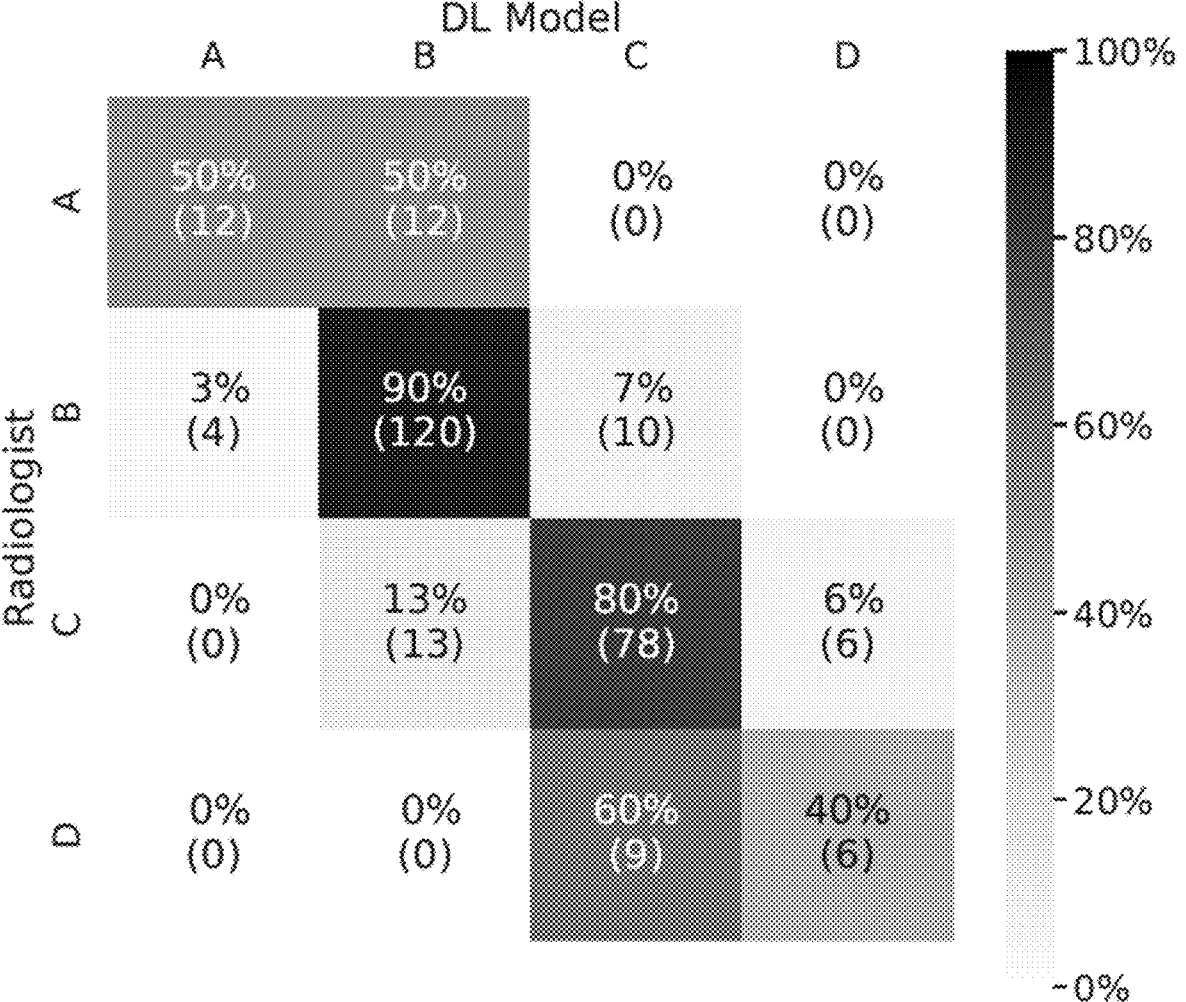
Figure 15D:
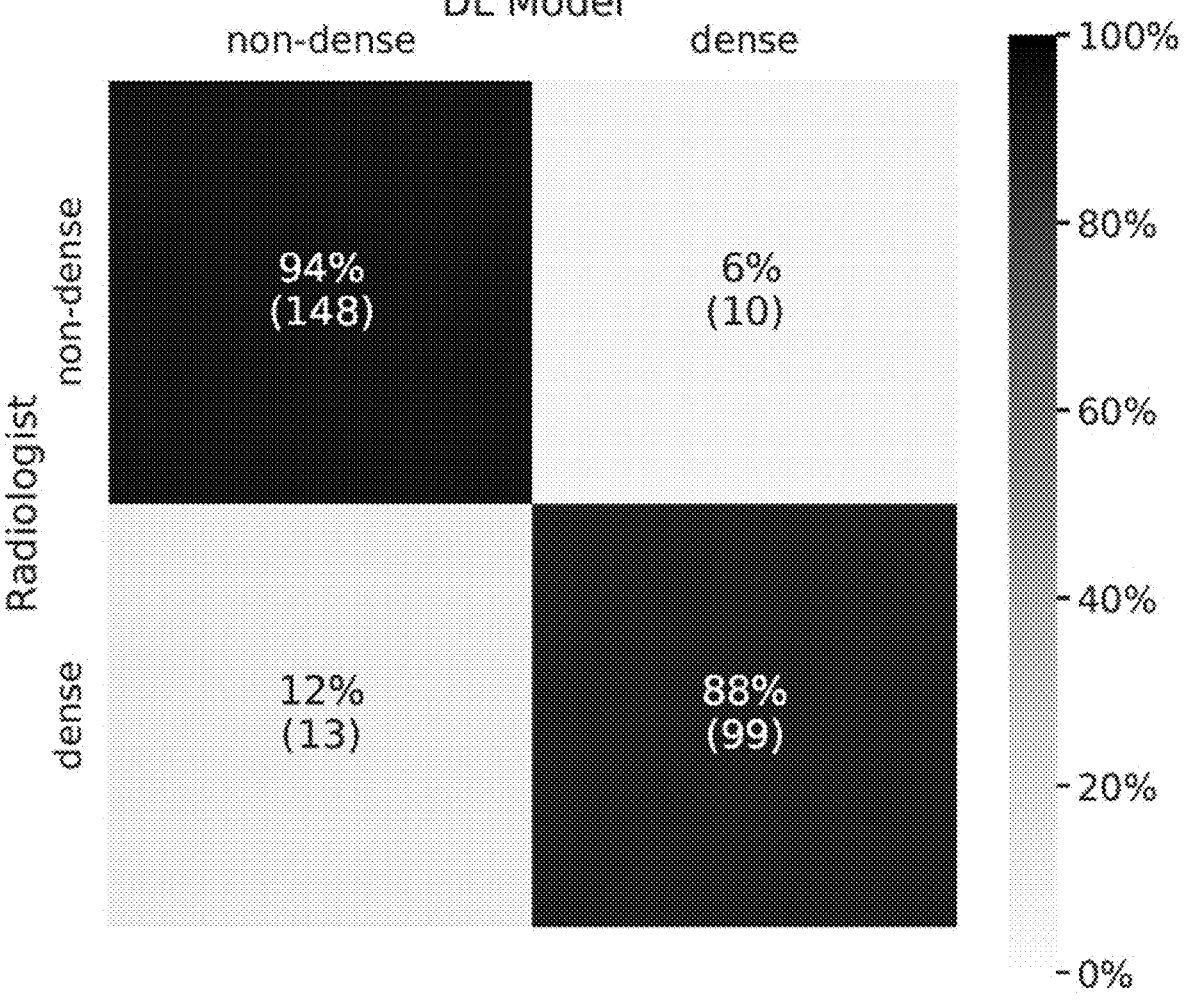
Figure 16A:
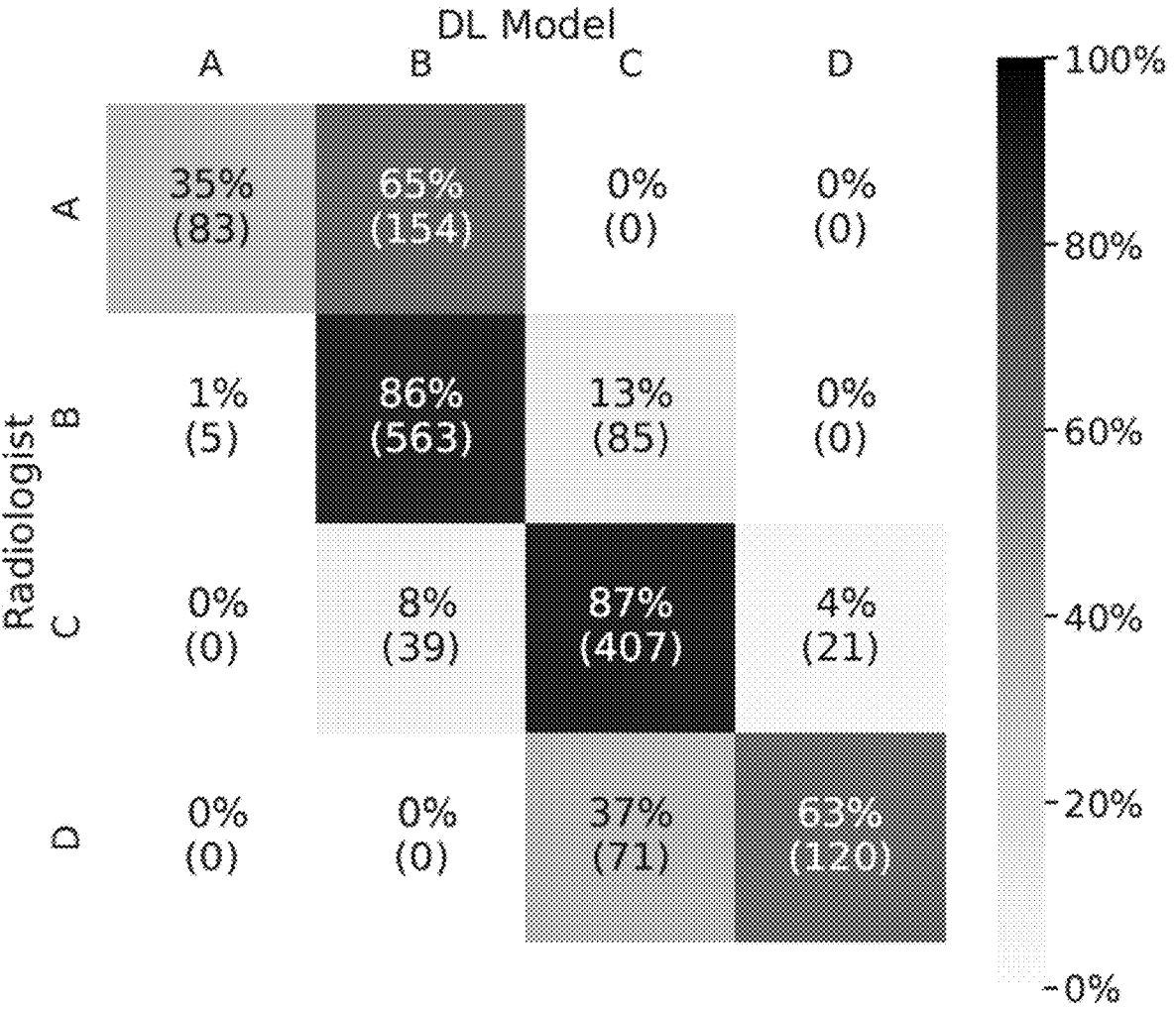
FIGS. 16A-16D show confusion matrices, evaluated on the Site 2 SM test set, for the Breast Imaging Reporting and Data System (BI-RADS) breast density task without adaptation (FIG. 16A), the binary density task (dense, BI-RADS C+D vs. non-dense, BI-RADS A+B) (FIG. 16B) without adaptation, the BI-RADS breast density task with adaptation by matrix calibration for 500 training samples (FIG. 16C), and the binary density task (dense vs. non-dense) (FIG. 16D)
Figure 16B:
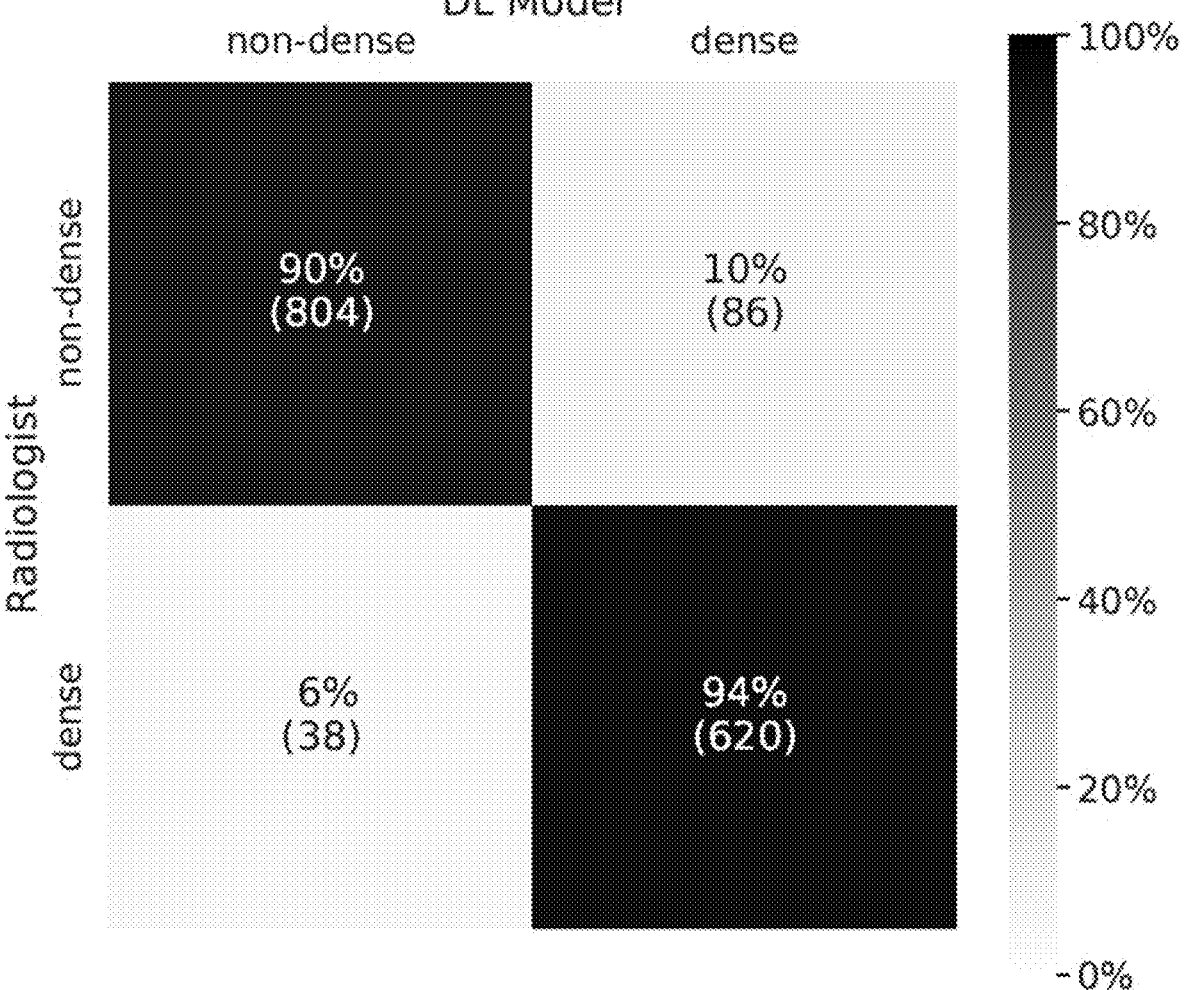
Figure 16C:
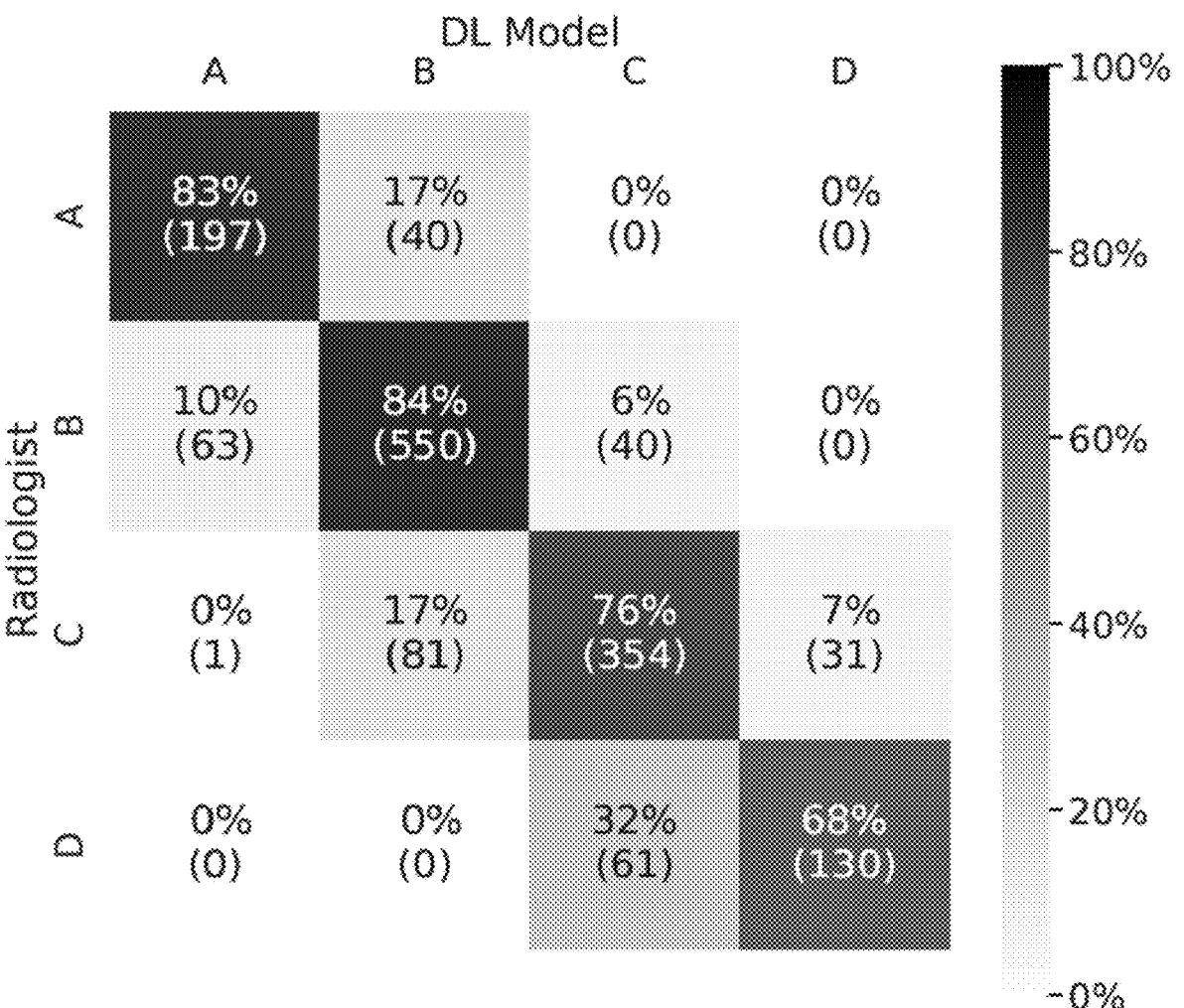
Figure 16D:
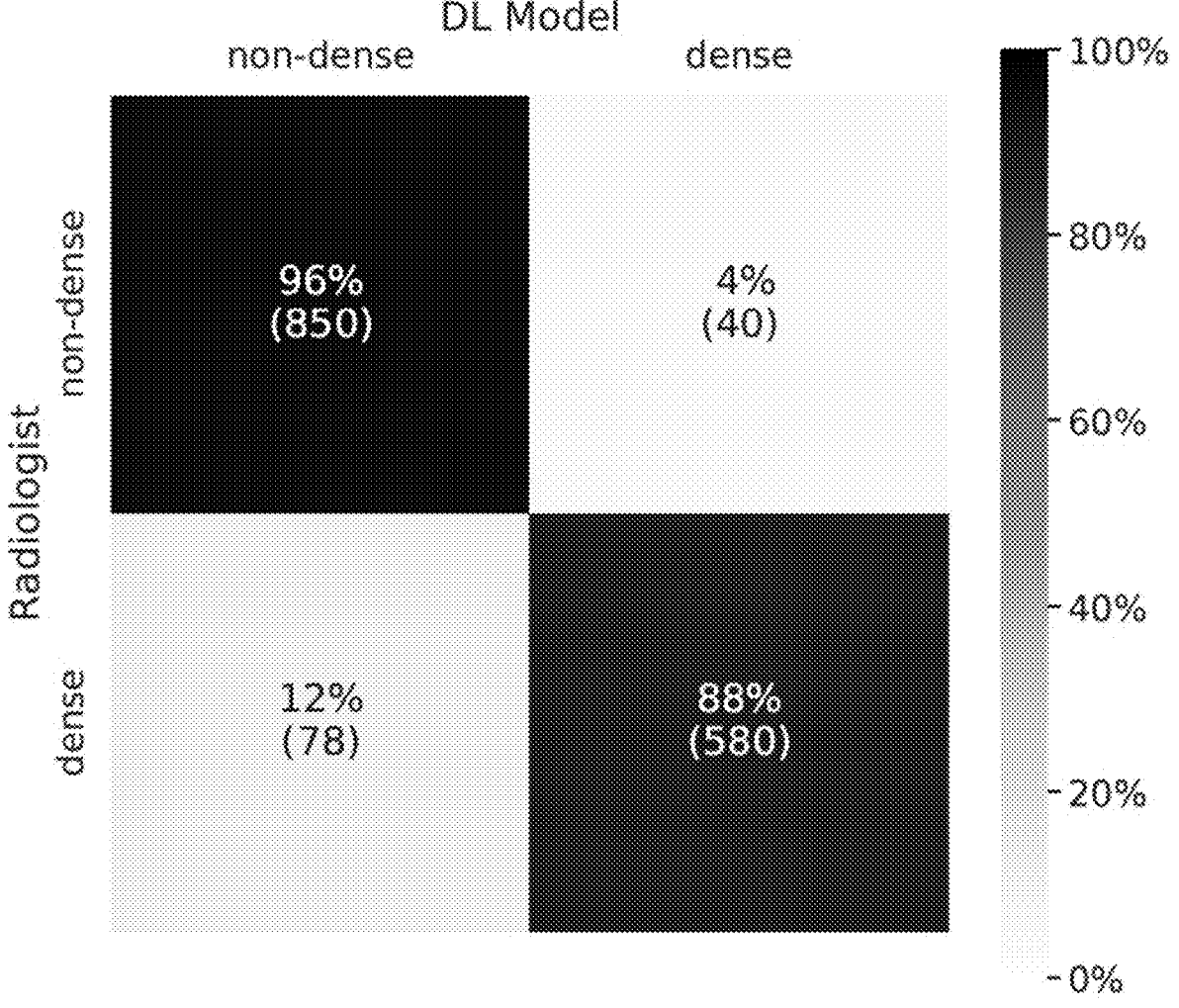

FIGS. 14A-14B show confusion matrices for the Breast Imaging Reporting and Data System (BI-RADS) breast density task (FIG. 14A) and the binary density task (dense, BI-RADS C+D vs. non-dense, BI-RADS A+B) (FIG. 14B) evaluated on the full-field digital mammography (FFDM) test set. The numbers of test samples (exams) within each bin are shown in parentheses.

TABLE 3

Performance of the deep learning model of the present disclosure on the test set for full-field digital mammography (FFDM) exams, for both the 4-class Breast Imaging Reporting and Data System (BI-RADS) breast density task and binary density task (dense, BI-RADS C + D vs. non-dense, BI-RADS A + B). 95% confidence intervals are given in brackets. Results from other studies are shown evaluated on their respective test sets as points of comparison.

| | 4-class Accuracy | 4-class macroAUC | 4-class Linear κ | Binary Accuracy | Binary AUC | Binary κ |
|---|---|---|---|---|---|---|
| Ours | 82.2 [81.6, 82.9] | 0.952 [0.949, 0.954] | 0.75 [0.74, 0.76] | 91.1 [90.6, 91.6] | 0.971 [0.968, 0.973] | 0.81 [0.80, 0.82] |
| Lehman et al. [19] | 77 [76, 78] | | 0.67 [0.66, 0.68] | 87 [86, 88] | | |
| Wu et al. [36] | 76.7 | 0.916 | | 86.5 | | 0.65 |
| Volpara v1.5.0 [3] | 57 | | 0.57 [0.55, 0.59] | 78 | | 0.64 [0.61.0.66] |
| Quantra v2.0 [3] | 56 | | 0.46 [0.44, 0.47] | 83 | | 0.59 [0.57, 0.62] |

In order to place the results in the context of other studies, the performance of the deep learning model on the FFDM test set was compared with results evaluated on other large FFDM datasets acquired from academic centers and with commercial breast density software (as shown in Table 3). The FFDM DL model appears to offer competitive performance.

Performance of the deep learning model on DBT exams was evaluated as follows. Results were first reported for the Site 1 SM test set (270 subjects, 1080 images, mean age: 54.6, age range: 28-72), as this avoids any differences that may occur between the two sites. As shown in Table 4, when performed without adaptation, the model still demonstrated close agreement with the original reporting radiologists for the BI-RADS breast density task (accuracy=79%, CI: [74%, 84%]; $\kappa w$=0.71, CI: [0.64, 0.78]). The DL model slightly underestimates breast density for SM images (as shown in FIGS. 15A-15D), producing a BI-RADS breast density distribution (A: 10.4%, B: 57.8%, C: 28.9%, D: 3.0%) with more non-dense cases and fewer dense cases relative to the radiologists (A: 8.9%, B: 49.6%, C: 35.9%, D: 5.6%). This bias may be due to the differences shown in FIG. 13, namely that certain regions of the breast appear darker in the SM image. A similar bias has been shown for other automated breast density estimation software [33]. Agreement for the binary density task is also quite high without adaptation (accuracy=88%, CI: [84%, 92%]; $\kappa$=0.75, CI: [0.67, 0.83]; AUC=0.97, CI: [0.96, 0.99]).

TABLE 4

Performance of methods and systems of the present disclosure for
adapting a deep learning (DL) model trained on one dataset to another with a set of 500
synthetic 2D mammography (SM) images. The datasets are denoted as "MM" for the full-
field digital mammography (FFDM) dataset, "C1" for the Site 1 SM dataset, and "C2" for
the Site 2 SM dataset. The performance of the model trained from scratch on the FFDM
dataset (672 thousand training samples) and evaluated on its test set is also shown as a
reference. 95% confidence intervals, computed by bootstrapping over the test sets, are
given in brackets.

| Datasets | Methods | 4-class Accuracy | 4-class macroAUC | 4-class Linear κ | Binary Accuracy | Binary AUC | Binary κ |
|---|---|---|---|---|---|---|---|
| MM | | 82.2 | 0.952 | 0.75 | 91.1 | 0.971 | 0.81 |
| MM → C1 | None | 79 | 0.94 | 0.71 | 88 | 0.97 | 0.75 |
| | | [74, 84] | [0.93, 0.96] | [0.64, 0.78] | [84, 92] | [0.96, 0.99] | [0.67, 0.83] |
| | Vector | 81 | 0.95 | 0.73 | 90 | 0.97 | 0.80 |
| | | [77, 86] | [0.94, 0.97] | [0.67, 0.80] | [87, 94] | [0.96, 0.99] | [0.73, 0.88] |
| | Matrix | 80 | 0.95 | 0.72 | 91 | 0.97 | 0.82 |
| | | [76, 85] | [0.94, 0.97] | [0.66, 0.79] | [88, 95] | [0.96, 0.99] | [0.76, 0.90] |
| | Fine-tune | 81 | 0.95 | 0.73 | 90 | 0.97 | 0.80 |
| | | [76, 86] | [0.94, 0.97] | [0.67, 0.80] | [87, 94] | [0.95, 0.99] | [0.73, 0.88] |
| MM → C2 | None | 76 | 0.944 | 0.72 | 92 | 0.980 | 0.84 |
| | | [74, 78] | [0.938, 0.951] | [0.70, 0.75] | [91, 93] | [0.976, 0.986] | [0.81, 0.87] |
| | Vector | 79 | 0.954 | 0.78 | 92 | 0.979 | 0.83 |
| | | [77, 8]1] | [0.949, 0.961] | [0.76, 0.80] | [91, 93] | [0.974, 0.985] | [0.80, 0.86] |
| | Matrix | 80 | 0.956 | 0.79 | 92 | 0.983 | 0.84 |
| | | [78, 82] | [0.950, 0.963] | [0.76, 0.81] | [91, 94] | [0.978, 0.988] | [0.82, 0.87] |
| | Fine-tune | 80 | 0.957 | 0.79 | 93 | 0.984 | 0.85 |
| | | [78, 82] | [0.952, 0.964] | [0.77, 0.81] | [92, 94] | [0.979, 0.988] | [0.83, 0.88] |

After adaptation by matrix calibration with 500 SM images, the density distribution was more similar to that of the radiologists (A: 5.9%, B: 53.7%, C: 35.9%, D: 4.4%), while overall agreement was similar (accuracy=80%, CI: [76%, 85%]; κw=0.72, CI: [0.66, 0.79]). Accuracy for the two dense classes was improved at the expense of the two non-dense classes (as shown in FIGS. 15A-15D). A larger improvement is seen for the binary density task, where the Cohen's kappa increased from 0.75 [0.67, 0.83] to 0.82 [0.76, 0.90](accuracy=91%, CI: [88%, 95%]; AUC=0.97, CI: [0.96, 0.99]).

FIGS. 15A-15D show confusion matrices, evaluated on the Site 1 SM test set, for the Breast Imaging Reporting and Data System (BI-RADS) breast density task without adaptation (FIG. 15A), the binary density task (dense, BI-RADS C+D vs. non-dense, BI-RADS A+B) (FIG. 15B) without adaptation, the BI-RADS breast density task with adaptation by matrix calibration for 500 training samples (FIG. 15C), and the binary density task (dense vs. non-dense) (FIG. 15B) with adaptation by matrix calibration for 500 training samples. The numbers of test samples (exams) within each bin are shown in parentheses.

A high degree of agreement between the DL model and the original reporting radiologists was also observed for the Site 2 SM test set (744 subjects, 6192 images, mean age: 55.2, age range: 30-92) without adaptation (accuracy=76%, CI: [74%, 78%]; κw=0.72 CI: [0.70, 0.75]; as shown in Table 4). The BI-RADS breast density distribution predicted by the DL model (A: 5.7%, B: 48.8%, C: 36.4%, D: 9.1%) was more similar to the distribution found in the Site 1 datasets. The model may have learned a prior from the Site 1 FFDM dataset that may not be optimal for Site 2 where subject demographics are different. The predicted density distribution does not appear to be skewed towards low density estimates as seen for Site 1 (as shown in FIGS. 16A-16D). This may suggest some difference in the SM images or their interpretation between the two sites. Agreement for the binary density task was especially strong (accuracy=92%, CI: [91%, 93%]; κ=0.84, CI: [0.81, 0.87];

AUC=0.980, CI: [0.976, 0.986]). The excellent performance on the Site 2 dataset without adaptation demonstrates that the DL model may be successfully generalized across sites.

With adaptation by matrix calibration for 500 training samples, performance for the BI-RADS breast density task on the Site 2 SM dataset substantially improved (accuracy=80, CI: [78, 82]; κw=0.79, CI: [0.76, 0.81]). After adaptation, the predicted BI-RADS breast density distribution (A: 16.9%, B: 43.3%, C: 29.4%, D: 10.4%) was more similar to that of the radiologists (A: 15.3%, B: 42.2%, C: 30.2%, D: 12.3%). Adaptation may have helped adjust for the demographic distribution of breast density at this site. Less improvement was seen for the binary breast density task (accuracy=92, CI: [91, 94]; κ=0.84, CI: [0.82, 0.87]; AUC=0.983, CI: [0.978, 0.988]).

FIGS. 16A-16D show confusion matrices, evaluated on the Site 2 SM test set, for the Breast Imaging Reporting and Data System (BI-RADS) breast density task without adaptation (FIG. 16A), the binary density task (dense, BI-RADS C+D vs. non-dense, BI-RADS A+B) (FIG. 16B) without adaptation, the BI-RADS breast density task with adaptation by matrix calibration for 500 training samples (FIG. 16C), and the binary density task (dense vs. non-dense) (FIG. 16B) with adaptation by matrix calibration for 500 training samples. The numbers of test samples (exams) within each bin are shown in parentheses.

The relative performance of different adaptation methods may depend on the number of training samples available for the adaptation, with more training samples benefiting methods with more parameters. FIGS. 17A-17D show the impact of the amount of training data on the performance of the adaptation methods, as measured by macroAUC and linearly weighted Cohen's kappa, for the Site 1 dataset (FIGS. 17A-17B, respectively) and the Site 2 SM dataset (FIGS. 17C-17D, respectively). Results are reported across 10 random realizations of the training data for each dataset size (as described elsewhere herein) in order to investigate the uncertainty arising from the selection of the training data rather than from the limited size of the test set, as was done when computing the 95% confidence intervals. Each adaptation method has a range of number of samples where it offers the best performance, with the region corresponding to the number of parameters for the adaptation method (vector calibration: 4+4=8 parameters; matrix calibration: 4×4+4=20 parameters; fine-tuning: 512×4+4=2052 parameters). When the number of training samples is very small (e.g., less than 100 images), some adaptation methods negatively impacted performance. Even at the largest dataset sizes, the amount of training data was too limited for the Resnet-34 model trained from scratch on SM images to exceed the performance of the models adapted from FFDM.

FIGS. 17A-17D show the impact of the number of training samples in the target domain on the performance of the adapted model for the Site 1 synthetic 2D mammography (SM) test set, as measured by macroAUC (FIG. 17A) and linearly weighted Cohen's kappa (FIG. 17B), and for the Site 2 SM test set, as measured by macroAUC (FIG. 17C) and linearly weighted Cohen's kappa (FIG. 17D). Results are shown for vector and matrix calibration, and retraining the last fully-connected layer (fine-tuning). Error bars indicate the standard error of the mean computed over 10 random samplings of the training data. Performance prior to adaptation (none) and training from scratch are shown as references. For the Site 1 SM studies, the full-field digital mammography (FFDM) performance served as an additional reference. Note that each graph is shown with its own full dynamic range in order to facilitate comparison of the different adaptation methods for a given metric and dataset.

Discussion

Breast Imaging Reporting and Data System (BI-RADS) breast density may be an important indicator of breast cancer risk and radiologist sensitivity, but intra- and inter-reader variability may limit the effectiveness of this measure. Deep learning (DL) models for estimating breast density may be configured to reduce this variability while still providing accurate assessments. However, these DL models were demonstrated to be applicable to digital breast tomosynthesis (DBT) exams and able to be generalized across institutions, thereby indicating suitability as a useful clinical tool. To overcome the limited training data for DBT exams, a DL model was initially trained on a large set of full-field digital mammography (FFDM) images. When evaluated on a held-out test set of FFDM images, the model showed close agreement with the radiologists reported BI-RADS breast density ($\kappa w=0.75$, 95% confidence interval (CI): [0.74, 0.76]). The model was then evaluated on two datasets of synthetic 2D mammography (SM) images, which are generated as part of DBT exams. A high level of agreement was also seen for the SM dataset from the same institution as the FFDM data (Site 1: $\kappa w=0.71$, CI: [0.64, 0.78]) and for the SM dataset from another institution (Site 2: $\kappa w=0.72$, CI: [0.70, 0.75]). The strong performance of the DL model demonstrates that it may generalize to data from DBT exams and different institutions. Further adaptation of the model for the SM datasets led to some improvement for Site 1 ($\kappa w=0.72$, CI: [0.66, 0.79]) and a more substantial improvement for Site 2 ($\kappa w=0.79$, CI: [0.76, 0.81]).

When the assessments of the original reporting radiologists are accepted as the ground truth, the level of inter-reader variability among these radiologists has a large impact on the performance that can be achieved for a given dataset. For example, the performance obtained on the Site 2 SM dataset following adaptation was higher than that obtained on the FFDM dataset used to train the model. This is likely a result of limited inter-reader variability for the Site 2 SM dataset due to over 80% of the exams being read by only two readers.

In contrast with other approaches, the BI-RADS breast density DL model was evaluated on SM images from DBT exams and on data from multiple institutions. Further, as discussed above, the DL model, when evaluated on the FFDM images, demonstrated competitive performance as compared to other DL models and commercial breast density software ($\kappa w=0.75$, CI: [0.74, 0.76] vs. Lehman et al. 0.67, CI: [0.66, 0.68]; Volpara 0.57, CI: [0.55, 0.59], Quantra 0.46, CI: [0.44, 0.47]) [19, 3]. For each approach, results are reported on their respective test sets, analogously to how our own results are reported.

Other measures of breast density, such as volumetric breast density, may be estimated by automated software for 3D tomosynthesis volumes or projections from DBT exams. Thresholds can be chosen to translate these measures to BI-RADS breast density, but this may result in lower levels of agreement than direct estimation of BI-RADS breast density (e.g. $\kappa w=0.47$ for agreement between radiologist assessed BI-RADS breast density and that derived from volumetric breast density). Here, BI-RADS breast density is estimated from 2D SM images instead of the 3D tomosynthesis volumes, as this simplifies transfer learning from the FFDM images and mirrors the manner in which breast radiologists assess density.

In some cases, when a deep learning (DL) model is adapted to a new institution, adjustments may be made for differences in image content, subject demographics, or the interpreting radiologists across institutions. This last adjustment may result in a degree of inter-reader variability between the original and adapted DL models, though likely lower than the individual inter-reader variability if the model learns the consensus of each group of radiologists. As a result, the improved DL model performance observed following adaptation for the Site 2 SM dataset may be attributable to differences in subject demographics or radiologist assessment practices compared with the FFDM dataset. The weaker improvement for the Site 1 SM dataset may be attributable to similarities in these same factors. For the comparison of the domain adaptation techniques as a function of the number of training samples, better performance for training a DL model from scratch may be obtained by tuning the number of parameters in the model based at least in part on the number of training samples.

These results establish that the broad use of Breast Imaging Reporting and Data System (BI-RADS) breast density deep learning (DL) models holds great promise for improving clinical care. The success of the DL model without adaptation shows that the features learned by the model are largely applicable to both full-field digital mammography (FFDM) images and synthetic 2D mammography (SM) images from digital breast tomosynthesis (DBT) exams, as well as to different readers and institutions. Therefore, BI-RADS breast density DL models may be deployed to new sites and institutions without the additional effort of compiling large-scale datasets and training models from scratch. A BI-RADS breast density DL model that can generalize across sites and image types may be used to perform fast, low-cost, and more consistent estimates of breast density for women.

Example 6—Real-Time Radiology for Optimized Radiology Workflows

A machine learning-based classification system is developed to sort, prioritize, enrich, or otherwise modify radiology interpretation work (e.g., among a plurality of different workflows), based at least in part on an analysis of datasets comprising medical images of subjects. The sorting, prioritizing, enriching, or modifying of the cases for radiological assessment may be performed based at least in part on the medical image data (instead of only relying on metadata such as labels or annotation information, such as header or database elements, of the image data). For example, the medical image data may be processed by one or more image processing algorithms. The machine learning-based radiology system enables advanced radiology workflows that deliver faster and more accurate diagnoses, by allowing datasets of medical images to be stratified into different radiological assessments based at least in part on their suitability for such different assessments. For example, the plurality of different workflows may comprise radiological assessment by a plurality of different sets of radiologists. The radiologists may be on-site or remotely located relative to a clinic where the medical images of subjects are acquired.

In some embodiments, the machine learning-based classification system is configured to sort or prioritize radiology interpretation work among a plurality of different workflows, based at least in part on an analysis of datasets comprising medical images of subjects. For example, one set of datasets comprising medical images may be prioritized for radiological assessment over another set of datasets comprising medical images, based at least in part on the AI triage engine's determination that the first set of datasets has a higher priority or urgency than the second set of datasets.

In some embodiments, the real-time radiology system acquires medical images of a subject through a screening exam, using an AI-enabled triage workflow, and then uses AI to deliver the radiology results (e.g., a screening result and/or a diagnostic result) within minutes (e.g., within about 5 minutes, about 10 minutes, about 15 minutes, about 30 minutes, about 45 minutes, about 60 minutes, about 90 minutes, about 2 hours, about 3 hours, about 4 hours, about 5 hours, about 6 hours, about 7 hours, or about 8 hours) to a subject after acquiring the medical images.

In some embodiments, the real-time radiology system comprises a real-time notification system for interacting with clinical staff of AI-determined alert cases. The notification system is installed at various locations in a screening clinic (e.g., at clinical staff workstations). Users (e.g., physicians and clinical staff) are assigned to roles and receive distinct notifications for each role. The notifications are triggered when an emergency is determined by a trained algorithm for a subject's case. For example, the notifications may contain both advisory information as well as permit users to enter information which can affect the subject's clinical workflow in real-time during the visit. A physician (e.g., treating physician or radiologist) is notified via real-time alerts of these emergency cases as they arise, and uses information from the notification to provide a better diagnosis.

In some embodiments, the real-time radiology system comprises a subject mobile application (app) for sending notifications to subjects. The notifications may include the status of their screening/diagnostic visit, the radiological assessments performed on their medical images, presentations constructed from the radiological assessments, etc.

In some embodiments, the real-time radiology system comprises a database configured to acquire, obtain, and store for future retrieval datasets comprising medical images (e.g., radiological images), AI enrichment of datasets (e.g., medical images labeled, annotated, or processed by AI, such as via image processing algorithms), screening results, diagnostic results, and presentations of medical images and results. The real-time radiology system is configured to provide a service to subjects and their clinical care providers (e.g., radiologists and clinical staff) to retrieve, access, and view the contents of the database. The real-time radiology system service may support the construction of complex computational graphs from the stored datasets, including chaining together several AI models.

FIG. 18 shows an example of a schematic of a real-time radiology assessment workflow. The real-time radiology assessment workflow may comprise acquiring an image from a subject (e.g., via mammography). The image may be processed using systems and methods (e.g., including AI algorithms) of the present disclosure to detect that the image corresponds to a suspicious case. A clinician may be alerted that the subject is eligible for real-time radiology assessment. While the subject waits in the clinic, the image is directed to a radiologist for radiological assessment, and results of the radiological assessment are provided to the clinician for further review.

FIG. 19 shows another example of a schematic of a real-time radiology assessment workflow. Using systems and methods (e.g., including AI algorithms) of the present disclosure, images of subjects are retrieved from a PACS database and analyzed. If the AI analysis indicates that a given subject (e.g., subject) does not have a suspicious image, then a subject coordinator is notified, who then informs the subject that results will be received at home after a radiological assessment has been performed. If the AI analysis indicates that the subject has a suspicious image, then a technologist is notified, who then either (1) updates the subject history, and notifies a radiologist to perform a radiological assessment and provide results to a subject coordinator, or (2) notifies billing to process an out-of-pocket expense for a follow-up exam of the subject, and notifies the subject coordinator. The subject coordinator may share results with the subject and schedule follow-up appointments as needed.

In some embodiments, the real-time radiology assessment workflow comprises (i) directing an image or derivative thereof to a first radiologist among a first set of radiologists for radiological assessment to produce a screening result, based at least in part on whether the image is classified as suspicious; (ii) directing the image or derivative thereof to a second radiologist among a second set of radiologists for radiological assessment to produce a screening result, based at least in part on whether the image is classified as ambiguous; or (iii) directing the image or derivative thereof to a third radiologist among a third set of radiologists for radiological assessment to produce a screening result, based at least in part on whether the image is classified as normal.

In some embodiments, the real-time radiology assessment workflow comprises directing the image or derivative thereof to a first radiologist among a first set of radiologists for radiological assessment to produce a screening result, if the at least one image is classified as suspicious. In some embodiments, the real-time radiology assessment workflow comprises directing the image or derivative thereof to a second radiologist among a second set of radiologists for radiological assessment to produce a screening result, if the image is classified as ambiguous. In some embodiments, the real-time radiology assessment workflow comprises directing the image or derivative thereof to a third radiologist among a third set of radiologists for radiological assessment to produce a screening result, if the image is classified as normal.

In some embodiments, the screening result of the subject is produced at a same clinic visit as the obtaining of the image or derivative thereof. In some embodiments, the first set of radiologists is located at an on-site clinic (e.g., where the image or derivative thereof is obtained).

In some embodiments, the second set of radiologists comprises expert radiologists (e.g., who are trained to classify the image or derivative thereof as normal or suspicious at a greater accuracy than the trained algorithm). In some embodiments, the third set of radiologists is located remotely to an onsite clinic (e.g., where the image is obtained). In some embodiments, the third radiologist of the third set of radiologists performs the radiologist assessment of the image or derivative thereof among a batch comprising a plurality of images (e.g., where the batch is selected for enhanced efficiency of the radiological assessment).

In some embodiments, the real-time radiology assessment workflow comprises performing a diagnostic procedure of the subject, based at least in part on the screening result, to produce a diagnostic result of the subject. In some embodiments, the diagnostic result of the subject is produced at a same clinic visit as the obtaining of the image. In some embodiments, the diagnostic result of the subject is produced within about one hour of the obtaining of the image.

In some embodiments, the image or derivative thereof is directed to the first radiologist, the second radiologist, or the third radiologist based at least in part on additional characteristics of the location of the body of the subject. In some embodiments, the additional characteristics comprise an anatomy, tissue characteristics (e.g., tissue density or physical properties), a presence of a foreign object (e.g., implants), a type of finding, an appearance of disease (e.g., predicted by an algorithm such as a machine learning algorithm), or a combination thereof.

In some embodiments, the image or derivative thereof is directed to the first radiologist, the second radiologist, or the third radiologist based at least in part on additional characteristics of the first radiologist, the second radiologist, or the third radiologist (e.g., a personal ability of the first radiologist, the second radiologist, or the third radiologist to perform a radiological assessment of the at least one image or derivative thereof).

In some embodiments, the real-time radiology assessment workflow comprises generating an alert based at least in part on the directing of the image or derivative thereof to the first radiologist or the directing of the image or derivative thereof to the second radiologist. In some embodiments, the real-time radiology assessment workflow comprises transmitting the alert to the subject or to a clinical health care provider of the subject. In some embodiments, the real-time radiology assessment workflow comprises transmitting the alert to the subject through a subject mobile application. In some embodiments, the alert is generated in real time or substantially real time as (b).

In some embodiments, the real-time radiology system comprises an AI-powered teleradiology platform. The teleradiology platform comprises an AI-based radiology work distributor that routes cases for review by doctors in real time or substantially real time as the acquisition of medical images. The teleradiology platform may be configured to perform AI-based profiling of image types and doctors to assign each case to a doctor from among a plurality of doctors based at least in part on the suitability of the individual doctor at handling, assessing, or interpreting the datasets of the given case. The radiologists may belong to a network of radiologists, each having distinct sets of radiological skills, expertise, and experience. The teleradiology platform may assign cases to doctors based at least in part on searching the network for the doctor having the desired combination of skills, expertise, experience, and cost. The radiologists may be on-site or remotely located relative to a clinic where the medical images of subjects are acquired. In some embodiments, the expertise of a radiologist may be determined by comparing his or her performance to that of an AI model for various radiologist tasks on an evaluative set of data. The radiologists may be paid for performing the radiological assessment for each individual case that they accept and perform. In some embodiments, the real-time radiology system features dynamic pricing of radiology work based at least in part on AI-determined difficulty, urgency, and value of the radiology work (e.g., radiological assessment, interpretation, or review).

In some embodiments, the real-time radiology system is configured to organize, prioritize, or stratify a plurality of medical image cases into subgroups of medical image cases for radiological assessment, interpretation, or review. The stratification of medical image cases may be performed by an AI algorithm to improve human efficiency in evaluating the individual cases, based at least in part on the image characteristics of the individual medical image cases. For example, the algorithm may group visually similar or diagnostically similar cases together for human review, such as putting identifying cases with similar lesion types in located in a similar region of anatomy.

FIG. 20 shows an example of a schematic of an AI-assisted radiology assessment workflow in a teleradiology setting. Using systems and methods (e.g., including AI algorithms) of the present disclosure, images of subjects are retrieved from a PACS database and analyzed using AI algorithms to prioritize and rule out cases for radiological assessment (e.g., based at least in part on breast density and/or breast cancer risk of the subjects). The AI-assisted radiology assessment workflow may optimize routing of the cases for radiological assessment based at least in part on radiologist skill level. For example, a first radiologist may have an average read time of 45 seconds, an expertise level of expert, and a skill for assessing extremely dense breasts. As another example, a second radiologist may have an average read time of 401 seconds and an expertise level of novice. As another example, a third radiologist may have an average read time of 323 seconds and an expertise level of novice. As another example, a fourth radiologist may have an average read time of 145 seconds and an expertise level of novice. For example, a fifth radiologist may have an average read time of 60 seconds, an expertise level of expert, and a skill for assessing benign masses. The AI-assisted radiology assessment workflow may direct a given subject's case to a radiologist selected from among the first, second, third, fourth, or fifth radiologist, based at least in part on their average read time, expertise level, and/or skill level appropriate for the given subject's case.

In some embodiments, the AI-assisted radiology assessment workflow comprises (i) directing an image or derivative thereof to a first radiologist among a first set of radiologists for radiological assessment to produce a screening result, based at least in part on whether the image is classified as suspicious; (ii) directing the image or derivative thereof to a second radiologist among a second set of radiologists for radiological assessment to produce a screening result, based at least in part on whether the image is classified as ambiguous; or (iii) directing the image or derivative thereof to a third radiologist among a third set of radiologists for radiological assessment to produce a screening result, based at least in part on whether the image is classified as normal.

In some embodiments, the AI-assisted radiology assessment workflow comprises directing the image or derivative thereof to a first radiologist among a first set of radiologists for radiological assessment to produce a screening result, if the at least one image is classified as suspicious. In some embodiments, the AI-assisted radiology assessment workflow comprises directing the image or derivative thereof to a second radiologist among a second set of radiologists for radiological assessment to produce a screening result, if the image is classified as ambiguous. In some embodiments, the AI-assisted radiology assessment workflow comprises directing the image or derivative thereof to a third radiologist among a third set of radiologists for radiological assessment to produce a screening result, if the image is classified as normal.

In some embodiments, the screening result of the subject is produced at a same clinic visit as the obtaining of the image or derivative thereof. In some embodiments, the first set of radiologists is located at an on-site clinic (e.g., where the image or derivative thereof is obtained).

In some embodiments, the second set of radiologists comprises expert radiologists (e.g., who are trained to classify the image or derivative thereof as normal or suspicious at a greater accuracy than the trained algorithm). In some embodiments, the third set of radiologists is located remotely to an onsite clinic (e.g., where the image is obtained). In some embodiments, the third radiologist of the third set of radiologists performs the radiologist assessment of the image or derivative thereof among a batch comprising a plurality of images (e.g., where the batch is selected for enhanced efficiency of the radiological assessment).

In some embodiments, the AI-assisted radiology assessment workflow comprises performing a diagnostic procedure of the subject, based at least in part on the screening result, to produce a diagnostic result of the subject. In some embodiments, the diagnostic result of the subject is produced at a same clinic visit as the obtaining of the image. In some embodiments, the diagnostic result of the subject is produced within about one hour of the obtaining of the image.

In some embodiments, the image or derivative thereof is directed to the first radiologist, the second radiologist, or the third radiologist based at least in part on additional characteristics of the location of the body of the subject. In some embodiments, the additional characteristics comprise an anatomy, tissue characteristics (e.g., tissue density or physical properties), a presence of a foreign object (e.g., implants), a type of finding, an appearance of disease (e.g., predicted by an algorithm such as a machine learning algorithm), or a combination thereof.

In some embodiments, the image or derivative thereof is directed to the first radiologist, the second radiologist, or the third radiologist based at least in part on additional characteristics of the first radiologist, the second radiologist, or the third radiologist (e.g., a personal ability of the first radiologist, the second radiologist, or the third radiologist to perform a radiological assessment of the at least one image or derivative thereof).

In some embodiments, the AI-assisted radiology assessment workflow comprises generating an alert based at least in part on the directing of the image or derivative thereof to the first radiologist or the directing of the image or derivative thereof to the second radiologist. In some embodiments, the AI-assisted radiology assessment workflow comprises transmitting the alert to the subject or to a clinical health care provider of the subject. In some embodiments, the AI-assisted radiology assessment workflow comprises transmitting the alert to the subject through a subject mobile application. In some embodiments, the alert is generated in real time or substantially real time as (b).

Example 7—High-Sensitivity Expedited Screening

The present disclosure provides systems and methods for identifying radiological images (e.g., images from mammography exams) considered to be non-suspicious. Non-suspicious, in the context of interpreting mammography, may be defined as the absence of clinically significant and actionable findings indicative of breast cancer (e.g., mammogram) that may be considered as BI-RADS 1 or 2 by a radiologist during screening mammography in accordance with the BI-RADS 5th Edition. For example, the mammogram image may be free of any lesion, or the image may contain lesions which require no immediate follow-up. The disclosed method may be designed to have a low false negative rate (or equivalently, high sensitivity) so the exams labeled as non-suspicious are unlikely to contain evidence of breast cancer.

Systems of the present disclosure may use a machine learning algorithm designed using the mammography reporting standard defined in the BI-RADS 5th edition. The device may label exams as "non-suspicious" or leave them uncategorized otherwise. For "non-suspicious" exams, the system may generate or pre-populate a report with BI-RADS Assessment Category 1/2 and/or the estimated BI-RADS Breast Density Category. Additional report content may be populated by the disclosed system. The report may be configured to be reviewed manually by a radiologist or finalized automatically.

All exams not marked as non-suspicious may be considered uncategorized and may be reviewed according to the current standard of care. Exams that may be uncategorized may include exams with findings potentially indicative of breast cancer, as well as exams without breast cancer where the device may not confidently eliminate the possibility of breast cancer. Mammography exams of insufficient quality may be excluded by the device and also left uncategorized.

All exam results may be communicated to the subject and referring physician via a clinical workflow. The disclosed system may analyze "for presentation" images from two-dimensional (2D) full-field digital mammography systems or three-dimensional (3D) tomosynthesis systems. The system may be designed to identify exams that may be free of clinically significant and actionable findings.

Example 8—Expedited Screening Method

The present disclosure provides methods for processing at least one image of a location of a body of a subject.

The image of the location of the body of the subject may be a medical image. Medical images are described in more depth elsewhere herein.

The trained algorithm may be configured to identify whether a medical image is "non-suspicious" or "not non-suspicious" (i.e., uncategorized). An uncategorized mammogram image may still be unlikely to exhibit breast cancer. For example, even an image that meets BI-RADS 4 may have as low a probability of 2% for malignancy. The trained algorithm may be configured to classify the image as non-suspicious or uncategorized with an accuracy of at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, at least about 99%, or more than 99% for at least about 25, at least about 50, at least about 100, at least about 150, at least about 200, at least about 250, at least about 300, at least about 350, at least about 400, at least about 450, at least about 500, or more than about 500 independent samples. The trained algorithm may be a binary classifier. The trained algorithm may be a multi-class classifier (e.g., with 3, 4, 5, 6, 7, 8, 9, 10, or more than 10 classes).

Following classification, the images may be designated as uncategorized or non-suspicious, if there are two categories. An uncategorized image may be considered high-priority and may be provided to a radiologist for assessment. A non-suspicious image may indicate that only a routine screening is necessary. If there are more categories, the trained algorithm may be a multiclass classifier. For example, in some embodiments, the method includes an additional category, where some images are designated as requiring examination. In some embodiments, the method includes this third category and/or a fourth category of images that merit more immediate attention by a radiologist.

After designating the images as non-suspicious or uncategorized, the system may output an electronic report. The electronic report may include text with information regarding the designation of the images taken from the human subject, as well as other information described elsewhere herein.

The trained algorithm may be a high sensitivity algorithm. Ranges for the sensitivity of the algorithm are described elsewhere herein. Also, as described elsewhere herein, the trained algorithm may be adjusted or tuned by adjusting parameters of the trained algorithm (e.g., a set of cutoff values used to classify a dataset comprising medical images as described elsewhere herein, or parameters or weights of a neural network). For example, a threshold for determining whether to classify an image as non-suspicious may be set such that an output probability below 0.2 yields a non-suspicious image, and above 0.2 yields an uncategorized image. Because more images may be likely to be non-suspicious than uncategorized, many or even a majority of images may be classified as non-suspicious, even if the threshold is low. But with such a low threshold, it may be more likely that negative images are classified as uncategorized (and thus requiring attention by a radiologist) than positive images classified as non-suspicious. Thus, such a system may be relatively unlikely to yield false negatives, which may potentially enable breast cancer or another serious condition to go undiagnosed.

In an aspect, an additional method is disclosed for processing an image or images of body locations of a human subject. The method additionally comprises using a first trained algorithm to produce a natural language description of the image or images. The first trained algorithm may be a deep learning algorithm, comprising multiple layers of neural networks. The first trained algorithm may be an image captioning algorithm. The image captioning algorithm may use an attention-based model. The image captioning algorithm may include an object detection algorithm to identify visual features within the image and an object relation algorithm to describe relationships between the visual features. The object detection algorithm may be configured to identify various visual features of mammogram images. Although features visible to humans may be lesions, density variations, and tissue variations, the object detection algorithm may not be limited to detecting human-visible features. The object detection algorithm may detect human-visible features and/or features that are not visible or comprehensible to humans. The object relation algorithm may be a clustering algorithm, a deep relational network, a convolutional neural network, a neural network, an interaction network, or another type of algorithm.

The method may further comprise using a second trained algorithm to classify the at least one image or a derivative thereof among at least a first category and a second category, wherein the classifying comprises applying a high-sensitivity natural language understanding algorithm to the natural language description of at least the one image. The natural language understanding algorithm may process the human-readable natural language description to determine whether the images are non-suspicious or uncategorized. An understanding process may include some or all of the following operations: segmentation of the text into components, removal of unnecessary elements from the text, text vectorization and feature engineering, and interpreting the result. The natural language understanding model may be a summarization model or a topic modeling model. Additionally, the second trained machine learning algorithm may identify one or more characteristics of the imaging system used to capture the human body images. Such characteristics my include multi-view imaging, bi-lateral imaging, or period imaging.

Similar to in other embodiments, the second trained algorithm may be a binary classifier or a multiclass classifier. Upon classification of the images, the method may designate the images as being low-priority or high-priority. Upon designation, the method may generate an electronic report.

In some embodiments, non-suspicious or low-priority images may be presented to a different radiologist or group of radiologists than uncategorized or higher-priority images for further screening. In other embodiments, non-suspicious or low-priority images may be presented to the same radiologist or group of radiologists as are uncategorized or high-priority images, but may be presented at a different time. For example, low-priority images may be presented later than high-priority images, which may require more urgent attention. Or, low-priority images may be presented earlier than high-priority images, as they may require less of a radiologist's time to attend to.

FIG. 21 schematically illustrates an example of a system for providing an expedited radiological screening workflow. The system includes an image capture device 2130, a client device 2110, a network 2120, and a server 2200. In alternative embodiments, the system may include additional image capture devices, client devices, and/or servers.

The image capture device 2130 may be a device for producing images of a subject body (e.g., capturing x-ray images of breast tissue). The image capture device may produce two-dimensional (2D) or three-dimensional (3D) mammogram images. For example, the device may be a tomosynthesis device or may be a full-field digital mammography device (FFDM). Alternatively, the image capture device may be a conventional film mammogram. In the latter case, film mammogram images may be captured by a digital camera or scanner and uploaded for viewing and/or processing by client and/or server devices. In some embodiments, the image capture device 2130 may provide photon-counting mammography or galactography.

The client device 2110 may enable a radiologist or other system user to interact with resources on the server. For example, the client device may enable the radiologist to configure one or more algorithmic parameters, view one or more screening images, or access generated reports. The client device may be a computing device, such as a desktop computer, laptop computer, mainframe computer, super-computer, computer terminal, cellular phone, smartphone, tablet computer, personal digital assistant (PDA), smart watch, or another type of computer. The client may use a web browser to access server resources from the Internet, or from another network.

The server 2200 may be a computing device that provides multiple screening functions within the expedited radiological screening system. For example, the server 2200 may store, handle, and process images taken by the image capture device 2130. The client device may comprise a computing device, such as a desktop computer, laptop computer, mainframe computer, supercomputer, computer terminal, cellular phone, smartphone, tablet computer, personal digital assistant (PDA), smart watch, or another type of computer. The server may exist on one or more computing machines. The server may comprise a cloud server.

The network 2120 may enable the client device 2110, the image capture device 2130, and the server 2200 to exchange digital information with one another. The network 2120 may enable the other devices in the system 2100 to be fully connected. The network 2120 may comprise an Internet network, a local area network (LAN), a wide area network (WAN), a Wi-Fi network, or another type of network.

FIG. 22 schematically illustrates an example of a server 2200. The server 2200 may include up to three modular functions: image storage function 2210, image handling function 2220, and/or image processing function 2230. In other embodiments, the server may include additional modular functions.

The image storage function 2210 may persist medical images to the filesystem and notify the image handling function 2220 that a new image has arrived. The image storage function may receive the images from a server or from another image provider. The image storage function 2210 may store the images in memory such as ROM, RAM, EEPROM, flash memory, or other memory technology.

The image handling function 2220 may receive new mammography images, may forward them to the image processing function 2230 for processing, and may forward outputs from the image processing function to the client device 2110 or to another device for generating reports or for further processing. The image handling function 2220 may log and persist data associated with the images it handles.

The image processing function 2230 may use one or more machine learning algorithms to process one or more mammogram images. The image processing function 2230 may produce one or more inferences relating to an image and may aggregate inferences from a plurality of images to produce an examination report. The image processing function may produce outputs associated with a BI-RADS Assessment and/or a BI-RADS Breast Density Assessment. With respect to the former, the image processing function may label non-suspicious breast images with BI-RADS Category 1/2. All other BI-RADS categories may be considered to be "uncategorized" by the image processing function 2230. If the image processing function 2230 categorizes the images as Category 1/2, the Breast Density Assessment may associate the image with one of four BI-RADS categories, including a) the breasts are almost entirely fatty, 2) there are scattered areas of fibroglandular density, 3) the breasts are heterogeneously dense, which may obscure small masses, or 4) the breasts are extremely dense, which lowers the sensitivity of mammography.

The image processing function may be implemented with hardware including general-purpose computers, graphical processing units (GPUs), application-specific integrated circuits (ASICs) and field-programmable gate arrays (FPGAs).

FIG. 23 shows an example of a process 2300 for generating an electronic assessment describing whether a mammogram is high-priority or low-priority for analysis by a radiologist or other professional.

In a first operation 2310, the system may obtain at least one image of a body location. The image may be a digital image or a digital scan of a film mammogram image. At least one image may be a two-dimensional mammogram image from an FFDM, or a three dimensional mammogram image. In some embodiments, the system may obtain a plurality of images from the same source. In other embodiments, the system may obtain a plurality of images from different sources.

In a second operation 2320, the system may use a trained algorithm to classify the at least one image. The trained algorithm may be a binary classification algorithm configured to provide one or more probability values to the images. For example, the probability value may be a number between 0 and 1. The classifier may also be a multiclass classifier. For example, in some embodiments, some image may be non-suspicious images, some may merit placement in a queue for analysis by a radiologist, and others may be selected for immediate analysis by a radiologist. The trained algorithm may be configured to achieve high sensitivity. In such a situation, many images that may end up being negative for breast cancer, or even do not show markers that may indicate a need for concern, may be considered "positive" (uncategorized) and later given a priority designation.

In a third operation 2330, the system may provide a priority designation for the at least one image. The priority designation may indicate whether the at least one image is non-suspicious (low-priority) or if the image is to be labeled as "uncategorized"—meriting further examination by a radiologist (high priority), based at least in part on the output of the trained algorithm.

In a fourth operation 2340, the system generates an electronic assessment based at least in part on the designation. The electronic assessment may include at least a recommendation as to whether the screening merits further analysis (if labeled "uncategorized"), or whether only a routine exam is necessary (if labeled "non-suspicious).

FIG. 24 illustrates an example of an alternative process 2400 for generating the electronic assessment, using a natural language description of mammogram images.

In a first operation 2410, the system may obtain at least one image of a body location.

In a second operation 2420, the system may use a first trained algorithm to generate a natural language description for the image or images. The system may generate the natural language description algorithmically, by recognizing visual features in the images and determining relationships between them. The system may train the algorithm using a combination of images and corresponding natural language descriptions of the images to be able to assign particular natural language descriptions to particular images. The system may use algorithms such as classification trees, neural networks (e.g., convolutional neural networks), and clustering algorithms (e.g., k-means clustering) to identify and relate visual features.

In a third operation 2430, the system may use a second trained algorithm to process at least the natural language description. The second trained algorithm may include one or more natural language understanding (NLU) algorithms or processes. For example, a trained algorithm may create a summary or perform other semantic analysis of the natural language description to serve as an input to a classifier. The trained algorithm may accept the natural language description or derivative thereof as an input along with the at least one image itself or derivatives thereof.

In a fourth operation 2440, the system may provide a priority designation for the image. As in FIG. 23, the priority designation may be a high-priority designation or a low-priority designation.

In a fifth operation 2450, the system may generate an electronic assessment based at least in part on the designation.

FIG. 25 illustrates an example of a block diagram 2500 for the expedited screening system. In the embodiment 2500, the system 2100 (e.g., by the server modules) may process one or more mammogram images to determine whether to schedule a routine exam or provide the images to a radiologist for further analysis.

FIG. 26 illustrates an example of a block diagram 2600 for the expedited screening system. In the embodiment 2600, as with embodiment 2500, a classifier may predict whether an exam is non-suspicious or should be provided to a radiologist for further analysis. But a small proportion of examinations may be predicted to require an immediate diagnostic exam.

FIG. 27 illustrates an example of a block diagram 2700 for the expedited screening system. In the embodiment 2700, the system produces a human-readable description from the mammogram images. Then the classifier may predict, based in part on the human-readable description, whether the exam is non-suspicious, whether the exam requires an immediate diagnostic exam, or whether the exam should be sent to the queue for a radiologist.

FIG. 28 illustrates an example of a preliminary report 2800 showing an assessment result for a subject. The preliminary report shows that the subject's exam is marked as "non-suspicious," not requiring further escalation to a radiologist. The preliminary report may indicate subject information such as a medical record number, a date of birth, and the date at which the analysis took place. The percentages indicate probabilities that the exam is categorized into each of four density classes A, B, C, and D. In the report 2800, the subject has an 86% chance of falling into density class A.

FIG. 29 illustrates a comprehensive report 2900 of an assessment result for a subject. The report 2900 shows the type of examination, the conditions of the breasts, whether there were suspicious findings, and/or whether there is any malignancy.

FIG. 30 illustrates a flow diagram 3000 for an example full screening process of a subject with a medical condition, based at least in part on obtained medical images from the subject. The full screening process includes the high-sensitivity method disclosed herein. First, the screening process determines whether the medical images are considered non-suspicious or uncategorized. If uncategorized, a radiologist may analyze the images and recommend a diagnostic exam. If so, the radiologist or another radiologist may conduct the diagnostic exam. Based at least in part on the results of the diagnostic exam, the radiologist may recommend a pathologist assessment. The pathologist assessment may yield a finding of breast cancer, for which a radiologist may prescribe treatment. After either of the radiologist assessments or the pathologist assessment, if medical personnel determine further investigation is not necessary, the screening process may provide a negative diagnosis and recommend follow-up care. If the high-sensitivity method determines the image is non-suspicious, the screening process may recommend routine screening, which may also yield a negative diagnosis.

Example 9—User Interface for AI-Assisted Radiological Workflow

Using systems and methods of the present disclosure, an AI-assisted radiological workflow is established for ruling out non-suspicious screening mammography exams. The AI engine performs machine learning inference on mammography images and returns the results to an application programming interface (API) service. It runs algorithms on images received by the API service and returns their results. Once an exam's images have been analyzed by the device, it aggregates the image-level inference results and returns an aggregated exam-level result. This result is used by the API service when generating device outputs.

A web interface provides a graphical user interface for users to input patient history information to apply the device's inclusion/exclusion criteria, the input worklist. It also provides an interface, the radiologist exam list, for viewing the outputs of exams processed by the device in environments where integration into the PACS, MIS, RIS, or Dictation System may not be practical.

DICOM images of radiological scans are uploaded into the device via a DICOM transfer. The device analyzes images acquired from compatible mammography systems (e.g., Hologic Selenia or Hologic Selenia Dimensions mammography systems).

The exams analyzed by the AI-assisted radiological workflow must satisfy a set of inclusion and exclusion criteria that validate if an exam can be analyzed by the device. Data for satisfying the criteria is extracted from image metadata and a data source containing patient history information. Patient history information can be retrieved from the RIS, MIS or the input worklist. If provided via the input worklist, an authorized user, such as a technologist, provides the necessary information.

The patient history information is required to determine if an exam satisfies the exclusion criteria for: breast implant or other implanted objects such as pacemakers, prior history of breast cancer, and patient history of breast surgery (e.g., lumpectomy). If the necessary data for determining whether an exam satisfies the inclusion and exclusion criteria is unavailable, the exam is labeled as Uncategorized.

The AI-assisted radiological workflow classifies exams as Non-Suspicious or Uncategorized. It computes a probability that an exam contains evidence of breast cancer. If the probability falls below a predetermined near-zero threshold, then the exam is labeled as Non-Suspicious. When the AI-assisted radiological workflow identifies an exam as Non-Suspicious, a BI-RADS Assessment Category 1 is generated and populated into the report by the device. The AI-assisted radiological workflow considers Non-Suspicious exams as having no evidence of malignancy with no specific benign findings described in the report, consistent with the BI-RADS Atlas 5th Edition definition of BI-RADS Assessment Category 1. These cases are intended to be subject to a lower priority review or entirely automated.

For all other cases, the AI-assisted radiological workflow classifies exams as Uncategorized. Exams can be Uncategorized by the AI-assisted radiological workflow for a number of reasons, including but not limited to: the exam's predicted probability of breast cancer was above the predetermined threshold, the images in the exam are not suitable for processing due to image quality or dissimilarity to training data issues, or the exam did not pass the inclusion/exclusion criteria. These cases are intended to be reviewed by a group of radiologists with a greater priority than Non-Suspicious cases.

For breast density classification, the AI-assisted radiological workflow assesses the BI-RADS Breast Density Category, computing the probabilities that an exam belongs to each of the four breast composition categories. The predicted breast density corresponds to the category with the highest predicted probability. The AI-assisted radiological workflow produces a categorical breast density assessment in accordance with the BI-RADS Atlas 5th Edition breast density categories, which are as below: (A) the breasts are almost entirely fatty; (B) the breasts have scattered areas of fibroglandular density; (C) the breasts are heterogeneously dense, which may obscure small masses; or (D) the breasts are extremely dense, which lowers the sensitivity of mammography.

The device outputs are communicated to the radiologist through the worklist labels. If the device outputs a breast density categorization of D, or extremely dense breasts, authorized users may configure an option to automatically populate a recommendation for a dense breast ultrasound in the radiology report.

The AI-assisted radiological workflow computes a probability that an exam contains breast cancer and generates a Case Score for each exam. The Case Score represents the confidence with which the algorithm assesses the likelihood of malignancy. The Case Score is an exam-level score assigned to each exam that is processed. The Case Score is a decimal number in the range [0, 10.0] and Non-Suspicious cases have scores in the range [0, 1.0].

The AI-assisted radiological workflow includes various aspects of a user interface. Intended users for the AI-assisted radiological workflow include the radiologist and authorized users in the radiology practice. The authorized user may interact with the user interface before the screening exam and the radiologist afterwards, when reviewing exams. The authorized user can be a technologist, a front-desk staff member, or another employee handling patient intake for a radiology practice.

The authorized user interfaces with the AI-assisted radiological workflow as follows. First, the authorized user can fill in patient history information in the input worklist, prior to performing a mammography exam, where this data is used by the AI-assisted radiological workflow when determining if an exam satisfies the inclusion/exclusion criteria of the device. Second, the authorized user can flag a case (e.g., marking it red) when the authorized user recognizes erroneous/incomplete input patient information, where the flag alerts the radiologist to correct these cases especially if they have already been auto-finalized by the AI-assisted radiological workflow. In this case, the radiologist may need to revise or amend a report previously finalized by the software.

The radiologist interfaces with the AI-assisted radiological workflow as follows. First, the radiologist can select a mammography exam for review from the RIS/PACS Worklist or the Radiologist Exam List. Each worklist is populated with a Non-Suspicious label for exams the device determines as non-suspicious for breast cancer as well as a Case Score for all exams. This allows radiologists to triage and focus on different classes of mammography exams. For Uncategorized exams or Non-Suspicious exams when auto-finalization is disabled, the radiologist can review the exam with the help of output information from the DICOM Secondary Capture Image in their PACS viewer and a pre-generated report in their reporting/dictation software. The radiologist either accepts the AI-assisted radiological workflow's assessment and finalizes the report as-is or updates the report with their assessment. Third, the radiologist can configure user settings to: populate a radiologist's report with the device's output, allowing the radiologist to modify the verbiage used; and/or set the report auto-finalization features for mammography exams labeled Non-Suspicious. Exams can be automatically finalized by the AI-assisted radiological workflow after a configurable grace period, in which the radiologist has a window to intervene and review cases. A subset of exams may also be configured to be auto-finalized, such as Non-Suspicious cases determined to have a non-dense breast density. Authorized users can also input or revise patient history information during this grace period. Note, in this configuration the radiologist may not see exams auto-finalized by the device in their RIS/PACS Worklist or reporting software, and may instead only see Uncategorized exams that require their review.

FIG. 31 shows a workflow diagram for the authorized user and radiologist for an Uncategorized exam or a Non-Suspicious exam where auto-finalization is not enabled. This diagram illustrates the different touchpoints for the radiologist and authorized user for an uncategorized exam. Uncategorized exams cannot be auto-finalized by the device and must be reviewed by a radiologist.

FIG. 32 shows a workflow diagram for the authorized user and radiologist for a Non-Suspicious exam that is automatically finalized by the AI-assisted radiological workflow. This diagram illustrates the touchpoints for the authorized user for a Non-Suspicious exam when auto-finalization has been enabled and the grace period expires without radiologist intervention. The radiologist has no touchpoints in this workflow.

The AI-assisted radiological workflow comprises an input worklist that allows authorized users to view information about upcoming patients and input necessary patient history information relevant to the rule-out workflow's exclusion criteria that cannot be retrieved from electronic storage systems such as RIS. This information includes: whether the patient has a history of breast surgery; whether the patient has a history of breast cancer; and/or whether the patient has implanted objects (e.g. breast implants, pacemaker, etc.).

If the authorized user entered incomplete or incorrect patient history information, and the exam has been finalized by the AI-assisted radiological workflow, they can select the exam and flag it for radiologist review and correction. The worklist can be sorted and searched by patient name, date of birth, medical record number and other fields.

FIG. 33 shows a user view of an input worklist of the AI-assisted radiological workflow. Authorized users input patient information related to exclusion criteria by clicking on an exam and using the expanded form (bottom). If an exam has already been automatically finalized by the AI-assisted radiological workflow and the user needs to correct patient exclusion information, then the user can input the information in the expanded form but then must flag the radiologist to correct the case (middle). Such flagged cases are highlighted in red and labeled appropriately (top).

The AI-assisted radiological workflow may use a radiologist exam list as an alternative to a radiologist's RIS/PACS Worklist for reviewing patient exams. It provides authorized users with a standalone worklist, which includes a list of exams that have been processed by the AI-assisted radiological workflow and the predicted labels for those exams. This may be used in addition to the information integrated into the RIS/PACS patient worklist or as an alternative in settings where integration with the patient worklist is technically infeasible. The list can be filtered to show only exams that have been labeled as Non-Suspicious or Uncategorized. The worklist also allows users to search for specific cases using the predicted breast density level, and other patient and exam details.

FIG. 34A shows a user view of a radiologist exam list of the AI-assisted radiological workflow, where only Non-Suspicious exams are being seen due to an applied filter.

If an authorized user has flagged an exam for radiologist review and correction, the exam list has a separate section highlighting flagged cases in red which cannot be hidden by filters or searches. These are typically cases that should have been excluded from processing by the AI-assisted radiological workflow, but were not due to the authorized user not entering patient information within the auto-finalization grace period (when enabled). Thus the results from the software may not be trustworthy for these cases. The radiologist reviews these cases and correct any reports that have been generated by the AI-assisted radiological workflow.

FIG. 34B shows a user view of a radiologist exam list of the AI-assisted radiological workflow, with flagged cases where a filter to include Uncategorized exams has been applied. Flagged cases are always visible regardless of filters or searches.

The settings page allows radiologists to configure the format of pre-populated and auto-finalized radiology reports and whether exams categorized as Non-Suspicious are finalized autonomously by the device. Radiologists can configure one or more of the following options. For example, an option may enable or disable the auto-finalization feature. As another example, an option may set the timing for the grace period or length of time prior to the auto-finalized report being sent to RIS (e.g., if this is set to 0 (zero seconds), exam outputs are generated automatically without a grace period, and authorized users see outcomes for these exams in real-time). As another example, an option may determine the verbiage or wording in the pre-generated report, which includes values for the findings, impression, breast density level, and recommendation fields. As another example, an option may determine the subset of cases that shall be auto-finalized based on their breast density level.

FIG. 35 shows a user view of a radiologist configuration panel for the AI-assisted radiological workflow, which occurs on a page within the Radiologist Exam List.

FIG. 36 shows a diagram illustrating the workflow for report generation and review with the AI-assisted radiological workflow, including when an exam is automated or manually reviewed by the radiologist for different exam classifications.

FIG. 37A shows an example of an output generated by the AI-assisted radiological workflow for a Non-Suspicious case, which indicates the label for the exam, the Case Score, the predicted breast density, and the unique exam ID.

FIG. 37B shows an example of an output scorecard generated by the AI-assisted radiological workflow for an Uncategorized exam, where the exam passed all the inclusion/exclusion criteria, which indicates the label for the exam, the Case Score, as well as the predicted breast density.

The AI-assisted radiological workflow can be configured to output its exam labels to the practice's existing RIS/PACS patient worklist. When the AI-assisted radiological workflow is not configured to finalize reports, exams that are identified as non-suspicious are labeled as "Non-Suspicious". When the AI-assisted radiological workflow is configured to automatically finalize reports, exams that are identified as non-suspicious are labeled as "<mm-dd-yyyy hh:mm AM/PM> Non-Suspicious". This indicates the date and time when the grace period expires. No label is given to exams that are Uncategorized.

For Non-Suspicious exams, a radiology report is generated by the AI-assisted radiological workflow with a BI-RADS Assessment Category, BI-RADS Breast Density Category, and additional exam metadata. The AI-assisted radiological workflow can be configured to only pre-populate the report for the radiologist to review or to finalize the exam automatically after a configurable grace period. A Non-Suspicious report from the AI-assisted radiological workflow contains the following elements: indications, comparisons, findings, recommendation, BI-RADS Assessment Category 1, and BI-RADS Breast Density Category FIG. 38A shows an example radiology report for an automated case, in which a Non-Suspicious exam is generated and finalized by the AI-assisted radiological workflow.

FIG. 38B shows an example radiology report for an assistive-use case, in which a Non-Suspicious exam report was pre-generated by the AI-assisted radiological workflow and reviewed by a radiologist in Nuance PowerScribe 360 radiology voice recognition software.

Example 10—Pre-Processing Check

Using systems and methods of the present disclosure, an AI-assisted radiological workflow is established for ruling out non-suspicious screening mammography exams. Such a system may have potential harm that occurs when the workflow labels as Non-Suspicious a cancer exam that would have been recalled by a radiologist (e.g., false negative (FN) cases). Since some cancers missed by radiologists may be mammographically occult (or true interval cancers), which indicates that neither radiologists nor AI-assisted radiological workflows can detect these findings, a safety metric of the AI-assisted radiological workflow may be quantified by the fraction of cancer exams with non-occult findings labeled as Uncategorized (e.g. not negative) by the AI-assisted radiological workflow, which may be referred to as the adjusted sensitivity. It may be established that the AI-assisted radiological workflow is unlikely to label cancer exams with detectable findings as Non-Suspicious (e.g., that the AI-assisted radiological workflow has high adjusted sensitivity).

To further ensure the safety of the AI-assisted radiological workflow, a pre-processing check may be performed to determine whether an exam can be reliably interpreted by the AI-assisted radiological workflow (e.g., to "rule out" cases).

There are several potential reasons why an exam may be unable to be interpreted by the AI-assisted radiological workflow. For example, one or more of the images may be determined to be of insufficient image quality (e.g., improper patient positioning, or motion blur). As another example, the properties of the exam may not conform to the inclusion/exclusion criteria for the device (e.g., unsupported vendor). As another example, the appearance of one or more of the images may differ significantly from those found in the training data for the malignancy model (e.g., out-of-distribution detection).

This pre-processing check includes determination of whether the images in the exam are of diagnostic image quality (e.g., with proper patient positioning and without motion blur). Exams that cannot be reliably interpreted by the AI-assisted radiological workflow (e.g., to "rule out" cases), due to issues such as image quality or other reasons such as being outside of the training data distribution, are labeled as uncategorized. To evaluate this aspect of the AI-assisted radiological workflow, some exams for which a technical repeat was recommended by the original reporting radiologists are included at a representative rate given the underlying data sources.

Exams that cannot be interpreted by the AI-assisted radiological workflow are labeled as uncategorized (AI positive) and sent to a radiologist for further review. Second, exams that pass this check are sent to an AI malignancy model, which produces a suspicion score, based on the presence or absence of findings potentially indicative of breast cancer. This score is compared to a threshold, or operating point, selected to ensure a low false negative rate. Exams where this score is less than a predetermined threshold are considered non-suspicious (AI negative). Exams where this score is greater than or equal to the threshold are considered uncategorized (AI positive). Thus, an exam can be labeled as AI positive either because the exam cannot be interpreted by the AI-assisted radiological workflow (e.g., due to insufficient image quality) or because the possibility of the presence of a malignant finding could not be eliminated. Conversely, an exam is labeled as AI negative only if it is thought to be of sufficient image quality (and meets all other characteristics for AI interpretation, such as inclusion/exclusion criteria) and the model is confident that there is no evidence of malignancy.

Performance metrics of the AI-assisted radiological workflow are evaluated on a large set of thousands of full-field digital mammography (FFDM) or tomosynthesis exams, including cancer exams and non-cancer exams. Ground truth for cancer exams are established by selecting screening exams that have a malignant biopsy within 12 months (365 days) following the exam. Ground truth for non-cancer exams are established by selecting screening exams that have either a negative biopsy within 12 months following the exam or at least 2 years (730 days) of negative imaging follow-up (at least one mammogram following 24 months and all mammograms up to and including that exam have negative assessments/biopsies or subsequent follow-up with a negative assessment/biopsy).

Cancer exams with negative assessments from the original reporting radiologist (radiologist false negative exams) are reviewed by three expert readers (along with a mix of radiologist true positive exams and non-cancer exams) in order to determine the detectability of the malignant findings on the screening mammograms. The finding will be said to be detectable (non-occult) if it is identified and localized by at least one reader during this ground truthing process, and occult if it cannot be identified by any reader.

A primary endpoint is the adjusted sensitivity of the AI-assisted radiological workflow for identifying screening mammography exams that have biopsy-proven, non-occult malignant findings within 12 months of the exam. The sensitivity, the specificity for identifying negative or benign screening exams, the reduction of non-cancer screening exams where the assessments of the original reporting radiologists were positive, and the area under the receiver operating characteristic curve (AUC) are assessed as secondary endpoints. Performance is stratified by race/ethnicity, breast density, finding type, compressed breast thickness, patient age, scanner model, and data site.

Sensitivity is defined as a fraction of the number of cancer cases that are AI-positive, and adjusted sensitivity is defined as a fraction of the number of non-occult cancer cases that are AI-positive, where non-occult cancer exams include cancer exams that either were detected by the original reporting radiologist or were a radiologist false negative found to be detectable by a radiologist during the ground truthing process.

Example 11—Machine Learning Algorithms

Using systems and methods of the present disclosure, an AI-assisted radiological workflow is established for ruling out non-suspicious screening mammography exams.

The AI-assisted radiological workflow technology uses a machine learning algorithm that is trained to process radiological images obtained via a screening mammogram of a subject to determine or predict the presence of cancer (e.g., breast cancer). The AI-assisted radiological workflow may comprise performing a breast density assessment.

The AI-assisted radiological workflow comprises improved technology for the detection of cancer in screening mammograms, which enables cancer to be ruled out in certain cases with high performance. The AI for the AI-assisted radiological workflow is developed in accordance with FDA Good Machine Learning Practice (as described by, for example, "Good Machine Learning Practice for Medical Device Development: Guiding Principles," FDA and Health Canada, October 2021, which is incorporated by reference herein).

The mammography screening algorithm receives as input data radiological images, including the four standard screening mammography views, and the subject's demographic data (e.g., age). The algorithm determines two outputs or predictions: a likelihood (e.g., probability) that the subject has cancer; and a binary value that is indicative of whether the subject has breast cancer (e.g., by using a binary value of 0 to denote non-suspicious cases in which the algorithm has not detected findings indicative of breast cancer, or 1 otherwise). The binary value is calculated by applying a pre-determined cancer rule-out threshold to the probability of cancer.

The predictive machine learning algorithm for cancer rule-out is developed via several key aspects, including the data used to train the machine learning algorithm, the architecture of the machine learning model, and the model pre-processing and training methodology (e.g., including determining the cancer rule-out threshold at completion of the model training phase).

The model architecture is designed to enable high performance and generalization for the cancer prediction model. To this end, the machine learning system comprises a combination of 22 deep learning models, each executed over every image in the mammogram and each specialized in a different task. The outputs of these 22 deep learning models from all images in a mammogram are aggregated to the subject's age to form an exam feature vector. The exam feature vector is then processed as input data using a final machine learning model that produces the exam-level probability of cancer.

Mammography exams were gathered from two institutions from the U.S. and U.K.: Washington University in St. Louis (WUSTL) and The National Health Service OPTIMAM database (OPTIMAM).

After applying a set of inclusion and exclusion criteria, a total of 162,466 exams from these two datasets were utilized to develop and internally test the model.

As shown in Table 5, the WUSTL and OPTIMAM data sets were split into training, internal validation, and internal testing data sets with a split of 80%, 10%, 10% at patient level, respectively. The training data set was utilized to learn the model weights. The validation data set was utilized to search for optimal model architectural variants (hyperparameters) and for the selection of the cancer rule-out algorithm's operating threshold. The test dataset was utilized to internally evaluate the model performance.

TABLE 5

Data source sites and attributes (number of exams used in training and internal testing).

| Site | Training and internal validation non-cancer | Training and internal validation cancer | Internal testing non-cancer | Internal testing cancer |
|---|---|---|---|---|
| WUSTL | 128,428 | 3,573 | 11,491 | 101 |
| OPTIMAM | 11,791 | 5,205 | 1,282 | 595 |

BI-RADS and pathology reports were used to determine the exam labels for model development and internal testing. Cancer cases included all mammography exams followed by a biopsy-ascertained cancer diagnosis within 12 or 24 months of the exam for the U.S. and U.K. datasets, respectively. In compliance with HIPAA standards, all protected health information (PHI) was removed from the data prior to the development of the dataset.

For the WUSTL data, a total of 915,334 screening and diagnostic exams from 94,656 patients acquired from 2008 to 2017 were obtained. The exams were interpreted by one of 11 radiologists with subspecialty breast imaging experience ranging from 2 to 30 years.

A subset of 143,593 FFDM exams from 38,451 patients were selected from the total number of exams based on the set of inclusion and exclusion criteria. Among the exams, 117,844 were screening exams from 38,451 patients. Among the screening exams, 1,057 (0.9%) were cancer-positive confirmed by biopsy. In addition to the screening exams, 25,749 diagnostic exams from 15,066 patients were available to augment training. These diagnostic exams were gathered such that all images had radiologists-provided image-level annotations localizing findings of interest. These diagnostic exams added an additional 2,555 exams that were cancer positive confirmed by biopsy, resulting in a total of 3,612 cancer-positive exams confirmed by biopsy.

A total of 18,873 screening exams from 15,025 patients were obtained from the UK's NHS Health Research Authority's OPTIMAM data set (OPTIMAM). This dataset was gathered by the NHS Breast Screening Programme from three different site locations. The imaging data and follow-up results were originally acquired between 2011 and 2015. Among the exams, 5,800 (30.7%) were cancer-positive confirmed by biopsy or interval cancer. These data were selected based on the same inclusion/exclusion with the exception of the BI-RADS assessment inclusion criterion, as the UK screening system does not use the BI-RADS lexicon.

The information available from the radiology and pathology reports was combined to assign labels to the mammograms for model training. The labels were assigned to exams, breasts, and images to enable model training and internal testing. First, labels were assigned to breasts using the rules specified in the table below. As BI-RADS is not used in the UK, the UK 5-point breast imaging classification was translated to proxy BI-RADS assessments (e.g., as described by Taylor et al., "Quantification of the UK 5-point breast imaging classification and mapping to BI-RADS to facilitate comparison with international literature", Br. J Radiol. 84 (1007): 1005-1010, 2011, which is incorporated by reference herein). Various definitions of dataset labels are shown in Table 6.

TABLE 6

Definitions of dataset labels.

| Label | Symbol | Definition |
|---|---|---|
| Negative | N | BI-RADS 1 with 2 years (730 days) of followup (BI-RADS 1 or 2) and no subsequent biopsy |
| Screening benign | S | BI-RADS 2 with 2 years (730 days) of followup (BI-RADS 1 or 2) and no subsequent biopsy |
| Diagnostic benign | D | BI-RADS 0 or 3 followed by a negative diagnostic assessment (BI-RADS 1, 2, 0, or 3) with 2 years of followup and no subsequent biopsy |
| Pathology benign | P | Benign pathology within 12 months (365 days) of the exam for the US dataset and 24 months (730 days) for the UK dataset |
| High risk | H | Non-upstaged high-risk pathology within 12 months (365 days) of the exam for the US dataset and 24 months (730 days) for the UK dataset |
| Malignant | M | BI-RADS 6 or Malignant pathology within 12 months (365 days) of the exam for the US dataset and 24 months (730 days) for the UK dataset |
| Interval cancer | I | BI-RADS 1 or 2 with malignant pathology within 12 months (365 days) for the US dataset and 24 months (730 days) for the UK dataset, and prior to the subsequent screening exam |
| Unknown | U | Not satisfying any of the outlined conditions |

The labels were propagated (i) to exam level by selecting the highest priority outcome from the two breasts from N (lowest priority), S, D, U, P, H, I, to M (highest priority) and (ii) to image level by copying the breast level label. Unknown (U) exams were excluded from training and the retrospective evaluation.

Some of the deep learning models (as described below, the algorithm combines multiple deep learning models) required training on localized findings within an image. Localized findings were marked with bounding box annotations provided by radiologists.

All model development was performed using the training and internal validation data sets. The training data set was utilized to learn the model weights. The validation data set was utilized to search for optimal model architectural variants (hyperparameters) and for the selection of the cancer rule-out operating threshold. Evaluation on the internal held out test set was only conducted after the model completed development to estimate the model performance.

The training data breakdown was as follows. The WUSTL data set was split at the patient level, such that 80% of patients were used for training, 10% for internal validation, and the remaining 10% reserved for internal testing. All data from a given patient appeared in only one of the three subsets. Diagnostic exams from these patients were included only in the training dataset. The OPTIMAM data set, comprising data from three physical sites, was partitioned by a similar method with one exception. In order to reserve a more independent set for evaluation, all data from one of the three sites were used only for internal testing. The remaining OPTIMAM data were partitioned as described above for WUSTL.

The internal testing data set was used to simulate the conditions of a validation design to obtain a preliminary estimate of the model's performance, to inform sample size calculations, and to perform risk analysis for primary endpoint justification. The composition of the data sets after applying the inclusion and exclusion criteria and the training-validation-testing split is summarized in Tables 7A-7G.

TABLE 7A

Distribution of Malignancy labels associated with the exams.

| Malignancy Label | Exam Count | | |
|---|---|---|---|
| | Training | Internal Validation | Internal Testing |
| Negative (N) | 88,846 | 10,338 | 10,110 |
| Screening Benign (S) | 8,867 | 1,166 | 1,088 |
| Diagnostic Benign (D) | 23,849 | 1,231 | 1,239 |
| Pathology Benign (P) | 4,725 | 295 | 308 |
| High Risk (H) | 856 | 46 | 28 |
| Malignant (M) | 7,611 | 607 | 650 |
| Interval Cancer (I) | 521 | 39 | 46 |

TABLE 7B

Distribution of BI-RADS assessments associated with the WUSTL exams. BI-RADS assessments are only available for the WUSTL data. The high number of BI-RADS 3 and above exams in training is due to the inclusion of diagnostic exams in training.

| BI-RADS Assessment | Exam Count | | |
|---|---|---|---|
| | Training | Internal Validation | Internal Testing |
| BI-RADS 1 | 80,011 | 9,233 | 9,014 |
| BI-RADS 2 | 21,355 | 1,171 | 1,091 |
| BI-RADS 0 | 12,222 | 1,482 | 1,487 |
| BI-RADS 3 and above | 6,242 | 0 | 0 |
| Unknown | 285 | 0 | 0 |

TALBE 7C

Distribution of Patient Age.

| Age Ranges | Exam Count | | |
|---|---|---|---|
| | Training | Internal Validation | Internal Testing |
| 18-29 | 109 | 5 | 8 |
| 30-39 | 1,939 | 108 | 101 |
| 40-49 | 27,994 | 2,902 | 2,604 |
| 50-59 | 47,137 | 4,960 | 5,009 |
| 60-69 | 37,678 | 3,959 | 3,760 |
| 70-79 | 17,556 | 1,602 | 1,777 |
| 80-89 | 2,729 | 183 | 199 |
| 90+ | 133 | 3 | 11 |

TABLE 7D

Distribution of Race and Ethnicity.

| Race/Ethnicity | Exam Count | | |
|---|---|---|---|
| | Training | Internal Validation | Internal Testing |
| White Non-Hispanic | 86,024 | 8,485 | 8,608 |
| Black Non-Hispanic | 34,787 | 3,653 | 3,324 |
| Hispanic | 1,588 | 156 | 195 |
| Asian | 2,851 | 330 | 333 |
| Other | 8,814 | 944 | 855 |
| Unknown | 1,211 | 154 | 154 |

TABLE 7E

Distribution of Breast Density for the screening exams utilized to train and test internally the rule-out model. Only available for the WUSTL data.

| Breast Density | Exam Count | | |
|---|---|---|---|
| | Training | Internal Validation | Internal Testing |
| BI-RADS A | 10,971 | 1,360 | 1,241 |
| BI-RADS B | 52,420 | 6,072 | 6,108 |
| BI-RADS C | 32,026 | 3,876 | 3,708 |
| BI-RADS D | 3,902 | 443 | 393 |
| Unknown | 20,796 | 135 | 142 |

TABLE 7F

Distribution of Mammogram Equipment Type and Model.

| Type and Model | Exam Count | | |
|---|---|---|---|
| | Training | Internal Validation | Internal Testing |
| Hologic Selenia Dimensions | 84,607 | 8,025 | 7,661 |
| Hologic (Lorad) Selenia | 50,668 | 5,697 | 5,808 |

TABLE 7G

Distribution of Data Sources.

| Data Source | Exam Count | | |
|---|---|---|---|
| | Training | Internal Validation | Internal Testing |
| WUSTL | 120,115 | 11,886 | 11,592 |
| OPTIMAM | 15,160 | 1,836 | 1,877 |

The model architecture was developed as follows. The cancer prediction algorithm comprised two levels: 1) a low-level vision system based on deep learning models that analyzes each image in a mammogram independently, and 2) a high-level vision system based on a metamodel (or ensemble model) that combines the information from the low-level models to determine a final cancer probability for the entire screening exam. Such a two-level architecture, as shown by the schematic in FIG. 39, enabled the algorithm to 1) learn to utilize multi-view and bilateral imaging data, and 2) integrate imaging and non-imaging information.

The low-level vision system comprised a bank of 22 deep learning models: 10 whole image models that output a floating point score predictive of breast cancer from a single image (Image Model Bank); a proposal generator (Detector Model), that operates on a single image, localizing a few areas of suspected abnormality; 10 patch models (Patch Model Bank) that operate on small image patches to produce a floating point score predictive of breast cancer for the areas localized by the Detector Model; and a density model (Density Model) that estimates BI-RADS breast density from a single image. The use of multiple (e.g., 10) whole-image and patch deep learning models, each predicting the probability of cancer (in an image and in a patch, respectively), enabled the creation of a rich descriptor of each image that is utilized by the high-level vision system to achieve high performance in evaluating the probability of cancer in the exam. While the multiple models are similar, they are trained on slightly different tasks. This multitask learning method enables high performance in predicting the probability of cancer in the exam.

FIG. 39 shows an example of a cancer detection model architecture. The mediolateral oblique (MLO) and bilateral craniocaudal (CC) views for each laterality are passed independently into the low-level vision system, comprising a detector, a patch and image model bank, and density models. The detector produces bounding boxes for image locations that it considers suspicious, which are cropped into patches and run through the patch model bank. The resulting outputs from the patch model bank, image model bank, and density model are combined with the outputs from the contralateral and ipsilateral images to create a single exam feature vector. This feature vector, along with the subject's age, is processed using the high-level vision model produce an exam-level malignancy score. The high-level vision model comprised four XGBoost tree classifiers, whose outputs were averaged to produce the exam-level malignancy score. XGBoost tree classifiers are described by, for example, Chen et al., "XGBoost: A Scalable Tree Boosting System", KDD '16: Proceedings of the 22nd ACM SIGKDD International Conference on Knowledge Discovery and Data Mining, 785-794, 2016, which is incorporated by reference herein.

The image model bank comprised 10 whole image deep learning models that evaluate the probability of cancer from a single image, all of which were based on the EfficientNet-B0 architecture. EfficientNet is described by, for example, Tan et al., "EfficientNet: Rethinking Model Scaling for Convolutional Neural Networks", Proceedings of the 36th International Conference on Machine Learning, in Proceedings of Machine Learning Research, 97: 6105-6114, 2019, which is incorporated by reference herein.

The detector model is a deep learning model that produces bounding boxes around suspicious areas in each image. An anchor-free detection architecture was used, e.g., fully convolutional one-stage (FCOS) object detection with a modified Resnet-26 architecture as the backbone. The Resnet-26 architecture was selected for its low memory footprint and was further restricted, by modifying the network width, to enable the use of high-resolution input images, which results in enhanced sensitivity for small findings. FCOS is described by, for example, Tian et al., "FCOS: A simple and strong anchor-free object detector", IEEE transactions on pattern analysis and machine intelligence, which is incorporated by reference herein.

The patch model bank comprised 10 patch models that predict malignancy from an image patch centered at the center of the bounding boxes produced by the detector model, and each comprised deep learning models based on the EfficientNet-B0 architecture. This model architecture is identical to the architecture used for the whole image models, with a different fully-connected classifier layer (i.e., the last layer).

A density model was developed to predict BI-RADS breast density from a single image. The density model outputs four scalars between 0 and 1, which represent a likelihood (e.g., probability) that the breast density corresponds to each of the four BI-RADS breast density classes A, B, C and D.

The high-level vision system comprised an ensemble of four metamodels that aggregate the outputs of the low-level deep learning models to determine a cancer likelihood (e.g., probability) prediction for the exam. To aggregate the outputs of the low-level vision system, an input feature vector was designed for the metamodels that combines 1) image-level information from the Image Models and the Density Model; and 2) localized information from the Detector Model and the Patch Models. The feature vector was designed to enable high-level models to learn to utilize multi-view and bilateral information, as well as breast density estimates and the patient's age, to predict malignancy at patient-level for a given screening exam. Multiple instance classifiers for breast cancer screening are described by, for example, Shen et al., "Globally-Aware Multiple Instance Classifier for Breast Cancer Screening", Medical Image Analysis, 11861: 18-26, 2020, which is incorporated by reference herein.

The feature vector comprised several features, ranging from statistical functions of the low-level vision models' outputs (e.g., mean, standard deviation, minimum, and maximum) to more semantic combinations. For example, one feature is the aggregate prediction for the left breast of the whole image models, defined as the average prediction of the whole image models limited to the left-MLO and left-CC images.

The metamodels were based on XGBoost trees and comprised four independent XGBoost models that optimize four different performance metrics: area under the receiver operating characteristic curve (AUC), mean rule-out rate (i.e., mean specificity in a sensitivity range of 95% to 100%), specificity at 99% sensitivity, and the receiver operating characteristic (ROC) curve equality point (i.e., the point at which sensitivity equals specificity). The final model, which outputs the probability of cancer for the exam, was determined as the averaged ensemble of these four XGBoost models.

The model pre-processing was performed as follows. Since the low-level vision models operate on individual DICOM images, the input DICOM images were pre-processed before training these models. The pre-processing comprised downsampling the large DICOM images via bi-linear interpolation, and normalizing the pixel values by the grayscale window denoted in the DICOM header.

The low-level vision system comprised the whole image models, detector model, patch models, and density model. The whole image models operated on a single image that was resized to 1664×1280, had view annotation markers removed, and was normalized at pixel level from 0 to 1.0. Whole image training employed horizontal flipping, vertical flipping, translation, rotation, scaling, and Gaussian noise for data augmentation.

The Detector Model was trained on single images that had the view annotation markers removed, were resized to 3328×2560, and were normalized at pixel level from 0 to 255. The Detector Model training used random rotation and horizontal flipping for data augmentation.

The Patch Models utilized 512×512 patches that were centered on ground truth annotations or proposals generated by the Detector Model. Patch training employed the same pre-processing methods as whole image training. The model considered patches centered on ground truth annotations as positives and the proposals from the Detector Model on negative images as negatives. The Patch Model training employed horizontal flipping, vertical flipping, translation, rotation, scaling, and Gaussian noise for data augmentation.

The density model used FFDM images that were resized to 416×320 and were normalized from 0 to 1.0. The training employed horizontal and vertical flipping for data augmentation.

The low-level vision models were trained as follows. Multiple Image Models (10 models) and Patch Models (10 models) were trained where the data sources, malignancy time windows, and prediction tasks were varied. Using such a diversity of complementary models helped the high-level vision system achieve higher performance by providing a rich descriptor of the images composing the mammogram. Table 8 describes the parameters that characterize each of the 10 whole image models and the 10 patch models. Some models were trained to imitate radiologists (models i1.5, i2.5, i3.6 in Table 8), others to predict if a biopsy is required (models i3.1-i3.5 in Table 8), and others to directly predict the biopsy outcome (models i4.2, i4.4 in Table 8). Various malignancy ground truth labels were utilized to define the prediction tasks.

The Image Models used pretrained weights from a model that was initially trained on the public visual object recognition dataset ImageNet, and fine tuned on patches centered on ground truth annotations as cancer positives and random breast crops as negatives. The final model was then trained using whole images as input such that images were sampled from the positive and negative classes from both datasets equally.

The Detector Model was trained to find malignant, high-risk, and benign findings annotated by radiologists with bounding boxes. To promote high sensitivity, the model was trained using a small threshold for the model-predicted probability of cancer to consider valid proposals, and the non-maximum suppression algorithm in the last stage of the detector model had a small intersection-over-union threshold.

The Patch Models used pretrained weights from a model that was initially trained on the ImageNet dataset and fine tuned on patches centered on ground truth annotations as cancer positives and random breast crops as negatives. The final Patch Models were then fine tuned using patches centered on ground truth annotations as positive examples and the proposals from the Detector Model on negative images as negative examples.

After training, the density model was fine-tuned using vector scaling, which added a linear transformation on top of the base deep learning model. A list of image models and patch models is summarized in Table 8.

the low-level vision models for each of the four images in the mammogram and the patient's age.

Training of the high-level vision model was performed using the combination of the WUSTL and OPTIMAM training data sets, which were adjusted for both the prevalence of screening exams that lead to a malignant biopsy, and the overall prevalence of exams from each data set. These adjustments sampled mammograms from these data sets with probabilities designed to enable equal prevalence of the two data sets and balanced prevalence of cancer and non-cancer cases in the two data sets At completion of the model training phase, the model operating point (e.g., model threshold) was calculated based on the internal validation dataset, which comprised positive samples from the WUSTL and OPTIMAM validation dataset. Cancer-positive mammograms from the internal validation dataset were sampled with replacement, thereby obtaining 2,000 bootstrapped mammograms. For each bootstrapped dataset, an operating point was chosen such that a desired sensitivity of 0.98 was achieved. The final operating point was calculated as the mean operating point chosen over the 2,000 bootstrap samples.

Example 12—False Negative (FN) Tracking

Generally, clinical metrics such as device sensitivity and specificity, are more robust when actual false-negatives (FN) data is available, such as via pathology malignant results. However, such pathology results for breast cancer cases can occur at other practices or facilities if the patient does not return to the screening facility. As a result, FN tracking tends to be inconsistent and many times not completely followed through in clinical standard of care because it is difficult and time consuming to gather cancer results from outside facilities.

Using systems and methods of the present disclosure, a systematic approach for FN tracking can be set up for an

TABLE 8

List of image models and patch models. Models have been trained on different tasks and different datasets. The model task MH|PDSN indicates that the model has been trained using all images of malignant (M) and high-risk (H) findings as positive examples and all images labeled as pathology benign (P), diagnostic benign (D), screening benign (S) and negative (N) as negative examples. Other task have similar interpretations. The numbers 1-5 refer to BI-RADS assessment categories. To introduce further model diversity and specialization, different datasets are generated by mixing the WUSTL (W) and the OPTIMAM (O) datasets and screening (Screen) and diagnostic (Diag) exams.

| Image Models Bank | | | | | Patch Models Banks | | | | |
|---|---|---|---|---|---|---|---|---|---|
| Model name | Task | Dataset | Screen/Diag. | Window | Model name | Task | Dataset | Screen/Diag. | Window |
| i0.17 | MH\|PDSN | W | Screen | 6 | p0.21w | MH\|DSN | W | Screen | 12 |
| i0.33 | M\|PDSN | W + O | Screen +Diag | 6 | p0.21o | MH\|DSN | O | Screen | 12 |
| i0.36 | M\|PDSN | W + O | Screen +Diag | 6 | p0.33w | M\|PDSN | W | Screen +Diag | 6 |
| i0.37 | M\|DSN | W + O | Screen +Diag | 6 | p0.33o | M\|PDSN | O | Screen +Diag | 6 |
| i0.42 | M\|PDSN | W + O | Screen +Diag | 6 | p0.37w | M\|DSN | W | Screen +Diag | 6 |
| i1.5 | 2345\|1 | W | Screen | — | p0.37o | M\|DSN | O | Screen +Diag | 6 |
| i2.3 | MHPD\|S | W + O | Screen | 6 | p4.3w | M\|N | W | Screen +Diag | 6 |
| i4.3 | M\|N | W + O | Screen +Diag | 6 | p4.3o | M\|N | O | Screen +Diag | 6 |
| i4.5 | M\|SN | W + O | Screen +Diag | 6 | p4.6w | M\|SN | W | Screen +Diag | 6 |
| i4.6 | M\|DN | W + O | Screen +Diag | 6 | p4.6o | M\|DN | O | Screen +Diag | 6 |

The high-level vision model considered information from the four FFDM DICOM images in a screening mammography exam: left-MLO, left-CC, right-MLO, and right-CC, and produces a probability of cancer as output. Instead of directly processing the images, the high-level model used a feature vector with the outputs of the low-level vision models as input. The feature vector comprised the outputs of AI-assisted radiological workflow for ruling out non-suspicious screening mammography exams by employing tracking mechanisms that leverage the common practice of collecting prior imaging in the current standard of care. Incorporating FN data from this tracking system enables more robust monitoring of the clinical performance in the total product life cycle.

FN tracking begins when a patient receives the Non-Suspicious screening exam result. This tracking continues if the patient has subsequent diagnostic mammograms. The tracking ceases when pathology (e.g., biopsy) analysis results in either a benign or malignant outcome or if a vigilance time window (e.g., 1 year) expires. If the biopsy is benign, then FN tracking stops and records the negative biopsy finding. If the biopsy is malignant, then the FN tracking shows a FN result by the AI-assisted radiological workflow for ruling out non-suspicious screening mammography exams, and the FN action plan is then initiated. If the vigilance time window expires, then FN tracking stops and the result of the case can be assumed to be a true negative.

The FN action plan comprises reviewing information about the case, such as patient clinic history, radiologist review to determine the detectability of the cancer on the original screening exam, lesion characteristics on the exam, IQ retrospective assessment data, and the facility history of FNs (without the use of the AI-assisted radiological workflow for ruling out non-suspicious screening mammography exams). The action plan also includes a risk analysis. Based on the totality of information, a risk-based determination is performed to decide whether the FN is acceptable in terms of device safety and effectiveness. If the decision is deemed not acceptable device safety and effectiveness, then the autonomous mode may be suspended.

A summary of various FN tracking mechanisms is provided in Table 9.

After a screening mammogram, if a patient develops breast symptoms and visits a new facility for a diagnostic exam, that facility typically requests prior imaging from the original facility. The software generates DICOM images and exam reports that are transferred along with the prior imaging. These contain special outputs and messages, including a proprietary unique identifier for each exam, intended for the new facility that is continuing the patient's care to help submit FN tracking information. The software generates a scorecard image and report which contains a URL where physicians, their clinical teams, or patients can enter the proprietary exam ID, verify patient identity, and review HIPAA information authorizations to report a potential FN event; submitting data of a malignancy trigger the FN action plan. The proprietary ID is also embedded into the DICOM image header metadata and can be associated programmatically with patient records at the new facility by an installation of the software at the new facility. The software would then submit this data automatically to a central database for FN tracking.

As a first example, as shown in FIG. 40, if the location of the mammograph is at the original location where the patient received a Non-Suspicious screening exam result from the AI-assisted radiological workflow for ruling out non-suspicious screening mammography exams, then the FN tracking begins at that facility, and the patient data is integrated from the facility's EMR/RIS. During each case's vigilance time window, the software watches for updates to the record in

TABLE 9.2.3

Summary of FN Tracking Mechanisms

| Location of Mammogram | Description of Location | FN Tracking Mechanism |
|---|---|---|
| Facility | Original location where the patient received Non-Suspicious exam result from WRClear | 1.) FN tracking begins at Facility<br>2.) WRClear patient data is integrated into Facility's EMR/RIS and extracts patient data relevant to FN tracking. |
| Alt Facility | A different facility with WRClear. The patient receives her subsequent Imammogram at Alt Facility after receiving her original Non-Suspicious iexam result at Facility | 1.) FN tracking is triggered by the request for prior imaging data (priors) by Alt Facility<br>2.) When Alt Facility imports priors from Facility, the WRClear installation at Alt Facility will find the outputs from WRClear at Facility and associate a proprietary exam ID from Facility to Alt Facility.<br>3.) WRClear is integrated into the Alt Facility's EMR/RIS and extracts patient data relevant to FN tracking. The outcomes from Alt Facility are tied to the original Non-Suspicious determination by WRClear at Facility via the exam ID association. |
| Alt Clinic | A different facility without WRClear. The patient receives her subsequent mammogram at Alt Clinic after receiving her original Non-Suspicious exam result at Facility | 1.) FN tracking is triggered by request for priors by Alt Clinic. Authorized users at Facility note this request in the software and enter in the contact information of Alt Clinic. Facility sends priors to Alt Clinic.<br>2.) When Alt Clinic imports priors from Facility, a radiologist reviewing the images will see a notice asking them to submit information to a website URL using a proprietary exam ID. Submitted information includes BI-RADS and pathology information about the case.<br>3.) The website will display a HIPAA release form signed by the patient that authorizes the vendor to receive information for the purposes of tracking false negative cancer cases.<br>4.) Submitted information by Alt Clinic can then be tied to the original Non-Suspicious determination by WRClear at Facility. | the facility's EMR/RIS. If a patient returns to the same facility and is subsequently diagnosed with cancer, then the software will import this information from the EMR/RIS and note that case is a FN.

As a second example, as shown in FIG. 41, if the location of the mammograph is at another facility with the AI-assisted radiological workflow for ruling out non-suspicious screening mammography exams, then the patient may be receiving her subsequent mammogram at an Alternate Facility that is also using the AI-assisted radiological workflow after receiving her original screening exam at the original facility. FN tracking is triggered by the request for prior imaging data (priors) by the alternate facility. When the alternate facility imports priors from the original facility, the AI-assisted radiological workflow installation at the alternate facility finds the outputs from the AI-assisted radiological workflow at the original facility, and associates a proprietary patient ID from the original facility to the alternate facility. The outcomes from the alternate facility can then be tied to the original Non-Suspicious determination by the AI-assisted radiological workflow at the original facility as the software has an integration into the patient records in the EMR/RIS at the alternate facility. These data can then be submitted to a central database for FN tracking.

As a third example, as shown in FIG. 42, if the location of the mammograph is at another facility without the AI-assisted radiological workflow for ruling out non-suspicious screening mammography exams, then the patient may be receiving her subsequent mammogram at an Alternate Clinic that is not using the AI-assisted radiological workflow after receiving her original screening exam at an original facility. FN tracking is triggered by a request for priors by the alternate clinic. When the alternate clinic imports priors from the original facility, a radiologist reviewing the images sees a notice asking them to submit information to a website URL using a proprietary patient ID. The website displays a HIPAA release form signed by the patient that authorizes the AI platform to receive information for the purposes of tracking false negative cancer cases. Submitted information by the alternate clinic can then be tied to the original Non-Suspicious determination by the AI-assisted radiological workflow at the original facility in a central database.

FIG. 43A provides an example flowchart of the clinical workflow, and FIG. 43B provides an example flowchart of the corresponding FN tracking process.

FIGS. 44A-44F provide example views of a website for radiologists to submit FN tracking information, including webpages that allow locating a patient record (FIG. 44A), acknowledging and agreeing to terms of use (FIG. 44B), displaying authorization for release of protected health information and notice of privacy practices (FIGS. 44C-44D), collecting patient exam information (FIGS. 44E-44F).

Example 13—Operation of Machine-Learning Medical Imaging Screening Classifier The performance of machine learning-based applications in a health care area may be evaluated differently based on the prediction goal of the applications and diseases to be evaluated. For example, in autonomous screening for diabetic retinopathy, the diagnosis of all exams are automated and there may be high requirements in both sensitivity and specificity. For automatic prescription of drugs with major side effects, the cost of false positives is high. Hence, the machine learning-based applications for automatic prescription of drugs may be required to have maximal specificity (e.g., a very low false positive rate) and a beneficial amount of sensitivity. For ruling out the presence of breast cancer in screening mammography exams, the machine-learning system automates solely negative exams and sends the remaining exams that it is not confident about to a physician to review. In this case, the cost of a false negative is high as it could potentially mean a missed cancer and delayed treatment, whereas the cost of a false positive is low as it is equivalent to the status quo of breast cancer screening today where all exams are reviewed by a physician. Therefore, the machine learning-based applications for ruling out a disease may be required to have a maximal sensitivity (e.g., with a low false negative rate) and a beneficial amount of specificity.

The present disclosure provides systems and methods for monitoring, surveillance, and/or operation of a machine-learning medical imaging screening classifier that performs a diagnosis autonomously. The operation of the machine-learning medical imaging screening classifier as described herein may have a maximal sensitivity with a low false negative rate ruling out a disease to automate negative exams. An example method may comprise (a) obtaining the machine-learning medical imaging screening classifier, wherein the machine-learning medical imaging screening classifier is trained to process medical image data of a subject to determine a classification output indicative of a presence or an absence of a health state in the subject; (b) obtaining medical image data of a plurality of clinical subjects of a medical imaging clinical site, the plurality of clinical subjects comprising one or more positive subjects having the health state and one or more negative subjects not having the health state; (c) applying the machine-learning medical imaging screening classifier to the medical image data of the plurality of subjects to determine a plurality of classification outputs indicative of a presence of an absence of a health state in each of the plurality of clinical subjects; (d) determining a set of performance metrics of the machine-learning medical imaging screening classifier, based at least in part on (i) the plurality of classification outputs and (ii) an actual presence or actual absence of the health state for each of the plurality of clinical subjects; (e) determining that the machine-learning medical imaging screening classifier is validated when the set of performance metrics meets pre-determined criteria, or determining that the machine-learning medical imaging screening classifier is not validated when the set of performance metrics does not meet the pre-determined criteria; and (f) operating the machine-learning medical imaging screening classifier in an autonomous operating mode when the machine-learning medical imaging screening classifier is validated, or operating the machine-learning medical imaging screening classifier in an semi-autonomous or non-autonomous operating mode when the machine-learning medical imaging screening classifier is not validated.

Moreover, when machine learning-based applications are purchased by entities and installed for use, it needs to undergo a post-market monitoring process that ensures the classifier functions as intended. A variety of issues may emerge post market. One issue is covariate shift in its input, features, and/or data drift. Covariate shift in the input may generally refer to a deviation in the input variable of a data stream. When the input comprises medical images from patients, the covariate shift may comprise scanner changes, imaging protocol changes, and changing patient demographics. Concept drift is another issue that may emerge post market. Concept drift may generally refer to changes in environment and relationships between variables. When a new concept emerges, the classifier needs to determine how the output may be modeled from the new concept. For example, clinical events (e.g., COVID or COVID vaccination) may change the clinical interpretation of chest X-rays and inflamed lymph nodes in breast imaging. Another issue that emerges in the post market setting is operational change. For example, changes in the data pipeline (e.g., switching units from feet to inch) may cause the machine learning-based applications to generate erroneous output.

FIG. 45 shows an example workflow of installing and operating a machine-learning medical imaging screening classifier. The workflow comprises three phases, phase I installation (4510), phase 2 assistive mode operation (4520), and phase 3 autonomous mode operation (4530). As illustrated, an entity that purchased a machine-learning medical imaging screening classifier (e.g., WRClear for automating negative exams in breast cancer screening) signs a new contract for installing the classifier. During phase I installation (4510), after the new contract has been signed (4512), the IT security may review the infrastructure of the network in the entity and setup one or more virtual private networks (VPN) when needed (4514). The classifier may be installed on the customer infrastructure (4516), followed by IT integration setup including access to picture archiving and communication system (PACS), radiological information system (RIS), and reporting systems (4518). In some embodiments, phase I may have a duration of about 1 week, about 2 weeks, about 3 weeks, or more.

In phase 2 (4520), the classifier may be operating in assistive mode during a training and validation transition period. Training may be provided to users in the entity for safe and effective use (4522). The training provided by exposing users to the assistive mode ensures users gain familiarity with the product and workflow while initially using the software as an assistive tool. The classifier may be operating in assistive mode during the transition period per facility (4524). The assistive mode may have a duration of about 1 month, about 2 months, about 3 months, or more. The classifier may also have an installation qualification (IQ) process or site installation qualification (SIQ) process comprising retrospective assessment of exams and system verification (4526). The SIQ process assesses a set of required standards on AI performance on retrospective data from the local site. When the classifier passes the acceptance criteria, it may progress to phase 3 (4530).

In phase 3 (4530), the autonomous mode of the classifier is active (4532). The performance of the classifier may be monitored under the clinical vigilance program (CVP) (4534). The sensitivity of the classifier may be monitored. The clinical vigilance program (CVP) may last about 1 year, about 2 years, about 3 years, about 4 years, about 5 years, about 6 years, about 7 years, about 8 years, about 9 years, about 10 years, or more than about 10 years. In addition, the performance of the classifier may be monitored using a quality assurance and/or quality control (QA and/or QC) program, which evaluates whether device functions and device metrics of the classifier in the autonomous mode are consistent with the pre-market specification.

The systems and methods for monitoring, surveillance, and/or operation of a machine-learning medical imaging screening classifier may implement a post market monitoring plan. Table 10 lists a post market monitoring plan.

TABLE 10

| Post market monitoring plan. | | |
|---|---|---|
| Components of the Postmarket Monitoring Plan | Goals of Postmarket Monitoring Plan—Based on FDA Feedback | Type of Risk Mitigated |
| 1 Installation qualification (IQ) | | |
| IQ, site-specific retrospective assessment of exams—Assess device retrospectively with facility's historical exams, mitigating AI generalization risk on local demographics. | (1) Algorithm generalization. | FN, FP |
| IQ, system verification—Ensure the classifier is correctly installed and operating in accordance to system specifications. | (2) Smooth transition from installation to steady-state. | Faulty device |
| 2 Training | | |
| Training is provided to the facility for safe and effective use. | (2) Smooth transition from installation to steady-state. | FN, FP, Faulty device |
| Use of the classifier in assistive mode for one-month minimum as transition to autonomous mode. | | |
| 3 Labeling | | |
| User manual provides the classifier operating instructions for the safe and effective use, including cautions and warnings, on correct device use. | (2) Smooth transition from installation to steady-state. | FN, FP, Faulty device |
| 4 Clinical vigilance program (CVP)— Two-year program | | |
| A two-year site-specific active surveillance of classifier performance, monitoring clinical metrics similar to those in premarket testing. | (3) Mitigate early unknowns in the first two years of use. (4) Mitigating action taken to reduce risk under a surveillance program | FN |
| 5 Quality assurance and quality control (QA/QC) program | | |
| Monthly verification that the device functions in accordance to system specifications (same as IQ and system verification) | (2) Smooth transition from installation to steady-state. | Faulty Device |
| Maintenance of cancer outcome tracking | (3) Mitigate early unknowns in the first two years of use. | FN |

US 12,586,360 B1

87

The safety of the classifier (e.g., WRClear device) may be critical. To ensure the continued safe operation of the classifier following its installation, a rigorous post-market monitoring plan has been developed. A goal of this plan is to minimize the risk of false negatives. This plan begins with a training and validation period after WRClear is installed, which must be completed before autonomous operation of the device.

The performance of the classifier may be evaluated by clinical metrics. In some embodiments, clinical metrics may comprise a clinical sensitivity, a clinical specificity, a true positive rate (TPR), a false positive rate (FPR), a positive predictive value (PPV), a negative predictive value (NPV), or an area-under-the-curve (AUC). Some of the clinical metrics may rely on ground truth clinical outcomes of patients that can take a long time to measure. For example, it may take about 3-6 months to get results from a recommended biopsy, and about 12-24 months to confirm a non-suspicious case is not a false negative.

The performance of the classifier may also be evaluated by device metrics. In some embodiments, device metrics may comprise a positive rate, a negative rate, a predicted probability score, feature importance/attribution, or DICOM header distribution. The positive and negative rate may quantify the percentage of medical exams labeled as uncategorized versus non-suspicious. Alternatively, the positive and negative rate may quantify the percent of medical exams that pass a pre-processing image quality check versus exams that fail the check. Feature importance/attribution may indicate which features or models contribute to the prediction of the classifier. DICOM header distribution may comprise image compression format, compression thickness, paddle, race/ethnicity. By comparing these values against their expected distributions based on the data that the classifier was trained or previously tested on, one may detect potential drift in the performance of the device that may mean a loss in generalizability or performance.

In some embodiments, after the classifier is installed, it may have a training and validation phase before operating at autonomous mode. FIG. 46 shows an example workflow of a machine-learning medical imaging screening classifier in a training mode which is functually similar to an assistive mode. The classifier may exam/process one or more medical image data from patients. The same medical images may also be reviewed by an interpreting physician (IP), who must review all exams in training mode regardless of the classifier's assessment.

During the training and validation phase, a set of pre-determined criteria may be established. When the performance metrics of the classifier meet or exceed the pre-determined criteria, it may be determined that the classifier is validated. When the performance metrics of the classifier do not meet or exceed the pre-determined criteria, it may be determined that the classifier is not validated. In some embodiments, the pre-determined criteria may comprise a sensitivity criterion that the clinical sensitivity is at least about 80%, at least about 85%, at least about 90%, at least about 95%, at least about 96%, at least about 97%, at least about 98%, or at least about 99%. In other embodiments, the pre-determined criteria may comprise a specificity criterion that the clinical specificity is at least about 80%, at least about 85%, at least about 90%, at least about 95%, at least about 96%, at least about 97%, at least about 98%, or at least about 99%. In yet other embodiments, the pre-determined criteria may comprise a positive predictive value (PPV) criterion that the PPV is at least about 80%, at least about 85%, at least about 90%, at least about 95%, at least about 96%, at least about 97%, at least about 98%, or at least about 99%. In yet other embodiments, the pre-determined criteria may comprise a negative predictive value (NPV) criterion that the NPV is at least about 80%, at least about 85%, at least about 90%, at least about 95%, at least about 96%, at least about 97%, at least about 98%, or at least about 99%. In yet other embodiments, the pre-determined criteria may comprise a false positive rate (FPR) criterion that the FPR is at least about 80%, at least about 85%, at least about 90%, at least about 95%, at least about 96%, at least about 97%, at least about 98%, or at least about 99%. In yet other embodiments, the pre-determined criteria may comprise an area-under-the-curve (AUC) criterion that the AUC is at least about 0.80, at least about 0.85, at least about 0.90, at least about 0.95, at least about 0.96, at least about 0.97, at least about 0.98, or at least about 0.99.

As illustrated in FIG. 45, phase 2 comprises installation qualification (IQ). A goal of IQ is to ensure that the classifier has the necessary prerequisite conditions to function as expected. In some embodiments, the IQ may be performed using retrospective data which has ground truth to be compared with the prediction output generated by the classifier. In other embodiments, IQ may be performed for an installed facility, a region, or for an entire company.

FIG. 47 shows an example workflow of installation qualification of a machine-learning medical imaging screening classifier. The classifier may first be installed at customer site (4710) and undergo the IQ process. The classifier may evaluate retrospective data (4720) and the device metrics as well as clinical metrics of the classifier may be compared to the specification (4730). When the metrics of the classifier do not meet the specification, the classifier, working environment and/or specification may need to be inspected and remediated. Subsequently, the classifier may be revalidated, for example, by processing the retrospective data. The classifier may operate in an assistive mode, where auto-finalization is disabled, for training purposes to enable users to gain familiarity with the system (4780). When the metrics of the classifier meet the specification and users have evaluated the classifier in assistive mode, the technical staff at the customer site may evaluate this data about the classifier and determine whether to configure the classifier for auto-finalization (4760). When the classifier is configured for auto-finalization, it may operate at autonomous mode (4770).

Table 11 lists retrospective assessment of exams with respect to clinical metrics and pre-determined acceptance criteria.

TABLE 11

Retrospective assessment of exams with respect to clinical metrics.

| Parameter | Description |
|---|---|
| Sample Size | All screening exams acquired within 12 months of a cancer diagnosis 1,000+ non-cancer exams 800+ non-cancer callback exams (non-cancers with a positive BI-RADS 0 assessment from the original reporting radiologists) |

TABLE 11-continued

Retrospective assessment of exams with respect to clinical metrics.

| Parameter | Description |
| --- | --- |
| Study Clinical Metrics/ Acceptance Criteria | The per-site evaluation parallels that of the premarket pivotal standalone study, specificity and reduction of non-cancer callbacks will be tested according to the same endpoints: Superiority test for the specificity of WRClear with a one-sided alpha of 0.005 $H_0$: Sp ≤ 0.20 $H_a$: Sp > 0.20 Superiority test for the reduction of non-cancer callbacks with a one-sided alpha of 0.01 $H_0$: $(C^R - C^W)/C^R$ ≤ 0.15 ($C^R$ = radiologist callback rate for non-cancer exams without WRClear (original reporting radiologist)) $H_a$: $(C^R - C^W)/C^R$ > 0.15 ($C^W$ = radiologist callback rate for non-cancer exams with WRClear (all exams with Non-Suspicious assessment from WRClear are considered negative)) |

In some embodiments, the sensitivity may not be evaluated in an identical manner to the premarket testing due to the limited number of cancer exams available at individual sites and the large number of exams required to statistically power the high sensitivity endpoint. Instead, the sensitivity and its 95% confidence intervals may be estimated based on the available data. One pre-determined acceptance criterion is for the upper bound of the 95% confidence interval to exceed the sensitivity endpoint of 94% from the premarket pivotal study.

FIG. 48 shows an example workflow of a machine-learning medical imaging screening classifier at autonomous mode. A medical image from a patient may be examined either manually by an interpreting physician (IP) (4830) or automatically by the classifier (4820). When the classifier predicts the image as non-suspicious (e.g., a CLEAR result) (4840), the classifier may determine whether the exam is auto finalized (4850). The classifier may auto finalize the exam by generating an examination report (4870).

When the classifier predicts the image as uncategorized (e.g., a non-CLEAR result), the image is manually reviewed by an IP with the support from the prediction output generated by the classifier (4860). When the exam is predicted as non-suspicious, it may not be auto finalized, instead the images may also be diverted for IP vigilance assessment. The IP is responsible for reading a sample of the "CLEAR" exams, which have been "diverted" by the WRClear device for IP assessment to monitor its performance. Here diverted may mean that the exam appears and remains on the interpreting physicians worklist instead of disappearing as may be the case when the exam is autonomously finalized.

In some embodiments, the classifier may track the post market performance by passive and/or active surveillance measures. The passive surveillance measure may comprise determining device sensitivity based on patient outcomes. Passive surveillance may have a large sample size but take a long time to gather. The active surveillance measures may comprise diverting a subset of the medical images examined by the classifier for manual review by IPs. As each IP only inspects a sample of the medical images, the sample size is low but the review process is timely. The diversion may be random, in other words, the subset of medical images is selected randomly. Alternatively, the subset may be diverted based on a risk criterion. The risk criterion may comprise whether the predicted probability of the health state is close to the decision boundary of the classifier. In some embodiments, the subset is at least about 5%, at least about 7%, at least about 10%, at least about 12%, at least about 15%, at least about 18%, or at least about 20% of the medical examinations.

When the classifier is operating in the autonomous mode, it may also undergo qualification control process as an active surveillance measure. In some embodiments, the qualification control process may comprise operational qualification. For example, the device metrics of the classifier may be measured and analyzed periodically. The periodic operational qualification may be by week, by month, or by quarter. When the device metrics change, they may be predictive of potential changes in the clinical metrics of the classifier. The goal is to detect adverse change earlier.

FIG. 49A shows an example workflow of operational qualification of a machine-learning medical imaging screening classifier. When the device metrics of the classifier are not within the specification, the classifier, working environment, and/or specification may need to be inspected and remediated.

In some embodiments, the qualification control process at the autonomous mode may comprise performance qualification. For example, the clinical metrics of the classifier may be measured and analyzed periodically. The periodic performance qualification may be by week, by month, by quarter, or by year.

FIG. 49B shows an example workflow of performance qualification of a machine-learning medical imaging screening classifier. The clinical metrics of the classifier may be compared with clinical outcome on an ongoing basis. When the device metrics of the classifier are not within the specification, the classifier, working environment, and/or specification may need to be inspected and remediated.

FIG. 50 shows an example of a diverted examination record. As illustrated, the record shows the patient's medical image is non-suspicious (e.g., case score as "CLEAR"). Moreover, the image needs to be manually reviewed (e.g., "review required"). The IP is required to read certain "CLEAR" exams, because a goal of post-market monitoring is to minimize the risk of false negatives. This is tracked in two ways. First, device sensitivity can be tracked, which is a passive quantitative measure based on patient outcomes. Second, active device monitoring is performed by the Interpreting Physician reading diverted "CLEAR" exams. An exam is indicated as being diverted based on the following: The Case Score is "CLEAR", the Exam Tag indicates that the exam is "REVIEW REQUIRED", and the Operating Mode is "Autonomous". Diverted exams should be read according to a standard reading workflow.

FIG. 51 shows an example workflow of a machine-learning medical imaging screening classifier when the continue surveillance program (i.e. Clinical Vigilance Program), quality assurance, or quality control identifies an issue of the classifier. To ensure the safety of the classifier, the operation of the classifier may be adjusted. In some embodiments, the autonomous mode operation may comprise three tiers of autonomy status. To ensure safety, the software is be disabled until a software update if troubleshooting cannot bring the device within specification after a fixed number of remediation attempts.

FIG. 52 shows 3-tier autonomous status of a machine-learning medical imaging screening classifier. As illustrated, the three-tier status system may comprise full status, a limited status, and a disabled (assistive) status. In some embodiments, the full status may require at least 10% of medical images that are predicted by the classifier as non-suspicious to be diverted for manual review. The limited status may require at least 50% of medical images that are predicted by the classifier as non-suspicious to be diverted for manual review. This is functionally similar to a semi-autonomous mode. The disabled status may require all medical images that are predicted by the classifier as non-suspicious to be diverted for manual review, similar to an assistive mode.

FIG. 53 shows an example workflow of determining an autonomous status of a machine-learning medical imaging screening classifier. The performance metrics of the classifier may be determined periodically when the classifier operates at autonomous mode. The performance metrics may be compared with a set of acceptance criteria (AC) that the classifier must meet in order to operate in full autonomous mode. When the performance metrics do not pass the acceptance criteria (AC), the operating mode of the classifier may reduce from autonomous to limited mode. The performance metrics of the classifier may be determined and compared with a set of restoration criteria (RC). When the performance metrics pass the restoration criteria (RC), the operating mode of the classifier may elevate from limited to autonomous. When the performance metrics do not pass the restoration criteria (RC), the operating mode of the classifier may remain limited and the performance of the classifier may still be monitored, potentially with a heightened level of surveillance such as diverting a greater percentage of exams for IP review. When the performance metrics do not pass the restoration criteria (RC) for the second time, the operating mode of the classifier may reduce from limited to disabled. At the disabled status, the classifier may need to be modified before the autonomous mode can be re-enabled.

Table 12 lists the operating modes and statuses of the classifier. In this embodiment, the training mode is similar to an assistive mode but cannot be used when the status is disabled. Here HL7 (Health Level Seven) refers to the automatic report generation and finalization feature of the classifier.

TABLE 12

| Operating modes and autonomy statuses of the classifier. | | Autonomy Status (Manufacturer controlled) | | | |
|---|---|---|---|---|---|
| | | Pre-IQ Status | Full Status | Limited Status | Disabled Status |
| Mode of operation (Facility controlled) | Training Mode (All outputs EXCEPT HL7) | Yes | Yes | Yes | No |
| | Autonomous Mode (HL7 generated) | No | Yes | Yes | No |

TABLE 12-continued

| Operating modes and autonomy statuses of the classifier. | Autonomy Status (Manufacturer controlled) | | | |
|---|---|---|---|---|
| | Pre-IQ Status | Full Status | Limited Status | Disabled Status |
| Off Mode (No outputs generated) | Yes | Yes | Yes | Yes |

As shown in Table 12, autonomy status is set based on whether the classifier passes or fails periodic predetermined criteria checks over the surveillance period and is set by the manufacturer either manually or automatically in the software. The classifier may start from pre-IQ status and when the performance metrics pass the IQ acceptance criteria, the classifier may move to full status. At the full status, the classifier may change to autonomous mode operation. Alternatively, users may be allowed to change it to an alternative mode of operation. During the course of operating in autonomous mode, if the surveillance acceptance criteria (AC) are not met, then the classifier may reduce to limited status. At the limited status, the active surveillance may be heightened by diverting a larger proportion of exams or altering the selection criteria to divert more of the types of exams that are similar to where the classifier appears to be initially failing. When the performance metrics of the classifier pass the restoration criteria, the classifier may return the full status. When the classifier fails the restoration criteria for a pre-determined number of times, the classifier may enter disabled status where the classifier automatically switches to off mode.

FIG. 54 shows examples of workflows of determining an autonomous status of a machine-learning medical imaging screening classifier. Surveillance criteria are evaluated periodically every 6 months. As illustrated in Example #1—minor corrections, the classifier passes the acceptance criteria at the 6th month check but fails in the 12th month. The classifier switches from full status to limited status. After remediation, at the 14th month, the classifier passe s the restoration criteria (RC) and switches back to full status. In Example #2—worst case, the classifier fails the acceptance criteria (AC) and restoration criteria (RC) at 6th month, 8th month, and 11th month after repeated attempts of remediation but failing to meet restoration criteria after two attempts, the pre-defined limit. Hence, the classifier changes to disabled status and off mode.

Example 14—Exclusion of Medical Images from being Processed by the Classifier

In some embodiments, patient information may need to be considered prior to the medical images of a patient being processed by the classifier. For example, when the patient has prior history or breast cancer or breast surgery, the medical images may be excluded without being processed by the classifier. When the patient wears an implanted device, the respective medical images may be excluded as well. These are exclusions outside of the intended population of the classifier and should not be autonomously assessed and finalized. In some embodiments, the exclusion criteria may be incorrectly captured. The medical image may need to be re-processed by the classifier and/or manually processed by Interpreting Physicians (IPs).

When the exclusion criteria are incorrectly captured, then the process proceeds depending on whether the exam has already been finalized or not.

FIG. 55 shows a use case of a patient's medical image examined by a machine-learning medical imaging screening classifier where the examination is not finalized (e.g., an autonomous report has not been generated). Users may correct the exclusion criteria such that the classifier may re-process the image. The exam may also be manually reviewed by the IP with or without the predicted output generated from the classifier. All re-processed exams, regardless of case score, must be read by the IP out of an abundance of caution.

FIG. 56 shows a use case of a patient's medical image examined by a machine-learning medical imaging screening classifier where the examination is finalized (e.g., the autonomous report has already been generated by the classifier). Users may correct the exclusion criteria after this has occurred. The image may need to be manually reviewed by an IP with or without the predicted output generated from the classifier. The IP reads the exam and potentially generates a report addendum. The technologist unflags the exam.

FIG. 57 shows an example of a reprocessed examination record. As illustrated, the report notes "REPROCESSED EXAM". As each reprocessed exam needs to be manually reviewed, the record also lists "REVIEW REQUIRED". If an exam is reprocessed, multiple scorecards are available. The scorecard with the most recent processed time is used. These will say "REPROCESSED EXAM" beneath the processed time as indicated in this figure in the red box. All reprocessed exams note that review is required in the Exam Tag field.

Example 15—Screening of Mammography Cases and Determination of Breast Density Using system and methods of the present disclosure, a deep learning algorithm is trained to detect non-suspicious and suspicious findings for breast cancer with large databases of biopsy-proven cases of breast cancer, benign lesions and normal tissues. Furthermore, the algorithm is trained to analyze and characterize breast density level.

WRClear is a software as a medical device (SaMD) indicated for identifying screening mammography exams that are considered Non-Suspicious. In this context, Non-Suspicious is defined as the absence of clinically significant and actionable findings indicative of breast cancer. These Non-Suspicious screening mammograms qualify for categorization as BI-RADS 1 in accordance with the BI-RADS Atlas 5th Edition. WRClear is designed to have an extremely low false negative rate so that exams labeled as Non-Suspicious are extremely unlikely to contain evidence of breast cancer. WRClear is designed to reduce non-cancer callbacks while improving radiologist accuracy and reducing radiologist workload.

WRClear first identifies whether the quality of the images are suitable for processing. WRClear then analyzes and calculates the likelihood of cancer and the breast density composition using machine learning algorithms designed in accordance with the BI-RADS Atlas 5th Edition. The device compares the likelihood of cancer to a fixed threshold and labels exams as Non-Suspicious or otherwise leaves them as Uncategorized. For Non-Suspicious exams, WRClear can generate or pre-populate a report with BI-RADS Assessment Category 1 and the estimated BI-RADS Breast Density Category. This report can be configured to be reviewed by an interpreting physician or finalized automatically. All exams not marked as Non-Suspicious are considered Uncategorized and should be further reviewed by an interpreting physician according to the current standard of care. WRClear generates additional information for Uncategorized cases to provide greater interpretability about its assessment and to aid in the detection, localization, and characterization of suspicious findings.

For all exams, the device outputs a Scorecard image and Structured Report which presents the results of the image quality check, breast density composition including predicted probabilities, and Non-Suspicious or Uncategorized assessment.

For Uncategorized exams, the Scorecard and Structured Report additionally display a case score and heatmap for each mammographic view. The case score associates the case with a Low, Medium, or High level of suspicion based on binning the algorithm's calculated likelihood of cancer. The heatmap displays explanatory information as to why the algorithm did not label the case as Non-Suspicious. It shows regions assessed by WRClear that are not necessarily suspicious, but for which the absence of actionable findings could not be confidently determined. When the case score is Medium or High, WRClear marks the locations of detected findings of suspicious soft tissue lesions and/or calcifications. A finding score is assigned to each detected region corresponding to the level of suspicion for cancer on a scale of 1 to 10, with increasing levels of suspicion.

FIG. 58 shows an example of Digital Imaging and Communications in Medicine (DICOM) image scorecard generated for a patient's medical image labeled as Uncategorized by a machine-learning medical imaging screening classifier. WRClear provides additional information in the form of explanatory heatmaps, a case score, markings of detected suspicious findings, and finding scores for Uncategorized exams. These outputs help the interpreting physician to understand why the algorithm did not label the case as Non-Suspicious, as well as aid in the detection, localization, and characterization of suspicious findings. As illustrated in FIG. 58, the scorecard contains a case score describing the level of suspicion for the exam (as Low, Medium, or High), a breast density assessment with reported confidence levels, and a heatmap on top of an outline of the breast of the regions of the images that could not be ruled out by WRClear and that are responsible for the exam needing additional review by the interpreting radiologist. This conveys to the interpreting radiologist which of the images caused the exam to be labeled as Uncategorized.

FIGS. 59A-59B show examples of 2D mammography images with assistive CAD marker functionality on L MLO and L CC views for an uncategorized exam with a case score of 9 and 8, respectively. An identified soft-tissue finding is marked by a (*) symbol. The finding scores in the MLO and CC views are 9 and 8 respectively.

FIGS. 60A-60B show examples of 2D mammography images with assistive CAD marker functionality on R CC and R MLO views for an Uncategorized exam with identified microcalcifications marked by a (Δ) symbol. The finding scores for both views are 9.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for monitoring, surveillance, and/or operation of a machine-learning medical imaging screening classifier, comprising:

(a) obtaining the machine-learning medical imaging screening classifier, wherein the machine-learning medical imaging screening classifier is trained to process medical image data of a subject to determine a classification output indicative of a presence or an absence of a health state in the subject;

(b) obtaining medical image data of a plurality of clinical subjects of a medical imaging clinical site, the plurality of clinical subjects comprising one or more positive subjects having the health state and one or more negative subjects not having the health state;

(c) applying the machine-learning medical imaging screening classifier to the medical image data of the plurality of subjects to determine a plurality of classification outputs indicative of a presence or an absence of a health state in each of the plurality of clinical subjects;

(d) determining a set of performance metrics of the machine-learning medical imaging screening classifier, based at least in part on (i) the plurality of classification outputs and (ii) an actual presence or actual absence of the health state for each of the plurality of clinical subjects;

(e) determining that the machine-learning medical imaging screening classifier is validated when the set of performance metrics meets pre-determined criteria, or determining that the machine-learning medical imaging screening classifier is not validated when the set of performance metrics does not meet the pre-determined criteria; and (f) operating the machine-learning medical imaging screening classifier in an autonomous operating mode when the machine-learning medical imaging screening classifier is validated, or operating the machine-learning medical imaging screening classifier in a semi-autonomous or non-autonomous operating mode when the machine-learning medical imaging screening classifier is not validated.

2. The method of claim 1, wherein the machine-learning medical imaging screening classifier comprises a supervised machine-learning algorithm, a deep reinforcement learning algorithm, a large language model, or a combination thereof.

3. The method of claim 1, wherein the plurality of classification outputs comprises a non-suspicious classification output that is indicative of an absence of the health state.

4. The method of claim 3, further comprising performing false-negative tracking of medical image data of a subject with a non-suspicious classification output, wherein the false-negative tracking (1) is continuously performed through subsequent medical imaging assessments of the subject for the health state, (2) ends when (i) a diagnosis is obtained that is conclusive of whether the subject has the health state, or (ii) a vigilance time window expires subsequent to the medical imaging assessment, or (3) a combination thereof.

5. The method of claim 1, wherein the health state comprises a presence or an absence of a disease or disorder.

6. The method of claim 5, wherein the disease or disorder comprises cancer.

7. The method of claim 6, wherein the cancer is breast cancer.

8. The method of claim 1, wherein the medical image data is generated using an imaging modality selected from the group consisting of mammography, X-ray, fluoroscopy, ultrasound, magnetic resonance imaging (MRI), computed tomography (CT), positron emission tomography (PET), and a combination thereof.

9. The method of claim 8, wherein the imaging modality is mammography.

10. The method of claim 1, wherein the set of performance metrics comprises a clinical sensitivity, a clinical specificity, a true positive rate (TPR), a false positive rate (FPR), a positive predictive value (PPV), a negative predictive value (NPV), an area-under-the-curve (AUC), a positive rate, or a negative rate.

11. The method of claim 1, wherein operating the machine-learning medical imaging screening classifier in the autonomous operating mode further comprises applying the machine-learning medical imaging screening classifier to medical image data of a subject, to automatically (i) determine, without performing radiologist review, a classification output indicative of a presence or an absence of a health state in the test subject, (ii) generate a tissue assessment of a body part of the test subject, or (iii) a combination thereof.

12. The method of claim 1, further comprising diverting at least a subset of the subjects that would be automated while operating the machine-learning medical imaging screening classifier in an autonomous operating mode for physicians to review to monitor the classifier's performance.

13. The method of claim 12, wherein the subset is diverted randomly.

14. The method of claim 12, wherein the subset is diverted based on a risk criterion.

15. The method of claim 14, wherein the risk criterion comprises whether the predicted probability of the health state is close to the decision boundary of the machine-learning medical imaging screening classifier.

16. The method of claim 1, wherein operating the machine-learning medical imaging screening classifier in the semi-autonomous operating mode further comprises applying the machine-learning medical imaging screening classifier to medical image data of a plurality of test subjects, to automatically determine, without performing radiologist review, a plurality of classification outputs indicative of an absence or presence of a health state for about 20% to about 80% of the plurality of test subjects.

17. The method of claim 1, wherein operating the machine-learning medical imaging screening classifier in the non-autonomous modes includes an assistive operating mode that further comprises applying the machine-learning medical imaging screening classifier to test subjects to aid a physician in case review or to triage the priority of subjects.

18. The method of claim 1, further comprising re-training the machine-learning medical imaging screening classifier, based at least in part on (i) the plurality of classification outputs determined in (c) and the actual presence or actual absence of the health state for each of the plurality of subjects, (ii) the set of performance metrics determined in (d), or (iii) a combination thereof.

19. The method of claim 1, further comprising (g) performing a continuous surveillance program to re-validate the machine-learning medical imaging screening classifier, thereby assessing the machine-learning medical imaging screening classifier based at least in part on the pre-determined criteria.

20. The method of claim 19, wherein the surveillance comprises (i) performing passive monitoring of the machine-learning medical imaging screening classifier by assessing subsequent outcome records of subjects after autonomous assessment by the machine-learning medical imaging screening classifier, (ii) active evaluation of the machine-learning medical imaging screening classifier by human or physician intervention before finalizing assessment by the machine-learning medical imaging screening classifier, or (iii) a combination thereof.

21. The method of claim 19, further comprising (h) altering an operating mode and/or a level of surveillance of the machine-learning medical imaging screening classifier, based at least in part on the assessing in (g).

22. The method of claim 1, wherein the machine-learning medical imaging screening classifier is configured to automate a determination of a positive diagnosis or a negative diagnosis of a disease or disorder in the subject, without further physician review.

23. The method of claim 1, further comprising providing, by the machine-learning medical imaging screening classifier, assistive features for aiding physician review for low-confidence cases that cannot be automatically assessed.

24. The method of claim 1, wherein the set of performance metrics comprises (i) an objective evaluation of the machine-learning medical imaging screening classifier, performed by applying the machine-learning medical imaging screening classifier to retrospective medical imaging data, (ii) a subjective evaluation of the machine-learning medical imaging screening classifier, performed by operating the machine-learning medical imaging screening classifier in an assistive or augmentative operating mode, or (iii) a combination thereof; wherein operating the machine-learning medical imaging screening classifier in the assistive or augmentative operating mode comprises performing physician review of the outputs of the machine-learning medical imaging screening classifier for at least a portion of subject examinations during a period of time.

25. The method of claim 1, wherein the validating further comprises qualifying the machine-learning medical imaging screening classifier for use at a facility level, a regional level, or a company level.

26. The method of claim 1, further comprising operating the machine-learning medical imaging screening classifier in different levels of autonomy such as a fully autonomous operating mode, a semi-autonomous operating mode, an augmentative operating mode, an assistive operating mode, a disabled operating mode, or any combination thereof.

27. The method of claim 26, wherein operating the machine-learning medical imaging screening classifier in the fully autonomous operating mode comprises generating, by the machine-learning medical imaging screening classifier, an autonomous assessment on all subject examinations within an intended population.

28. The method of claim 26, wherein operating the machine-learning medical imaging screening classifier in the semi-autonomous operating mode comprises generating, by the machine-learning medical imaging screening classifier, an autonomous assessment on a subset of subject examinations within an intended population.

29. The method of claim 28, wherein the subset of the subject examinations within the intended population is randomly selected or selected based on risk and/or demographic factors.

30. The method of claim 26, wherein operating the machine-learning medical imaging screening classifier in the augmentative operating mode comprises (i) generating, by the machine-learning medical imaging screening classifier, an initial assessment for a subject examination within an intended population, and (ii) performing physician review and verification of the initial assessment.

31. The method of claim 26, wherein operating the machine-learning medical imaging screening classifier in the assistive operating mode comprises performing physician review of subject examinations while utilizing the outputs of the machine-learning medical imaging screening classifier to aid in the review.

32. The method of claim 1, wherein the pre-determined criteria comprise a set of acceptance criteria that the machine-learning medical imaging screening classifier must meet in order to (i) operate in full autonomous mode or (ii) return to an operating mode with a higher level of autonomy subsequent to a previous failed validation.

33. The method of claim 1, wherein the pre-determined criteria comprise benchmarks for sensitivity, specificity, NPV, PPV, AUC, positive rate, negative rate, a pre-determined allowable number of probability of false negative or false positive errors by the machine-learning medical imaging screening classifier to occur within a given time period during the course of active evaluation, or a combination thereof.

34. The method of claim 1, wherein the surveillance comprises performing (i) active evaluation by diverting a subset of exams away from automation for physician assessment, (ii) a false negative tracking process to detect potential false negative errors by the machine-learning medical imaging screening classifier, (iii) a false negative action plan to determine whether a potential false negative is a true false negative, or (iv) a combination thereof.

35. The method of claim 1, wherein the operating mode of the machine-learning medical imaging screening classifier is (i) reduced in level of autonomy responsive to failure of the machine-learning medical imaging screening classifier to be re-validated based on pre-determined acceptance criteria, or (ii) increased in level of autonomy, responsive to the machine-learning medical imaging screening classifier being restored to meeting pre-determined restoration criteria after taking corrective actions.

36. The method of claim 1, wherein (i) a level of surveillance is raised when the machine-learning medical imaging screening classifier fails to be re-validated based on pre-determined acceptance criteria, or (ii) the machine-learning medical imaging screening classifier is disabled, when a number of attempts to resolve performance issues have been unsuccessfully performed.

37. The method of claim 1, wherein a level of autonomy and/or operation mode of the machine-learning medical imaging screening classifier is automatically changed in response to the re-validation or is manually changed as part of a manual evaluation process.

38. A non-transitory computer-readable medium comprising machine-executable code that, upon execution by one or more computer processors, implements a method for operating a machine-learning medical imaging screening classifier, the method comprising:

(a) obtaining the machine-learning medical imaging screening classifier, wherein the machine-learning medical imaging screening classifier is trained to process medical image data of a subject to determine a classification output indicative of a presence or an absence of a health state in the subject;

(b) obtaining medical image data of a plurality of clinical subjects of a medical imaging clinical site, the plurality of clinical subjects comprising one or more positive subjects having the health state and one or more negative subjects not having the health state;

(c) applying the machine-learning medical imaging screening classifier to the medical image data of the plurality of subjects to determine a plurality of classification outputs indicative of a presence or an absence of a health state in each of the plurality of clinical subjects;

(d) determining a set of performance metrics of the machine-learning medical imaging screening classifier, based at least in part on (i) the plurality of classification outputs and (ii) an actual presence or actual absence of the health state for each of the plurality of subjects;

(e) determining that the machine-learning medical imaging screening classifier is validated when the set of performance metrics meets pre-determined criteria, or determining that the machine-learning medical imaging screening classifier is not validated when the set of performance metrics does not meet the pre-determined criteria; and (f) operating the machine-learning medical imaging screening classifier in an autonomous operating mode when the machine-learning medical imaging screening classifier is validated, or operating the machine-learning medical imaging screening classifier in a semi-autonomous or non-autonomous operating mode when the machine-learning medical imaging screening classifier is not validated.

39. A computer system for operating a machine-learning radiological screening classifier, comprising:

one or more computer processors individually or collectively programmed to:

(a) obtain the machine-learning medical imaging screening classifier, wherein the machine-learning medical imaging screening classifier is trained to process medical image data of a subject to determine a classification output indicative of a presence or an absence of a health state in the subject;

(b) obtain medical image data of a plurality of clinical subjects of a medical imaging clinical site, the plurality of clinical subjects comprising one or more positive subjects having the health state and one or more negative subjects not having the health state;

(c) apply the machine-learning medical imaging screening classifier to the medical image data of the plurality of subjects to determine a plurality of classification outputs indicative of a presence or an absence of a health state in each of the plurality of clinical subjects;

(d) determine a set of performance metrics of the machine-learning medical imaging screening classifier, based at least in part on (i) the plurality of classification outputs and (ii) an actual presence or actual absence of the health state for each of the plurality of clinical subjects;

(e) determine that the machine-learning medical imaging screening classifier is validated when the set of performance metrics meets pre-determined criteria, or determining that the machine-learning medical imaging screening classifier is not validated when the set of performance metrics does not meet the pre-determined criteria; and (f) operate the machine-learning medical imaging screening classifier in an autonomous operating mode when the machine-learning medical imaging screening classifier is validated, or operating the machine-learning medical imaging screening classifier in a semi-autonomous or non-autonomous operating mode when the machine-learning medical imaging screening classifier is not validated.

* * * * *